US012647727B2

(12) United States Patent
Nelson et al.

(10) Patent No.: US 12,647,727 B2
(45) **Date of Patent: *Jun. 2, 2026**

(54) SYSTEMS AND METHODS FOR TUNING BASED ON FURNITURE CONFIGURATION

(71) Applicant: THE LOVESAC COMPANY, Stamford, CT (US)

(72) Inventors: Shawn Nelson, Washington, UT (US); David Underwood, Hurricane, UT (US); Brian Kuchler, Hurricane, UT (US); Clint Gibson, St. George, UT (US)

(73) Assignee: THE LOVESAC COMPANY, Stamford, CT (US)

(*) Notice: Subject to any disclaimer, the term of this patent is extended or adjusted under 35 U.S.C. 154(b) by 397 days.

This patent is subject to a terminal disclaimer.

(21) Appl. No.: 17/491,858

(22) Filed: Oct. 1, 2021

(65) Prior Publication Data

US 2022/0078555 A1 Mar. 10, 2022

Related U.S. Application Data

(63) Continuation-in-part of application No. 16/696,696, filed on Nov. 26, 2019, now Pat. No. 11,178,486, (Continued)

(51) Int. Cl.
*H04R 5/02* (2006.01)
*A47C 7/72* (2006.01)
(Continued)

(52) U.S. Cl.
CPC ............... *H04R 5/023* (2013.01); *A47C 7/72* (2013.01); *A47C 7/727* (2018.08); (Continued)

(58) Field of Classification Search
None
See application file for complete search history.

(56) References Cited

U.S. PATENT DOCUMENTS 988,059 A 3/1911 Allen
2,625,983 A 1/1953 Raymond et al.
(Continued)

FOREIGN PATENT DOCUMENTS

CN 2236262 Y 10/1996
CN 101005741 A 7/2007
(Continued)

OTHER PUBLICATIONS

Issue Notification issued for U.S. Appl. No. 17/128,575 mailed Jun. 7, 2023.
(Continued)

*Primary Examiner* — Quynh H Nguyen
(74) *Attorney, Agent, or Firm* — Polsinelli PC

(57) ABSTRACT

An electronic furniture assembly of the present invention includes: (i) a furniture assembly comprising: (A) a base (e.g., a seat portion), (B) at least one transverse or upright member (e.g., a side, armrest or backrest), and (ii) a speaker system mounted within one or more portions of the furniture assembly. A method of tuning a speaker of an audio-enhanced furniture system includes presenting a user with predetermined tuning profiles corresponding to a plurality of configuration footprint shapes in which the furniture assembly can be assembled and in response to a user selection of a given configuration footprint shape, tuning the speaker system according to the tuning profile selected by the user.

20 Claims, 93 Drawing Sheets

Related U.S. Application Data which is a continuation-in-part of application No. 16/273,773, filed on Feb. 12, 2019, now Pat. No. 11,172,301, which is a continuation of application No. 15/348,068, filed on Nov. 10, 2016, now Pat. No. 10,212,519, which is a continuation-in-part of application No. 15/270,339, filed on Sep. 20, 2016, now Pat. No. 10,236,643.

(60) Provisional application No. 62/417,091, filed on Nov. 3, 2016, provisional application No. 62/257,623, filed on Nov. 19, 2015.

(51) Int. Cl.
*A61H 23/02* (2006.01)
*H04R 1/02* (2006.01)

(52) U.S. Cl.
CPC ......... *A61H 23/0236* (2013.01); *H04R 1/025* (2013.01); *H04R 2201/028* (2013.01); *H04R 2420/07* (2013.01)

(56) References Cited

U.S. PATENT DOCUMENTS 2,653,648 A 9/1953 Marshall
3,113,633 A 12/1963 Eberhardt et al.
3,870,297 A 3/1975 Elder
3,880,152 A 4/1975 Nohmura
3,893,731 A 7/1975 Maggs
4,120,017 A 10/1978 Sickles
4,124,249 A 11/1978 Abbeloos
4,321,717 A 3/1982 Serra
4,507,816 A 4/1985 Smith, Jr.
4,734,946 A 4/1988 Saputo
4,846,525 A 7/1989 Manning
5,106,153 A 4/1992 Durling
5,133,017 A 7/1992 Cain et al.
5,173,943 A 12/1992 Dzurko
5,362,296 A 11/1994 Wang et al.
5,367,727 A 11/1994 Dyer, Jr.
5,368,359 A 11/1994 Eakin
5,397,727 A 3/1995 Lee et al.
5,544,938 A 8/1996 Saul et al.
5,624,156 A 4/1997 Leal et al.
5,681,179 A 10/1997 Lane
5,683,139 A 11/1997 Golynsky et al.
5,735,573 A 4/1998 Vredevoogd
5,740,564 A 4/1998 Hankins et al.
5,790,993 A 8/1998 Roma et al.
5,828,766 A 10/1998 Gallo
5,895,365 A 4/1999 Tomlinson
5,967,820 A 10/1999 Siegal et al.
5,995,634 A 11/1999 Zwolski
6,000,353 A 12/1999 De Leu
6,000,758 A 12/1999 Schaffner et al.
6,073,723 A 6/2000 Gallo
6,092,867 A 7/2000 Miller
6,322,146 B1 11/2001 Fisher, Jr.
6,683,965 B1 1/2004 Sapiejewski
6,814,709 B2 11/2004 Schwartz et al.
7,003,832 B2 2/2006 Wilson
7,090,297 B2 8/2006 Mohn et al.
7,164,255 B2 1/2007 Hui
7,172,196 B2 2/2007 Randall
7,213,885 B2 * 5/2007 White, III ............. A47C 4/028 297/440.16
D547,087 S 7/2007 Natuzzi
7,312,393 B2 12/2007 Mccarthy
7,385,357 B2 6/2008 Kuennen et al.
7,419,220 B2 9/2008 White et al.
7,421,608 B2 9/2008 Schron
7,547,073 B2 6/2009 White et al.
7,553,288 B2 6/2009 Cohen
7,575,279 B2 8/2009 Robertson
7,631,937 B2 12/2009 Robertson
7,699,389 B2 4/2010 Robertson
7,735,912 B2 6/2010 Robertson
7,766,421 B2 8/2010 Lawson
7,825,625 B2 11/2010 Posamentier
7,868,587 B2 1/2011 Stevens et al.
7,871,280 B2 1/2011 Henriott
7,918,308 B2 4/2011 Cohen
7,963,612 B2 6/2011 Nelson
7,982,436 B2 7/2011 Randall
8,004,235 B2 8/2011 Baarman et al.
8,035,340 B2 10/2011 Stevens et al.
8,061,864 B2 11/2011 Metcalf et al.
8,074,581 B2 12/2011 Epstein et al.
8,097,984 B2 1/2012 Baarman et al.
8,132,856 B2 3/2012 Wilson et al.
8,146,229 B2 4/2012 Henriott et al.
8,188,854 B2 5/2012 Yamashita
8,228,026 B2 7/2012 Johnson et al.
8,258,653 B2 9/2012 Kitamura et al.
8,290,463 B2 10/2012 Liu et al.
8,299,753 B2 10/2012 Hui
8,324,759 B2 12/2012 Karalis et al.
8,330,414 B2 12/2012 Takahashi et al.
8,344,552 B2 1/2013 Cook et al.
RE44,038 E 3/2013 Cho
8,421,407 B2 4/2013 Johnson
8,427,011 B2 4/2013 Jung et al.
8,446,046 B2 5/2013 Fells et al.
8,471,410 B2 6/2013 Karalis et al.
8,519,668 B2 8/2013 Hui
8,552,593 B2 10/2013 Jung et al.
8,554,165 B2 10/2013 Liu et al.
8,618,697 B2 12/2013 Karaoguz et al.
RE44,713 E 1/2014 Jung
8,629,578 B2 1/2014 Kurs et al.
8,664,914 B2 3/2014 Toya et al.
8,668,045 B2 3/2014 Cohen
8,669,676 B2 3/2014 Karalis et al.
8,716,977 B2 5/2014 Walley et al.
8,760,010 B2 6/2014 Jung et al.
8,783,778 B2 7/2014 Nelson et al.
8,786,252 B2 7/2014 Toya et al.
8,831,513 B2 9/2014 Baarman
8,853,892 B2 10/2014 Fells et al.
8,914,080 B2 12/2014 Kowalewski
8,920,191 B2 12/2014 Carpanzano
8,935,985 B2 1/2015 Hjelm
9,010,851 B2 4/2015 Lapointe
9,088,117 B2 7/2015 Rosenblum
9,095,209 B2 8/2015 Mirth et al.
9,119,000 B2 8/2015 Tracy
9,124,106 B2 9/2015 Toya et al.
9,124,308 B2 9/2015 Metcalf
9,130,395 B2 9/2015 Jung
9,142,995 B2 9/2015 Jung
9,178,376 B2 11/2015 Jung et al.
9,185,988 B1 11/2015 Sanchez
9,277,826 B2 3/2016 Nelson et al.
9,295,339 B2 3/2016 Hampton
9,312,711 B2 4/2016 Toya et al.
9,318,912 B2 4/2016 Baarman et al.
9,362,779 B2 6/2016 Takahashi et al.
RE46,111 E 8/2016 Kook
9,419,478 B2 8/2016 Jung et al.
9,438,069 B2 9/2016 Hongo
9,490,654 B2 11/2016 Tomiki et al.
9,520,738 B2 12/2016 Rejman et al.
9,529,431 B2 12/2016 Bleacher et al.
9,531,197 B2 12/2016 Jung et al.
9,585,468 B2 3/2017 Udagawa et al.
9,608,474 B2 3/2017 Mack
9,685,817 B2 6/2017 Jung
9,734,815 B2 8/2017 Defranks et al.
9,735,836 B2 8/2017 Van Wageningen
9,762,092 B2 9/2017 Jung et al.
9,788,092 B2 10/2017 Rawls-Meehan et al.
9,843,230 B2 12/2017 John

(56) References Cited

U.S. PATENT DOCUMENTS

| | | | |
|---|---|---|---|
| 9,853,405 | B2 | 12/2017 | Suri |
| 9,905,217 | B2 | 2/2018 | Hyde et al. |
| 9,912,188 | B2 | 3/2018 | Lohr |
| 9,975,459 | B2 | 5/2018 | Takada et al. |
| 9,984,686 | B1 | 5/2018 | Mutagi et al. |
| 9,985,463 | B2 | 5/2018 | Seki et al. |
| 10,051,354 | B2 | 8/2018 | Linjama et al. |
| 10,074,475 | B2 | 9/2018 | Lohr et al. |
| 10,101,488 | B2 | 10/2018 | Krupezevic et al. |
| 10,103,584 | B2 | 10/2018 | Van Wageningen et al. |
| 10,123,621 | B2 | 11/2018 | Nelson et al. |
| 10,143,307 | B2 | 12/2018 | Nelson et al. |
| 10,212,519 | B2 * | 2/2019 | Nelson .................. A47C 4/028 |
| 10,235,543 | B2 | 3/2019 | Pachler et al. |
| 10,235,643 | B2 | 3/2019 | Sawka |
| 10,236,643 | B2 | 3/2019 | Nelson et al. |
| 10,239,413 | B2 | 3/2019 | Riedel et al. |
| D848,393 | S | 5/2019 | Pennanen et al. |
| 10,299,095 | B2 | 5/2019 | Porat et al. |
| 10,305,329 | B2 | 5/2019 | Baarman et al. |
| 10,320,244 | B2 | 6/2019 | Van Wageningen |
| 10,326,317 | B2 | 6/2019 | Krupezevic et al. |
| 10,340,744 | B2 | 7/2019 | Tominaga et al. |
| 10,439,445 | B2 | 10/2019 | Jung et al. |
| 10,511,183 | B2 | 12/2019 | Pan et al. |
| 10,545,180 | B2 | 1/2020 | Van Wageningen |
| 10,679,601 | B2 | 6/2020 | Linjama et al. |
| RE48,193 | E | 9/2020 | Cho |
| 10,827,280 | B2 | 11/2020 | Linjama et al. |
| 10,957,302 | B2 | 3/2021 | Linjama et al. |
| 10,972,838 | B2 | 4/2021 | Nelson et al. |
| 10,979,241 | B2 | 4/2021 | Nelson et al. |
| 11,039,234 | B2 | 6/2021 | Linjama et al. |
| 11,112,301 | B2 | 9/2021 | Lee et al. |
| 11,139,698 | B2 | 10/2021 | Jung et al. |
| 11,159,026 | B2 | 10/2021 | Kim |
| 11,172,301 | B2 | 11/2021 | Nelson |
| 11,178,486 | B2 | 11/2021 | Nelson et al. |
| 11,178,487 | B2 | 11/2021 | Nelson et al. |
| 11,374,417 | B2 | 6/2022 | Bober et al. |
| 11,381,091 | B2 | 7/2022 | Fang et al. |
| 11,435,534 | B2 | 9/2022 | Hill et al. |
| 11,444,485 | B2 | 9/2022 | Partovi |
| 11,469,615 | B2 | 10/2022 | Bober et al. |
| 11,647,840 | B2 | 5/2023 | Nelson et al. |
| 11,689,856 | B2 | 6/2023 | Nelson et al. |
| 2001/0020810 | A1 | 9/2001 | Kennedy |
| 2002/0063454 | A1 | 5/2002 | Illulian |
| 2003/0025366 | A1 | 2/2003 | Barreiro |
| 2003/0090135 | A1 | 5/2003 | Newman et al. |
| 2003/0102657 | A1 | 6/2003 | Kuo |
| 2003/0139693 | A1 | 7/2003 | Swift |
| 2003/0167222 | A1 * | 9/2003 | Mehrotra ............. G06Q 10/087 705/37 |
| 2004/0026998 | A1 | 2/2004 | Henriott et al. |
| 2004/0061943 | A1 | 4/2004 | Bosch et al. |
| 2004/0095000 | A1 | 5/2004 | Durling |
| 2005/0007067 | A1 | 1/2005 | Baarman et al. |
| 2005/0008147 | A1 | 1/2005 | Lee |
| 2005/0053252 | A1 | 3/2005 | Cohen |
| 2005/0096098 | A1 | 5/2005 | Woods |
| 2005/0185801 | A1 | 8/2005 | Mccarty et al. |
| 2005/0253430 | A1 | 11/2005 | George et al. |
| 2005/0264044 | A1 | 12/2005 | Lee |
| 2006/0036201 | A1 | 2/2006 | Cohen |
| 2006/0061148 | A1 | 3/2006 | Pollard et al. |
| 2006/0076813 | A1 | 4/2006 | Mohn et al. |
| 2006/0102657 | A1 | 5/2006 | Naslund et al. |
| 2006/0147067 | A1 * | 7/2006 | Lee .......................... H04R 5/02 381/306 |
| 2006/0220435 | A1 | 10/2006 | Carter et al. |
| 2006/0238087 | A1 | 10/2006 | Holt |
| 2006/0279124 | A1 | 12/2006 | White et al. |
| 2007/0001494 | A1 | 1/2007 | Hoover |
| 2007/0164178 | A1 | 7/2007 | Beilstein et al. |
| 2008/0012404 | A1 | 1/2008 | Dewert |
| 2008/0037794 | A1 | 2/2008 | Sugawara et al. |
| 2008/0122241 | A1 | 5/2008 | Blackmore et al. |
| 2008/0150329 | A1 | 6/2008 | Lawson |
| 2008/0220646 | A1 | 9/2008 | Leddusire |
| 2008/0262657 | A1 | 10/2008 | Howell et al. |
| 2009/0001775 | A1 | 1/2009 | Smith |
| 2009/0032660 | A1 | 2/2009 | Wadsworth et al. |
| 2009/0072782 | A1 | 3/2009 | Randall |
| 2009/0096255 | A1 | 4/2009 | Robertson |
| 2009/0212638 | A1 | 8/2009 | Johnson |
| 2009/0212639 | A1 | 8/2009 | Johnson |
| 2009/0212737 | A1 | 8/2009 | Johnson et al. |
| 2009/0250982 | A1 | 10/2009 | Cohen |
| 2010/0055928 | A1 | 3/2010 | Randall |
| 2010/0092022 | A1 | 4/2010 | Hopkinson et al. |
| 2010/0178797 | A1 | 7/2010 | Byrne |
| 2010/0290215 | A1 | 11/2010 | Metcalf et al. |
| 2010/0320819 | A1 | 12/2010 | Cohen et al. |
| 2011/0012403 | A1 | 1/2011 | Wilson et al. |
| 2011/0025915 | A1 | 2/2011 | Daban |
| 2011/0109163 | A1 | 5/2011 | Bennett |
| 2011/0109211 | A1 | 5/2011 | Kirkeby et al. |
| 2011/0110075 | A1 | 5/2011 | Smith |
| 2011/0298340 | A1 | 12/2011 | Nelson et al. |
| 2012/0026724 | A1 | 2/2012 | Metcalf et al. |
| 2012/0051579 | A1 | 3/2012 | Cohen |
| 2012/0123897 | A1 * | 5/2012 | Gargiulo ............ G06Q 30/0621 705/26.5 |
| 2012/0200129 | A1 | 8/2012 | Wilson, Jr. |
| 2012/0286557 | A1 | 11/2012 | Hoffman et al. |
| 2012/0316884 | A1 | 12/2012 | Rozaieski et al. |
| 2013/0002001 | A1 | 1/2013 | Allen et al. |
| 2013/0066636 | A1 | 3/2013 | Singhal |
| 2013/0129105 | A1 | 5/2013 | Hua |
| 2013/0137524 | A1 | 5/2013 | Scott |
| 2013/0177198 | A1 | 7/2013 | Hogue et al. |
| 2013/0199421 | A1 | 8/2013 | Hjelm |
| 2013/0207478 | A1 | 8/2013 | Metcalf et al. |
| 2013/0234481 | A1 | 9/2013 | Johnson |
| 2013/0249257 | A1 | 9/2013 | Suhre et al. |
| 2013/0304475 | A1 | 11/2013 | Gratke et al. |
| 2013/0333940 | A1 | 12/2013 | Stencil |
| 2014/0010387 | A1 | 1/2014 | Cohen |
| 2014/0022084 | A1 * | 1/2014 | Drimusz .............. H04R 29/001 381/300 |
| 2014/0197666 | A1 | 7/2014 | Koch |
| 2014/0272266 | A1 | 9/2014 | Svilar |
| 2014/0285140 | A1 | 9/2014 | Jung |
| 2014/0368476 | A1 | 12/2014 | Rauch et al. |
| 2015/0061258 | A1 | 3/2015 | Flores et al. |
| 2015/0069965 | A1 | 3/2015 | Verschueren |
| 2015/0076881 | A1 | 3/2015 | Lapointe |
| 2015/0076891 | A1 | 3/2015 | Lapointe et al. |
| 2015/0230622 | A1 | 8/2015 | Orbelian |
| 2015/0255914 | A1 | 9/2015 | Kong et al. |
| 2015/0300627 | A1 | 10/2015 | Wang et al. |
| 2015/0334482 | A1 | 11/2015 | Rawls-Meehan et al. |
| 2016/0118035 | A1 | 4/2016 | Hyde et al. |
| 2016/0126916 | A1 | 5/2016 | Kappus et al. |
| 2016/0136529 | A1 | 5/2016 | Weston et al. |
| 2016/0174715 | A1 | 6/2016 | Nelson et al. |
| 2016/0257227 | A1 | 9/2016 | Takada et al. |
| 2016/0286291 | A1 | 9/2016 | Linjama et al. |
| 2016/0379631 | A1 | 12/2016 | Wang et al. |
| 2017/0135490 | A1 | 5/2017 | Andrix et al. |
| 2017/0143122 | A1 | 5/2017 | Nelson et al. |
| 2017/0149181 | A1 | 5/2017 | Nelson et al. |
| 2017/0150264 | A1 | 5/2017 | Nelson et al. |
| 2017/0214197 | A1 | 7/2017 | Suri |
| 2017/0221340 | A1 | 8/2017 | Rhoads et al. |
| 2017/0295941 | A1 | 10/2017 | King et al. |
| 2017/0317458 | A1 | 11/2017 | Byrne et al. |
| 2018/0000244 | A1 | 1/2018 | Nelson et al. |
| 2018/0041354 | A1 | 2/2018 | Nelson et al. |
| 2018/0158192 | A1 | 6/2018 | Rocque et al. |
| 2018/0191178 | A1 | 7/2018 | Byrne et al. |
| 2018/0253947 | A1 | 9/2018 | Muhsin et al. |
| 2019/0222935 | A1 | 7/2019 | Nelson et al. |

(56) References Cited

U.S. PATENT DOCUMENTS

| | | | | |
|---|---|---|---|---|
| 2019/0266993 | A1 | 8/2019 | Linjama et al. | |
| 2020/0100030 | A1 | 3/2020 | Nelson et al. | |
| 2020/0100031 | A1 | 3/2020 | Nelson et al. | |
| 2020/0221227 | A1 | 7/2020 | Nelson et al. | |
| 2021/0002170 | A1 | 1/2021 | Chien et al. | |
| 2021/0105563 | A1 * | 4/2021 | Marten | H04N 21/439 |
| 2021/0112341 | A1 | 4/2021 | Nelson et al. | |
| 2021/0352422 | A1 | 11/2021 | Lin et al. | |
| 2022/0060829 | A1 | 2/2022 | Nelson et al. | |
| 2022/0078555 | A1 | 3/2022 | Nelson et al. | |
| 2022/0095060 | A1 | 3/2022 | Yang et al. | |
| 2022/0115907 | A1 | 4/2022 | Bober et al. | |
| 2022/0337928 | A1 | 10/2022 | Nelson | |
| 2022/0400868 | A1 | 12/2022 | Nelson et al. | |
| 2022/0408925 | A1 | 12/2022 | Rafieha | |
| 2023/0111916 | A1 | 4/2023 | Nelson et al. | |
| 2023/0126734 | A1 | 4/2023 | Piccin | |
| 2023/0209262 | A1 | 6/2023 | Nelson et al. | |
| 2023/0209263 | A1 | 6/2023 | Nelson et al. | |
| 2023/0217170 | A1 | 7/2023 | Nelson et al. | |
| 2023/0336911 | A1 * | 10/2023 | Orth | H04R 3/04 |

FOREIGN PATENT DOCUMENTS

| | | | | |
|---|---|---|---|---|
| CN | 201135239 | Y | 10/2008 | |
| CN | 201178847 | Y | 1/2009 | |
| CN | 201282826 | Y | 8/2009 | |
| CN | 201341645 | Y | 11/2009 | |
| CN | 201452358 | U | 5/2010 | |
| CN | 201518894 | U | 7/2010 | |
| CN | 101909490 | A | 12/2010 | |
| CN | 202211357 | U | 5/2012 | |
| CN | 202530580 | U | 11/2012 | |
| CN | 202553058 | U | 11/2012 | |
| CN | 101909490 | B | 3/2013 | |
| CN | 202817641 | U | 3/2013 | |
| CN | 202907151 | U | 4/2013 | |
| CN | 202981088 | U | 6/2013 | |
| CN | 203563950 | U | 4/2014 | |
| CN | 203609079 | U | 5/2014 | |
| DE | 102012211865 | A1 | 5/2013 | |
| EP | 3244633 | A1 | 5/2016 | |
| EP | 3244628 | A1 | 11/2017 | |
| EP | 3097703 | B1 | 10/2018 | |
| FI | 20196020 | A1 | 5/2021 | |
| GB | 2300329 | A | 10/1996 | |
| JP | 47-004753 | Y1 | 2/1972 | |
| JP | 56-087863 | A | 7/1981 | |
| JP | 59-067079 | A | 4/1984 | |
| JP | 59-107523 | A | 6/1984 | |
| JP | S59107523 | U | 7/1984 | |
| JP | 06-079086 | A | 3/1994 | |
| JP | 08063174 | A | 3/1996 | |
| JP | 3047023 | U | 3/1998 | |
| JP | 3047023 | B2 | 5/2000 | |
| JP | 2001-285976 | A | 10/2001 | |
| JP | 2004-097273 | A | 4/2004 | |
| JP | 2007-003994 | A | 1/2007 | |
| JP | 2008-513138 | A | 5/2008 | |
| JP | 2008-545504 | A | 12/2008 | |
| JP | 2011505921 | A | 3/2011 | |
| JP | 2013-094405 | A | 5/2013 | |
| JP | 2014-230026 | A | 12/2014 | |
| JP | 2015-126460 | A | 7/2015 | |
| KR | 20080012919 | A | 2/2008 | |
| WO | 99/63786 | A1 | 12/1999 | |
| WO | 2006/135509 | A2 | 12/2006 | |
| WO | WO-2009113319 | A1 * | 9/2009 | A47C 7/72 |
| WO | 2012/093398 | A2 | 7/2012 | |
| WO | WO-2012093398 | A3 | 10/2012 | |
| WO | 2014/072975 | A1 | 5/2014 | |
| WO | 2015/118217 | A1 | 8/2015 | |
| WO | 2016/044884 | A1 | 3/2016 | |
| WO | 2017/087266 | A1 | 5/2017 | |
| WO | 2017/087268 | A1 | 5/2017 | |
| WO | WO-2017087224 | A1 | 5/2017 | |
| WO | 2017/194785 | A1 | 11/2017 | |
| WO | 2018/134142 | A1 | 7/2018 | |
| WO | 2018/189422 | A1 | 10/2018 | |
| WO | 2021/105554 | A1 | 6/2021 | |
| WO | 2021/141783 | A1 | 7/2021 | |
| WO | 2022/262950 | A1 | 12/2022 | |

OTHER PUBLICATIONS

Issue Notification issued for U.S. Appl. No. 17/349,363 mailed Apr. 27, 2023.

Lovesac Stealthtech, Sactionals Sound + Charge System, Setup Guide, 48 pages, Publicly available at least as early as Feb. 2023.

Lovesac Stealthtech, sound by harman/kardon, Get Ready for a Fully Immersive Audio Experience, Welcome to Sactionals StealthTech Sound + Charge, Software Application Screen Prints, 41 pages, publicly available, on information and belief, at least as early as Nov. 2021, Printed Feb. 2023.

Non-Final Office Action received for U.S. Appl. No. 18/065,329, mailed on May 30, 2023, 7 pages.

Notice of Allowance and Fees Due (PTOL-85) Mailed on Apr. 13, 2023 for U.S. Appl. No. 17/128,575, 3 page(s).

Notice of Allowance received for U.S. Appl. No. 17/348,088, mailed on Mar. 28, 2023, 5 pages.

Non-Final Office Action received for U.S. Appl. No. 17/128,575, mailed on Oct. 24, 2022, 32 pages.

"The Wireless Speaker and Audio (WISA(Registered)) Association, " retrieved Nov. 7, 2016 at www.wisaassocation.org, 2 pages.

"WISA Wireless Speaker & Audio," retrieved on Nov. 7, 2016 at www.wisaassociation.org, 3 pages.

Bose Corporation, Wikipedia, http:/en.wikipedia.org/wiki/Bose_Corporation, Apr. 25, 2012.

Corrected Notice of Allowance received for U.S. Appl. No. 15/786,922, mailed on Sep. 23, 2020.

Corrected Notice of Allowance received for U.S. Appl. No. 15/786,922, mailed on Sep. 28, 2020.

Curry, M. "Its Speakers Sound Good Even in Terrible Listening Environments, i.e. Your Apartment;" Core77; Article [online]. Sep. 29, 2015 [retrieved Jan. 30, 2017]. Retrieved from the Internet: <URL: http://www.core77.com/posts/41080/Sonos-Debuts-Software-That-Makes-Its-Speakers-Sound-Good-Even-in-Terrible-Listening-Environments-ie-Your-Apartment; p. 2, paragraph 2 to p. 4, paragraph 1.

Equalization (audio) Wikipedia, web.archive.org archived pages, https://web.archive.org/web/20210325042554/https://en.wikipedia.org/wiki/Equalization_(audio) dated Mar. 25, 2021, last updated Mar. 20, 2021 (11 pages).

Equalization (audio); Wikipedia, https://en.wikipedia.org/wiki/Equalization_(audio), printed Jul. 13, 2021 (11 pages).

Equalization—What's the difference of frequency sets for 10 band equalizers?—Sound Design Stock Exchange; sound.stackechange.com question/answer website pages; dated Jan. 22, 2015 (2 pages).

Final Office Action received for U.S. Appl. No. 13/869,600, mailed on Sep. 14, 2016.

Final Office Action received for U.S. Appl. No. 15/270,339, mailed on Mar. 12, 2018.

Final Office Action received for U.S. Appl. No. 15/786,922, mailed on May 22, 2019.

Final Office Action received for U.S. Appl. No. 16/273,773, mailed on Feb. 12, 2020.

Final Office Action received for U.S. Appl. No. 16/273,773, mailed on Oct. 13, 2020.

Final Rejection Mailed on May 24, 2021 for U.S. Appl. No. 16/738,916.

Final Rejection received for U.S. Appl. No. 16/696,696, mailed on May 3, 2021.

Final Rejection received for U.S. Appl. No. 15/348,068, Mailed on Apr. 2, 2018.

Issue Notification received for U.S. Appl. No. 15/270,339, mailed on Feb. 27, 2019.

Issue Notification received for U.S. Appl. No. 15/348,068, mailed on Jan. 30, 2019.

(56) References Cited

OTHER PUBLICATIONS

Issue Notification received for U.S. Appl. No. 15/786,922, mailed on Aug. 5, 2020.
Leviton, "2-Gang White Duplex Outlet/Quick Port Plate Recessed Device, " retrieved Nov. 17, 2017 at homedepot.com, (2 pages).
Leviton, "Product Bulletin for Recessed Devices Cal. Nos. 689 and 690," Copyright 2008, published and available, on information and belief, at least as early as 2008 (2 pages).
Non-Final Office Action received for U.S. Appl. No. 16/273,773, mailed on Jun. 16, 2020, 18 pages.
Non-Final Rejection Mailed on Apr. 19, 2021 for U.S. Appl. No. 16/273,773.
Non-Final Rejection Mailed on Jan. 28, 2021 for U.S. Appl. No. 16/738,916.
Notice of Allowance and Fees Due (PTOL-85) Mailed on Jul. 27, 2021 for U.S. Appl. No. 16/273,773.
Notice of Allowance and Fees Due (PTOL-85) Mailed on Sep. 21, 2021 for U.S. Appl. No. 16/696,696.
Notice of Allowance and Fees Due (PTOL-85) Mailed on Sep. 28, 2021 for U.S. Appl. No. 16/738,916.
Notice of Allowance received for U.S. Appl. No. 15/270,339, mailed on Jan. 24, 2019.
Notice of Allowance received for U.S. Appl. No. 15/348,068, mailed on Dec. 12, 2018.
Notice of Allowance received for U.S. Appl. No. 15/786,922, mailed on Jul. 10, 2020.
Notice of Allowance received for U.S. Appl. No. 15/786,922, mailed on Mar. 2, 2020.
Notice of Allowance received for U.S. Appl. No. 15/786,922, mailed on Sep. 15, 2020.
Notice of Allowance received for U.S. Appl. No. 16/696,712, mailed on Aug. 27, 2020.
Notice of Allowance received for U.S. Appl. No. 16/696,712, mailed on Dec. 30, 2020.
Office Action received for U.S. Appl. No. 13/869,600, mailed on Dec. 15, 2015.
Office Action received for U.S. Appl. No. 15/270,339, mailed on Aug. 6, 2018.
Office Action received for U.S. Appl. No. 15/270,339, mailed on Jun. 22, 2017.
Office Action received for U.S. Appl. No. 15/348,068, mailed on Nov. 1, 2017.
Office Action received for U.S. Appl. No. 15/348,068, mailed on Oct. 2, 2018.
Office Action received for U.S. Appl. No. 15/786,922, mailed on Nov. 28, 2018.
Office Action received for U.S. Appl. No. 15/786,922, mailed on Oct. 1, 2019.
Office Action received for U.S. Appl. No. 16/273,773, mailed on Oct. 25, 2019.
Office Action received for U.S. Appl. No. 16/696,696, mailed on Jan. 14, 2021.
Restriction Requirement received for U.S. Appl. No. 15/348,068, mailed on Aug. 2, 2017.
The Wall Street Journal newspaper article entitled, "Wireless Charging Everywhere," dated Dec. 30, 2015.
U.S. Appl. No. 60/778,761, entitled Power Delivery Surface Power Supply Safety, filed Mar. 3, 2006 (59 pages).
Gear Diary, "Lovesac Sactionals StealthTech Sound + Charge System Brings Invisible and Immersive Harmon Kardon Sound to Your Home Theater", posted Oct. 18, 2021, publicly accessed Oct. 24, 2022, 6 pages.
Lovesac.com "An Unparalled, Immersive Home Experience", publicly accessed Oct. 24, 2022, 8 pages.
Notice of Allowance and Fees Due (PTOL-85) Mailed on Aug. 16, 2023 for U.S. Appl. No. 17/348,088, 2 page(s).
Notice of Allowance and Fees Due (PTOL-85) Mailed on Aug. 31, 2023 for U.S. Appl. No. 18/065,329, 7 page(s).
Office Action published Jan. 30, 23, U.S. Trademark U.S. Appl. No. 97/627,790, 41 pages.
Photos of Lovesac Stealthech sectional furniture SIDE upright member/arm rest (fabric covering and foam removed) with speakers, which was publicly available at least as early as Feb. 2022; 6 photos; 3 pages.
U.S. Trademark Application, U.S. Appl. No. 97/627,790, filed Oct. 11, 2022, publicly accessed Oct. 24, 2022, 3 pages.
Non-Final Rejection Mailed on Jul. 26, 2022 for U.S. Appl. No. 17/348,088.
Notice of Allowance and Fees Due (PTOL-85) Mailed on Jul. 17, 2023 for U.S. Appl. No. 17/348,088, 22 page(s).
Notice of Allowance and Fees Due (PTOL-85) Mailed on Jul. 25, 2023 for U.S. Appl. No. 17/520,488, 5 page(s).
Black Sobro Smart End Table with Built-In-Outlets, 7 pages, www.wayfair.com, Nov. 30, 2022.
Jason Cartwright, This connected bed has wireless charging, bluetooth and a subwoofer, 8 pages, Aug. 12, 2019, www.techau.com.au, Nov. 28, 2022.
Non-Final Office Action received for U.S. Appl. No. 17/349,363, mailed on Aug. 25, 2022, 6 pages.
Notice of Allowance and Fees Due (PTOL-85) Mailed on Feb. 13, 2023 for U.S. Appl. No. 17/128,575, 15 page(s).
Notice of Allowance Office Action received for U.S. Appl. No. 17/520,488, mailed on Mar. 17, 2023, 5 pages.
Notice of Allowance received for U.S. Appl. No. 17/348,088, mailed on Mar. 23, 2023.
Notice of Allowance received for U.S. Appl. No. 17/349,363, mailed on Jan. 5, 2023, 6 pages.
Notice of Allowance received for U.S. Appl. No. 17/349,363, mailed on Sep. 28, 2022, 8 pages.
Notice of Allowance received in U.S. Appl. No. 17/348,088, mailed on Dec. 19, 2022.
Office Action received for U.S. Appl. No. 17/520,488, mailed on Feb. 24, 2023.
Restriction Requirement received for U.S. Appl. No. 17/349,363, mailed on Jun. 10, 2022, 8 pages.
Sobro Coffee Table with Built in Fridge, Speakers, Outlets, LED Light, and More—Black, 12 pages, www.amazon.com, Nov. 29, 2022.
Sobro Smart Side/Nightstand Table—with Cooling Drawer, Wireless Charging, Bluetooth Speakers, USB-C and 120V outlets, LED Light, Black/Black, 11 pages, www.amazon.com, Nov. 29, 2022.
Amendment and Response to Office Action for U.S. Appl. No. 16/273,773 dated May 11, 2020, 13 pages.
Communication Pursuant to Article 94(3) EPC for European Patent Application No. 16866890.3, mailed on Dec. 12, 2019, 4 pages.
International Search Report and Written Opinion for Application No. PCT/US2016/061085, mailed on Jan. 31, 2017, 11 pages.
International Search Report and Written Opinion for Application No. PCT/US2016/061491, mailed on Apr. 3, 2017, with Search History, 25 pages.
International Search Report and Written Opinion for Application No. PCT/US2016/061508, mailed on Apr. 19, 2017, 12 pages.
Invitation to Pay Additional Fees and, Where Applicable, Protest Fee, for International Application No. PCT/US2016/061491, dated Jan. 24, 2017, 2 pages.
Korean Office Action for Application No. 10-2018-7014059 dated Nov. 1, 2023 (32 pages).
Mar. 22, 2024—(US) Notice of Allowance—U.S. Appl. No. 18/300,148, 12 Pages.
Mar. 26, 2024—(US) Non-Final Office Action—U.S. Appl. No. 17/491,858, 93 Pages.
International Search Report and The Written Opinion of the International Searching Authority for International Application No. PCT/US2024/018378 dated Jun. 25, 2024 (21 pages).
Jul. 18, 2024—(US) Non-Final Office Action—U.S. Appl. No. 18/458,350, 58 Pages.
Dec. 4, 2024—(US) Non-Final Office Action—U.S. Appl. No. 18/178,287, 79 Pages.
Dec. 9, 2024—(US) Non-Final Office Action—U.S. Appl. No. 18/178,304, 90 Pages.
Dec. 9, 2024—(US) Non-Final Office Action—U.S. Appl. No. 18/183,204, 90 Pages.

(56) References Cited

OTHER PUBLICATIONS

Dec. 10, 2024—(US) Non-Final Office Action—U.S. Appl. No. 18/178,319, 85 Pages.
Dec. 17, 2024—Notification of Reexamination—Chinese Patent Application No. 201680067504.2, 20 Pages.
Nov. 5, 2024—(US) Final Office Action—U.S. Appl. No. 18/458,350, 15 Pages.
Feb. 18, 2025—(CN) Decision of Reexamination—App No. 201680067504.2, 15 Pages.
Feb. 25, 2025—(US) Non-Final Office Action—U.S. Appl. No. 18/458,350, 11 Pages.
Currey ("Its speakers sounds good even in terrible sound environments i. e. your apartment"). (Year: 2010).
Handbagio ("Guide to Leather Weight and Thickness (With Charts)" Aug. 4, 2022) (Year: 2022).
Nonpatent reference (Year: 2017).

* cited by examiner

| Target Frequency (Hz) | F1 | F2 | F3 | ... | Fn |
|---|---|---|---|---|---|
| Baseline EQ (dB) | V1 | V2 | V3 | ... | Vn |
| w/ Fabric (dB) | V1_fabric1 | V2_fabric1 | V3_fabric1 | ... | Vn_fabric1 |
| EQ Compensation | ÄV1 | ÄV2 | ÄV3 | ... | ÄVn |

*FIG. 26*

POLYESTER

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 94 | 92 | 89 | 87 | 89 | 90 | 87 | 84 |
| w/ Fabric (dB) | 72 | 83 | 94 | 92 | 88 | 84 | 83 | 82 | 78 | 76 |
| EQ Compensation (dB) | 0 | 0 | 0 | 0 | 1 | 3 | 6 | 8 | 9 | 8 |

*FIG. 27A*

CHENILLE

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 72 | 83 | 94 | 92 | 89 | 86 | 85 | 85 | 82 | 79 |
| EQ Compensation (dB) | 0 | 0 | 1 | 0 | 0 | 1 | 4 | 5 | 5 | 5 |

*FIG. 27B*

TWEED

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 70 | 82 | 94 | 92 | 89 | 87 | 89 | 89 | 85 | 81 |
| EQ Compensation (dB) | 2 | 1 | 1 | 0 | 0 | 0 | 0 | 1 | 2 | 3 |

*FIG. 27C*

LINEN

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 71 | 83 | 95 | 92 | 89 | 86 | 89 | 89 | 85 | 81 |
| EQ Compensation (dB) | 1 | 0 | 0 | 0 | 0 | 1 | 0 | 1 | 2 | 3 |

*FIG. 27D*

VELVET

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 70 | 82 | 93 | 92 | 89 | 87 | 88 | 88 | 82 | 79 |
| EQ Compensation (dB) | 2 | 1 | 2 | 0 | 0 | 0 | 1 | 2 | 5 | 5 |

*FIG. 27E*

LEATHER

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 72 | 83 | 92 | 92 | 89 | 85 | 82 | 79 | 72 | 68 |
| EQ Compensation (dB) | 0 | 0 | 3 | 0 | 0 | 2 | 7 | 11 | 15 | 16 |

*FIG. 27F*

POLYESTER LINEN

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 71 | 83 | 93 | 92 | 88 | 87 | 84 | 84 | 77 | 73 |
| EQ Compensation (dB) | 1 | 0 | 2 | 0 | 1 | 0 | 5 | 6 | 10 | 11 |

*FIG. 27G*

FAUX FUR

| Target Frequency (Hz) | 32 | 63 | 125 | 250 | 500 | 1K | 2K | 4K | 8K | 16K |
|---|---|---|---|---|---|---|---|---|---|---|
| Baseline EQ (dB) | 72 | 83 | 95 | 92 | 89 | 87 | 89 | 90 | 87 | 84 |
| w/ Fabric (dB) | 72 | 82 | 94 | 92 | 89 | 85 | 81 | 80 | 76 | 74 |
| EQ Compensation (dB) | 0 | 1 | 1 | 0 | 0 | 2 | 8 | 10 | 11 | 10 |

*FIG. 27H*

Plug In a. Plug Center Channel power cord into an outlet.

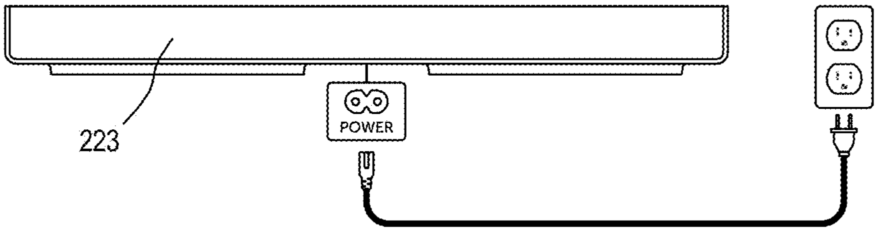

*FIG. 35*

Power On and Select Input a. If Center Channel is off, press Power button.

b. Select input by pressing the Input button on the Center Channel.

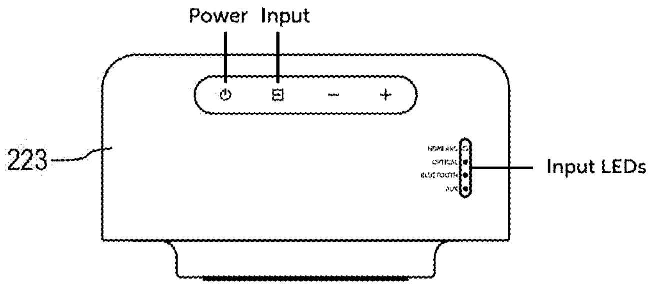

*FIG. 36*

Pair Remote Control a. With Center Channel on, simultaneously hold down the Volume + and - buttons on the Remote Control for more than 5 seconds.

- Red LED on Remote Control will blink for two seconds, then turn off.

b. Change volume with Remote Control to verify successful pairing.

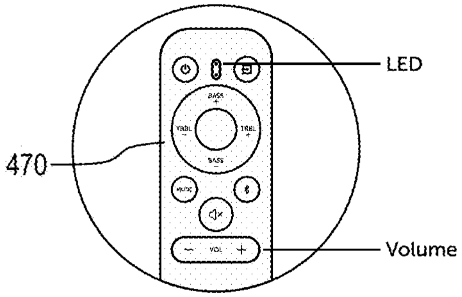

*FIG. 38*

1. Power
2. Input: HDMI ARC, Optical, Bluetooth, AUX.
3. Bass: Increase or decrease subwoofer volume.
4. Treble: Increase or decrease treble level.
5. Mode: Toggle between sound modes
6. Bluetooth Input: Select Bluetooth input. Long press to begin Bluetooth pairing.
7. Mute
8. Volume

Sound + Charge Subwoofer

The Subwoofer receives the signal from the Center Channel, amplifies the signal and sends it to the Sound + Charge Sides and Satellite Sides

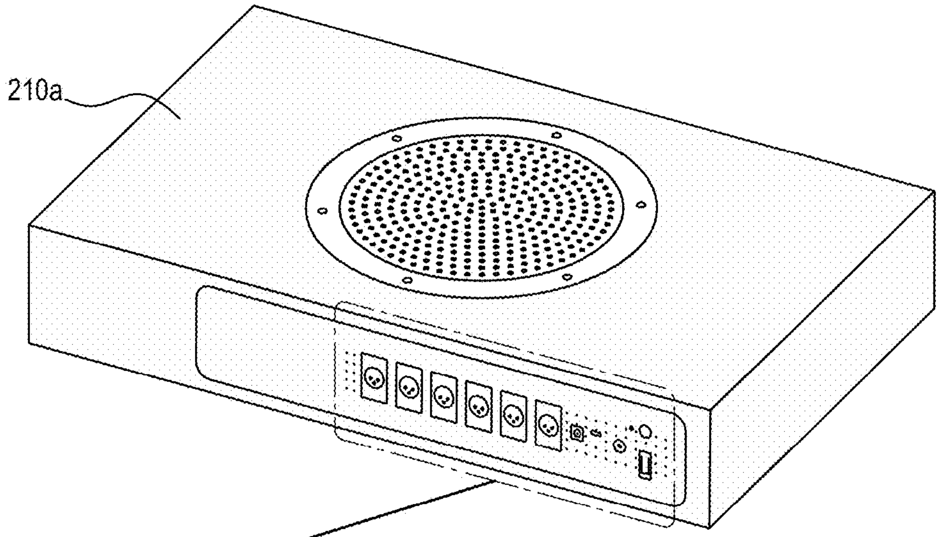

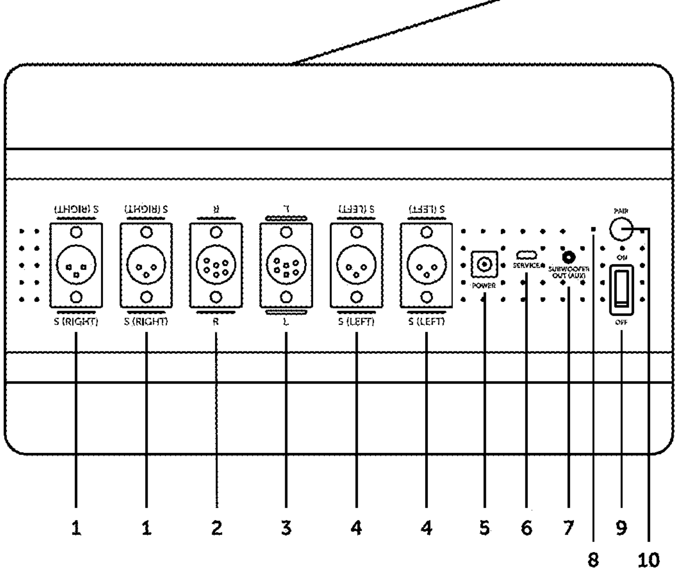

1. 2x Satellite Side (Optional): S (Right)
2. Sound + Charge Side: R
3. Sound + Charge Side: L
4. 2x Satellite Side (Optional): S (Left)
5. Power Cord port
6. Factory USB port
7. AUX out
8. Pairing LED indicator
9. On/Off Switch
10. Pair button

*FIG. 39*

Lay Down Shoes a. Lay down Shoes to know where to lay out cables.

Place Seat Frame
a. Place your Seat Frame with Subwoofer into 4 Shoes.
b. Leave Shoes sticking out to connect other Seats or Sides.
c. Straighten Shoes using alignment marks.

Add Seat Frames
a. Place the rest of your Sectionals Seat Frames into Shoes.
b. Ensure cable ends reach past all Seats.

Lay out all Sides
a. Place all Sides near their final location.

Add Sides and Clamps
a. Place all Sides in Shoes.
b. Use included steel Clamps to attach all Sides to Seat Frames.

Add Cushions and Pillows
a. Add all of your Seat Cushions and Back Pillows.

LED Indicators

The LED indicators will behave differently with each function.

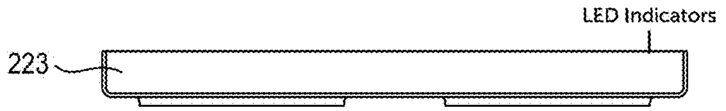

| FUNCTION | LED BEHAVIOR | DESCRIPTION |
| --- | --- | --- |
| POWER ON/ WAKE FROM STANDBY | All LEDs flash once. | Press the ***Power*** button on the Center Channel, remote control, or in the app. |
| SELECT INPUT | HDMI-ARC<br>Optical<br>Bluetooth<br>AUX | On the Center Channel, press the ***Input*** button to change audio input.<br>On the remote control, press the ***Input*** button display the current input and press again to change audio input. Or press the ***Bluetooth*** button to directly select the Bluetooth input.<br>In the app, press the ***Input*** button at the top of the dashboard to change audio input. |
| VOLUME | Volume increases from left to right | On the Center Channel and remote control, press the ***Volume +/-*** buttons to increase/decrease volume level.<br>In the app, slide the ***System Volume*** slider to increase/decrease volume level. |
| MUTE | LEDs used to display current volume will change to half brightness when muted.<br>Example volume level<br>Example volume level when muted | On the remote control and in the app, press the ***Mute*** button to mute sound for the entire system. Press again to unmute, or press ***VOL +/-*** buttons to unmute. |

FIG. 47

LED Indicators (Cont.)

| FUNCTION | LED BEHAVIOR | DESCRIPTION |
|---|---|---|
| BLUETOOTH | Bluetooth Input Selected.<br>**Bluetooth Pairing Process:**<br>1. Pairing: All LEDs flash slow.<br>2: Connected: All LEDs at full brightness. | <u>Select Bluetooth Input:</u><br>On the Center Channel, press the ***Input*** button until the Bluetooth input is selected.<br><br>On the remote control and in the app, press the ***Bluetooth*** button once to select Bluetooth input.<br><br><u>Pair to Bluetooth:</u><br>On the remote control, press and hold the ***Bluetooth*** button for 3 seconds to initiate the pairing process.<br><br>On the Center Channel, press ***Input*** button until Bluetooth is selected. Press and hold the ***Input*** button for 3 seconds to initiate Bluetooth pairing process. |
| TREBLE/BASS<br>- +| Level increases from left to right<br>Treble/Bass at default level | On the remote control, press ***Bass+/Bass-*** and ***Treble+/Treble-*** buttons to increase/decrease bass or treble level.<br><br>In the app, slide ***Bass+/Bass-*** and ***Treble+/Treble-*** sliders to increase/decrease bass or treble level. |
| SPEAKER BALANCE<br>L R | 3 Levels Right of Center<br>2 Levels Right of Center<br>1 Level Right of Center<br>Speaker and Center Balance is Centered<br>1 Level Left of Center<br>2 Levels Left of Center<br>3 Levels Left of Center | In the app, slide ***Speaker Balance*** slider to move the balance to the left or right. |

*FIG. 48*

SYSTEMS AND METHODS FOR TUNING BASED ON FURNITURE CONFIGURATION

PRIORITY CLAIM

Cross-Reference to Related Applications

This application is a continuation-in-part of U.S. patent application Ser. No. 16/696,696 filed Nov. 26, 2019, entitled MODULAR FURNITURE SPEAKER ASSEMBLY WITH RECONFIGURABLE TRANSVERSE MEMBERS, which application is a continuation-in-part of U.S. patent application Ser. No. 16/273,773 filed Feb. 12, 2019, entitled ELECTRONIC FURNITURE SYSTEMS WITH INTEGRATED INTERNAL SPEAKERS, which application is a continuation of U.S. patent application Ser. No. 15/348,068 (now U.S. Pat. No. 10,212,519), filed on Nov. 10, 2016, entitled ELECTRONIC FURNITURE SYSTEMS WITH INTEGRATED INTERNAL SPEAKERS, which:

(A) is a continuation-in-part of U.S. patent application Ser. No. 15/270,339 (now U.S. Pat. No. 10,236,643), filed on Sep. 20, 2016, entitled ELECTRICAL HUB FOR FURNITURE ASSEMBLIES, which claims priority to and the benefit of U.S. Provisional Patent Application Ser. No. 62/257,623, filed on Nov. 19, 2015, entitled FURNITURE WITH ELECTRONIC ASSEMBLIES; and (B) also claims priority to and the benefit of U.S. Provisional Patent Application Ser. No. 62/417,091, filed on Nov. 3, 2016, entitled ELECTRONIC FURNITURE SYSTEMS WITH INTEGRATED INTERNAL SPEAKERS.

Each of the foregoing patent applications is incorporated herein in its entirety by reference.

THE FIELD OF THE INVENTION

This invention is in the field of furniture with built-in electronic assembly (e.g., speaker) systems.

THE RELEVANT TECHNOLOGY

Speaker systems are widely used for home, business, social activities, entertainment and for practical, commercial, and household uses. Unfortunately, speaker systems take up a great deal of space in a home, office, or business environment, and even if small, they are often unsightly. Moreover, wiring and cabling associated with such systems is also unsightly and cumbersome.

Furniture also tends to take up a great deal of space in a home, office or business environment. When sitting on furniture, it is often desirable to listen to music, watch TV, or watch a movie in a home theater environment, or employ one or more electronic components. Improved furniture is needed with improved electronic assembly systems that can be used in association with modern furniture assemblies or devices.

BRIEF SUMMARY OF THE INVENTION

The present invention relates to space-saving furniture systems with associated electrical assembly systems, including integrated, embedded internal speaker systems, internal electrical power sources, electrical devices, and other electrical components associated with furniture that can be conveniently used by individuals while sitting on the furniture.

The audio-enhanced furniture system conveniently provides furniture for comfortably sitting, as well as integrated internal speakers for convenient, space saving high-fidelity listening, and a power source for providing electrical power to the speakers and other electrically powered objects, e.g., phones, computers, lighting systems, and recharging systems for recharging such devices as a user is comfortably sitting on the furniture.

One electronic furniture system of the present invention comprises: (i) a furniture assembly comprising: (A) a base (e.g., a seat portion), (B) at least one transverse member (e.g., an armrest or backrest), and (C) a coupler for coupling the base to the transverse member; (ii) an electrical hub configured to selectively reside within the furniture assembly; and (iii) a speaker system mounted within one or more portions of the furniture assembly. The electrical hub acts as a source of electrical power for the speaker system and may be selectively positioned, for example, within a cavity in a transverse member of the furniture assembly.

In one embodiment, the speaker system includes one or more speakers mounted to a frame of the transverse member and one or more speakers mounted to a frame of the base member. Embedding the speakers within the base and transverse members saves vast amounts of space within a room while also hiding the speakers, using the same footprint of space for the combined furniture and speaker systems.

A subwoofer speaker can be mounted within the base of a furniture assembly, while transverse members coupled to the base on opposing sides of the base acting as armrests include one or more speakers each (e.g., two speakers each) embedded therein. The combined base, transverse members, and associated internal speakers form a high-fidelity surround sound experience for a user. This enables a user to use furniture and speakers in the same footprint, saving valuable space for other objects in a room while simultaneously providing a high fidelity listening experience.

The subwoofer may include an amplifier assembly comprising one or more amplifiers, an audio receiver and/or a controller for amplifying and controlling the outputs of the speakers in the transverse members and/or base.

In one embodiment, the electrical hub, which provides electrical power to the speakers, comprises: (a) an electrical outlet assembly having a housing; (b) a securement panel linked to and offset from the electrical outlet assembly such that at least one outlet of the electrical outlet assembly is spaced away from the securement panel; and (c) an installation clip mounted to the electrical outlet assembly. The offset securement panel of the electrical hub forms a protective area within which to connect one more electrical cords (e.g., electrical cords of the speakers, amplifiers, audio receiver, controller or other objects, e.g., phones, etc.) to the outlet assembly. The installation clip can be selectively moved to mount the electrical hub within a cavity of a transverse member of the furniture assembly.

An example of a furniture system of the present invention comprises: (A) a base; (B) a transverse member; and (C) a speaker system comprising at least one speaker positioned within one of the bases and the transverse members. A coupler selectively couples the base to the transverse member. The speaker system comprises one or more speakers mounted within at least one of: (i) the base; or (ii) the transverse member of the furniture assembly, the speaker system comprising at least one speaker mounted within the furniture assembly. Embedding the speakers in the modular or assemble-able furniture assembly serves to hide the speakers and associated wiring and cabling from view, and provides high quality sound without using any additional space beyond that already occupied by the footprint of the furniture assembly.

In order to provide power to the speaker system, the electrical hub is configured to be coupled to at least one of: (i) the transverse member; or (ii) the base. The hub may be selectively mounted within a cavity of the transverse member, for example. The hub may be selectively mounted adjacent the coupler within the transverse member. Other components may be connected to the hub in order to receive electrical power, such as cell phone, computers, lamps and/or an induction charger mounted within the furniture assembly for recharging other electrical devices, for example.

Another example of a furniture system according to the present invention includes an assemble-able modular furniture assembly comprising one or more bases and a plurality of transverse members, wherein at least two of the transverse members are audio-enhanced transverse members. A speaker system is positioned within the assemble-able modular furniture assembly, where the speaker system includes a front left speaker mounted within the first audio-enhanced transverse member, a front right speaker mounted within the second audio-enhanced transverse member, a left surround speaker mounted within the one of the audio-enhanced transverse members, and a right surround speaker mounted within the one of the audio-enhanced transverse members. The assembly is such that transverse members can be selectively coupled to the one or more bases in different configurations, to thereby allow a user to selectively move and re-position one or more of the front left speaker, the front right speaker, the left surround speaker or the right surround speaker relative to another of the speakers and/or relative to the base(s), in the modular furniture system.

Another example of a furniture system according to the present invention includes an assemble-able modular furniture assembly comprising a plurality of bases and at least 4 audio-enhanced transverse members including a front left speaker mounted within the first audio-enhanced transverse member, a front right speaker mounted within the second audio-enhanced transverse member, a left surround speaker mounted within the first audio-enhanced transverse member, and a right surround speaker mounted within the second audio-enhanced transverse member, an additional surround speaker mounted within the third audio-enhanced transverse member, and an additional surround speaker mounted within the fourth audio-enhanced transverse member. The assembly is such that the bases and transverse members can be selectively coupled to one another in different configurations, to thereby allow a user to selectively move and re-position one or more of the front left speaker, the front right speaker, the left surround speaker or the right surround speaker relative to another of the speakers and/or relative to the bases, in the modular furniture system.

Yet another example of a furniture system according to the present invention includes an assemble-able modular furniture assembly comprising at least one base and at least 2 audio-enhanced transverse members including a front left speaker mounted within one of the audio-enhanced transverse members, a front right speaker mounted within another of the audio-enhanced transverse members, a left surround speaker mounted within one of the audio-enhanced transverse members, and a right surround speaker mounted within one of the audio-enhanced transverse members. The assembly is such that the bases and transverse members can be selectively coupled to one another in different configurations, to thereby allow a user to selectively move and re-position at least one of the front left speaker, the front right speaker, the left surround speaker or the right surround speaker relative to another of the speakers, and/or relative to the base, in the modular furniture system.

The audio enhanced furniture system of the present invention thus conveniently provides furniture for comfortably sitting, as well as speakers for convenient listening and a power source for providing electrical power to the speakers and other electrically powered objects, e.g., phones, computers, lighting systems, and recharging systems for recharging such devices.

A major advantage of the present invention is that the speaker systems and electronic assembly systems employed in the present invention are concealed from the view of the typical user and potential consumer, avoiding some of the unsightly and cluttered images of speakers and electronics that fill many of the spaces in modern homes and businesses.

Furniture cavities, provided within the base member and the transverse member, may enhance the sound of the speakers mounted therein. Thus, the user may experience a quality sound and musical experience using the base and transverse members of the present invention. The speakers are tuned in order to compensate for the sound being emitted through the fabric which covers the speakers embedded within the bases and/or transverse members.

One major benefit of the present invention is the concealment of the speakers within the bases and transverse members of the present invention. This enables significant space saving and aesthetics within a home, business, office or other location by using the space that speakers would normally take up for furniture. The sofa of the present invention thus provides extensive space efficiencies. Speakers can be concealed behind home decorative fabric. Such fabrics may not be acoustically transparent. Given frequencies emitted by the speakers are tuned in order to compensate for the fact that the emitted sound extends through the interface of the fabric, optimizing the sound as it extends through the fabric layer.

The speaker system of the present invention can be used in a couch, in a chair, in sectional systems, and in sectional systems having a variety of different components, such as recliners, seats, footrests and a vast variety of configurations.

Various embodiment of the present invention are further shown in the following applications, which are incorporated herein by reference: U.S. patent application Ser. No. 16/273,773 filed Feb. 12, 2019, entitled ELECTRONIC FURNITURE SYSTEMS WITH INTEGRATED INTERNAL SPEAKERS, which application is a continuation of U.S. patent application Ser. No. 15/348,068 (now U.S. Pat. No. 10,212,519), filed on Nov. 10, 2016, entitled ELECTRONIC FURNITURE SYSTEMS WITH INTEGRATED INTERNAL SPEAKERS, which:

(A) is a continuation-in-part of U.S. patent application Ser. No. 15/270,339 (now U.S. Pat. No. 10,236,643), filed on Sep. 20, 2016, entitled ELECTRICAL HUB FOR FURNITURE ASSEMBLIES, which claims priority to and the benefit of U.S. Provisional Patent Application Ser. No. 62/257,623, filed on Nov. 19, 2015, entitled FURNITURE WITH ELECTRONIC ASSEMBLIES; and (B) also claims priority to and the benefit of U.S. Provisional Patent Application Ser. No. 62/417,091, filed on Nov. 3, 2016, entitled ELECTRONIC FURNITURE SYSTEMS WITH INTEGRATED INTERNAL SPEAKERS.

Each of the foregoing patent applications is incorporated herein in its entirety by reference.

Embodiments of the present disclosure solve various problems in the art with systems, methods, and apparatuses for acoustically correcting sound loss through various types and compositions of fabric. In particular, systems, methods and apparatuses of the present disclosure can be implemented to improve the sound quality of a speaker system having at least one speaker integrated with a furniture component and covered with an upholstery fabric. Such upholstery fabrics are typically not at all acoustically transparent, but are rather configured to provide a combination of durability and aesthetics to a seating or other furniture surface.

In particular, one or more embodiments can include an audio-enhanced furniture system including a furniture assembly; an upholstery fabric at least partially covering the furniture assembly; and a speaker system positioned within the furniture assembly, the speaker system including a speaker covered by the upholstery fabric. The speaker is configured to be tuned to compensate for sound being emitted from the speaker through the upholstery fabric by adjusting the equalization of one or more target frequencies or frequency bands emitted by the speaker. Embodiments can also include a plurality of tuning profiles corresponding to a plurality of upholstery fabrics, wherein a user may select a tuning profile from the plurality of tuning profiles.

Embodiments of a method of tuning a speaker to compensate for sound being emitted through upholstery fabric can include: selecting a desired baseline equalization (e.g., desired frequency response), configuring the speaker to emit sound at an actual equalization (e.g., frequency response) approximate to the desired baseline equalization or frequency response; covering the speaker with an upholstery fabric; measuring a resultant equalization or frequency response as the speaker emits sound through the upholstery fabric; calculating a differential equalization; and reconfiguring the audio system to emit sound through the upholstery fabric according to the desired baseline equalization or frequency response by adjusting the actual equalization or frequency response by the differential equalization. Methods can also include creating a plurality of tuning profiles corresponding to a plurality of upholstery fabrics, each tuning profile including a differential equalization calculated for each of the plurality of upholstery fabrics.

Systems of the present disclosure also include audio-enhanced modular furniture systems having: a modular furniture assembly including one or more bases, a plurality of upright members, at least two of the upright members being audio-enhanced upright members, and a speaker system positioned within the modular furniture assembly. The speaker system can include (a) at least one speaker mounted within a first audio-enhanced upright member, the at least one speaker being hidden from view by a first upholstery fabric that covers the first audio-enhanced upright member; (b) at least one speaker mounted within a second audio-enhanced upright member, the at least one speaker being hidden from view by a second upholstery fabric that covers the second audio-enhanced upright member; and (c) at least one speaker controller configured to control each speaker of the speaker system. Each speaker of the speaker system can be configured to be tuned through the at least one speaker controller to compensate for sound being emitted from the speaker through the respective first or second upholstery fabric by adjusting the equalization of one or more audio frequencies emitted by the at least one speaker.

The term "transverse member" and similar terms refers to an upright member that can be used as an armrest of a furniture assembly or, optionally, as a backrest of the furniture assembly. The terms "transverse member" and "upright member" can be used interchangeably herein to describe members of a furniture assembly that can be used as either an armrest or a backrest, depending upon a configuration selected by a user. Methods of the present disclosure can also include methods for tuning speakers in modular furniture including (a) providing an assemble-able modular furniture assembly having one or more bases, a plurality of upright members, wherein at least one of the upright members is an audio-enhanced upright member, and a speaker system including at least one speaker mounted within the first audio-enhanced upright member, the at least one speaker being hidden from view by a first upholstery fabric that covers the first audio-enhanced upright member; and (b) tuning the at least one speaker mounted within the first audio-enhanced upright member to compensate for sound being emitted from the at least one speaker through the first upholstery fabric by adjusting the decibel level of one or more audio frequencies emitted by the at least one speaker.

Embodiments of the present disclosure solve one or more of the foregoing or other problems in the art with systems, methods, and apparatuses for acoustically correcting sound loss, accommodating for sound variations based, in part, from the furniture component orientation and/or location of portions of the speaker system, and improving acoustic experience of users. In particular, systems, methods and apparatuses of the present disclosure can be implemented to improve the sound quality of a speaker system having at least one speaker integrated with a furniture component and covered with an upholstery fabric. Such upholstery fabrics are typically not at all acoustically transparent, but are rather configured to provide a combination of durability and aesthetics to a seating or other furniture surface.

In particular, one or more embodiments can include an audio-enhanced furniture system including a furniture assembly; an upholstery fabric at least partially covering the furniture assembly; and a speaker system positioned within or about the furniture assembly, the speaker system including a speaker covered by the upholstery fabric. The speaker is configured to be tuned to compensate for sound being emitted from the speaker through the upholstery fabric by adjusting the equalization of one or more target frequencies or frequency bands emitted by the speaker. Additionally, the speaker is configured to be tuned to compensate for sound variations based, in part, upon the furniture component orientation and/or location of portions of the speaker system. Embodiments can also include a plurality of tuning profiles corresponding to a plurality of upholstery fabrics, wherein a user may select a tuning profile from the plurality of tuning profiles. Such tuning profiles can also be selected based of variations in the furniture component orientation and/or location of portions of the speaker system. For instance, embodiments allow a user to layer or stack different tuning profiles so the user can selectively select tuning profiles to accommodate for one or more of (i) upholstery fabrics, (ii) variations in the furniture component orientation, and (iii) a location of portions of the speaker system, such as satellite speakers, sound bars, etc.

Embodiments of a method of tuning a speaker to compensate for sound being emitted through upholstery fabric can include: selecting a desired baseline equalization (e.g., desired frequency response), configuring the speaker to emit sound at an actual equalization (e.g., frequency response)

approximate to the desired baseline equalization or frequency response; covering the speaker with an upholstery fabric; measuring a resultant equalization or frequency response as the speaker emits sound through the upholstery fabric; calculating a differential equalization; and reconfiguring the audio system to emit sound through the upholstery fabric according to the desired baseline equalization or frequency response by adjusting the actual equalization or frequency response by the differential equalization. Methods can also include creating a plurality of tuning profiles corresponding to a plurality of upholstery fabrics, each tuning profile including a differential equalization calculated for each of the plurality of upholstery fabrics. It can be understood that the method of tuning a speaker to compensate for sound being emitted through upholstery fabric can also be used to compensate for sound variations based upon the furniture component orientation and/or location of portions of the speaker system.

Systems of the present disclosure also include audio-enhanced modular furniture systems having: a modular furniture assembly including one or more bases, a plurality of upright members, at least two of the upright members being audio-enhanced upright members, and a speaker system positioned within the modular furniture assembly. The speaker system can include (a) at least one speaker mounted within a first audio-enhanced upright member, the at least one speaker being hidden from view by a first upholstery fabric that covers the first audio-enhanced upright member; (b) at least one speaker mounted within a second audio-enhanced upright member, the at least one speaker being hidden from view by a second upholstery fabric that covers the second audio-enhanced upright member; (c) at least one speaker spaced from the modular furniture assembly, and (d) at least one speaker controller configured to control each speaker of the speaker system. Each speaker of the speaker system can be configured to be tuned through the at least one speaker controller to compensate for sound being emitted from the speaker through the respective first or second upholstery fabric, for variations in sound based upon, in part, the furniture component orientation and/or location of portions of the speaker system by adjusting the equalization of one or more audio frequencies emitted by the at least one speaker.

Methods of the present disclosure can also include methods for tuning speakers in modular furniture including (a) providing an assemble-able modular furniture assembly having one or more bases, a plurality of upright members, wherein at least one of the upright members is an audio-enhanced upright member, and a speaker system including at least one speaker mounted within the first audio-enhanced upright member and at least one speaker spaced from the modular furniture assembly, the at least one speaker within the first audio-enhanced upright member being hidden from view by a first upholstery fabric that covers the first audio-enhanced upright member; (b) tuning the at least one speaker mounted within the first audio-enhanced upright member to compensate for sound being emitted from the at least one speaker through the first upholstery fabric by adjusting the decibel level of one or more audio frequencies emitted by the at least one speaker; and (c) selectively tuning the at least one speaker mounted within the first audio-enhanced upright member and/or the at least one speaker spaced from the modular furniture assembly to compensate for variations in sound quality based upon the furniture component orientation and/or location of the at least one speaker spaced from the modular furniture assembly.

Accordingly, systems and methods for acoustically correcting sound loss, such as through fabric, accommodating for sound variations based, in part, from the furniture component orientation or configuration footprint shape, and/or location of portions of a speaker system associated with the furniture, and improving acoustic experience of users are disclosed. As further embodiments of the present invention, this application incorporates by reference, in their entirety, U.S. patent application Ser. No. 16/696,696 filed Nov. 26, 2019, entitled MODULAR FURNITURE SPEAKER ASSEMBLY WITH RECONFIGURABLE TRANSVERSE MEMBERS; U.S. patent application Ser. No. 16/273,773 filed Feb. 12, 2019, entitled ELECTRONIC FURNITURE SYSTEMS WITH INTEGRATED INTERNAL SPEAKERS; U.S. patent application Ser. No. 15/348,068 (now U.S. Pat. No. 10,212,519), filed on Nov. 10, 2016, entitled ELECTRONIC FURNITURE SYSTEMS WITH INTEGRATED INTERNAL SPEAKERS; U.S. patent application Ser. No. 15/270,339 (now U.S. Pat. No. 10,236,643), filed on Sep. 20, 2016, entitled ELECTRICAL HUB FOR FURNITURE ASSEMBLIES; U.S. Provisional Patent Application Ser. No. 62/257,623, filed on Nov. 19, 2015, entitled FURNITURE WITH ELECTRONIC ASSEMBLIES; and U.S. Provisional Patent Application Ser. No. 62/417,091, filed on Nov. 3, 2016, entitled ELECTRONIC FURNITURE SYSTEMS WITH INTEGRATED INTERNAL SPEAKERS, each of which are incorporated herein by reference.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 26 is an illustrative table of audio frequency adjustments for acoustically correcting sound loss through fabric according to embodiments of the present invention.

FIG. 27A is a table of audio frequency adjustments for acoustically correcting sound loss through an exemplary upholstery fabric including a polyester material.

FIG. 27B is a table of audio frequency adjustments for acoustically correcting sound loss through an exemplary upholstery fabric including a chenille material.

FIG. 27C is a table of audio frequency adjustments for acoustically correcting sound loss through an exemplary upholstery fabric including a tweed material.

FIG. 27D is a table of audio frequency adjustments for acoustically correcting sound loss through an exemplary upholstery fabric including a linen material.

FIG. 27E is a table of audio frequency adjustments for acoustically correcting sound loss through an exemplary upholstery fabric including a velvet material.

FIG. 27F is a table of audio frequency adjustments for acoustically correcting sound loss through an exemplary upholstery fabric including a leather material.

FIG. 27G is a table of audio frequency adjustments for acoustically correcting sound loss through an exemplary upholstery fabric including a polyester linen material.

FIG. 27H is a table of audio frequency adjustments for acoustically correcting sound loss through an exemplary upholstery fabric including a faux fur material.

FIG. 35 illustrates the center channel speaker of the modular furniture assembly connected to a power source.

FIG. 36 illustrates the power on and input buttons of the center channel speaker of the modular furniture assembly.

FIG. 38 is a close up view of the remote control of the modular furniture assembly.

FIG. 39 illustrates a subwoofer of the modular furniture assembly, with a close up view of various ports.

FIGS. 47-48 illustrate status indicator information for the center channel speaker associated with the modular furniture assembly.

FIG. 57A illustrates a view of a graphical user interface accessible through the mobile device of FIG. 50 to select a configuration footprint shape having "L" and "U" configurations for tuning of an audio-enhanced modular furniture assembly or system.

FIG. 57B illustrates a view of a graphical user interface accessible through the mobile device of FIG. 51 to select a configuration footprint shape having "L" and "U" configurations for tuning of an audio-enhanced modular furniture assembly or system.

FIG. 57C illustrates a view of a graphical user interface accessible through the mobile device of FIG. 50 to select a configuration footprint shape having "L" and "U" configurations for tuning of an audio-enhanced modular furniture assembly or system.

FIG. 57D illustrates a view of a graphical user interface accessible through the mobile device of FIG. 50 to select a configuration footprint shape having "L" and "U" configurations for tuning of an audio-enhanced modular furniture assembly or system.

FIG. 57E illustrates a view of a graphical user interface accessible through the mobile device of FIG. 50 to select a configuration footprint shape having "L" and "U" configurations for tuning of an audio-enhanced modular furniture assembly or system.

DETAILED DESCRIPTION OF THE PREFERRED EMBODIMENTS

Figure 1A:
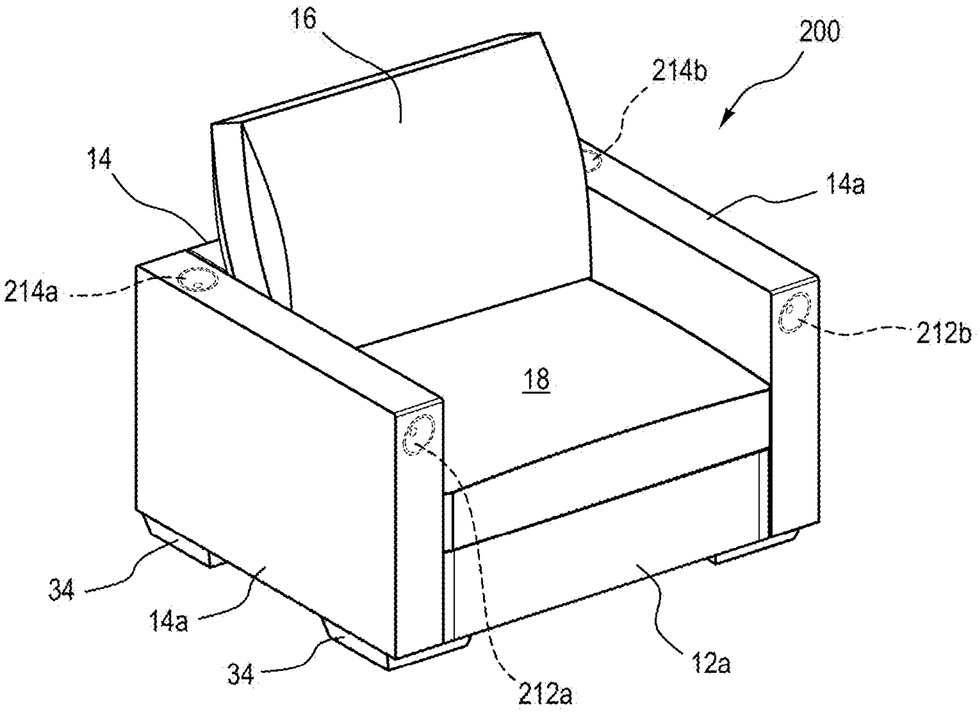
FIG. 1A is a perspective view of a modular furniture assembly in the form of a surround sound chair of the present invention having audio speakers in the transverse members thereof to form a surround sound speaker system, the position and orientation of the speakers reflected in phantom lines in the transverse members.
Figure 1B:
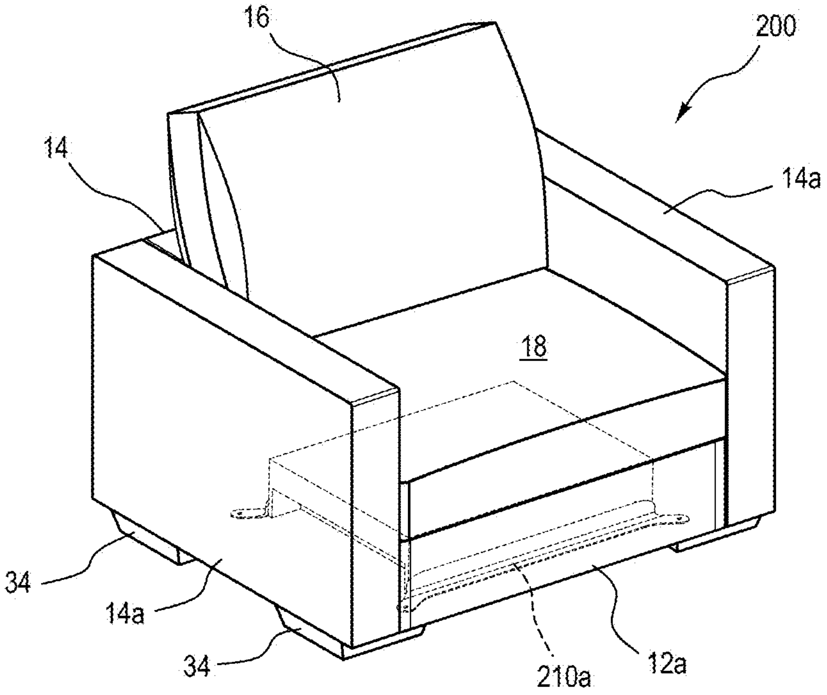
FIG. 1B is a perspective view of the modular furniture assembly of FIG. 1A in the form of the chair, wherein the surround sound chair also has a subwoofer speaker in the base thereof, the subwoofer speaker shown in phantom lines in the base.
Figure 2:
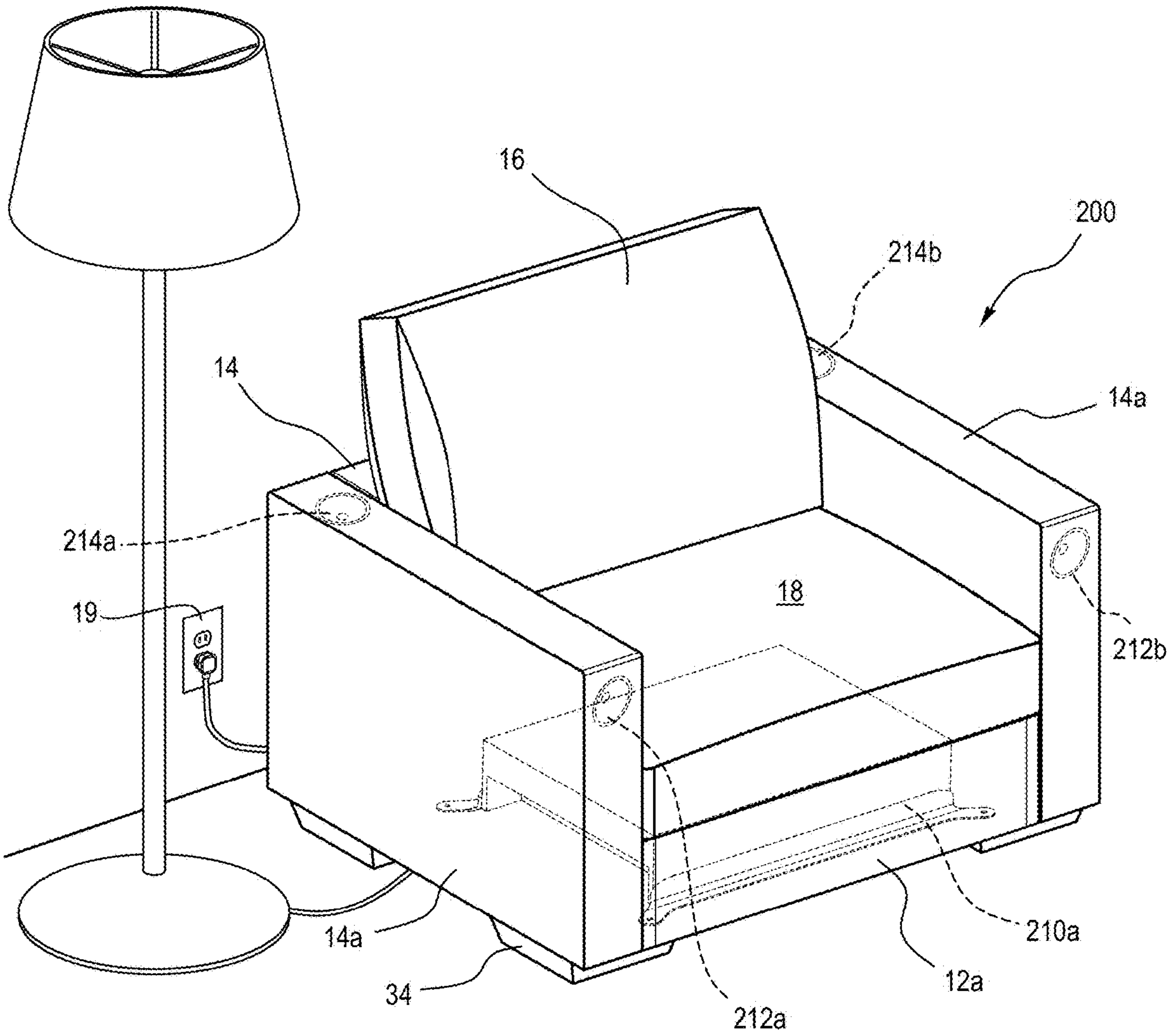
FIG. 2 shows an embodiment of the surround sound chair of FIGS. 1A-B with an adjacent lamp that is electrically coupled to the hub of the chair.
Figure 3:
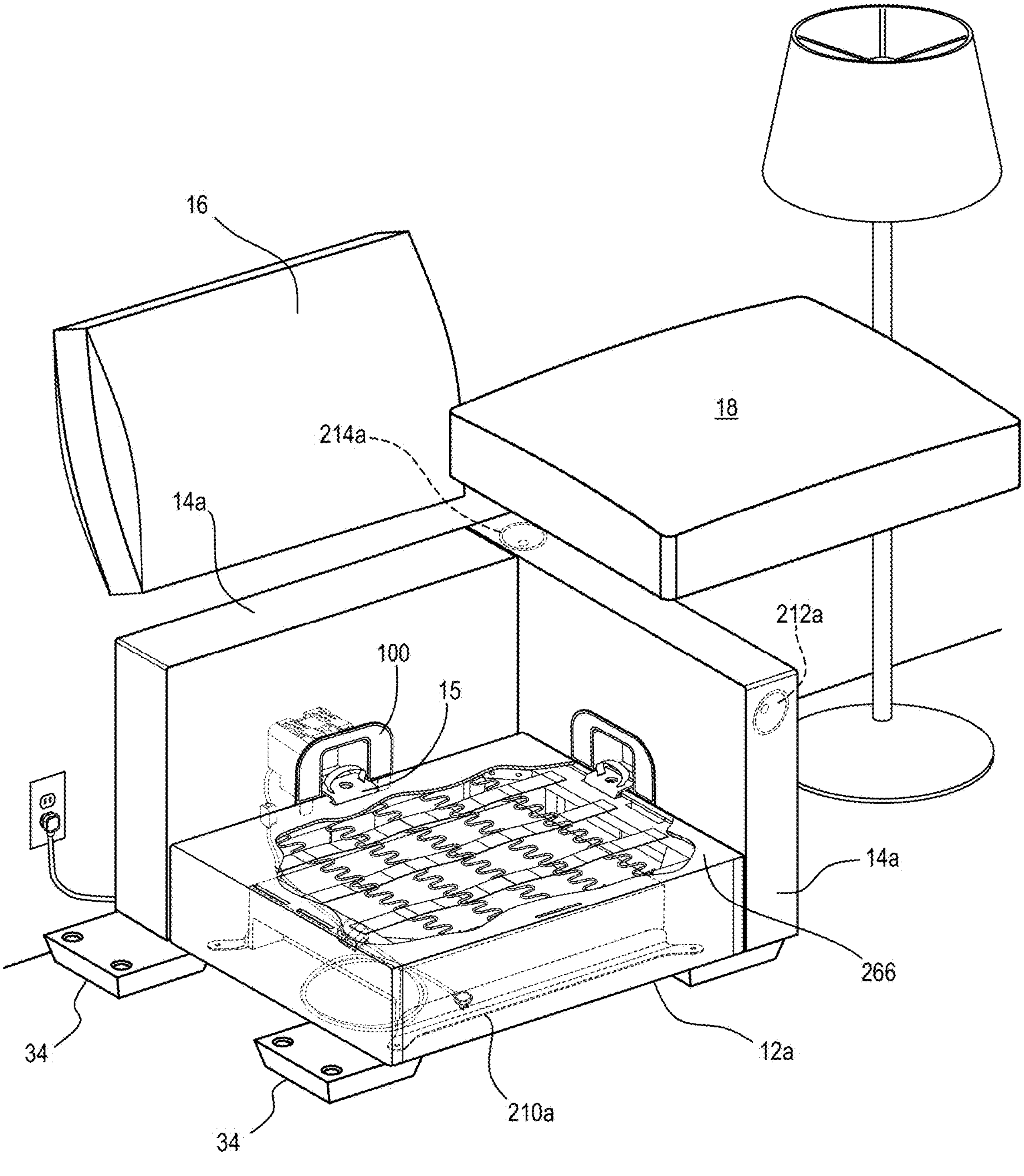
FIG. 3 is a chair having a surround sound speaker system as in FIGS. 1A-B, the cushions exploded therefrom and a cutaway view of the base shown.

FIGS. 1-3: Modular Furniture System w/ Surround-Sound Speakers

FIG. 1A is a perspective view of a modular furniture assembly in the form of a chair of the present invention having audio speakers embedded in the transverse members thereof to form a surround sound speaker system, the speakers reflected in phantom lines in the transverse members.

FIG. 1B is a perspective view of the modular furniture assembly of FIG. 1A in the form of the chair, wherein the chair also has a subwoofer speaker in the base thereof, the subwoofer speaker shown in phantom lines in the base.

As shown in FIGS. 1A and 1B, the present invention relates to an audio-enhanced, modular furniture system 200 comprising a speaker-containing base member 12*a* selectively coupled to speaker-containing transverse members 14*a* and a non-speaker containing transverse member 14. The speaker-containing base member 12*a* and speaker-containing transverse members 14*a* and transverse member 14 are connected to each other as shown in FIGS. 1A and 1B. Cushions 16, 18 can be provided.

Audio-enhanced, modular furniture system 200 advantageously includes one or more speakers positioned therein and as shown in FIGS. 1A-B, has a set of speakers in each armrest transverse member 14*a* and a subwoofer 210 in base 12*a*.

In the embodiment of FIGS. 1A-1B, furniture system 200 comprises an integrated internal subwoofer 210*a* and four integrated, internal non-subwoofer speakers 212*a-b*, 214*a-b*. The non-subwoofer speakers 212*a-b*, 214*a-b*, as shown in FIG. 1A, include two front speakers 212*a-b* and two surround, rear speakers 214*a-b* which are oriented upwardly in the embodiment of FIG. 1A. The subwoofer 210*a* may handle low frequency sounds (e.g., from about 20 Hz up to about 120 Hz, up to about 100 Hz, or up to about 80 Hz), while the front and rear speakers 212*a-b*, 214*a-b* may handle higher frequencies (e.g., from a cut-off frequency of the subwoofer up to about 20 kHz). Any of the speakers may include cone drivers, dome drivers, ribbon drivers, horn drivers, any other driver configuration, or a combination of drivers.

As illustrated in FIGS. 1A and 1B, the footprint of system 200 having speakers 210*a*-214*b* therein, has the same mathematical specifications as the footprint of a modular furniture assembly not having speakers therein. Thus, the addition of speakers within system 200 does not add any additional space requirements to a home or office. In addition, wiring and/or cabling typically associated with speakers is also hidden within the furniture assembly itself, presenting a very clean, aesthetically desirable appearance, while at the same time providing high quality stereo, surround, or other sound playback.

Instead, the use of the speakers mounted within the furniture system 200 efficiently uses furniture and provides a high quality, high-fidelity listening experience to the user. The speakers are hidden within certain discrete portions of the transverse members 14*a* and within the base 12*a*, thereby enabling efficient use of space.

In the illustrated embodiment of FIGS. 1A-1B, speakers 212*a* and 212*b* are shown mounted in a front facing surface of transverse members 14*a*. As discussed in further detail herein, in one embodiment, such front-facing placement of speakers 212*a* and 212*b* works in conjunction with a front wall, flat screen television or other surface which aids in reflection of the front directed sound from front-facing speakers 212*a* and 212*b*, the sound being reflected back to the user seated on furniture assembly 200, the reflected sound potentially having the advantages of reflected sound, which may, in some embodiments, include improved sound quality. For example, sound reflected back to the seated user may mimic sound coming from front speakers actually positioned in front of the seated user.

The subwoofer assembly within base 12*a* is hidden inside the frame of base 12*a* and is therefore underneath the seat cushion 18.

FIG. 2 shows an embodiment of the surround sound chair of the furniture system 200 of FIGS. 1A-B with an adjacent lamp that is electrically coupled to an integral electrical hub mounted internally within the chair. Details of the internal electrical hub 100 will be discussed further with respect to FIGS. 5-7.

FIG. 3 is a furniture system 200 in the form of a chair having a surround sound speaker system as in FIGS. 1A-B, the cushions exploded therefrom and a cutaway view of the base 12*a* shown.

FIG. 3 shows an exploded view of the surround sound chair of the furniture system 200 of FIGS. 1A-B and FIG. 2, showing use of: (1) selectively mounting couplers 15 which couple transverse members 14, 14*a* to base 12*a*; (2) integral electrical hubs 100 mounted internally within the furniture system 200 to provide a source of electrical power; as well as (3) details of base 12*a*, including cushioning assemblies and integral, internal speaker assemblies of base 12*a*.

Figure 4A:
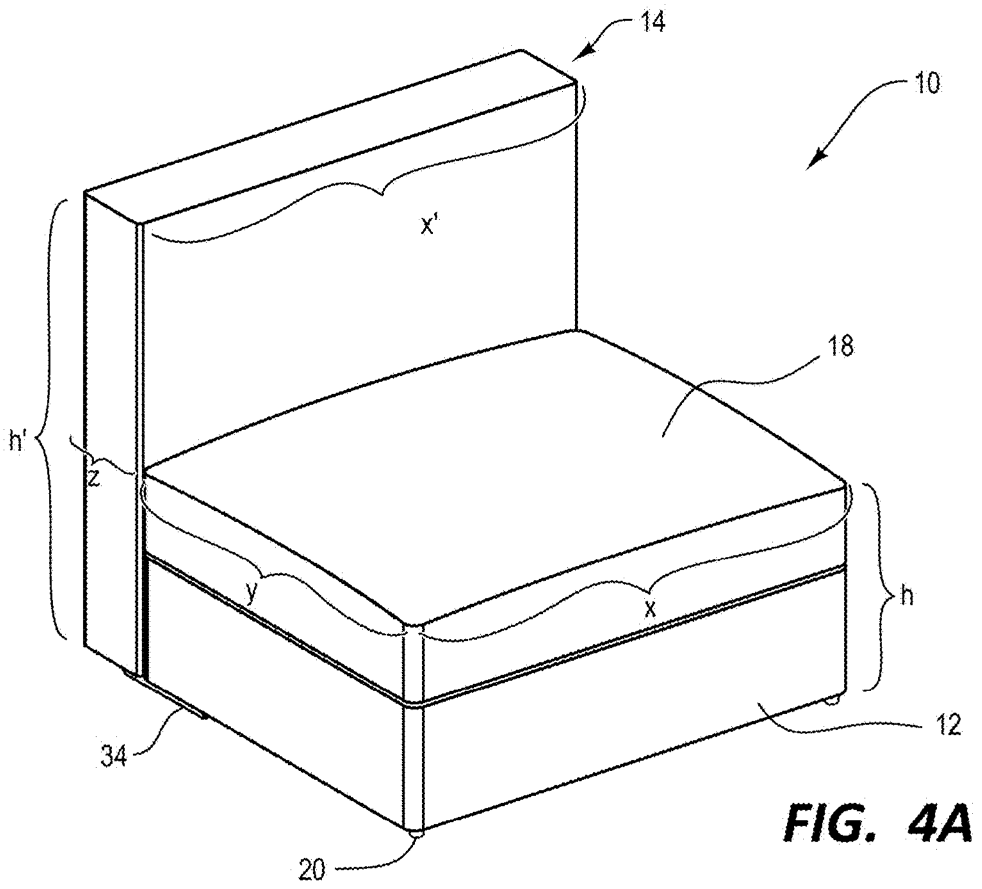
FIGS. 4A-4B illustrate a modular furniture assembly of the present invention.
Figure 4B:
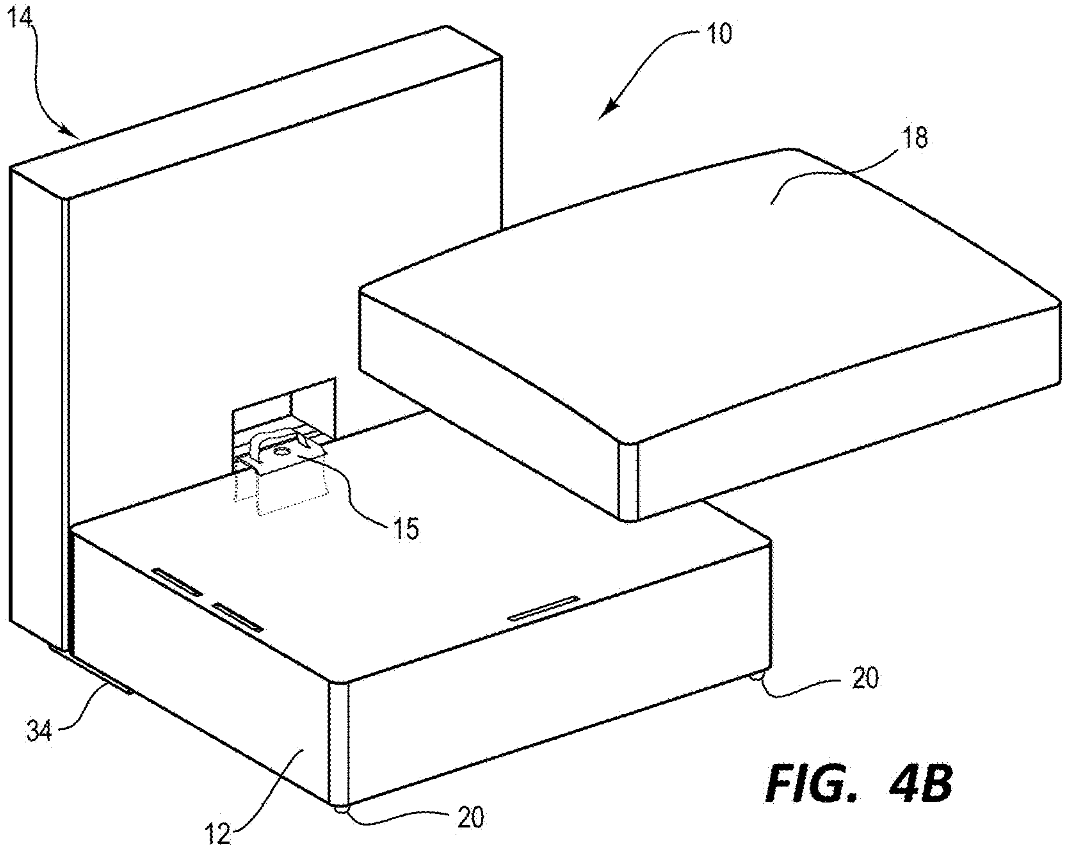

Audio-enhanced modular furniture system 200 has bases 12*a* and transverse members 14*a* that are similar to base 12 and transverse member 14 of FIGS. 4A-B. Base 12*a* connects to transverse member 14*a* and 14 in the same or similar manner to that of base 12 and transverse member 14 shown in FIGS. 4A-B, which will now be discussed.

FIGS. 4-7: Coupling and Electrical Power

Figure 5:
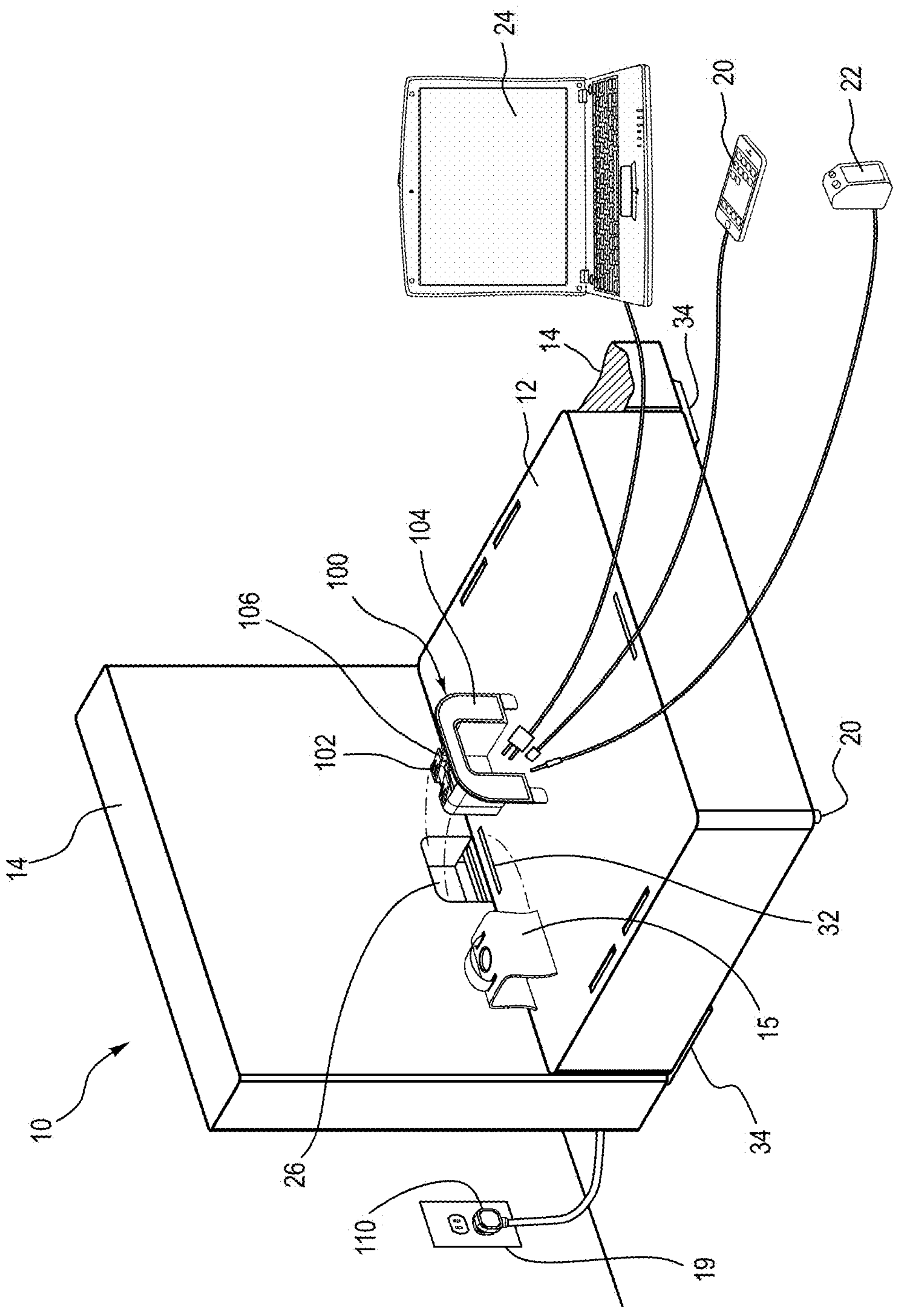
FIG. 5 illustrates the modular furniture assembly of FIGS. 2A-2B in an exploded view with the addition of certain electronic assemblies which connect to an electrical hub configured to be mounted within the modular furniture assembly.
Figure 6:
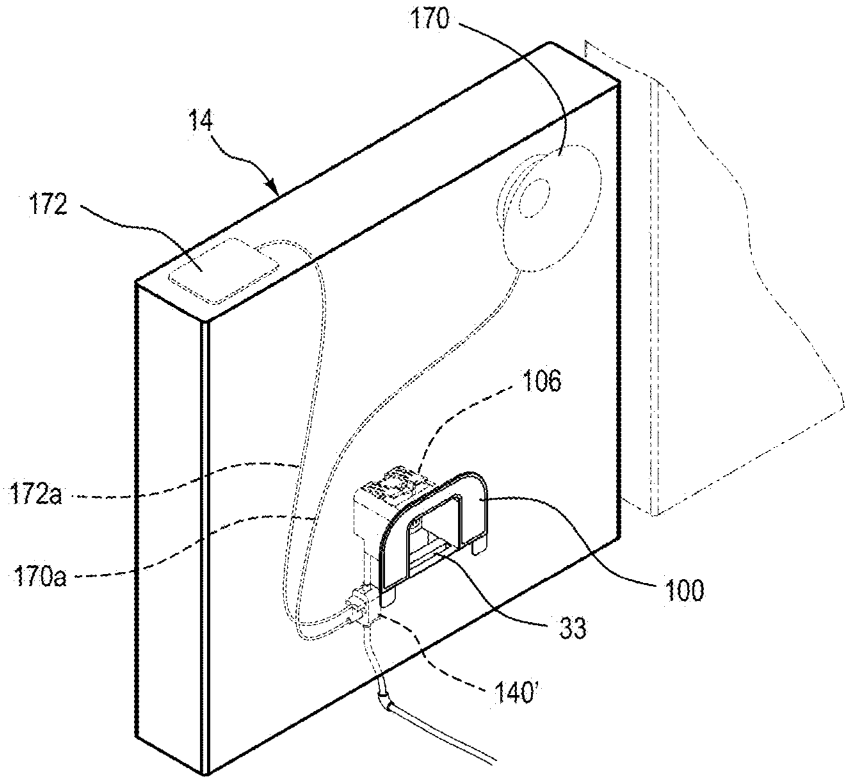
FIG. 6 is a perspective view of a transverse member of the present invention, including phantom views of certain electronic components internally mounted and connected to a hub of the present invention. An adjacent transverse member is also depicted.
Figure 7:
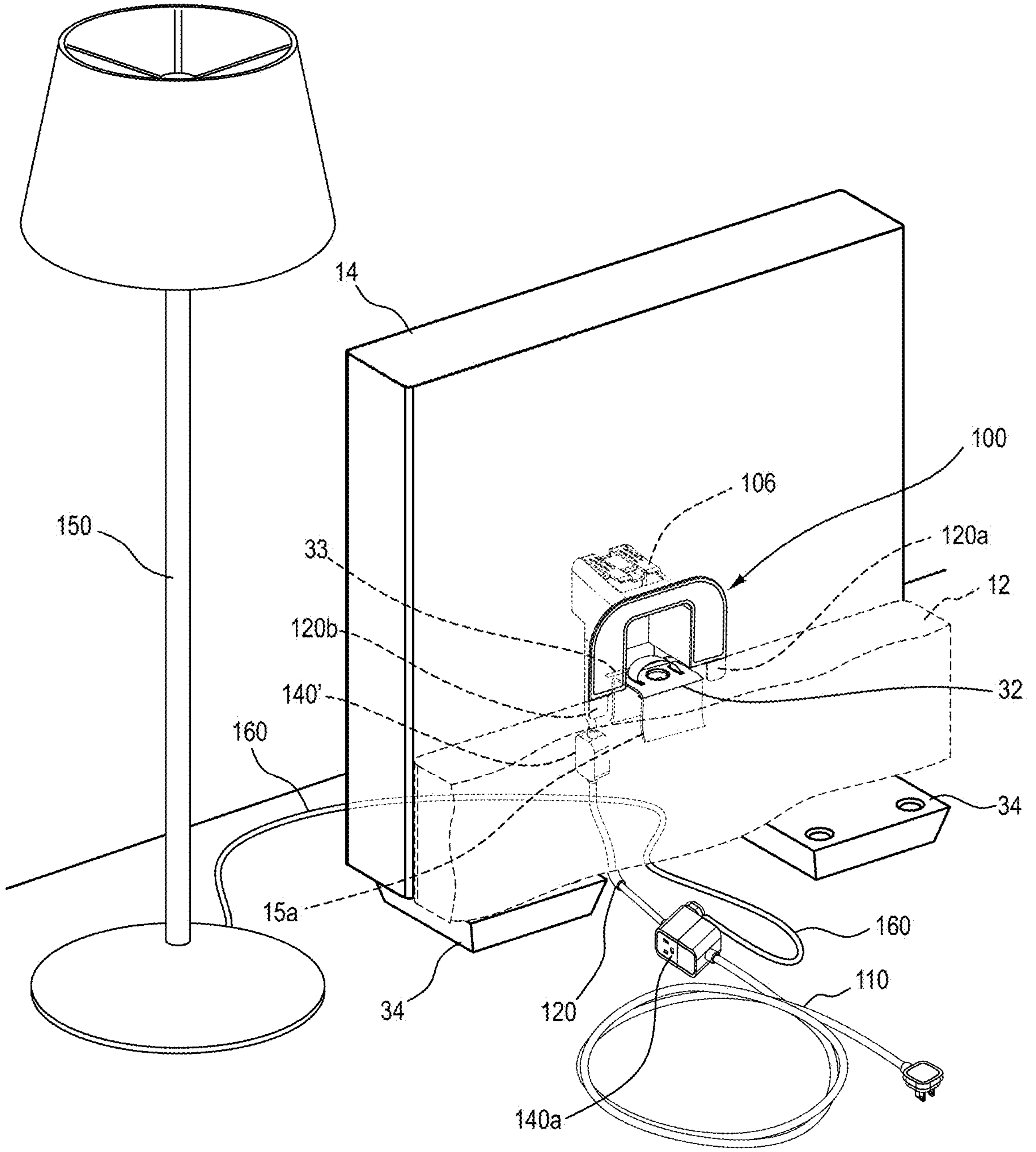
FIG. 7 is a perspective view of a transverse member and a hub mounted within the transverse member, including a lamp electrically coupled to the hub.

Additional details of each of the components reflected in FIG. 3 will be discussed in additional detail with reference to FIGS. 4A-4B, 5-7, and 8A-8H. For example, FIGS. 4A-4B shows additional details relating to the use of couplers 15 and the coupling of a base 12 to a transverse member 14. FIG. 5 shows further details relating to couplers 15, as well as details relating to electrical hub 100, which acts as a source of electrical power for the speakers and other electrically powered devices, such as phones, computers, lamps, recharging systems, and other electrical devices that can be conveniently used by a user sitting on the modular furniture assembly depicted in FIG. 5. FIG. 6 shows the coupling of electrical hub 100 within a transverse member 14, as well as the advantageous use of electrical hub 100 to power a speaker 170 and an induction charger 172 that can be used to wirelessly charge electrical devices, e.g., phones, etc., placed on or within a transverse member 14, e.g., when transverse member 14 is being used as an armrest. FIG. 7 shows the use of hub 100 to power a lamp. FIGS. 8A-8H demonstrate an embodiment of a speaker system coupled within base 12*a*. FIGS. 9A-12 demonstrate embodiments of speaker systems within transverse members 14*a*.

The coupling together of components of the modular furniture assembly of the present invention and the electrical power system within the modular furniture assembly will now be discussed with detailed reference to FIGS. 4A-7. The principles of coupling using coupler 15 and the use of hub 100 to provide electrical power can be employed in conjunction with speaker-containing bases 12*a* and transverse members 14*a* and/or in conjunction with non-speaker containing bases and transverse members.

FIGS. 4A-4B: Modular Furniture Configuration and Coupling

FIGS. 4A-4B illustrate a modular furniture assembly 10 of the present invention. Modular furniture assembly 10 of FIGS. 4A-B illustrates the configuration of base 12 and transverse member 14 and the coupling of base 12 and transverse member 14 to each other. Once base 12 is placed adjacent transverse member 14, coupler 15 selectively couples base 12 to transverse member 14. Coupler 15 can also be used to couple speaker-containing base 12*a* to speaker-containing transverse member 14.

In one embodiment, neither base 12 nor transverse member 14 of FIGS. 4A-4B have a speaker, electrical hub, or other electrical component therein, whereas, in another embodiment, base 12 and transverse member 14 of FIGS. 4A-4B each may have one or more speakers, an electrical hub, or other electrical component therein. FIGS. 4A-4B are shown in order to illustrate the use of coupler 15 to couple a non-speaker-containing base/transverse member combination or a speaker-containing base/transverse member combination.

As shown in FIGS. 4A-4B, each of the modular furniture assemblies 10 have a seat cushion 18 on base 12 thereon for sitting on by a user. In addition, foot couplers 34 are shown for coupling the bottom portions of transverse members 14 and bases 12 to each other.

Further discussion and disclosure relating to the modular furniture assemblies 10 and their connection to each other and to the transverse members 14 are shown and discussed in the following patents and patent applications, each of which are incorporated herein by reference: (i) U.S. patent application Ser. No. 14/332,705, filed Jul. 16, 2014, entitled MOUNTING PLATFORM FOR MODULAR FURNITURE ASSEMBLY, (ii) U.S. Pat. No. 8,783,778, entitled MOUNTING PLATFORM FOR MODULAR FURNITURE ASSEMBLY, (iii) U.S. Pat. No. 7,963,612 entitled MODULAR FURNITURE ASSEMBLY, (iv) U.S. patent application Ser. No. 11/449,074, filed Jun. 8, 2006, entitled MODULAR FURNITURE ASSEMBLY, now U.S. Pat. No. 7,547,073, (v) U.S. Pat. No. 7,213,885 entitled MODULAR FURNITURE ASSEMBLY, (vi) U.S. Provisional Application No. 62/354,426 filed Jun. 24, 2016 entitled MODULAR FURNITURE ASSEMBLY CORNER SEATING SYSTEM; (vii) U.S. Provisional Patent Application Ser. No. 62/257,623, filed on Nov. 19, 2015, entitled FURNITURE WITH ELECTRONIC ASSEMBLIES; (viii) U.S. patent application Ser. No. 15/270,339, filed on Sep. 20, 2016, entitled ELECTRICAL HUB FOR FURNITURE ASSEMBLIES; (ix) U.S. patent application Ser. No. 15/276,524, filed Sep. 26, 2016, entitled Modular Furniture Assembly Corner Seating System; and (x) U.S. patent application Ser. No. 15/342,800, filed Nov. 3, 2016, entitled Furniture System with Recliner Assembly, each of which are incorporated herein by reference.

The bases and transverse members of the present invention can include one or more covers (e.g., an inner cover and an outer cover). Such covers have various advantages, such as that the outer covers are conveniently removable so that the user can remove the covers, wash them, and swap them with other covers as desired. In one embodiment, the speakers used in the present invention are frequency tuned so that there is a high quality sound emitted through the inner and/or the outer removable covers.

FIG. 5: Electrical Power Hub

For Modular Furniture

FIG. 5 illustrates the modular furniture assembly of FIGS. 4A-4B in an exploded view with the addition of certain electronic assemblies which connect to an electrical hub configured to be mounted within the modular furniture assembly.

Hub 100 of FIG. 5 is used to provide electrical power to the speakers of furniture system 200 and other electrical components. Base 12 of furniture assembly 10 is selectively coupled to first and second transverse members 14 of furniture assembly 10, a second transverse member being shown in a partial view in FIG. 5.

Each transverse member 14 has a cavity 26 in a middle, lower portion thereof. A U-shaped coupler 15, selectively couples an upper portion of a base 12 to a middle, lower portion of a transverse member 14. Foot couplers 34 selectively couple respective feet of base 12 to respective feet of the transverse members 14. Foot couplers 34 have apertures therein that receive the feet of respective adjacent bases and transverse members, coupling them to each other.

In one embodiment, a foot coupler such as coupler 34 can be placed under a foot of a base that is not adjacent a transverse member or other base, for aesthetic continuity and/or to provide a level surface of all four corners of the base. Furniture assembly 10 is a modular furniture assembly that can be assembled as illustrated in FIG. 5, for example.

As illustrated in FIG. 5, a U-shaped coupler 15 selectively connects a portion of base 12 to a portion of a transverse member 14 by placing one plate of the U-shaped coupler 15 within an aperture 32 in the frame of base 12 and another plate of the U-shaped coupler 15 within an aperture 33 (see FIG. 7) in the frame of transverse member 14 that is in the cavity 26 of transverse member 14, thereby selectively coupling base 12 to transverse member 14. The second transverse member 14, shown in partial view in FIG. 5, and/or additional transverse members 14, can be selectively coupled similarly or in exactly the same manner to base 12.

Base 12 is used as a seat member and/or for receiving a cushion 18 to be used as a seat member while transverse member 14 can be used as a backrest and/or armrest. Various combinations of bases, transverse members, and U-shaped couplers and foot couplers can be used in varying numbers to create a variety of different furniture assemblies of the present invention, as discussed and illustrated in the patents and patent applications that are incorporated herein by reference.

Electrical hub 100 is also shown in an exploded view in FIG. 5, electrical hub 100 being selectively mounted within the cavity 26 of transverse member 14 and a portion of an electrical hub 100 being selectively sandwiched between a portion of base 12 and a portion of transverse member 14, thereby maintaining hub 100 in a convenient, stable position within furniture assembly 10. Hub 100 acts as a convenient power source for electrical devices 20, 22, and 24. As described in further detail herein, hub 100 may also provide power for speakers and/or other audio components (e.g., an audio receiver).

When cushion 18 of FIG. 4B is placed onto base 12 and adjacent transverse member 14 of FIG. 5, hub 100 is not visible to the user, with the exception of the portion of the electrical cord 110 that extends from behind furniture assembly 10 and into the electrical wall outlet 19. For example, when cushion 18 of FIG. 3 is placed on the base 12*a* and adjacent transverse member 14*a*, hub 100 is not visible to the user, as shown in FIG. 2.

An electronic furniture assembly of FIG. 5 thus comprises: (i) a furniture assembly 10 comprising: (A) a base 12, (B) a transverse member 14, and (C) a coupler 15 for coupling the base 12 to the transverse member 14; and (ii) an electrical hub 100 as shown in FIG. 5 configured to selectively reside within the furniture assembly 10. As shown in FIGS. 1A, 1B and 2, electrical hub 100 enables the resulting electronic furniture assembly of FIGS. 1A, 1B and 2 to conveniently receive and act as a source of electrical power for personal objects, such as all phones, computers and other accessories used while sitting on the furniture assembly 10. Power available through hub 100 may also be used to power speakers and other audio components embedded within the furniture assembly in a manner that during normal use (e.g., with cushion 18 in place), the speakers, hub 100, and even any wiring/cabling associated therewith is hidden from view.

The electrical hub 100 comprises one or more electrical outlets. Hub 100 is configured to be selectively integrated into furniture assembly 10. One or more electrical hubs 100 is configured to be selectively integrated into a variety of other furniture assemblies, having one or multiple transverse members 14, such as the furniture assemblies disclosed in U.S. Pat. No. 8,783,778, entitled MOUNTING PLATFORM FOR MODULAR FURNITURE ASSEMBLY and (vii) Provisional Patent Application Ser. No. 62/257,623, filed on Nov. 19, 2015, entitled "Furniture with Electronic Assemblies," each of which are incorporated herein by reference. The electrical hubs 100 described herein are compatible to communicate with the transverse member cavities disclosed in the aforementioned patents and applications.

Hub 100 can be conveniently used within the transverse members of the furniture assemblies disclosed in U.S. Pat. No. 7,213,885 entitled MODULAR FURNITURE ASSEMBLY, wherein the furniture assemblies have a configuration such that the length X of the base and the length X' of the transverse member are equal to each other and wherein the length X of the base is equal to the width of the base and the width of the transverse member, such that X=Y+Z and X=X' as disclosed in U.S. Pat. No. 7,213,885 entitled MODULAR FURNITURE ASSEMBLY, which is incorporated herein by reference.

The drawings provided herein show hub 100 in use in connection with modular furniture. However, hub 100 is conveniently used in connection with various types of furniture, including: (i) fixed, non-configurable furniture; (ii) furniture that is assembled by a consumer (known as "assemble-able furniture); and furniture that can be configured into a variety of different configurations (known as "modular furniture"). Assemble-able furniture includes (i) modular furniture that can be configured into a variety of different configurations and (ii) furniture that can only be assembled into a single configuration. Hub 100 is conveniently used in connection with various types of furniture, including (i) fixed-nonconfigurable, (ii) assembleable-modular and (iii) assembleable-non-modular furniture.

Although FIG. 5 illustrates a furniture assembly 10 that includes two transverse members 14, and a base member 12, in other embodiments, the hub 100 or hubs 100 may be used in other combinations of transverse members 14 and base members 12, such as those disclosed in the aforementioned patents and applications, hub 100 being configured to be disposed partially within at least one of the transverse members 14 of such assemblies. When positioned thereon, cushion 18 hides the hub 100 from view. A number of mobile, computing and/or other electronic devices 20, 22, 24 are plugged in to the hub 100 that resides at least partially within the transverse member 14 behind the cushion 18.

FIG. 5 illustrates a mobile phone 20, a speaker 22, and a laptop computer 24 electrically connected to the hub 100. Other electrical devices that may be plugged into the hub 100 may include, but are not limited to, table lamps, induction chargers, couch and/or chair lamps, reading and/or floor lamps, mobile computing devices, speakers, stereo systems, vacuums, heaters, fans, electric blankets, and the like for use by a user using furniture assembly 10.

FIG. 5 also illustrates a hub electrical cord 110 plugged into a wall outlet 19. The hub electrical cord 110 provides electrical power to the hub 100, which in turn provides electrical power to the one or more electronic devices 20, 22, 24 that are plugged or otherwise connected into the hub 100. In this way, electronic devices 20, 22, 24 are powered via the hub 100 in a visually pleasing and convenient way. For example, the electrical outlets of hub 100 and connections of the electrical devices to the hub 100 are typically not seen by the user when the user is seated on the couch or by others in the room when the cushion(s) is on the base 12. The hub electrical cord 110 thus provides power to multiple electronic devices 20, 22, 24 from a single power source. A person sitting on or otherwise using the illustrated furniture assembly 10 has access to his or her electronic devices 20, 22, 24 while they are being powered through the hub 100 without the need for multiple electrical cords or other power strips separate from the furniture assembly 10.

As shown in FIG. 5, in one embodiment, the electrical hub 100 comprises: (a) an electrical outlet assembly 102; (b) a securement panel 104 wherein a rear face of the securement panel 104 is linked to the electrical outlet assembly 102, such that at least one outlet of the electrical outlet assembly 102 is spaced away and offset from the securement panel 104; and (c) an installation clip 106 mounted to the electrical outlet assembly 102, the installation clip 106 being moveable with respect to the electrical outlet assembly 102, the installation clip 106 having an extended position and being capable of being moved to a compressed position when it is desired to move the hub into cavity 26. Electrical outlet assembly 102 includes electrical cord 110 and at least one electrical outlet in electrical communication with cord 110.

The free end of the installation clip 106 is movable with respect to the assembly and is configured to be normally in the extended position absent any other force, and is selectively moved by a user from the extended position to the compressed position in order to mount the electrical hub 100 within the furniture assembly 10. Clip 106 is further configured to be selectively moved by a user from the extended position to the compressed position in order to remove the electrical hub 100 from the furniture assembly. Hub 100 is configured to be selectively mounted within a furniture assembly 100 in order to provide a source of electrical power for one or more electrical devices 20, 22, 24 adjacent the furniture assembly, as illustrated in FIG. 5.

Additional information regarding hub 100 is disclosed in U.S. patent application Ser. No. 15/270,339, filed on Sep. 20, 2016, entitled "Electrical Hub for Furniture Assemblies," which is incorporated herein by reference.

FIGS. 6-7: Electrical Components

Coupled to Electrical Hub 100

FIG. 6 is a perspective view of a transverse member of the present invention, including phantom views of certain electronic components connected to a hub of the present invention. An optional adjacent transverse member is also depicted.

FIG. 6 illustrates a transverse member 14 of the present invention having an electrical hub 100 mounted therein, wherein a speaker 170 and an induction charger 172 are fed electrical power through the electrical hub, the speaker and induction charger being mounted within the transverse member.

Various electronic devices can be electrically coupled to the outlets of the electrical outlet assembly 102 or to the interior outlet 140' shown in FIGS. 5-6, such as speakers, induction chargers (e.g., under the fabric of a transverse member serving as an arm rest), refrigerators, amplifiers for a surround sound system, and a vast number of other electrical devices that are convenient to have in a furniture assembly. In various embodiments, outlet 140' has one, two, or more than two electrical outlets.

In addition, one or more additional transverse members with a hub 100, a speaker 170, and a charger 172 can also be provided in order to provide stereo and surround sound and in order to provide a conveniently wired electrical furniture assembly.

Using induction charger 172 mounted within a transverse member 14, a user seated on a furniture assembly 10 can conveniently recharge an electrical device, such as a cellular phone, while seated on the modular furniture assembly.

Wireless qi charging, e.g., via induction charger 172 embedded within the transverse member or other devices is used to charge mobile devices, such as cellular phones, computers, lighting systems, lamps, or other electronic devices. As shown in FIG. 6, the qi charger, also known as an induction charger, may be hidden under furniture covers and/or embedded within the wooden frame of an embodiment of transverse member 14. In one embodiment, the induction charger is mounted on an upper surface of one or more transverse members under a thin cover in order to provide easy access for mobile devices, such as cellular phones, etc.

The induction charger charges though layers of fabric when desired. The induction charger may be placed in a variety of locations such as within the transverse member or the base.

Other embedded devices that may be employed in transverse member 14 or in a base 12, include ambience lights, heating systems, cooling systems and motion sensors, for example.

FIG. 7 is a cutaway perspective view of a transverse member 14 and a hub 100 mounted within the transverse member 14, including a lamp 150 electrically coupled to the hub 100. As shown in FIG. 7, the hub electrical cord 110 extends from the hub 100, through the transverse member 14, out of a hole in the bottom portion of the frame of the transverse member 14 and below transverse member 14, so that the hub electrical cord 110 can be plugged in to an external power source. The illustrated hub electrical cord 110 is flexible and in some of the embodiments shown, e.g., in FIG. 7 is comprised of a plurality of extension cords.

An electrical device such as lamp 150 has a cord 160 thereof conveniently connected to floor resting cord outlet 140*a* as shown in FIG. 7. Electrical cord 110 is thus advantageous because cord outlets such as floor resting cord outlet 140*a* can power an electrical device such as lamp 150 and hide at least a portion of the corresponding electrical cord 160 from view, providing a more functional furniture assembly and a more pleasing aesthetic appearance.

Cord elbow 120 extending about electrical cord 110 is also illustrated. The cord elbow 120 is a rigid or semi-rigid component (comprised, e.g., of a hard plastic) positioned about cord 110 in a bending, elbow shape along the length of the hub electrical cord 110. The cord elbow 120 is positioned about the hub electrical cord 110 so as to facilitate a convenient permanent bending of the hub electrical cord 110 while simultaneously protecting the bent portion of cord 110. In one embodiment, the cord elbow 120 bends the hub electrical cord 110 at a position where the hub electrical cord 110 reaches the floor or other surface when extending between the electrical outlet assembly 102 and a power source, such as a wall outlet 19.

Elbows such as cord elbow 120 provide a protected, smooth transition from a vertical orientation to a horizontal orientation, and may be comprised of a variety of different materials, such as a hard plastic, or a rubber, neoprene, silicone or other material that can be wrapped around an electrical cord and form a rigid or semi-rigid tubular member wrapped around the cord.

Elbows such as cord elbow 120 extending about cord thus protect the electrical cord from breaking or fraying while bending, minimize the amount of electrical cord seen, and in some instances hides the electrical cord from view.

Also as shown in FIG. 7, one coupler plate 15*a* of coupler 15 is configured to fit within a corresponding aperture 32 of base 12 while another plate of coupler 15 fits within a corresponding aperture 33 of transverse member 14 to thereby selectively connect base 12 to member 14. As shown, in one embodiment, U-shaped coupler 15 has a ribbon handle attached thereto for removing coupler 15 from respective apertures 32, 33 and may have a hole in a top portion thereof, which assists in reducing the weight of the coupler 15. In other embodiments, the hole and ribbon are not employed.

FIG. 7 further shows the convenience and utility of internal cord outlet 140*a* or 140' mounted within the body of transverse member 14, which accepts the cord 160 of a lamp 150, and/or the respective cords 170*a*, 172*a* (FIG. 6) of one or more speakers 170 and one or more wireless electrical induction chargers 172 mounted within transverse member 14.

Induction charger 172 can be mounted under the fabric within a transverse member 14, for example for conveniently, wirelessly charging electronic devices wireless, e.g., a phone and/or computer placed by a user on a transverse member 14.

One or more tabs 120*a-b* extend from the panel 104 of the hub 100 and are configured to reside between the transverse member 14 and the base member 12 when transverse member 14 and base member 12 are coupled together. In this way, the tabs 120*a-b* are press fitted between the transverse member 14 and base member 12 so as to help secure the hub 100 at least partially within the cavity 26 in transverse member 14.

Coupler 15 and similar couplers and hub 100 and similar hubs can be employed to provide coupling and electrical power in conjunction with speaker-containing bases 12*a* and transverse members 14*a* and/or in conjunction with non-speaker containing bases and transverse members.

FIGS. 8A-8H: Base 12*a* with Speaker System

FIGS. 8A-8H demonstrate an example of the base 12*a* of the furniture system 200 in the form of the chair of FIGS. 1A-FIG. 3 of the present invention and the subwoofer speaker system mounted within the frame of the base 12*a*.

FIGS. 8A-8H illustrate how subwoofer 210*a* is mounted and positioned within base 12*a*. As shown in FIGS. 8A-8H, base member 12*a* includes a frame assembly 216 into which subwoofer 210*a* is mounted. Subwoofer 210*a* can receive its audio signal wirelessly (e.g., from transmitter 224, or from receiver/amplifier 217), or through a wired connection (e.g., from audio receiver 217). Power for a powered subwoofer may be provided from hub 100. If the subwoofer is passive (e.g., no internal amplifier), the amplified signal may be provided from receiver/amplifier 217.

FIGS. 8A-H illustrate how subwoofer 210*a* is embedded into the frame assembly 216 of base 12. Frame assembly 216 of base 12*a* has a cavity 226 within frame assembly 216, within which subwoofer 210*a* is positioned.

Subwoofer speaker 210*a* is comprised of a subwoofer speaker driver 211*a*, including electronics and other structure typically associated with such a speaker driver, such as its magnet. Speaker driver 211*a* is coupled to a speaker housing 228 on which driver 211*a* is mounted. Speaker housing 228 provides a given, desired internal volume associated with subwoofer speaker 210*a*. In the illustrated embodiment, housing 228 is separately defined from the cavity 226 within frame assembly 216.

The configuration of speaker housing 228 enables speaker 210*a* to be removed from the cavity 226 of base member 12*a* so as to allow a user to remove subwoofer assembly 210*a* from a given base member 12*a* and install it into another base member 12, for example, which may not have previously included a subwoofer speaker 210*a* therein. Subwoofer assembly 210*a* is thus entirely self-contained. Enclosure 228 may be sealed or ported, as desired.

Subwoofer speaker 210*a* further includes elongate attachment arms 230*a* and 230*b* mounted on opposing sides of speaker housing 228. Arms 230*a* and 230*b* are attached to the enclosure 228 and couple enclosure 228 to frame assembly 216 of base 12*a*.

In the illustrated embodiment, arms 230*a* and 230*b* each include an angled terminal extension 232 at each end thereof and a mounting hole 232*a* associated therewith. The positioning and orientation of holes 232*a* are configured to allow subwoofer speaker 210*a* to be received within cavity 226 of frame assembly 216 in a manner that holes 232*a* align with the holes for mounting feet 20*a* of base member 12*a*.

Each of the arms 230*a*-*b* are comprised of an L-shaped shaft body having an approximately 90 degree angled L-shaped cross section, each shaft body having terminating extensions 232 extending from the shaft body. The terminating extensions 232 are angled to extend laterally outward from the shaft body as shown in FIG. 8H. As shown in FIG. 8H, the terminating extensions 232 extend in the same plane as one of the legs of the L-shaped shaft body. Using the arms 230*a*-*b*, the associated speakers can be quickly and efficiently coupled to the frame assembly of the base and can be readily removed therefrom in order to selectively replace the speakers.

Thus, in one embodiment of the present invention, the speaker system comprises one or more arms configured to couple one or more speakers to a frame of a portion of the furniture assembly, the one or more arms comprised of an L-shaped shaft body having an angled L-shaped cross section, the shaft body having terminating extensions extending from the shaft body, the terminating extensions being are angled to extend laterally outward from the shaft body, the terminating extensions extending in the same plane as one of the legs of the L-shaped shaft body.

Figure 8A:
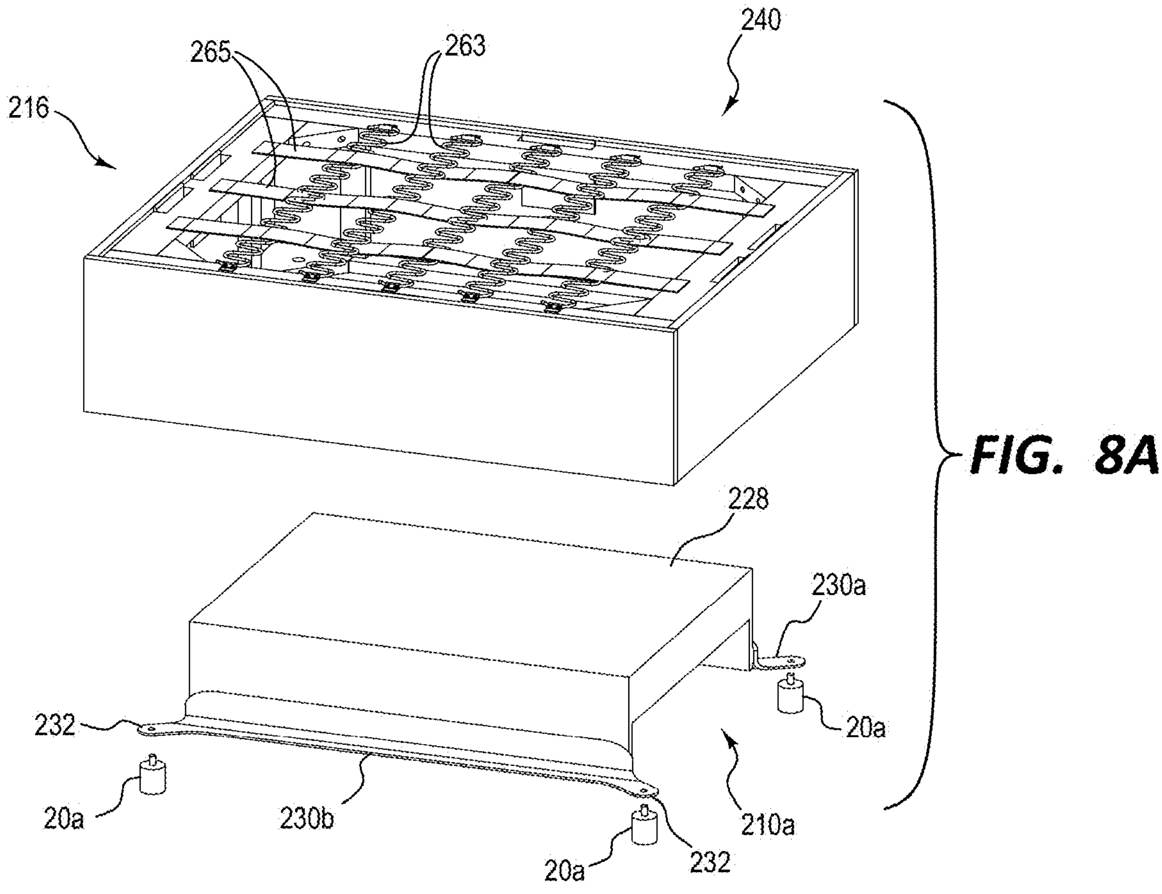
FIGS. 8A-8H demonstrate the speaker-containing base of the chair of FIGS. 1A-1B of the present invention with the subwoofer speaker system mounted within the frame of the base. An outer and inner cover and feet members associated with components of the base are depicted in FIG. 8F.
Figure 8B:
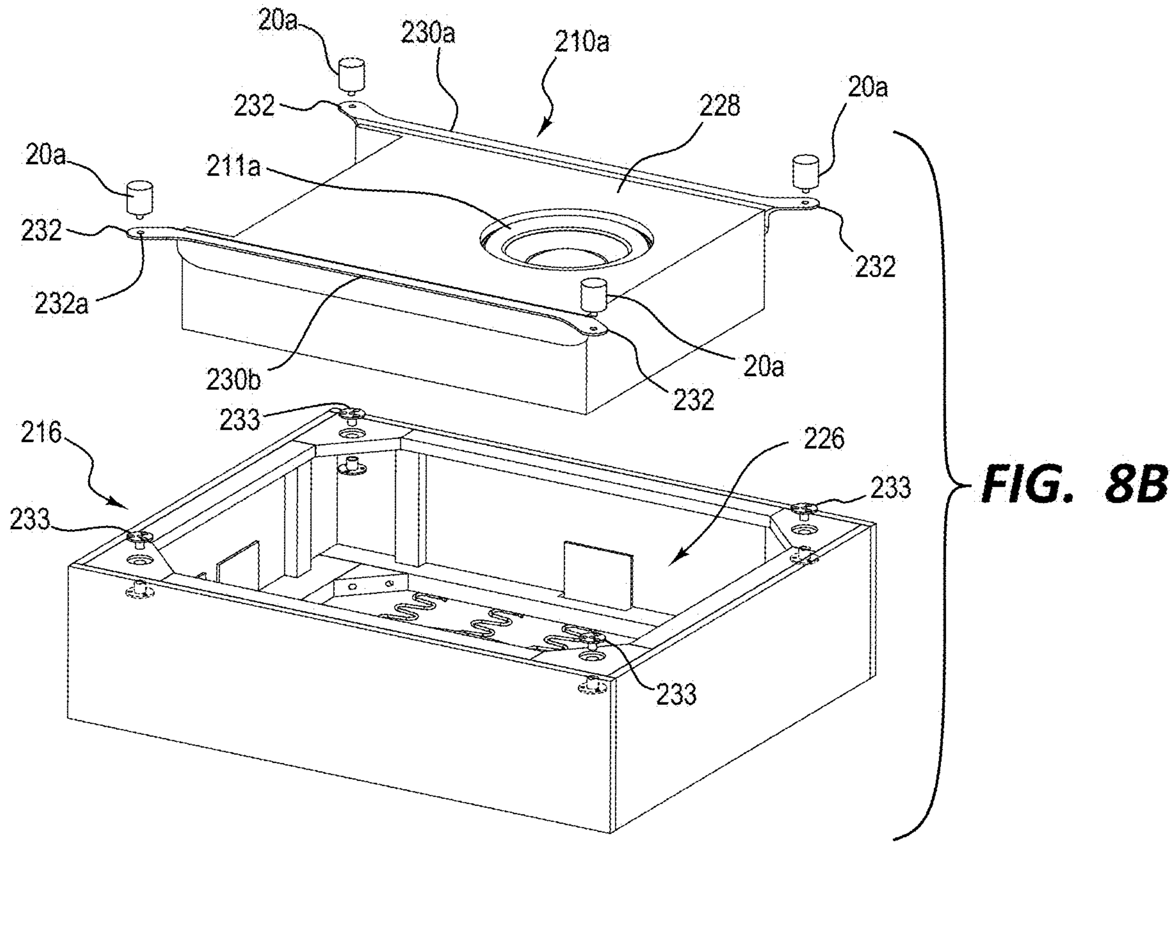
Figure 8C:
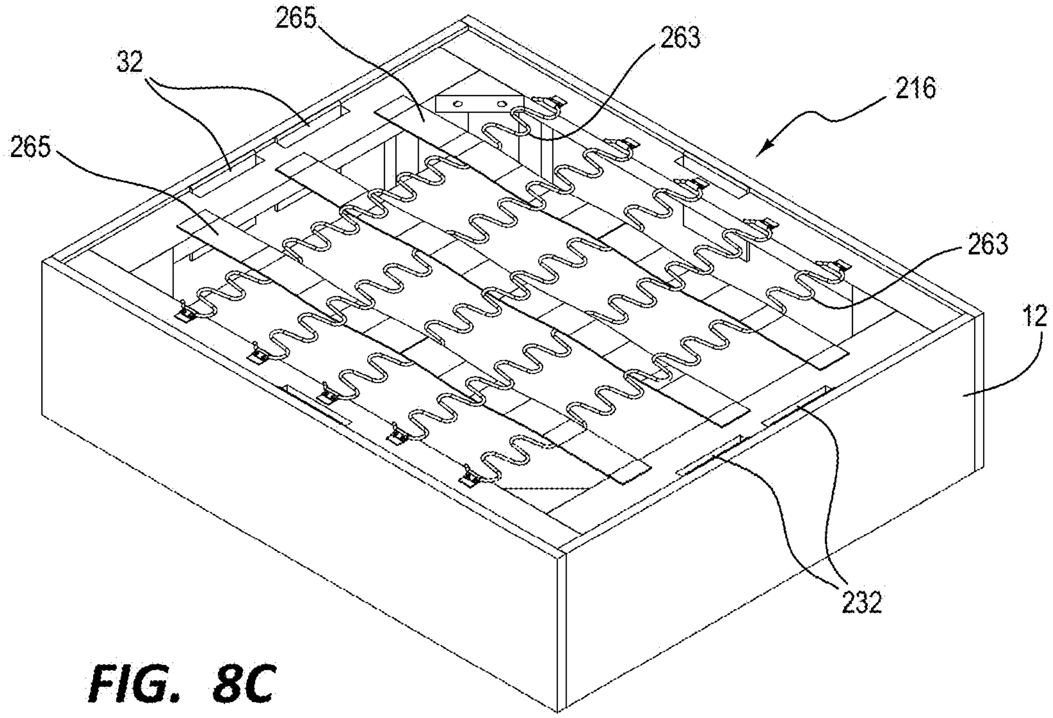
Figure 8D:
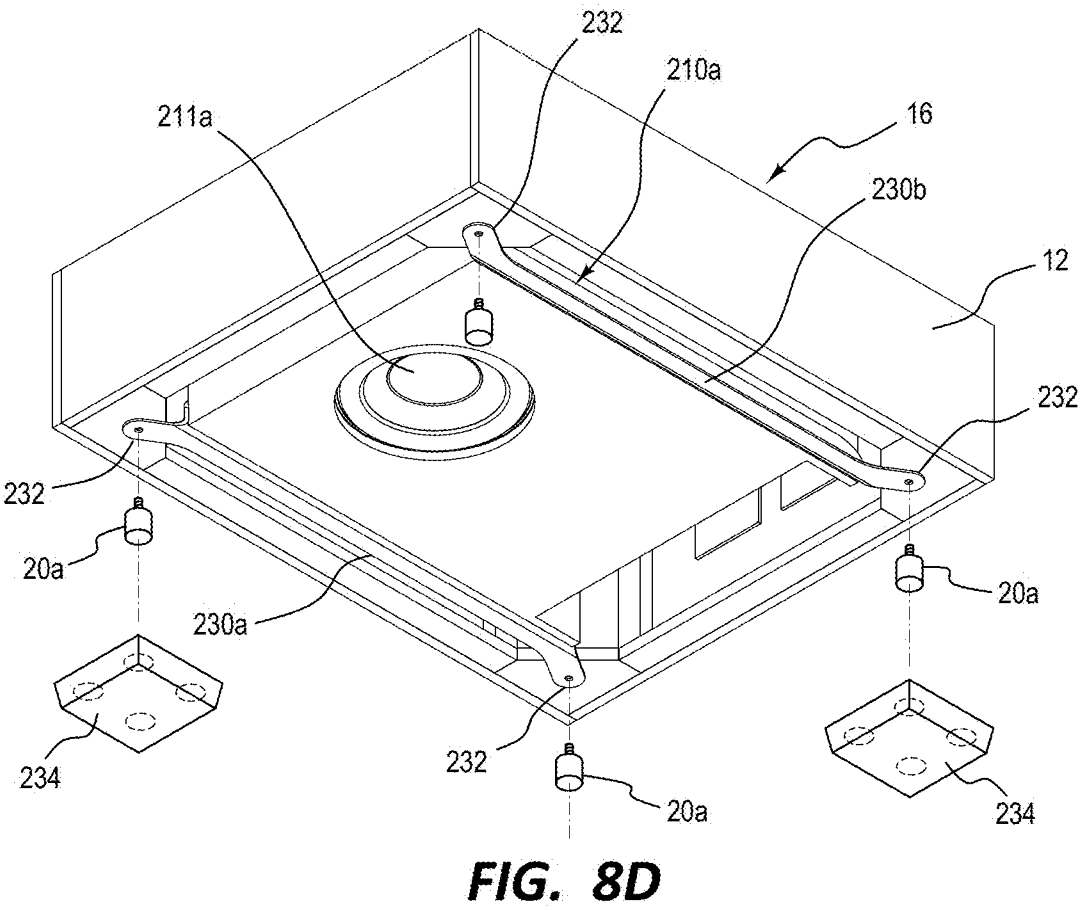
Figure 8E:
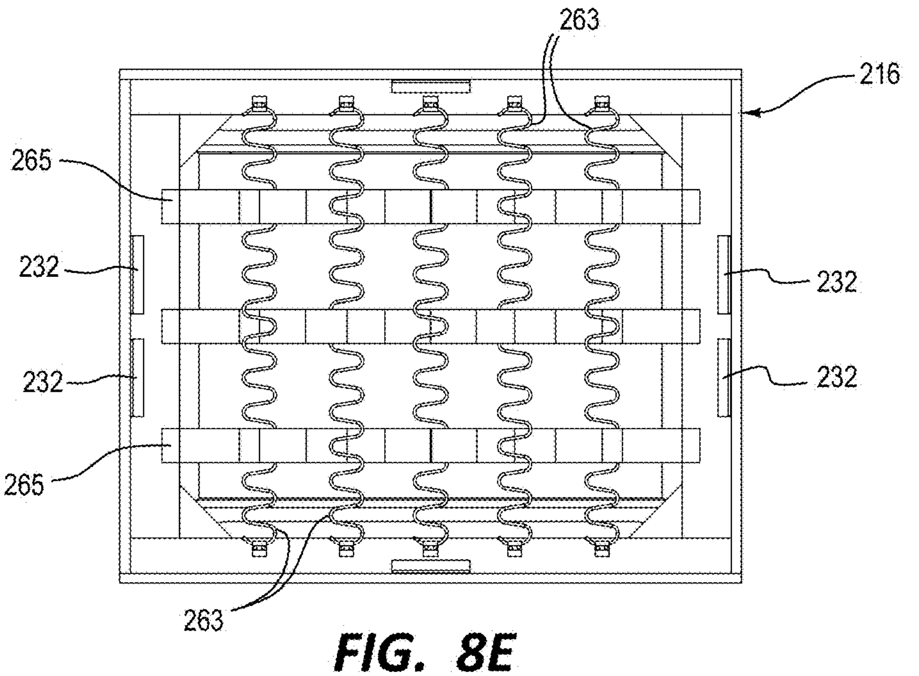
Figure 8F:
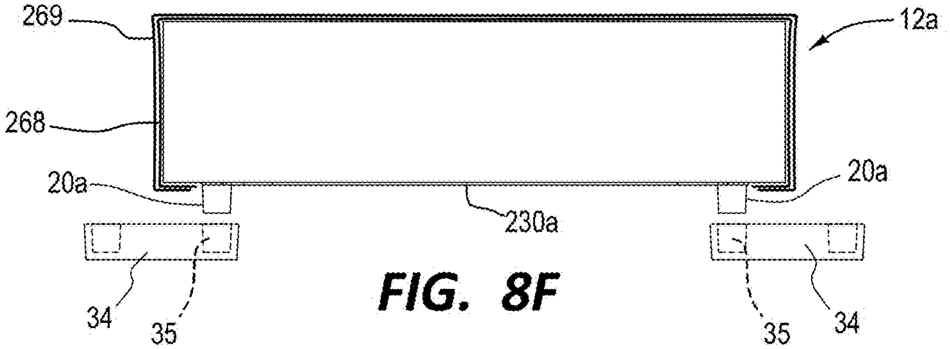
Figure 8G:
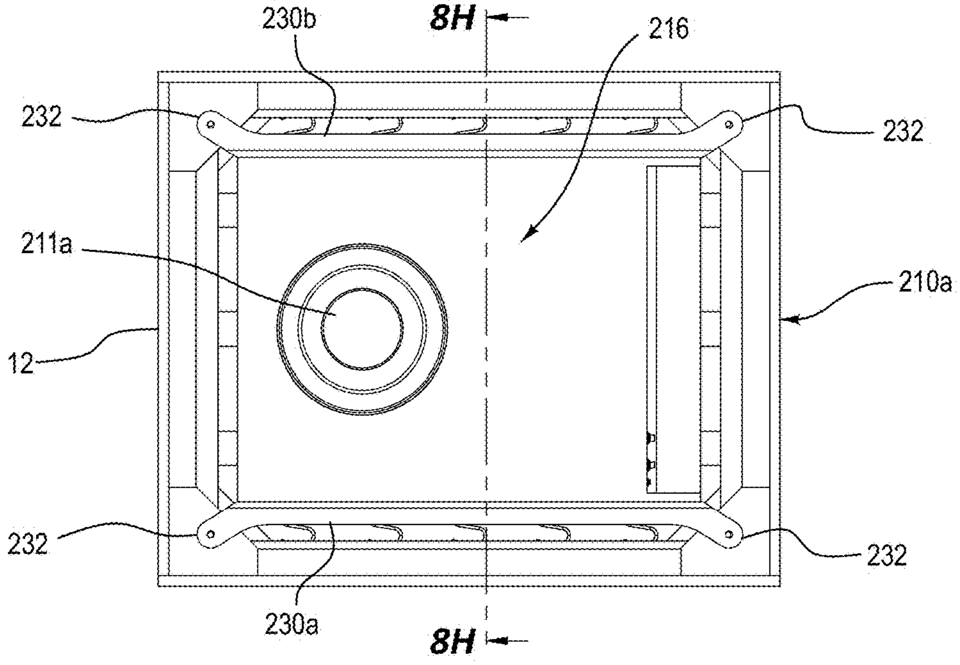
Figure 8H:
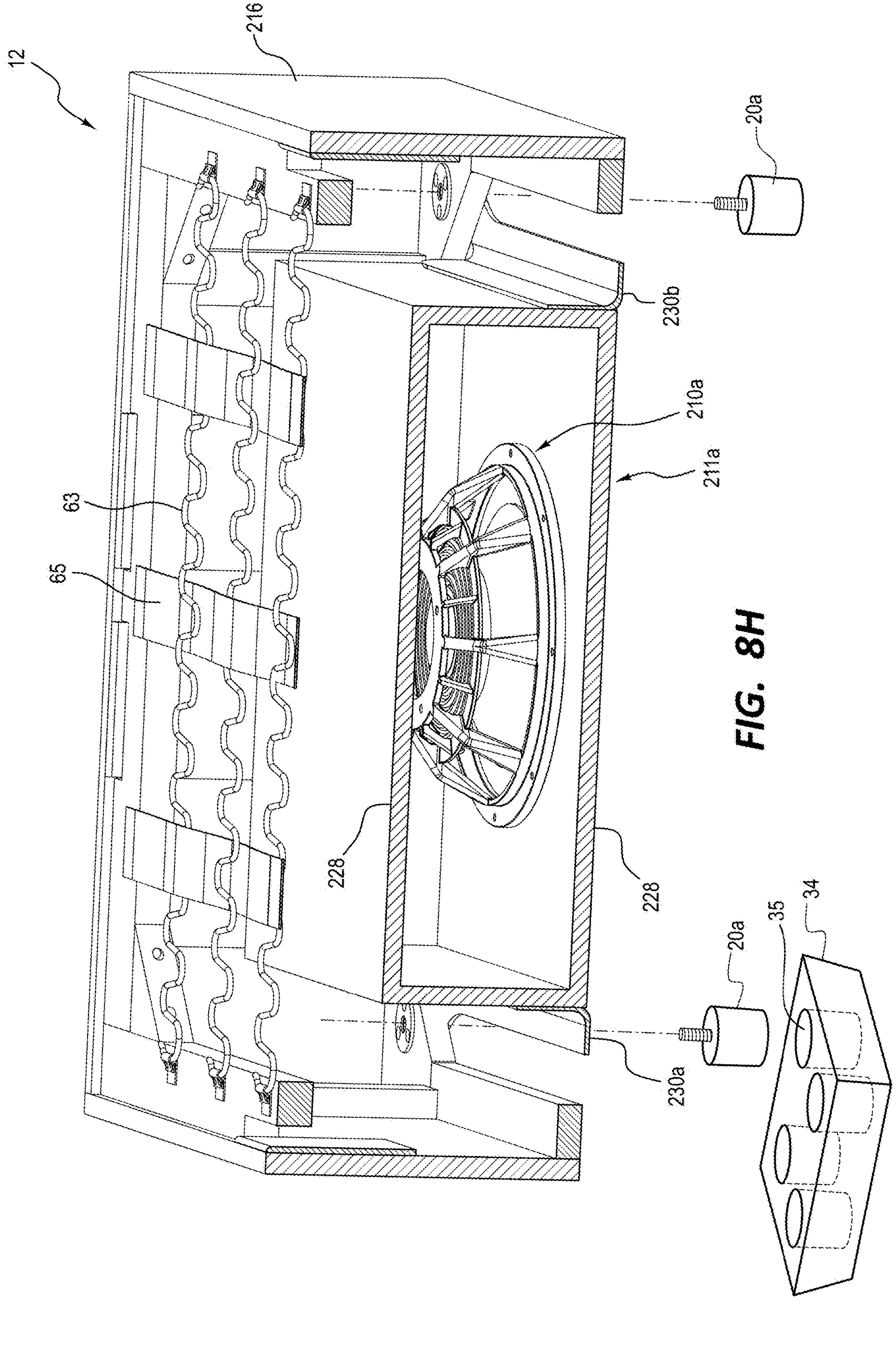

This relationship is further shown in FIGS. 8A-8H in which the positioning of feet 20*a* is depicted. Feet 20*a* of base member 12*a* are shown as being configured to be mounted to the respective four corners of frame assembly 216 with arms 230*a* and 230*b* being sandwiched between the respective feet 20*a* and a hole in frame assembly 216 into which feet 20*a* are threadedly received, for example. FIG. 8B illustrates the positioning of upper and lower internally threaded hubs 233 that sandwich corner portions of frame assembly 216. Feet 20*a* can be selectively threaded into hubs 233 within the corner portions of frame assembly 216.

As further shown in FIGS. 8A-H, the subwoofer speaker 210*a* is shown positioned within frame assembly 216 of base 12 in an orientation so that the driver 211*a* of subwoofer speaker 210*a* is oriented downwards, for example, in the same direction as feet 20*a* (towards the floor).

In other words, the cone of driver 211*a* associated with subwoofer 210*a* is shown as directing sound downward towards the floor or other support surface when assembled within base 12*a*.

Other configurations are possible. For example, the driver 211*a* can alternatively be flipped over so that the cone of driver 211*a* associated with subwoofer speaker 210*a* is oriented upwardly within base 12*a*, in other words, toward the seated user.

Each of these different configurations provides a different sound-enhanced experience for the user. For example, when driver 211*a* is pointed downward towards the floor, sound is reflected off the floor, the reflected sound potentially having the advantages of reflected sound, which may, in some embodiments, include improving the sound quality.

When driver 211*a* is pointed upwardly toward the user sitting on the base 12*a*, it may be possible for the user to feel and experience an increased amount of reverberation, improving the fourth dimensional experience for the user who can, in some embodiments, feel the sound of the speaker more intensely.

The illustrated configuration provides a high degree of protection for the driver 211*a* of subwoofer speaker 210*a*, while also providing excellent sound quality. In some embodiments, as frequencies of 120 Hz or less, or 80 Hz or less are largely omni-directional, a user seated on couch 200 cannot readily tell from which direction such sounds are coming.

Providing a full enclosure housing 228 for subwoofer speaker 210*a*, in addition to using an enclosure associated with frame assembly 216 of base 12*a*, provides additional protection to the driver 211*a* of subwoofer speaker 210*a*.

For example, the top side of enclosure 228 is spaced apart from the springs 263 coupled to the top of frame assembly 216 on which the cushion is positioned. The space thus provided between the top of enclosure 228 and the springs 263 coupled to the top of frame assembly 216, so that when a user sits on a cushion 18 positioned on the springs 263 coupled to the top of frame assembly 216 (or on fabric cover 266 or other cover over the springs 263), there is little risk of damage to driver 211*a* of subwoofer speaker 210*a*.

For example, such a space or clearance between the springs 263 and the housing 228 may be at least about 2 inches to about 5 inches, for example.

As shown in FIGS. 8A and 8B, one or more internally threaded hubs 233 are coupled to each of the corners of base frame 226. In one embodiment, corresponding upper and lower hubs 233 are mounted within a corner such that each corner has an upper hub and a lower hub in an aperture thereof. Feet 20*a* are threadedly coupled to corresponding corners by being threaded within corresponding upper and/or lower hubs 233.

In the embodiment of FIG. 8D, foot couplers 234 are shown. Foot couplers 234 are further shown in FIGS. 8F and 8H. In one embodiment, the diameter of each of the holes of foot couplers 234 are larger than the outer diameter of the feet 20*a*, such that the rim and body portions of the foot couplers 234 contact the corners 232 of the arms 230*a*-230*b*, such that weight of the arm's base frame 216 and an individual sitting on the base 12*a* are received by the foot couplers 234 and not by the feet 20.

FIG. 8F shows an example of an inner and outer cover 268, 269 mounted on base frame 216 and having ends that extend slightly onto the underside of base frame 216, as shown in FIG. 8F. Covers 268, 269 may be comprised of a variety of different fabrics. Additional covers or shielding members can be used to protect base frame 216 and/or speaker system 210*a*, such as a metal or plastic mesh or caging material to cover driver 211*a* on the bottom of frame assembly 216. A removable outer cover 269 is selectively, removably mounted on the undersurface of frame 216 and/or on inner cover 268 in order to protect inner cover 268 and frame 216 and in order to provide a selectively changeable aesthetic appearance. Covers 268, 269 may be secured over frame assembly 216 with attachment members, such as with one or more two-part attachment members, such as VELCRO, snaps, or with a variety of different attachment members. Staples or other attachment members may be used to connect inner cover 268 to frame 216.

As shown in FIGS. 8A-8H, at the top end of frame assembly 216, serpentine springs 63 and/or Italian webbing 65 are mounted on frame assembly 216. Such resilient cushioning structures provide support to a cushion 18 placed over frame assembly 216 and may also help to ensure that even if a user were to step or jump on the top of frame assembly 216 or a cushion placed thereon, the springs and webbing 263 and 265 will not be pressed against enclosure housing 228.

Even in the unlikely event that a user were able to depress springs 263 and/or webbing 265 to a top surface of housing 228, the rigid enclosure housing 228 will still protect subwoofer driver 211*a* from any damage. Thus, the configuration of housing 228 and the space between housing 228 and springs 263 provides dual layers of protection for subwoofer driver 211*a*.

As further illustrated in FIGS. 8F and 8H, the foot couplers 34, used to couple adjacent base members 12*a* and/or transverse member 14*a* to one another have apertures 35 that are large enough to surround feet 20*a* without contacting feet 20*a*, such that the upper surfaces of foot couplers 34 contact the surface of arms 230*a* and 230*b* on the respective corners of base 12*a*, along with other surfaces of the corners, so that more of the force and strain associated with base members 12*a* is carried by arm members 230*a* and 230*b*, and frame assembly 216 and foot couplers 34, rather than all of the force being concentrated within foot members 20.

FIGS. 9A-12 Transverse Member with Speakers

Figure 9A:
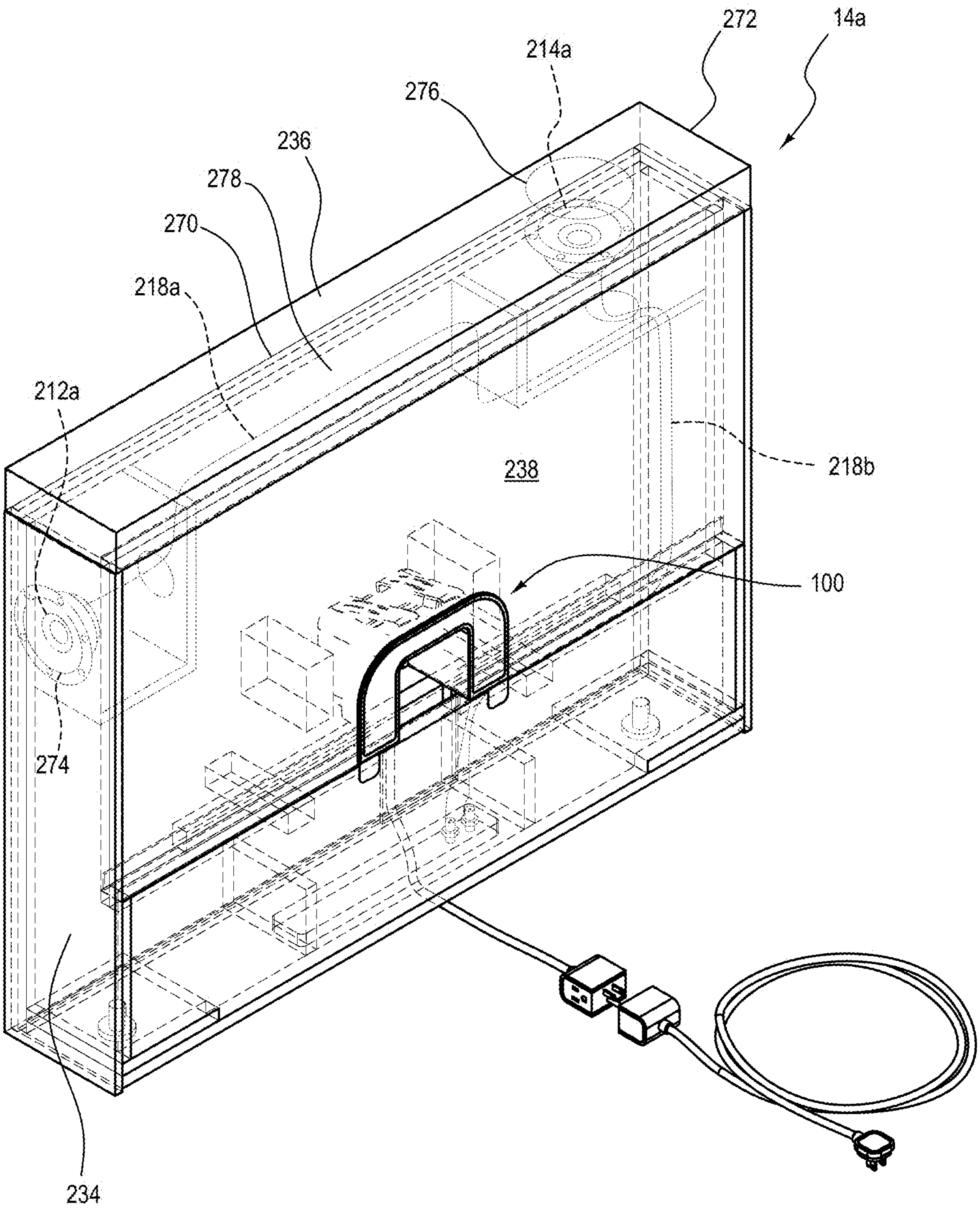
FIGS. 9A-9D demonstrate the transverse member of FIG. 1A through FIG. 3 of the present invention and the speaker system mounted within the frame of the transverse member. The electrical hub 100, which is selectively mounted within the transverse member, is shown mounted within the transverse member.
Figure 9B:
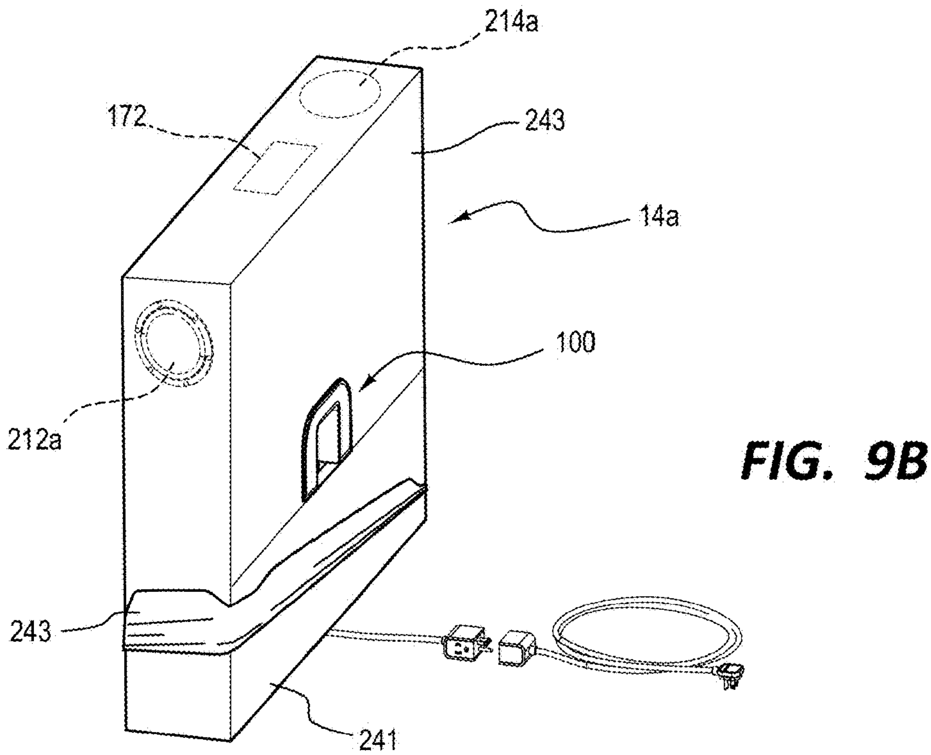
Figure 9C:
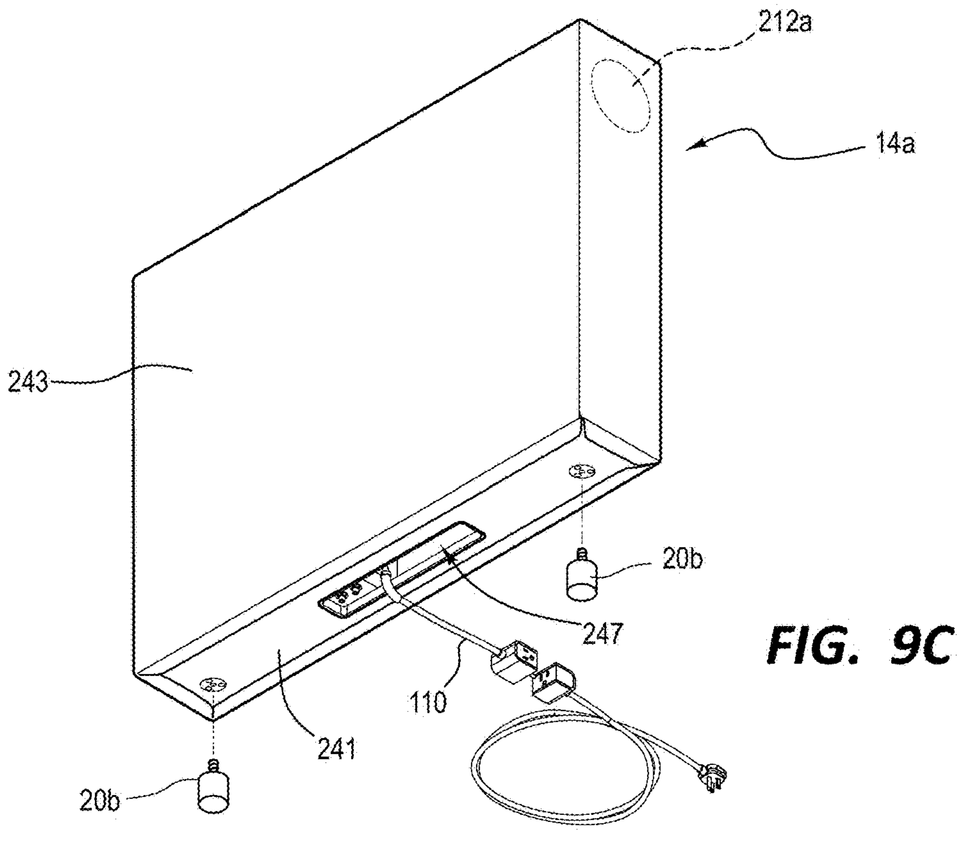

FIGS. 9A-9D demonstrate an example of the transverse member 14*a* of FIG. 1A through FIG. 3 of the present invention, with the speakers mounted within the frame of the transverse member 14*a*. The electrical hub 100, which is selectively mounted within the transverse member 14*a*, is shown mounted within the transverse member 14*a*. Depictions of inner and outer covers 241, 243 of the transverse member 14*a* are shown in FIGS. 9B-9C. Covers 241, 243 are not depicted in FIGS. 9A and 9D.

FIGS. 9A-9D illustrate transverse member 14*a* having two speakers embedded therein. FIGS. 9A-D illustrates the mounting of front speaker 212*a* on and within the frame 270 of transverse member 14*a* and the rear, upwardly facing surround speaker 214*a* mounted on and within the frame 270 of transverse member 14*a*. FIG. 9A shows how front speakers and rear speakers 212*a-b*, 214*a-b* of FIG. 1 may be mounted to the framing 270 within transverse member 14*a*.

As shown in FIG. 9A, an exemplary mounting configuration for mounting surround sound speakers 214*a* and front speaker 212*a* to frame 270, is shown. For example, speaker 212*a* is screwed onto, bolted or otherwise secured to plywood, other wood, or other material of the frame 270 of the transverse member 14*a*, as shown. The frame 270 of the transverse member 14*a* is comprised of vertical and horizontally oriented members that define and create an internal speaker cavity within frame 270. Frame is covered on one or more exterior surfaces thereof by a cushioning material 272, e.g., a polyurethane foam material for providing cushioning to frame 270.

Holes 274, 276 are formed through the frame 270 and cushioning material 272 through which the sound of respective speakers 212*a*, 214*a* is emitted. A layer of polyurethane or other foam is typically present around the top, sides and front and back faces of frame 270 of transverse member 14*a*. Holes 274, 276 extend through such foam and frame 270 through which respective speakers 212*a*, 214*a* adjacent the respective holes 274, 276 emit sound.

An inner fabric cover 241 extends over the foam 272 and frame 270 of transverse member 14 and connects on the bottom of frame 270, as illustrated in FIGS. 9B-9C. In one embodiment, such fabric extends over the holes 274, 276, protecting the respective speakers 212*a*, 214*a*. An outer removable upholstery fabric cover 243 is selectively placed over the inner cover 243. The frequencies generated by the speakers are tuned such that the sound emitted from the speakers 212*a-b* is tuned to compensate for the sound passing through the inner and outer covers 241, 243, which covers are typically not acoustically transparent materials.

In another embodiment, a fabric inner cover may be mounted within the holes of the polyurethane or other foam material and/or the plywood frame member, after which the speakers are secured to the frame member. The outer upholstery fabric cover then extends over the transverse member, including the speakers 212*a*, 214*a*, hiding the speakers from view.

Rear surround speaker 214*a* can be mounted in the same or similar manner as speaker 212*a*, or in a different manner. For example, speaker 214*a* can be secured to a plywood or other frame member of transverse member 14*a* and mounted adjacent a hole in the frame member. A hole is also provided through the polyurethane or other foam around the top surface of transverse member 14*a* through which surround speaker 214*a* is mounted. Inner and outer fabric covers similarly extend over and/or about rear surround speaker 214*a*.

In one embodiment, the transverse member frame 270 is surrounded entirely by cushioning material 272, except possibly on the bottom surface of frame 270 and possibly within the cavity 26 where the coupler 15 and hub 100 are mounted.

The front speaker 212*a* and rear surround speaker 214*a* of FIGS. 9A-9D are mounted within compartments within the frame 270 of transverse member 14*a* and are coupled to the frame 270, e.g., with screws or bolts. Holes 274, 276 in the frame 270 and foam 272 correspond to the inner diameter of the respective speaker cone. As indicated, the interior cover 241 can either be covering the outer portion of the holes 274 to thereby cover the speakers, or can be tucked into the holes created in the frame and foam that house the speakers.

The speakers 212*a*, 214*a* of FIGS. 9A-9D of the speaker-containing transverse members 14*a* are thus each positioned within the frame 270 thereof with the drivers of the speakers screwed or bolted to the frame 270 and with the inner diameter of the cones of the speakers 212*a*, 214*a* placed adjacent respective circular holes through the frame and adjacent foam.

The holes in the outer foam covering may be covered by an inner cover 241 (FIG. 9B) which covers the transverse member frame and/or by an outer cover 243 (e.g., washable) that is selectively purchased by a user according to color, fabric, etc. and which selectively is placed over the inner cover 241. The speakers 212*a*-214*a* are tuned in order to emit sound in a high quality manner through the upholstery fabrics of the covers 241, 243. For example, frequencies that are preferentially absorbed by the fabric covers (altering the loudness of a given frequency as it passes through the fabric cover) may be boosted to compensate for loss as such frequency passes through the cover(s). Relatively higher frequencies are typically more drastically attenuated by such fabric passage than relatively lower frequencies, such that the tuning may comprise preferentially boosting higher frequencies (as compared to little or no boosting of lower frequencies), in order to provide a "flat" frequency response across the frequency spectrum as heard on the other side of the fabric (i.e., at the listener's ears).

The drivers of transverse members 14*a* may optionally be covered by a metal or plastic mesh or caging material mounted within the holes within the cushioning material and/or frame, for additional protection beyond that provided by the fabric covers.

The front-facing speaker 212*a* of FIGS. 9A-9D is shown positioned adjacent the front face 234 of transverse member 14*a*. Front speaker 212*a* is shown as being positioned near the top of the front face 234. Upwardly facing rear surround speaker 214*a* is shown as being embedded adjacent a top surface 236 of transverse member 14*a*. Surround speaker 214*a* is shown as being positioned within transverse member 14 near a rear end of upper surface 236 of member 14*a*.

The structure and positioning and tuning of speakers 212*a*, 214*a* is strategically useful to the sound and fidelity of the speakers as the speakers are covered by one or more covers 241, 243.

Such placement is advantageous as it positions speaker 212*a*, 214*a* well above the floor on which the couch assembly 200 is placed, while also positioning rear surround speaker 214*a* near to, and perhaps behind the ears of a user seated on couch 200. Such positioning is also advantageous as it helps to protect speakers 212*a* and 214*a* from damage that might otherwise occur if the speakers were near the floor.

For example, positioning speakers 212*a*, 214*a* closer to the floor surface might result in a user inadvertently kicking the speaker, thereby damaging it. Positioning of surround speaker 214*a* at or near a rear end of the upper surface 236 of transverse member 14 is also advantageous as a user is less likely to spill a drink at this location or even position an arm or hand over the speaker, damaging the speaker and/or muffling sound generated thereby.

The interior furniture cavities of the base and transverse members of the present invention are utilized to potentially enhance the audio quality by resonance and positioning. The volume of the transverse member itself (or an enclosure within such space) may be used as the speaker enclosure, creating the desired resonance. Speakers are tuned for speaker output through the fabric covers covering the frames of the speakers, which is highly useful.

Removable, outer cover 243 may selectively be mounted on transverse member frame 270 (and the at least partially surrounding foam 272) and/or on interior cover 241 through the use of a two part attachment assembly, such as VELCRO, or other two part attachment assembly.

The inner and outer covers 241, 243 may be comprised of a variety of different upholstery fabrics, such fabrics comprising fibers, such as polyester fibers, or other fibers. The fabric of covers 241, 243 may be woven or non-woven. Typically, such fabrics are not acoustically transparent, e.g., they affect sound waves at one or more frequencies from 20 Hz to 20 kHz by attenuating (or boosting) any such frequency more than 3 dB (i.e., ±more than 3 dB). For example, such upholstery fabrics are relatively heavy fabrics, which may typically attenuate particularly the higher sound frequencies at more than 3 dB. As a result of such attenuation by the fabric, the sound generated at any such speaker hidden behind the upholstery fabric may be tuned to increase the volume of the attenuated frequencies to compensate for the attenuation that occurs as the sound passes through the fabric. For example, if the fabric attenuates sounds at 2 kHz by 6 dB, the tuning may increase the volume of sounds at 2 kHz by 6 dB to compensate. There may typically be several frequencies which may be boosted to compensate for such fabric induced attenuation.

Examples of the upholstery materials for the inner and/or outer cover 243 include polyester, chenille, tweed, linen, velvet, leather, polyester linen, cotton, cotton blend, denim, twill, faux fur, leather, and the like, for example. Such materials can also be used for outer covers for base member 12*a*, and all of which are examples of upholstery fabrics, although a variety of different fabrics may be employed.

Examples of weights of upholstery fabrics that can be used as interior covers and/or outer covers for the bases and/or transverse members of the present invention include, for example: fabrics having weights in a range of approximately 50 grams per square meter (GSM) to approximately 1500 grams per square meter (GSM), for example, such as approximately 100 GSM to approximately 1000 GSM, or such as approximately 190 GSM to approximately 800 GSM, although a variety of different interior and exterior fabrics may be employed. The speakers of the present invention are adjusted and tuned in order to emit sound through such fabrics in a manner that attenuation due to such fabric is compensated for.

In one embodiment, the inner cover of base 12*a* and/or the inner cover of transverse member 14*a* are comprised of a thin cover comprising an approximately 90 percent polyester and approximately 10 percent cotton blend, for example.

In one embodiment, with respect to tuning the speakers through the upholstery fabric of covers 241, 243 through which the sound is emitted, the upholstery fabric used in transverse member 14*a* is in one embodiment not an acoustically transparent fabric, but rather is upholstery fabric configured to be employed in upholstery, chairs, couches and other furniture.

For this reason, the front speakers and the surround speakers can be tuned to accommodate for the dynamic that the sound generated from such speakers is required to pass through the upholstery fabric.

For example, relatively higher frequencies (e.g., 200 Hz or more, 400 Hz or more, 800 Hz or more, 2 kHz or more, 4 kHz or more, etc.) generated from such speakers are often affected by passage through such fabric, and may have some degree of attenuation associated therewith, which attenuation may increase with increasing frequency. As a result of this, the speaker can be tuned by boosting such higher frequencies before they pass through the fabric so that once the speaker sound passes through the fabric, it is approximately at a volume as it is intended to be heard and received by a listener (e.g., so that the overall tuned output is within ±3 dB of the un-attenuated "target" value).

As mentioned, examples of the upholstery materials for the inner and/or outer cover 243 include chenille, tweed, linen, velvets, leather, polyester linen, cotton, cotton blend, denim and others used in furniture upholstery, for example. Tuning of the frequencies of the speakers to provide the sound through such upholstery fabrics is a unique and novel aspect of the present invention.

In addition to tuning by adjusting the frequency response of the speaker to adjust for the particular upholstery material through which the sound is emitted (e.g., by boosting particular frequencies, etc.), tuning can also refer to other adjustments configured to improve the sound quality, e.g., by adjusting a sound delay setting, phase, or other parameter of the sound, to accommodate placement of the speaker within the room, e.g., when the components of a modular furniture system are uncoupled from one another, and reassembled, in a different configuration (e.g., such as any of the various configurations shown in FIGS. 13C-13L, 14A-15K, or others). For example, when rearranging the bases and/or transverse members to form a different furniture assembly, a given speaker (e.g., left front, right front, left surround, right surround, etc.) may now be positioned at a different distance, location, or orientation as compared to a previous position, such that adjustments to sound delay, phase, volume of a given speaker, etc. could be advisable, to provide a high quality listening experience. The present systems contemplate such "tuning" adjustments, as well. Such adjustments can be made through any suitable control interface, e.g., an app on the user's smartphone, tablet, a remote control, or otherwise. The available controls can also allow changing of what channel signal (i.e., left surround channel, right surround channel, left front channel, or right front channel) is being sent to a given speaker, e.g., as described herein in conjunction with FIGS. 14D-14E and 15D-15E.

Such positioning hides speakers 212*a* and 214*a* within transverse member 14 so as to not be readily seen by a user or other person, but also allows a high quality sound from the speakers.

Such hiding of the speakers is particularly advantageous in at least some embodiments. For example, many users dislike the appearance of speakers within a room in locations such as a bookshelf, or on stands located some distance from a couch, which is often typical.

The present configurations are advantageous in that they allow complete hiding of the speakers, sometimes even all of the speakers associated with a surround sound system.

Each of speakers 212*a* and/or 214*a* may be mounted within transverse member 14 in any manner desired. For example, they may each include a dedicated housing enclosure similar to that described above, with respect to the subwoofer assembly. Such a housing enclosure could be attached to the frame assembly within transverse member 14*a*. In another embodiment, the speaker driver associated with speakers 212*a* and/or 214*a* can simply be mounted to frame members internally disposed within transverse member 14*a*, employing the cavity associated with transverse member 14*a* for one or both of speakers 212*a* and/or 214*a*.

Figure 9D:
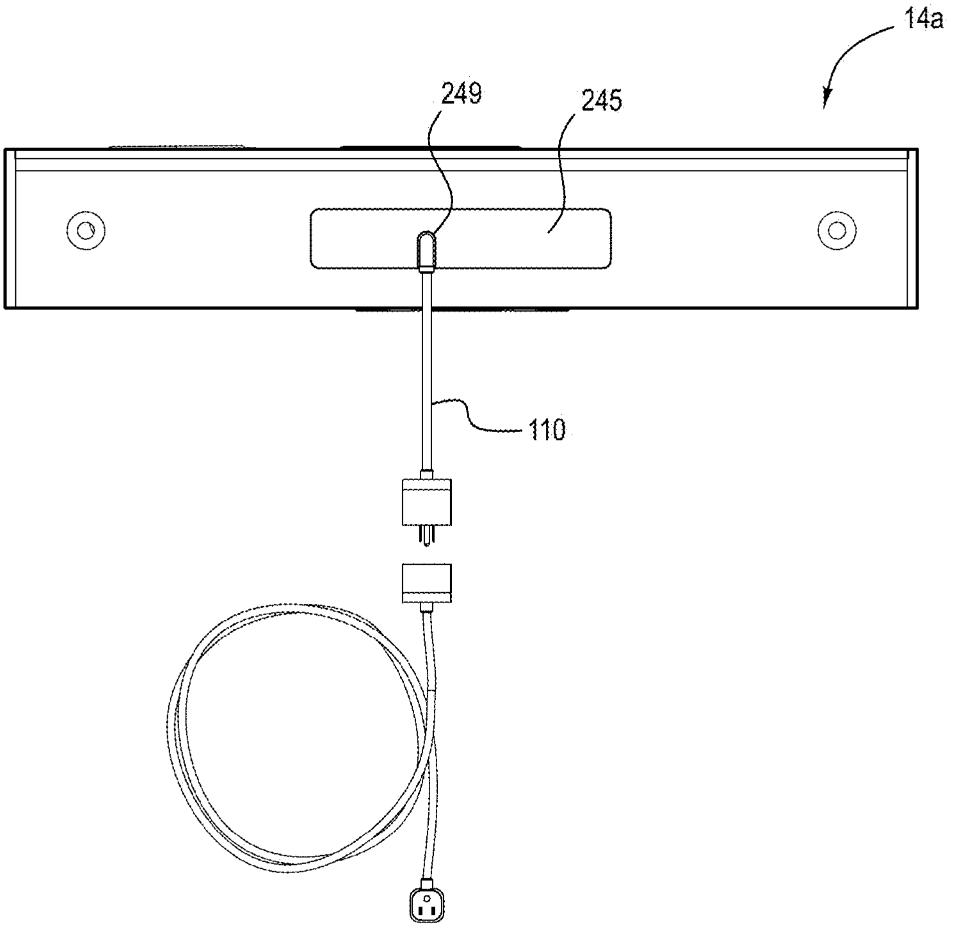

With regard to FIG. 9D, a hole cover 245 may be employed as a plug to cover electronics of the interior systems within the transverse member 14*a* as shown in FIG. 9D. For example, FIG. 9C illustrates hole or opening 247 in a bottom face of transverse member 14*a*, through which cord 110 passes. As shown in FIG. 9D, hole 247 is shown covered by hole covering 245. A relatively small slot 249 may be provided through covering 245, to permit cord 110 to extend therethrough.

As shown in FIG. 9A, wiring 218*a*, 218*b* provides power and/or signal to embedded speakers 212*a* and/or 214*b* as appropriate. Wire 218*a* provides at least part of an electrical connection between an amplifier 217 (see FIG. 16), which may be mounted in base 12*a* on, near, or within housing 228 for example, and front speaker 212*a*. It will be appreciated that cable or wiring 218*a-b* may be provided in a plurality of sections to preserve the modular nature of furniture assembly 200. For example, coupling between such wiring sections could be provided at or near the hub 100 disposed within transverse member 14.

For example, it will be appreciated that a first section of such wiring or cabling may extend from a base member 12*a* and amplifier 217 to a location of the base member 12*a* that is near or adjacent to the coupler 15 and/or hub 100.

This first section of wiring or cabling could be terminated at this location with an appropriate RCA, BNC or other type coupling jack. The transverse member 14*a* may similarly include another section of wiring 218*a* which extends from speaker 212*a* through transverse member 14 to another jack coupling at or near hub 100. Once the modular furniture assembly 200 has been assembled with transverse member 14*a* positioned adjacent to and coupled to base member 12*a*, a coupling or cabling can be extended between two such jacks (bridging wiring within transverse member 14*a* and base 12*a*), providing an effective, wired connection from amplifier 217 to speaker 212*a*.

A similar multi-section wiring or cabling configuration can similarly be provided between rear, surround speaker 214*a* and a jack at or near the hub 100 and from the amplifier 217 to a location at or near the hub 100, with a bridging coupling or wiring between wiring in base 12*a* with wiring in the transverse member 14*a*.

In another configuration, such internal wiring spanning the base members and the transverse members may not necessarily be required. For example, signals could be transmitted to the speakers from receiver 217 (e.g., an audio or home theater receiver) and/or transmitter 224 through wireless transmission.

In such embodiments, the signal may be transmitted wirelessly to speaker 212*a* and/or speaker 214*a*. In such embodiments, it may still be necessary to provide power to speaker 212*a* and/or 214*a*, e.g., through use of hub 100. Such wireless transmission of signals may eliminate the need for any wiring or electrical coupling for power or signals from base 12*a* to transverse member 14*a*, at least for speakers 212*a* and 214*a*.

Where jumper connections are desired for power and/or signal transmission, such may be achieved through any suitable configuration. For example, quick connect ports (e.g., RCA, BNC, banana plugs, or other) for such speaker wire or cable may be located on a bottom side of transverse member 14*a* (FIG. 9C) for connecting a jumper cable, for example, from the transverse member 14*a* to the base member 12*a*.

In one embodiment, an induction charger 172 (such as that in FIG. 6) is mounted on an upper surface of the frame 270 of the transverse member 14*a*, embedded within the foam 272 on top of the frame 270, for example, and located below the inner cover 241 (and possibly below a portion of foam) mounted on the frame 270. Induction charger 172 is electrically coupled to an interior outlet of the electrical hub 100.

Induction charger 172 can be mounted in an upper middle portion 278 of transverse member frame 270, for example, between the speakers 212*a*-214*a* and above the electrical hub 100. Charger 172 may be in the same top surface 236 as surround speaker 214*a*, positioned forwardly relative to speaker 214*a*, e.g., behind speaker 212*a* positioned in the front surface 234 of transverse member 14*a*.

Figure 10:
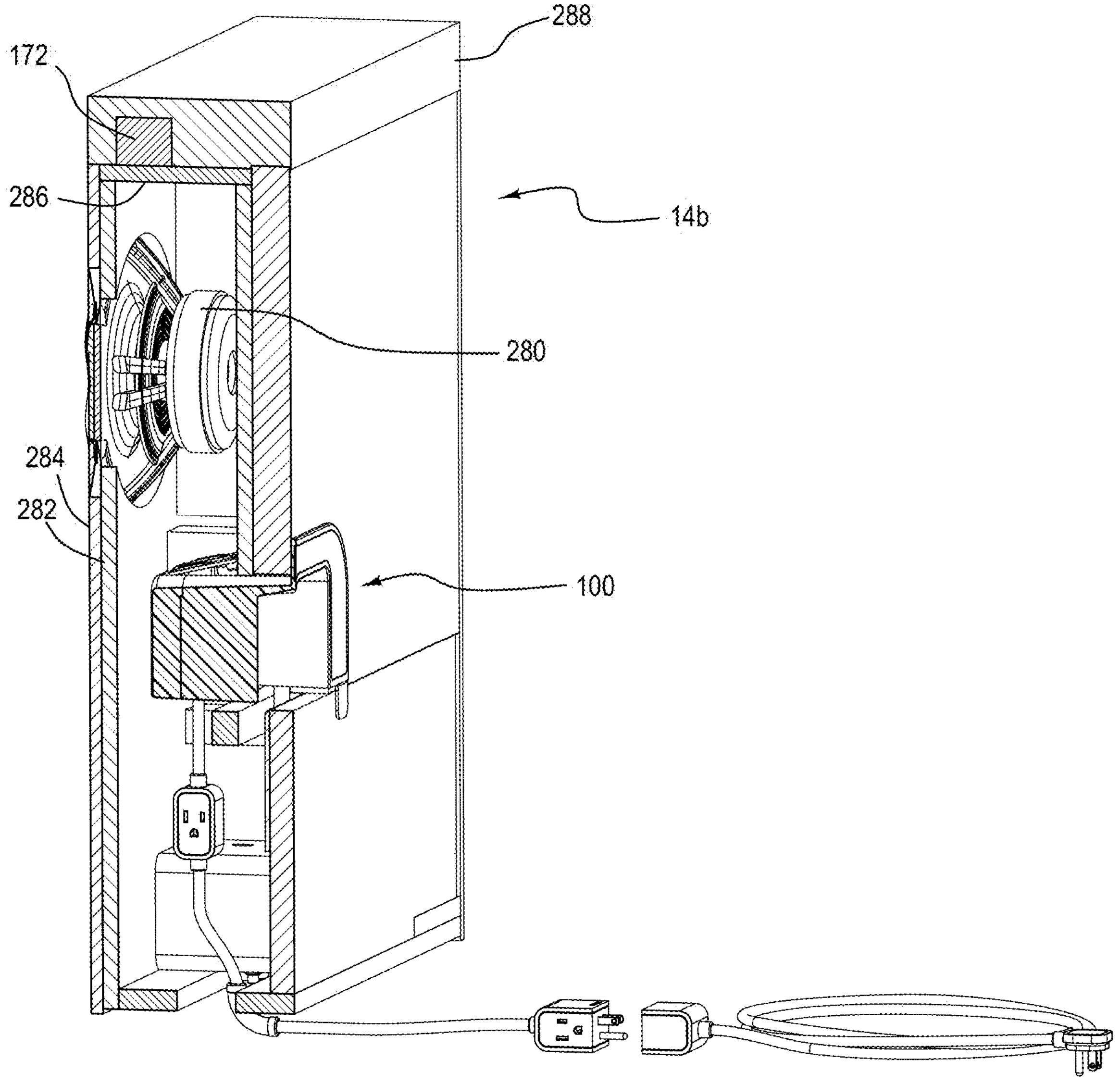
FIG. 10 shows a cutaway view of an alternative speaker-containing transverse member, wherein the speaker is in a different location from the transverse member of FIGS. 9A-9D.
Figure 11:
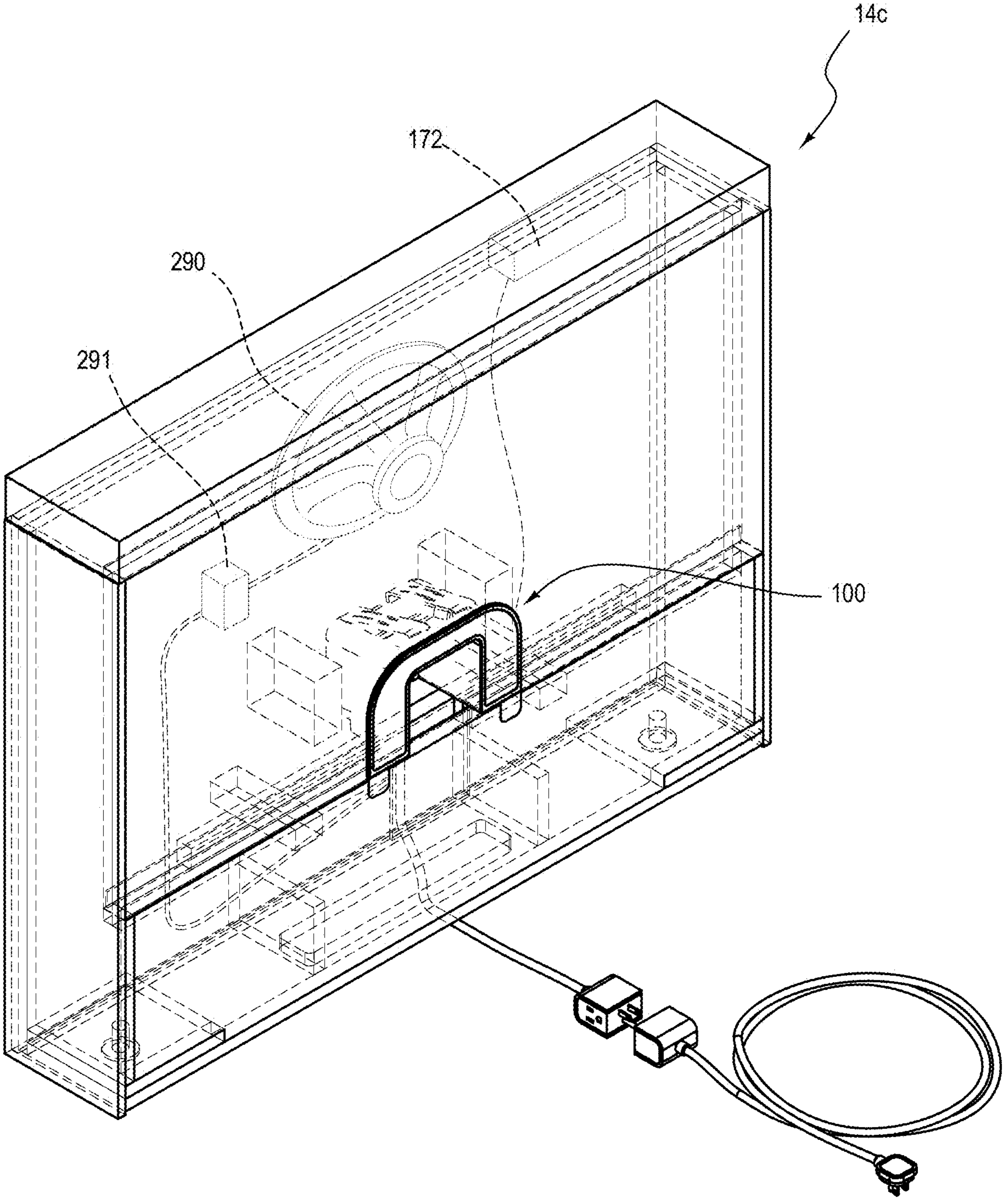
FIGS. 11-12 show alternate transverse members with alternate speaker locations.
Figure 12:
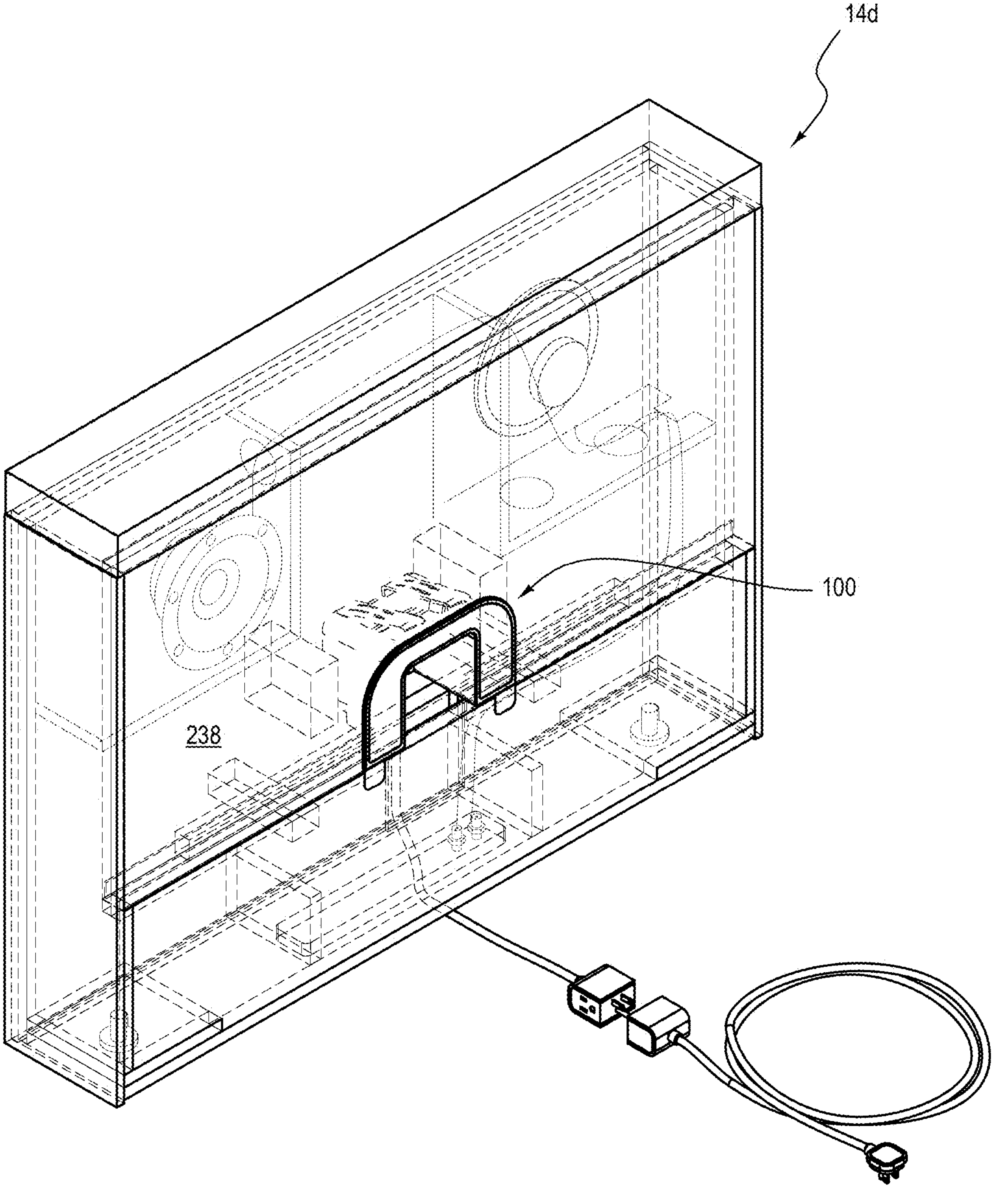

FIGS. 10-12 show alternate transverse members with speaker assemblies of the present invention. FIGS. 10, 11 and 12 illustrate differently configured transverse members 14*b*-14*d* in which the speakers embedded therein are differently positioned.

FIG. 10 shows a cutaway view of an alternative speaker-containing transverse member 14*b*, wherein the speaker 280 is pointing horizontally and away from the hub 100. Speaker 280 is coupled to the frame 282 (e.g., wood, plywood, fiberboard) of transverse member 14*a*, such that the speaker cone is adjacent a hole in the frame 282 and a corresponding hole in the foam cushioning material 284 adjacent the frame 282.

An induction charger 172 shown in FIG. 10 is mounted on an upper panel 286 of the frame 282 of the transverse member 14*b*, embedded within (or, optionally, adjacent) the cushioning material 288 on top of the upper panel 286 of the frame 284 of transverse member 14*b*, for example.

FIGS. 11-12 also show different speaker orientations for the transverse member speakers. It will thus be appreciated that numerous positioning possibilities are possible for positioning and orienting the speakers within transverse members 14*c-d*.

FIG. 11 shows another alternative which may include perhaps only a single speaker 290 within transverse member 14*c* which may be oriented and positioned in any desired orientation and position. Speaker 290 is electrically coupled to an amplifier 291 within the frame of the transverse member 14*c*. Thus, in some embodiments each speaker in each transverse member has its own associated amplifier mounted within the respective transverse member. In another embodiment, a single amplifier 217 for each speaker of the speaker system (all transverse members and base(s) is mounted within or on the housing 228 within base 12*a*. Where a dedicated amplifier 291 is provided for each speaker or speaker channel, the signal is transmitted through wiring as shown in FIG. 11 to amplifier 291 (and eventually speaker 290), or alternatively the signal is transmitted wirelessly, and power for amplifier 291 can be provided from hub 100 through appropriate wiring. Amplifier 291 sends an amplified signal to speaker 290.

An induction charger 172 is mounted on the upper portion of the frame of transverse member 14*c* in FIG. 11.

The speakers of FIG. 12 may be wireless speakers so as to receive signals through wireless transmission as described herein from audio receiver 217 and/or transmitter 224. Power for the speakers of FIG. 12 may be provided through a connection with hub 100.

It will thus be appreciated from FIGS. 9A-12 that numerous speaker placement and a number of speaker options are possible. For example, a stereo set up could be provided in which only left and right speakers are provided or a system including left and right speakers and a subwoofer, for example, a 2.1 system. While a single speaker for each channel (front left, front right, surround left, surround right) is principally shown and described, it will be appreciated that more than one speaker can be provided for any given channel (e.g., for front left, front right, left surround, right surround, subwoofer, center, etc.).

FIGS. 13A-16: Modular Sofas with Speakers

Figure 13A:
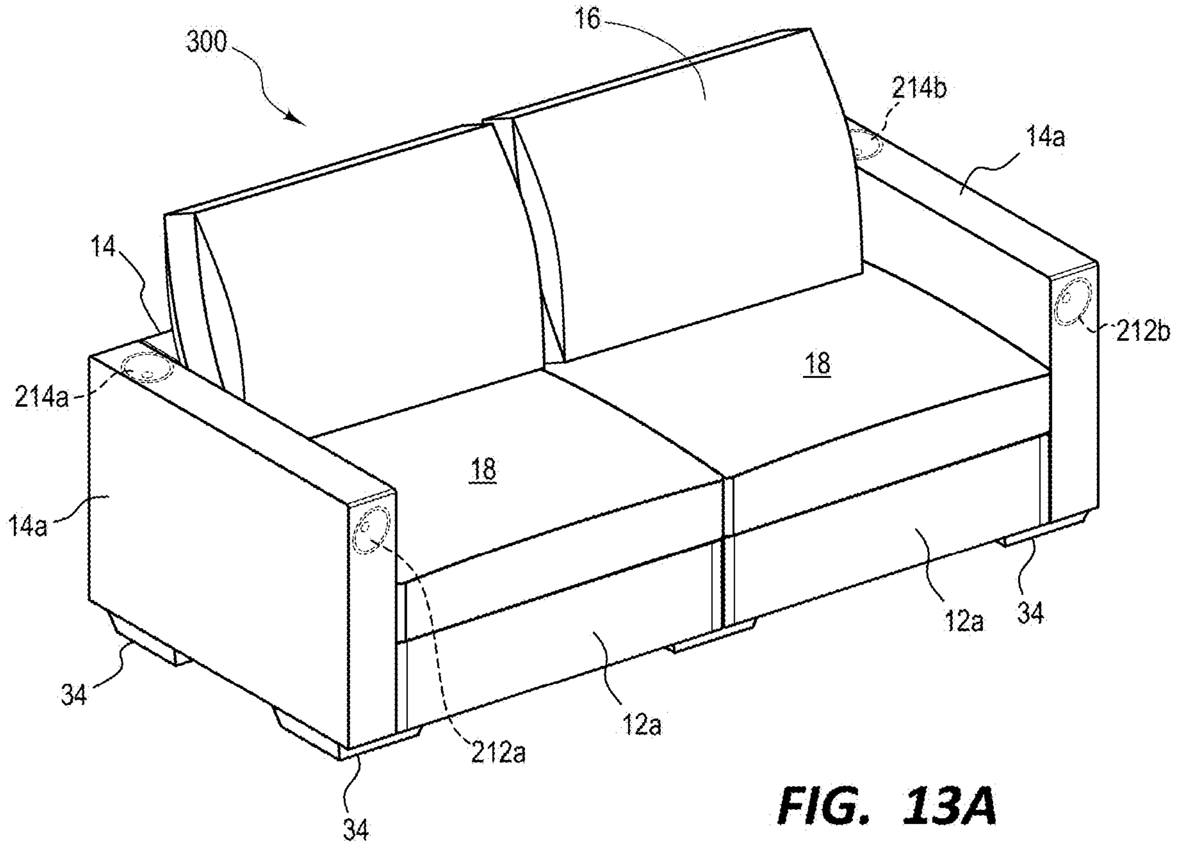
FIGS. 13A-13B are perspective views of a sofa similar to that of FIG. 1A with audio speakers in the transverse members (armrests) thereof and subwoofer speakers in the bases thereof to form a surround sound speaker system, the speakers reflected in phantom lines.
Figure 13B:
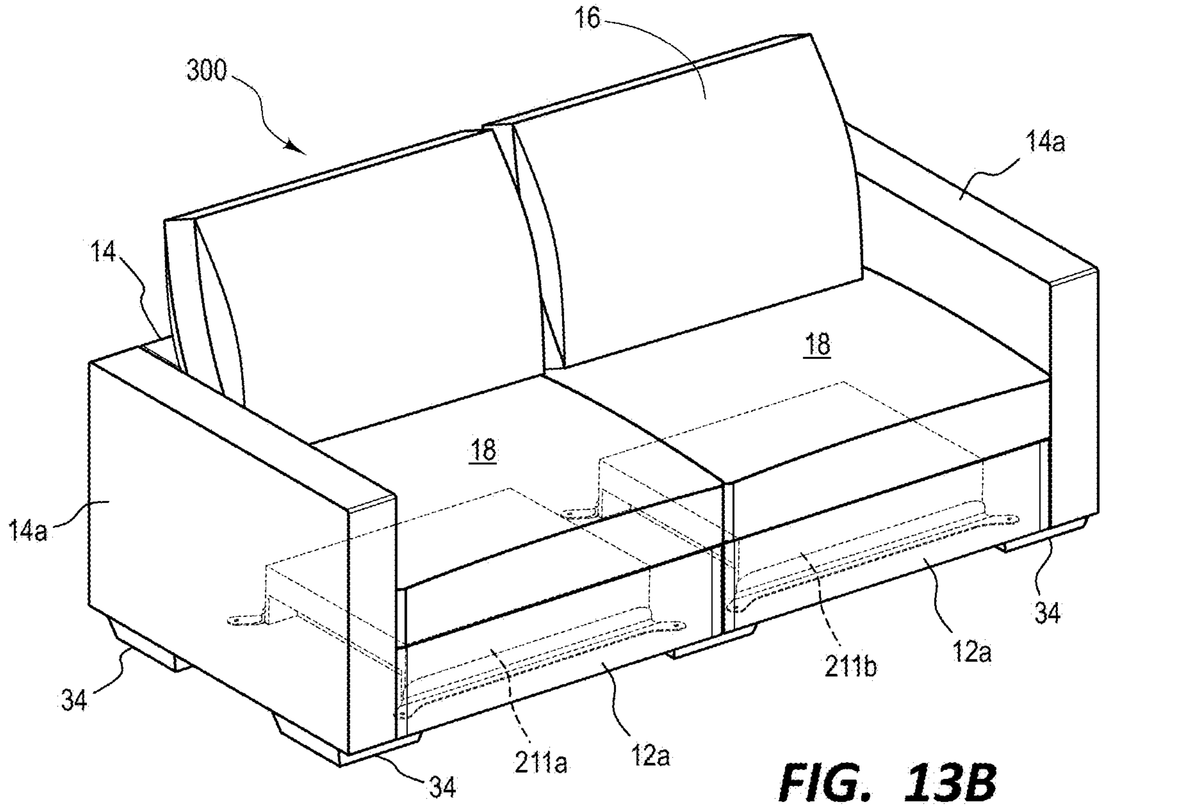

FIGS. 13A-13B are perspective views of a modular furniture system 300 of the present invention using the disclosure herein to form a sofa with audio speakers in the transverse members 14*a* (armrests) thereof and subwoofer speakers in the bases 12*a* thereof to form a surround sound speaker furniture system 300, the speakers reflected in phantom lines.

Front speakers 212*a*-*b* and rear, upwardly facing surround speakers 214*a*-*b* are each mounted in respective transverse members 14*a*. As shown in FIG. 1B, surround speakers 214*a* and 214*b* are shown as being oriented upwards so that the sound directed therefrom may be directed towards the ceiling and reflected off the ceiling, the reflected sound potentially having the advantages of reflected sound, which may, in some embodiments, include improving the sound quality (e.g., creating a diffuse, surround sound).

Each of transverse member speakers 212*a*, 212*b*, 214*a*, 214*b* are positioned underneath the upholstery fabric of the covers 241, 243 (FIGS. 9A-9C) of the respective transverse member 14*a* in which the speaker is positioned. Each of these speakers may be tuned so that output from a given speaker accounts for transmission of the sound waves through the upholstery fabric associated with transverse member 14*a* before reaching the user seated on sofa 300.

Positioning of speakers 212*a*, 212*b*, 214*a*, and 214*b* is also advantageous as the speakers are positioned in transverse members 14*a* in a manner such that a user seated on sofa 300 typically will not obstruct sound emanating from any of these speakers.

The particular positioning and orientation of the speakers shown in FIGS. 13A-13B may advantageously create a realistic surround sound environment in which sound from front speakers 212*a* and 212*b* is intentionally reflected off a front surface, such as a front wall, television or similar structure, disposed in front of a seated viewer. Sound from rear surround speakers 214*a* and 214*b* is similarly directed upwardly toward the ceiling so as to be reflected back down toward a seated viewer sitting on sofa 300, the front and/or ceiling reflected sound potentially having the advantages of reflected sound, which may, in some embodiments, include improving the sound quality, creating a surround sound experience.

The speakers embedded in base member 12*a* and/or transverse member 14*a* can be switched or swapped as a user wishes to reconfigure the modular furniture assembly of sofa 300. For example, if a user wished to reconfigure sofa 300 so as to include more or less base members and/or more or less transverse members 14*a*, the user can simply disassemble that part of sofa 300 and include additional base members 12*a* and/or transverse members 14*a* (or remove such), as desired. Such reconfigured and/or more complex arrangements are shown in FIGS. 13C-13L.

Because the speakers are positioned within such modular furniture assembly components, this provides great flexibility to a user in where the speakers can be positioned within a built furniture assembly. For example, any of the furniture assemblies shown in any of the applications already incorporated by reference can be modified to swap out any of the bases or transverse members with bases 12*a* including a subwoofer, or transverse members 14*a* including speakers, or any combination thereof. Such modularity of the furniture system thus allows the user extreme flexibility in where the speakers are provided, hidden within the furniture assembly. The modularity of the subwoofer assembly in base 12*a* can also allow a user to remove the assembly from one base, and install it in another base, if desired.

For example, the modularity of the system allows a user to place base members 12*a* and transverse members 14*a* in any place desired. Some base members 12 and some transverse members 14 may be provided which do not include any speakers positioned therein, allowing the user to use these component pieces in configuring any desired modular furniture assembly configuration they desire.

In order for an end user to set up sofa 300 (or system 200 or system 350), no tools are required because the speakers are already mounted within respective base members and transverse members, and wiring can be connected without the use of complicated tools. Therefore, the sofa 300 with its electronic assembly members is highly advantageous, efficient and useful.

Figure 13C:
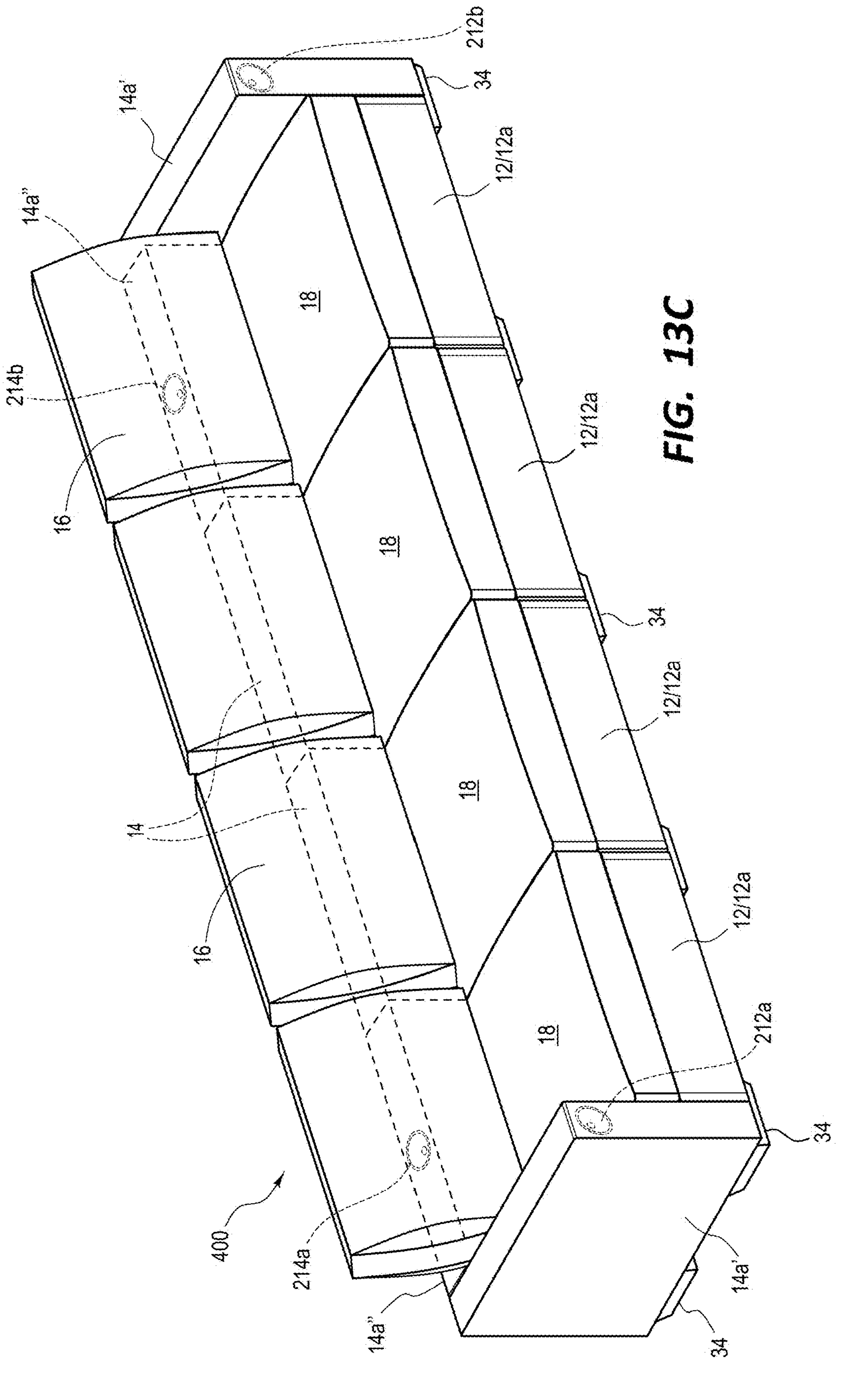
FIGS. 13C-13L illustrate additional modular furniture assembly configurations, where audio speakers are embedded in the transverse members as front speakers, and as surround speakers, which configurations allow a user to reconfigure the modular furniture assembly, positioning the speakers in different locations relative to another of the speakers, and/or the bases of the assembly, as desired.
Figure 13C:
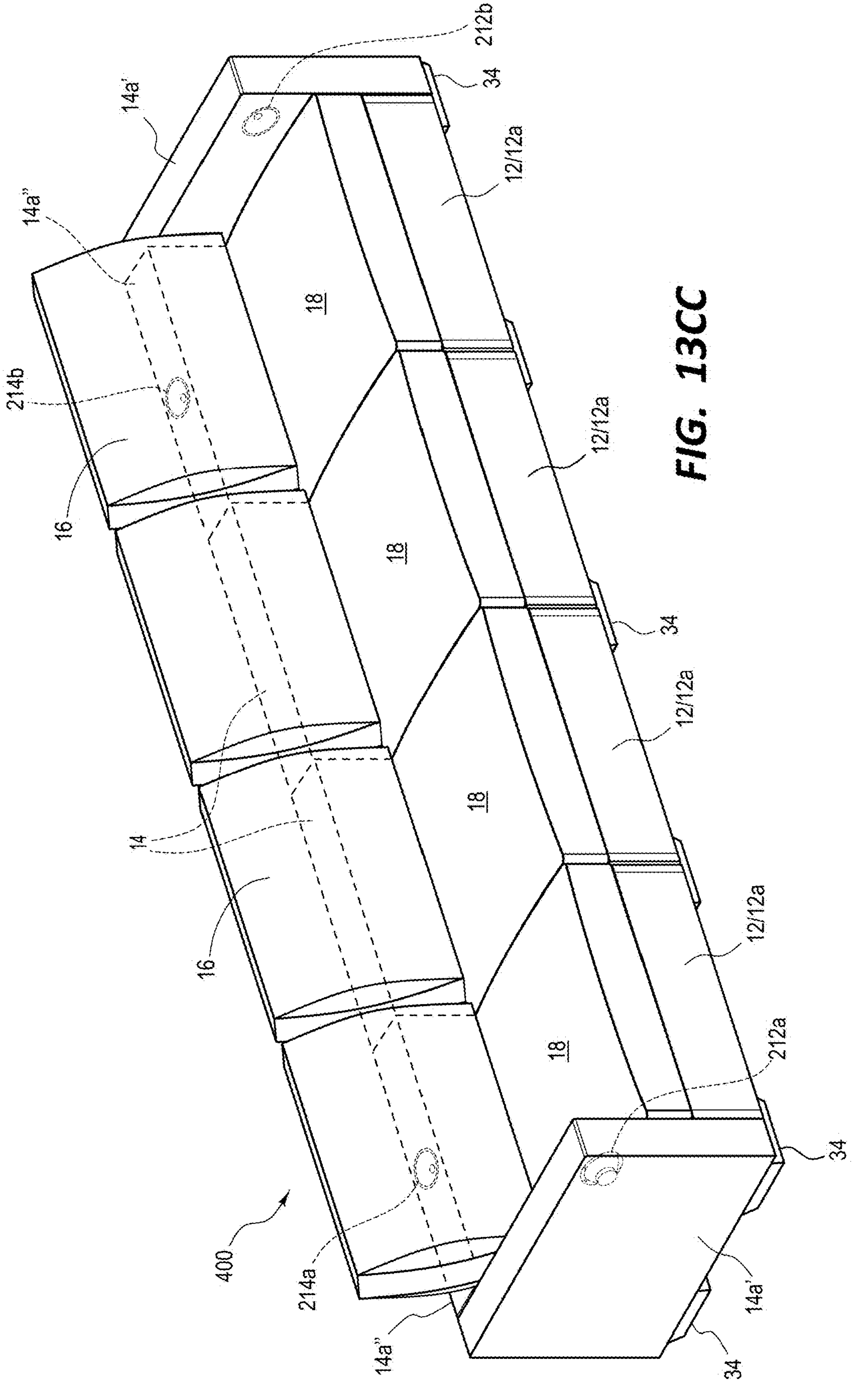

By way of further examples, FIGS. 13C-13L and 14A-14E illustrate additional configurations that can be provided, or are possible using components (bases and transverse members) as described herein. For example, FIG. 13C illustrates a larger sofa configuration 400 that is similar to sofa 300, but in which the audio-enhanced transverse members 14*a* are shown as including only a single speaker provided therein, rather than the two (front and surround) speakers seen in sofa 300. It will be appreciated that various different configurations for the audio-enhanced transverse members (and audio-enhanced base members) can be provided. By separating the front and surround speakers (i.e., providing them in separate transverse members 14*a*), this can provide additional flexibility to a user, e.g., when used in the context of larger furniture arrangements (e.g., including 3 or more, or 4 or more seating bases 12 or 12*a*). Another possible configuration is shown and described in detail below in conjunction with FIGS. 14A-15K, where the left front and left surround speakers are provided in the same audio-enhanced transverse member, the right front and left surround speakers are similarly provided in a given audio-enhanced transverse member, and where additional audio-enhanced transverse members with a single (e.g., surround) speaker can be additionally provided.

As shown in FIG. 13C, with the audio-enhanced transverse members providing surround sound speakers 214*a* and 214*b* separated from the front speakers 212*a*, 212*b*, additional flexibility in placement is possible. For example, the surround speakers can be positioned more towards the center of the seating arrangement provided by the furniture assembly, or more towards the ends (as shown), as desired. For example, while shown with the audio-enhanced transverse members 14*a*' providing front right 212*a* and front left 212*b* at the extreme right and left ends (as armrests) of sofa 400, and audio-enhanced transverse members 14*a*" providing surround speakers 214*a* and 214*b* respectively, towards the ends, with non-audio-enhanced transverse members 14 positioned at the other backrest members between audio-enhanced transverse members 14*a*", it will be appreciated that the locations could be interchanged, e.g., with the audio-enhanced transverse members 14*a*" positioned in the two middle backrest positions, with the non-audio-enhanced transverse members 14 positioned at the end backrest positions.

One advantage of the present systems is the extreme modularity provided by the system, whereby any and all of the configurations seen in FIGS. 13C-13L or 14A-14E could be formed by a user, by simply re-arranging the various bases and transverse members (where some of such are audio-enhanced). FIG. 13C includes 4 audio-enhanced transverse members (14*a*' and 14*a*"), two additional transverse members 14 (whether audio-enhanced or not), and four bases 12, 12*a* (whether audio-enhanced or not). Such an arrangement could be assembled with just two of the audio-enhanced transverse members used in FIGS. 14A-15E.

The audio-enhanced transverse members 14*a*" shown in FIG. 13C show the surround speakers 214*a*, 214*b* positioned generally centered in the top side of the generally rectangular shaped transverse member, where each is geometrically configured the same, whether providing the right surround speaker 214*a* or the left surround speaker 214*b* therein. Such can be advantageous as it reduces the number of differently configured furniture components (bases and transverse members) that must be stocked and available. For example, the same transverse member 14*a*" can be provided for all surround speaker positions, rather than needing to provide one configured for the right side, and a different configuration for the left side. The configuration described in conjunction with FIGS. 14D-15K does include separate configurations (e.g., an A and B surround audio-enhanced transverse member configuration) for left and right, which provides its own distinct advantages. It will be appreciated that the front speaker audio-enhanced transverse members 14*a*' may not be so configured (i.e., the right side including right front speaker 212*a*) can be different from one another. For example, the coupling cavity 26 (see FIG. 5) can always be on the face of the generally rectangular prism-shaped transverse member that is oriented towards the base to which the transverse member is coupled, so that the left and right audio-enhanced transverse members actually include different placement of the front speaker relative to the coupling cavity 26, requiring two different front audio-enhanced transverse members (one right and one left).

Figure 13D:
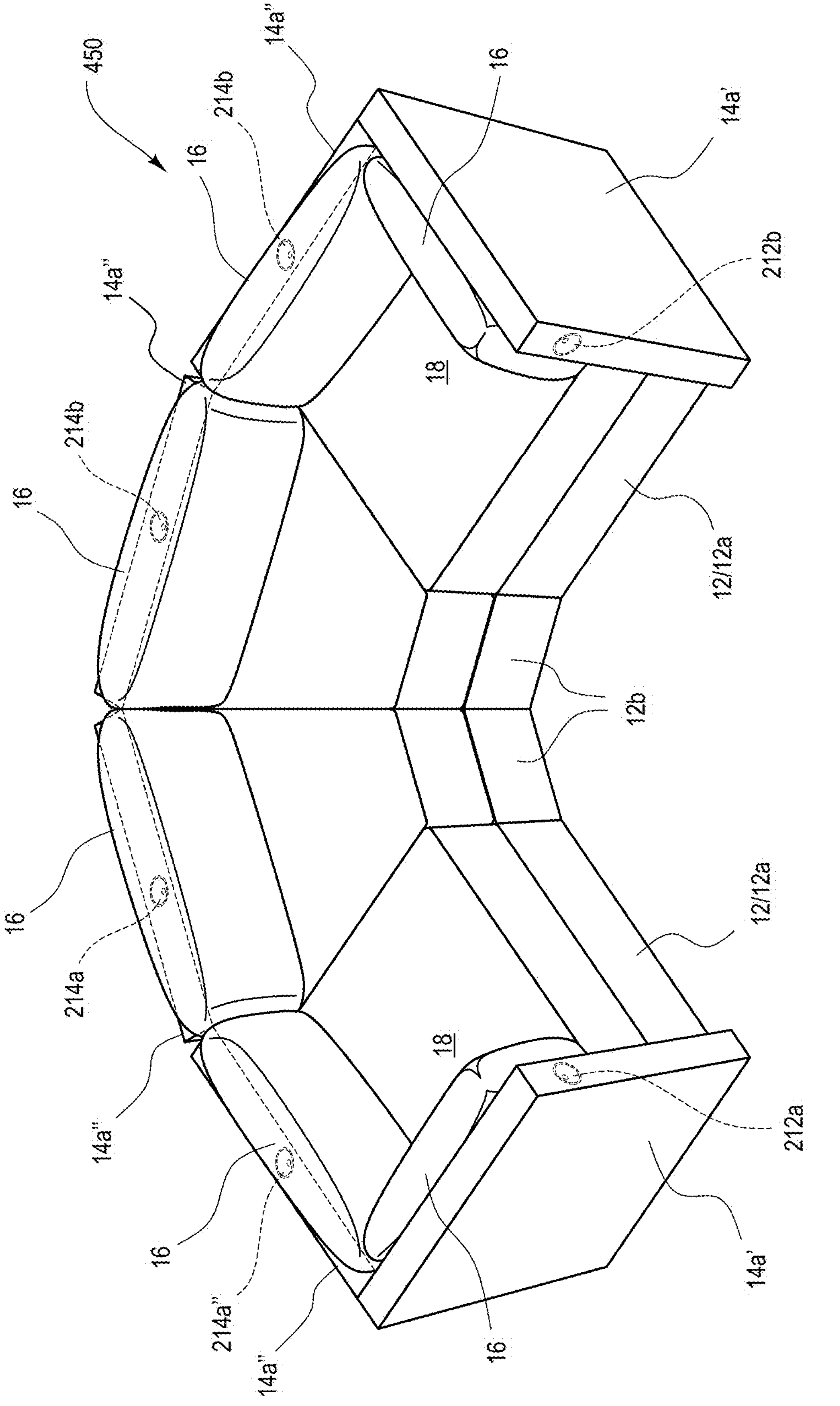
Figure 13D:
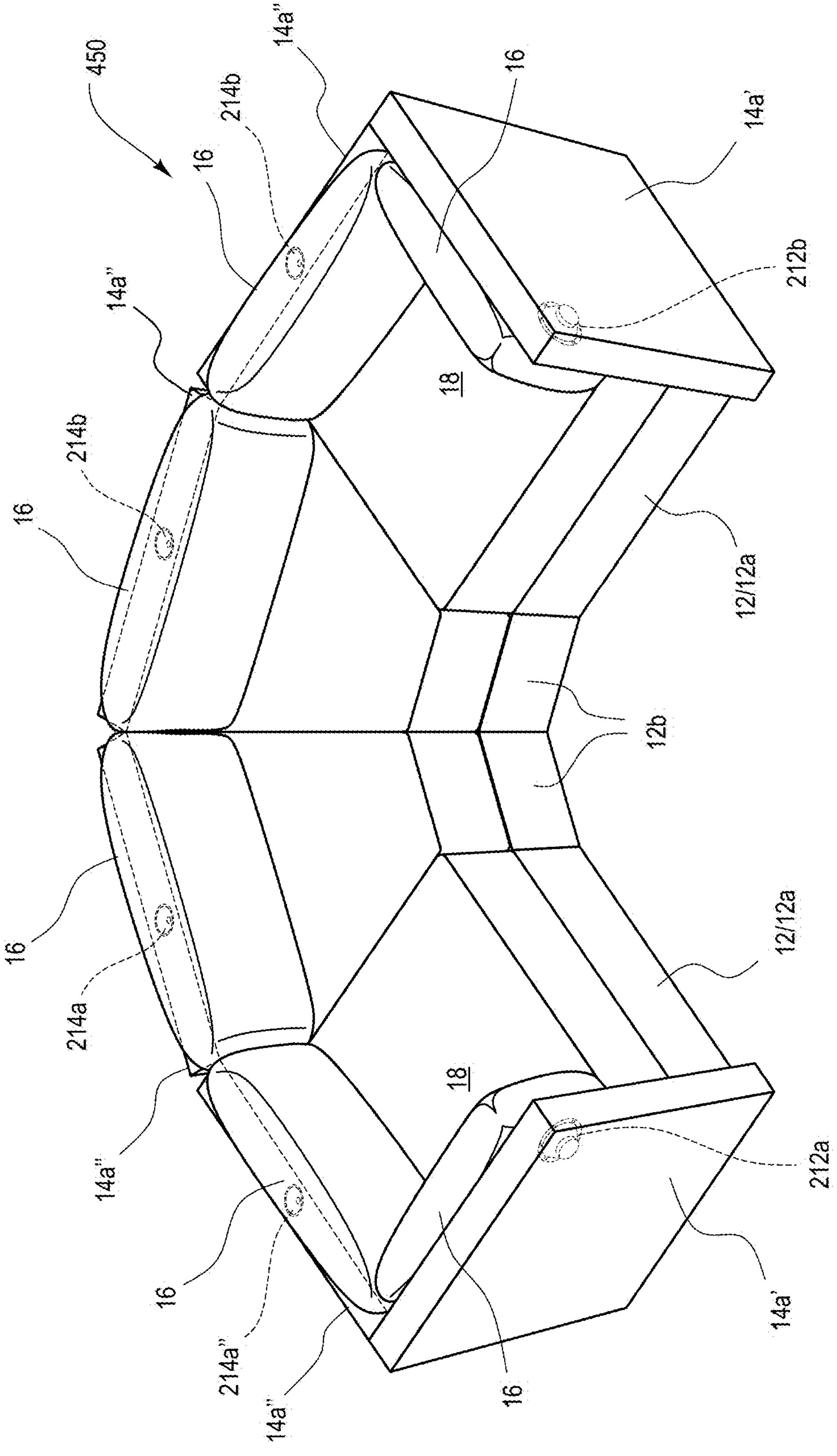

FIG. 13D illustrates how the same 4 audio-enhanced transverse members can be used in a different arrangement 450 of the assemble-able modular furniture components, along with bases 12, 12*a* (audio-enhanced or not), with one or more wedge-shaped bases 12*b* (which could also be audio-enhanced or not). Such wedge-shaped bases are described in further detail in U.S. application Ser. No. 15/276,524 filed Sep. 26, 2016, titled MODULAR FURNITURE ASSEMBLY CORNER SEATING SYSTEM, herein incorporated by reference in its entirety. As shown in FIG. 13D, more than the 4 basic audio-enhanced transverse members could be used. FIG. 13D shows inclusion of two right surround speaker enabled transverse members, and two left surround speaker enable transverse members. It will be appreciated that two (or one) of transverse members 14*a*" could be replaced with standard non-audio-enhanced transverse members (e.g., replace the middle two or outside two with standard transverse members 14).

FIGS. 13I-13L show additional possible assemblies 410, 420, 430, and 440 using the same basic 4 audio-enhanced transverse members (one with a front right speaker 212*a*, one with a front left speaker 212*b*, one with a right surround speaker 214*a*, and one with a left surround speaker 214*b*). It will be apparent that a user can thus purchase the 4 basic audio-enhanced transverse members (and optionally any audio-enhanced bases or bases), and reconfigure them, in combination with standard bases and/or transverse members, in various desired furniture configurations. Similar benefits of reconfigurability are possible when providing two audio-enhanced transverse members, as shown in FIGS. 14A-15K, where the surround speaker is mounted in the same audio-enhanced transverse member as the corresponding front speaker (e.g., left or right). In any case, this allows the user enormous flexibility in reconfiguring their seating furniture system, while providing right front, left front, and surround speakers incorporated within the furniture system. This allows the user to move the location of one or more of the speakers relative to another of the speakers, or relative to any of the bases. Such modularity of the furniture system, incorporating audio-enhanced transverse members and/or bases is very advantageous for such reasons.

Figure 13E:
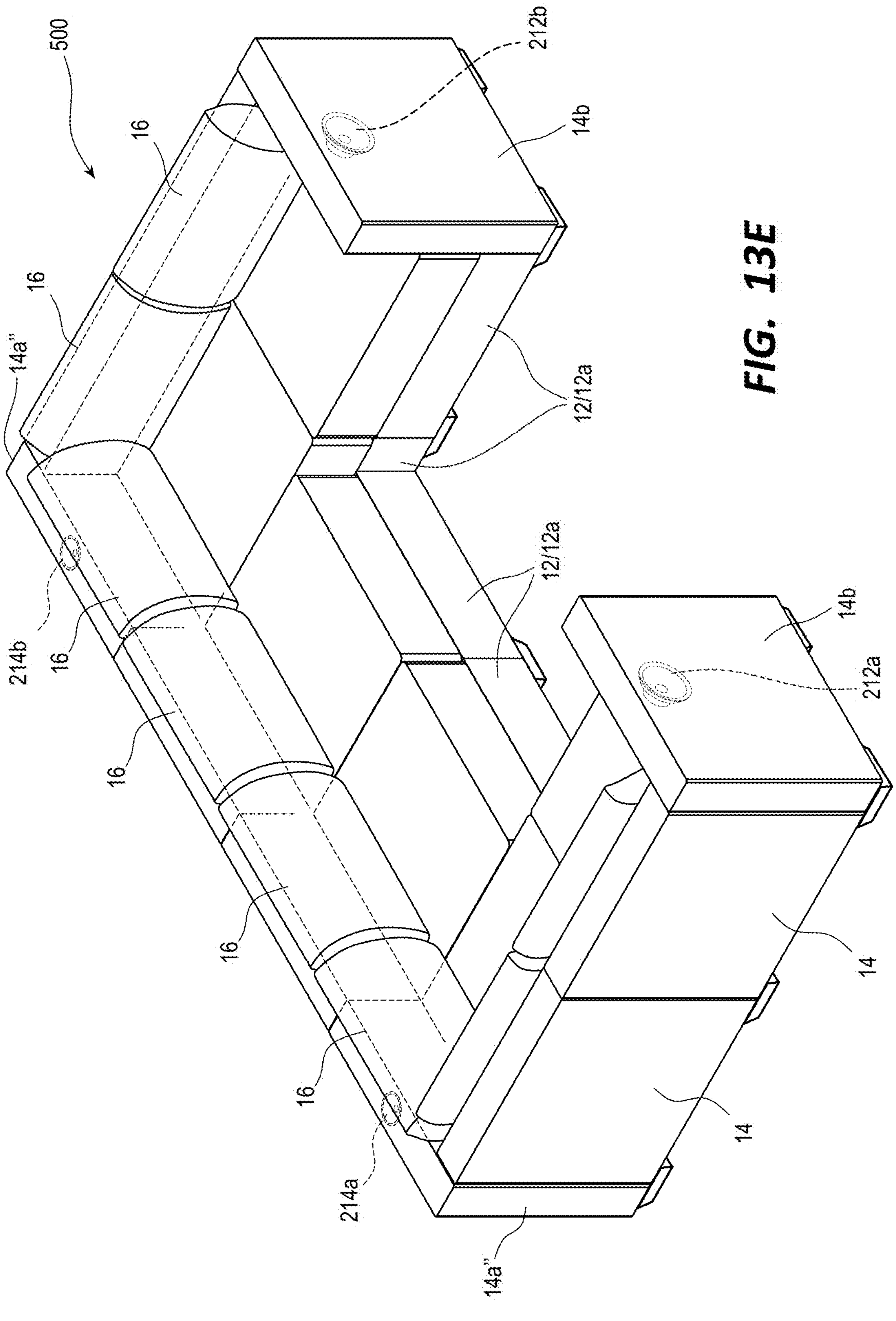

FIG. 13E shows yet another configuration 500, also including 4 basic audio-enhanced transverse members (4 of the audio-enhanced configurations shown in FIGS. 14A-15K could alternatively be used), shown with 6 bases total, and 10 transverse members total, where at least 4 of the 10 transverse members are audio-enhanced. One or more of the base members can also be audio-enhanced (e.g., including a subwoofer or other speaker as described herein). In FIG. 13E, rather than positioning the front speaker 212*a* in the side (e.g., front side) of the transverse member, as in FIGS. 13C, 13D, and 13I-13L, front speaker 212*a* is shown as positioned in the face of transverse member 14*b*, similar to as shown in FIG. 10, with the speaker 212*a*, 212*b* oriented facing the opposite direction in which coupling cavity 26 opens (i.e., the speaker and coupling cavity are in the opposite of the two major planar faces of transverse member 14*b*). In this configuration, the front right and left speakers 212*a*, 212*b* are oriented so as to fire frontally, out away from the furniture assembly, where the sound emitted from the front speakers 212*a*, 212*b* would be reflected back to users seated on the assembly 500, off a front wall, TV or the like.

Figure 13F:
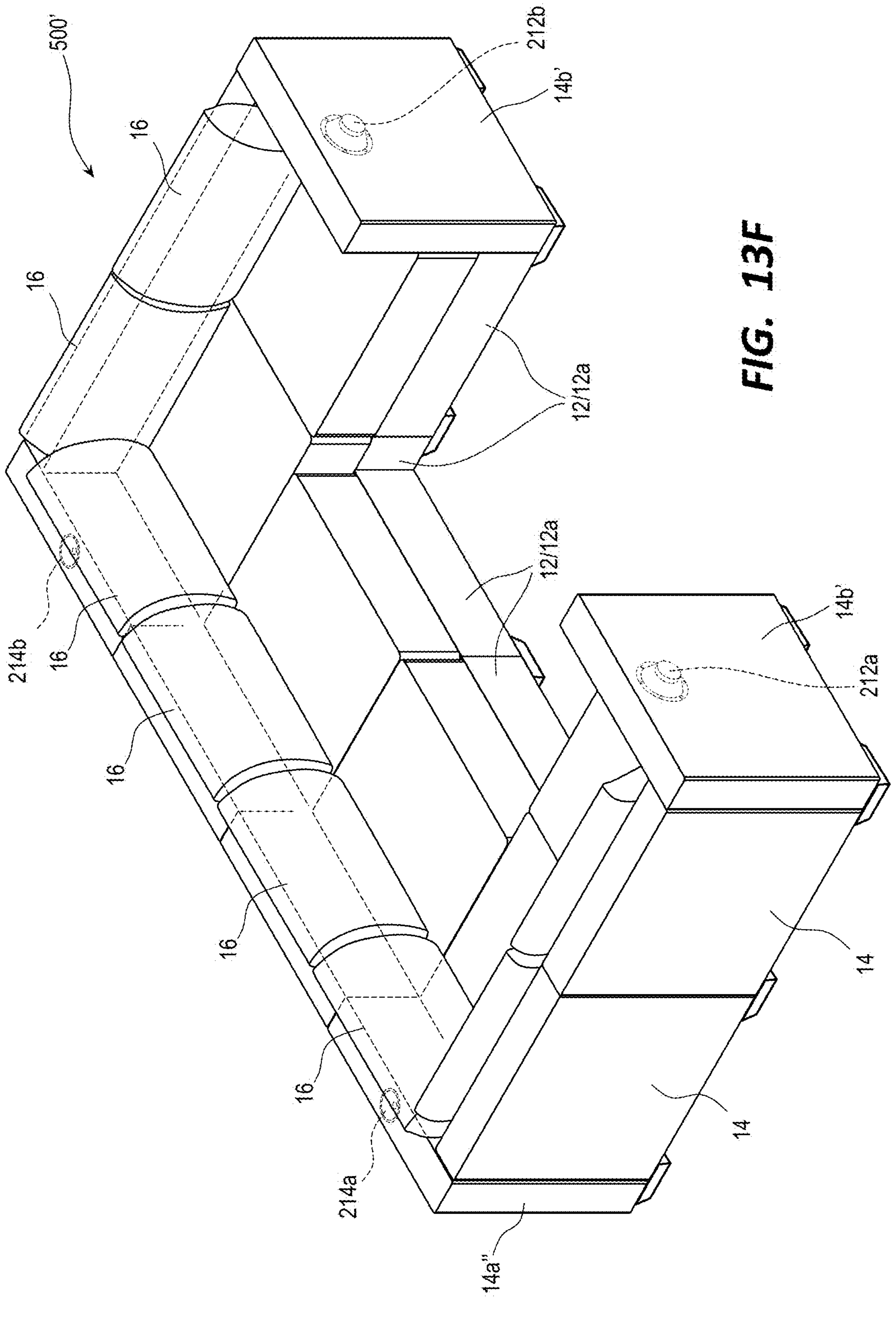

FIG. 13F shows a configuration 500', similar to FIG. 13E, but shows the front right and left speakers 212*a*, 212*b* oriented in the audio-enhanced transverse member 14*b*' similar to the orientations shown in FIG. 6, where the front right and left speakers 212*a*, 212*b* are oriented so as to fire directly towards users seated on the assembly 500'. It will be apparent that numerous configurations are possible.

Figure 13G:
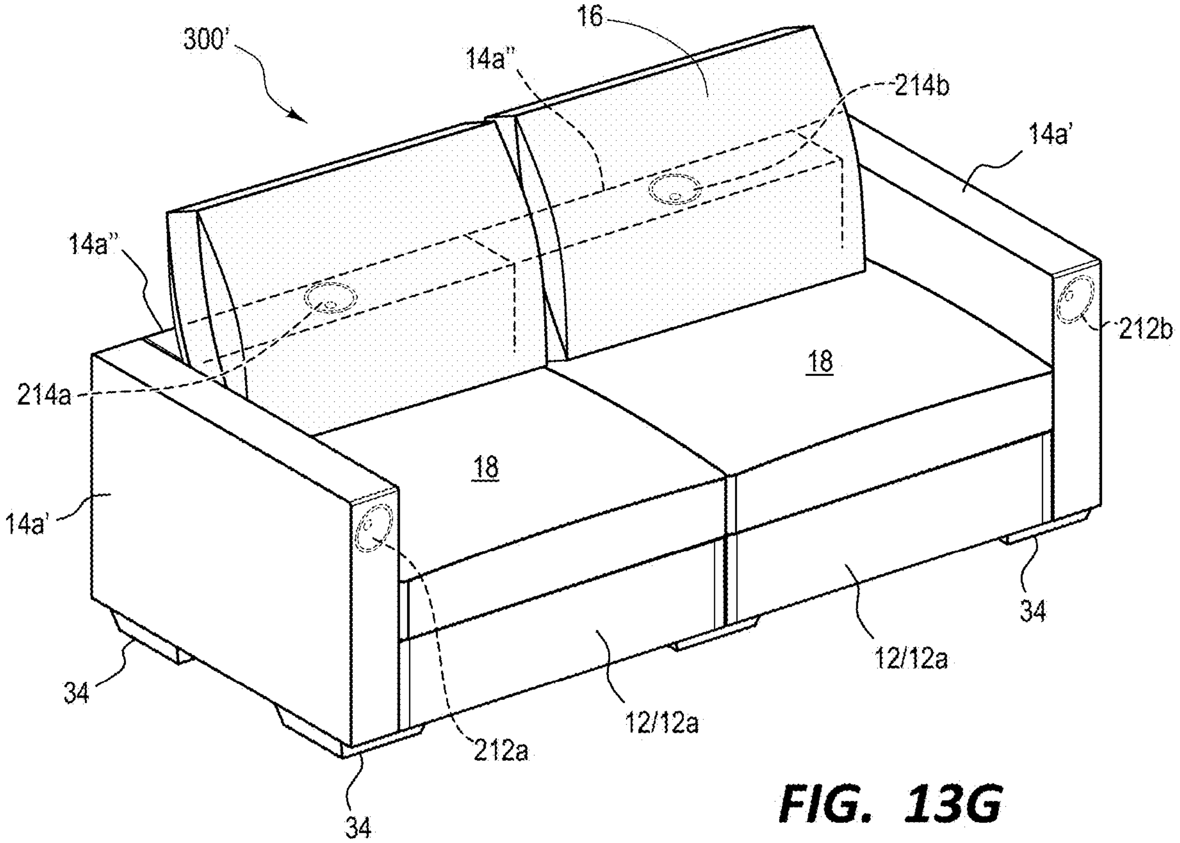
Figure 14A:
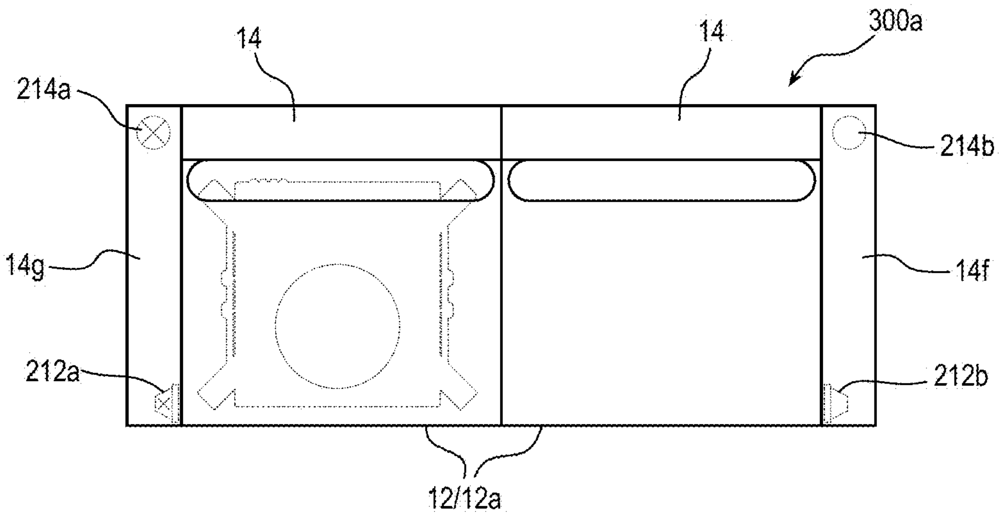
FIGS. 14A-14C illustrate additional modular furniture assembly configurations, where audio speakers are embedded in two audio-enhanced transverse members, each including a left or right front speaker and a corresponding surround speaker, which configurations allow a user to reconfigure the modular furniture assembly (e.g., into any of the configurations of FIGS. 13C-13L, or otherwise), positioning the speakers in different locations relative to another of the speakers, and/or relative to the base(s) of the assembly, as the components are rearranged, and/or more bases and/or transverse members (e.g., audio-enhanced or not) are added.
Figure 15A:
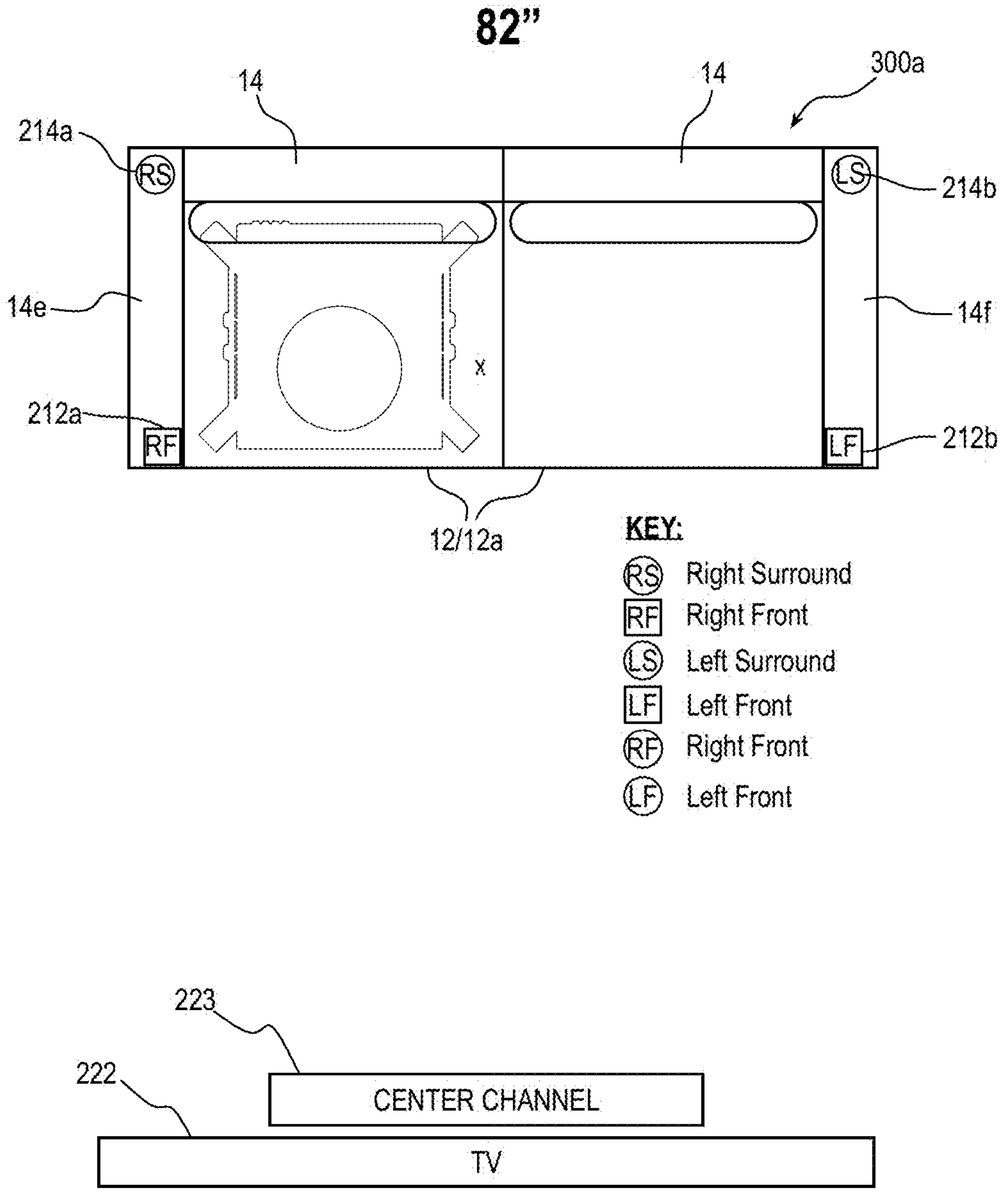
FIGS. 15A-15E shows another version of the modular furniture assemblies of FIGS. 14A-14E, with text descriptions for certain elements identified therein.
Figure 15B:
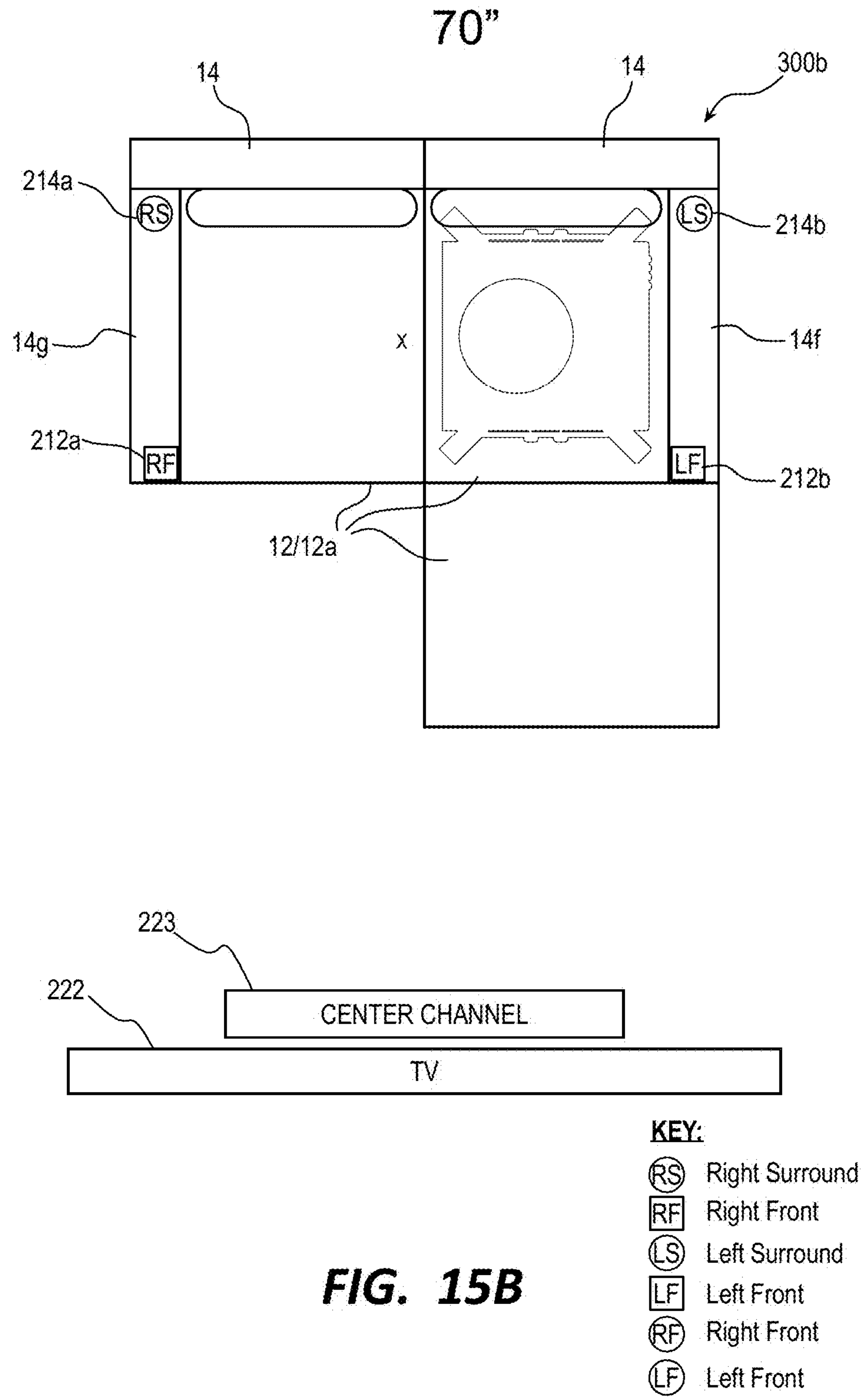
Figure 15C:
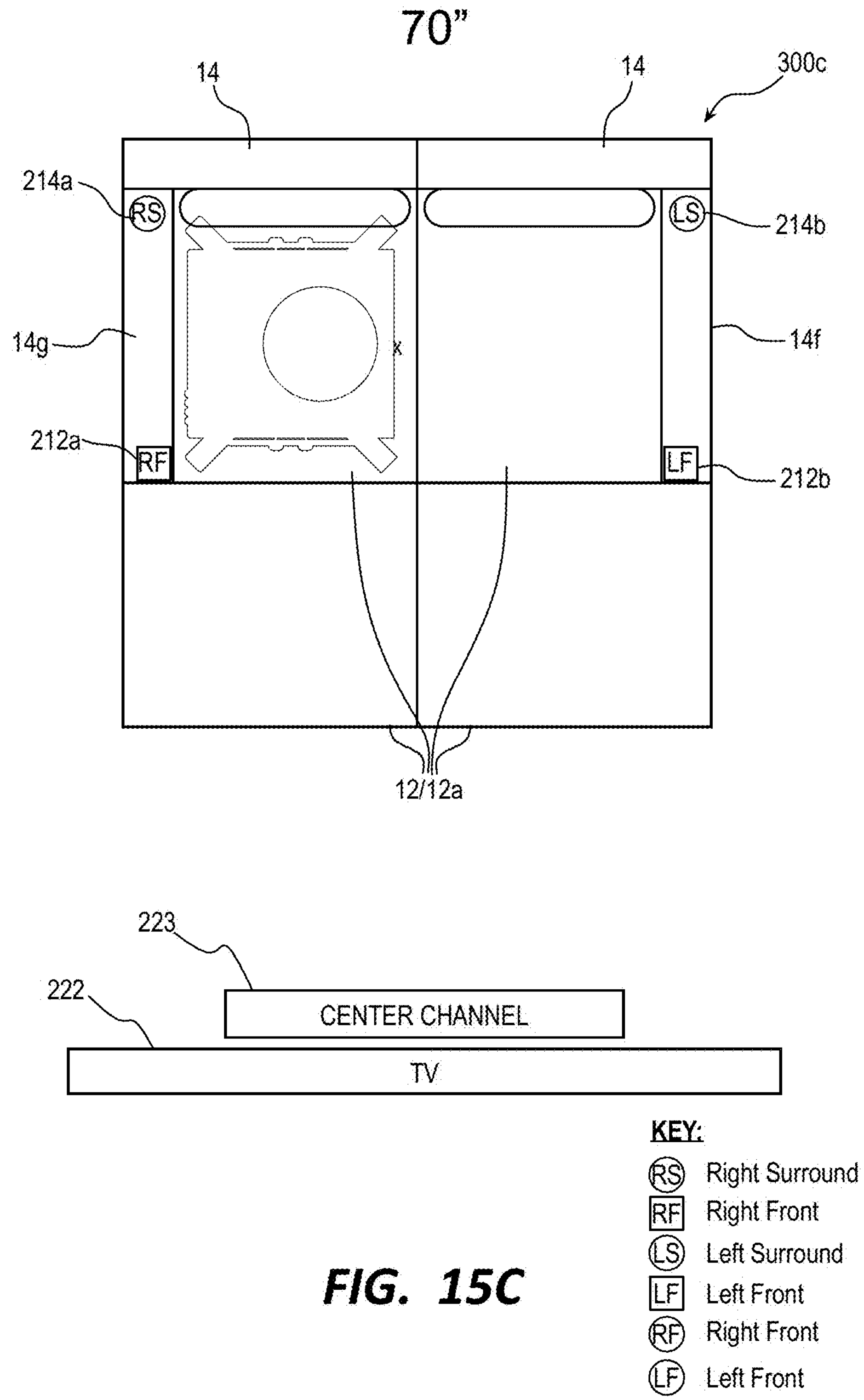
Figure 15D:
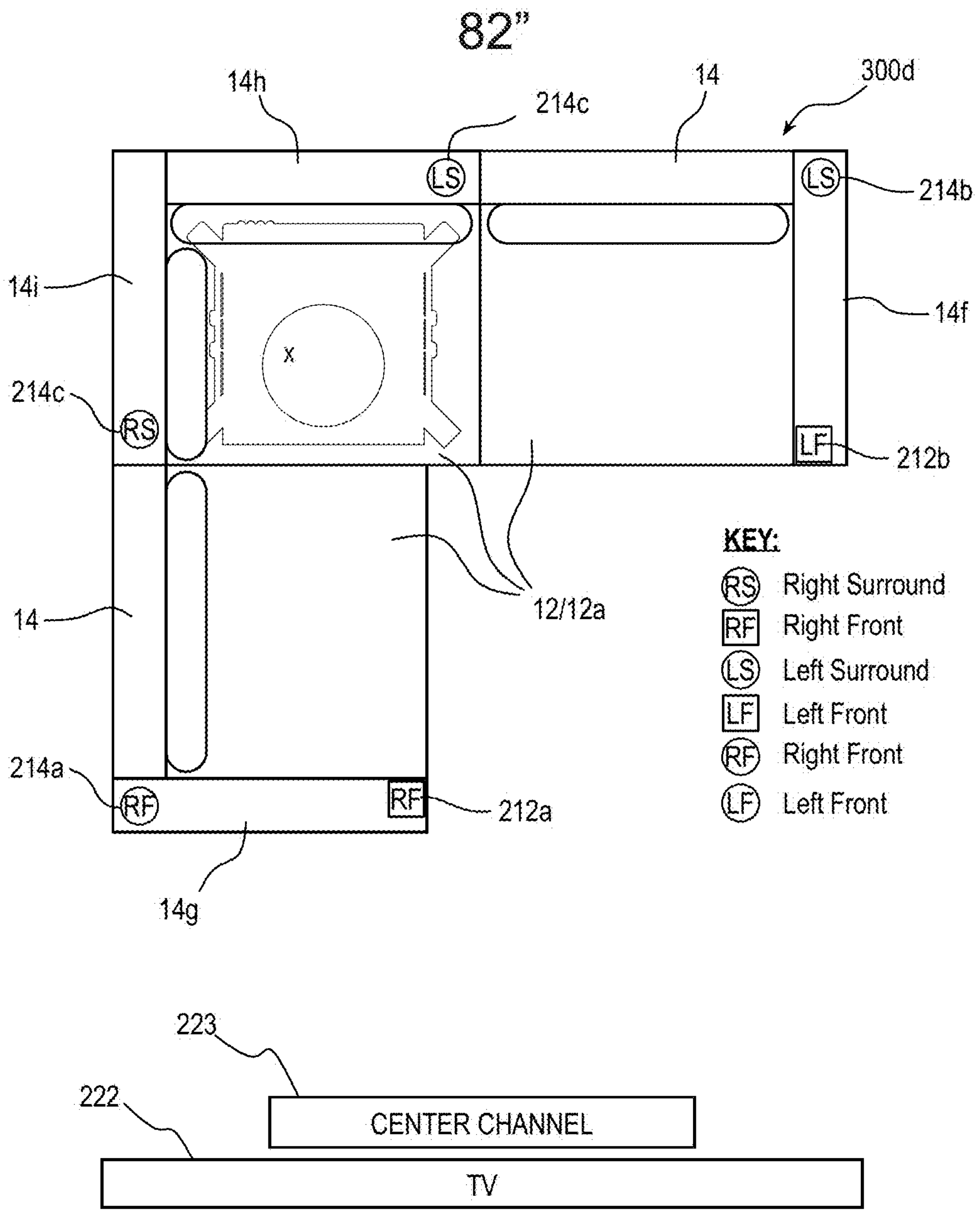
Figure 15E:
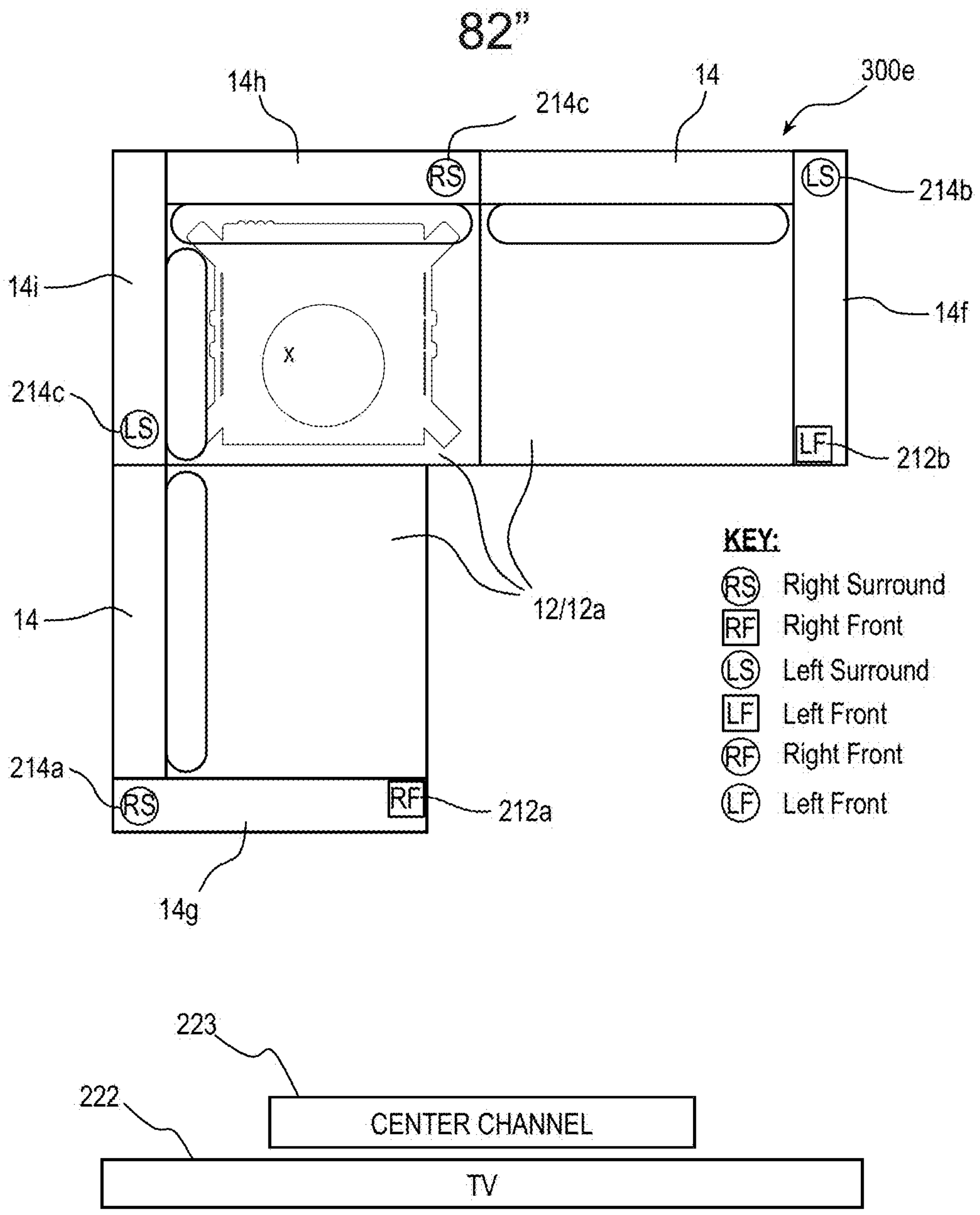
Figure 15F:
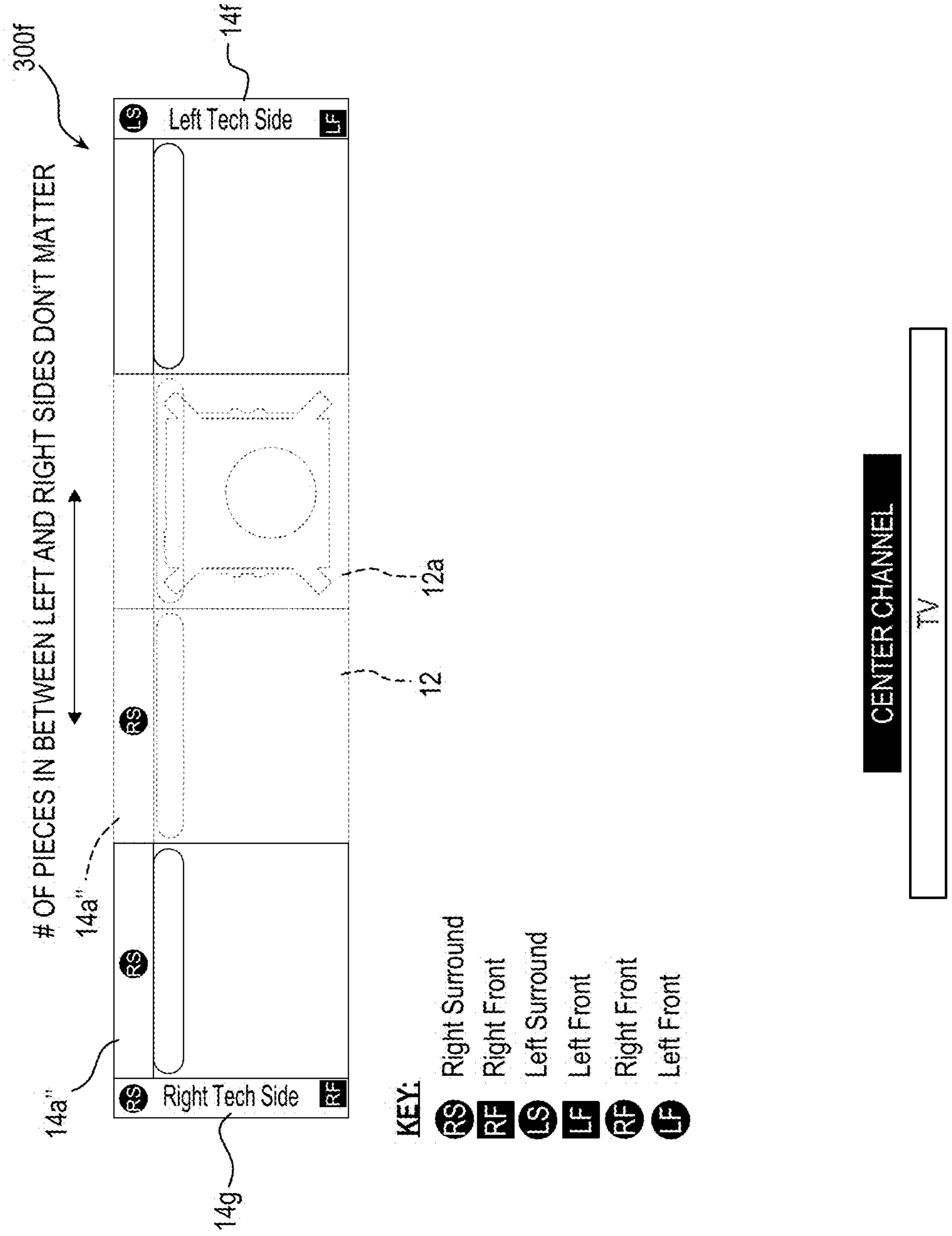
FIGS. 15F-15K illustrates additional modular furniture assembly configurations uses various audio-enhanced transverse members.
Figure 15G:
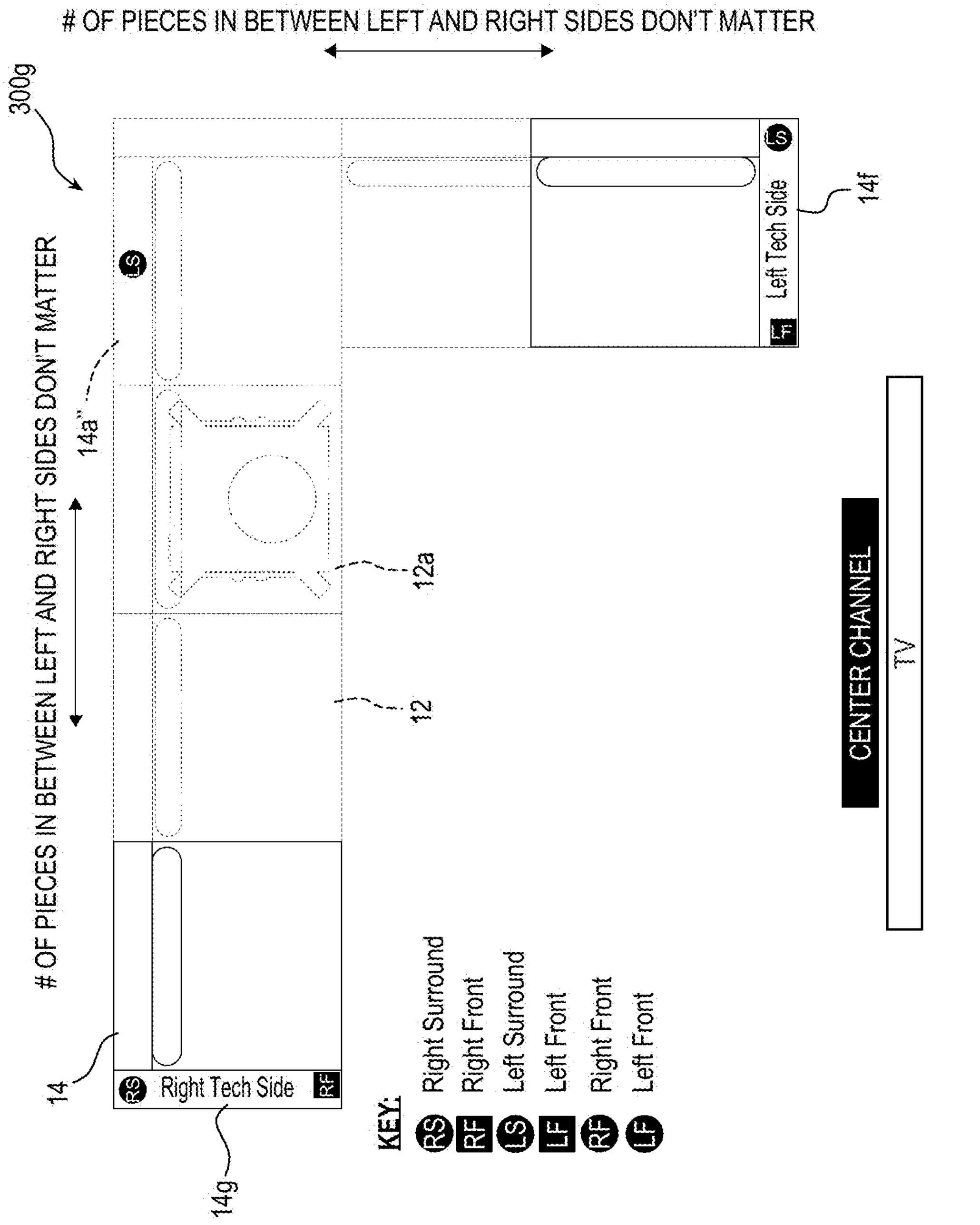
Figure 15H:
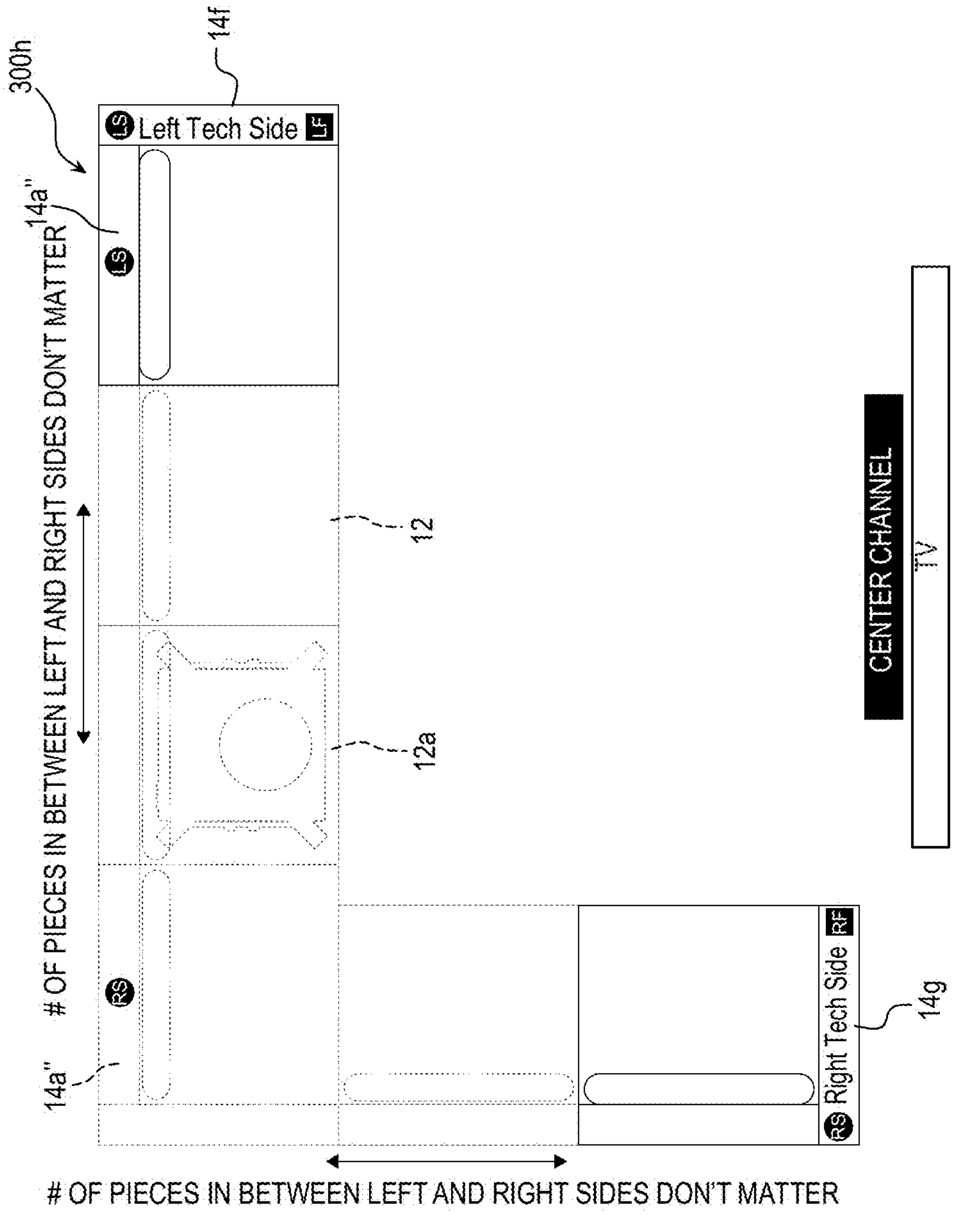
Figure 15I:
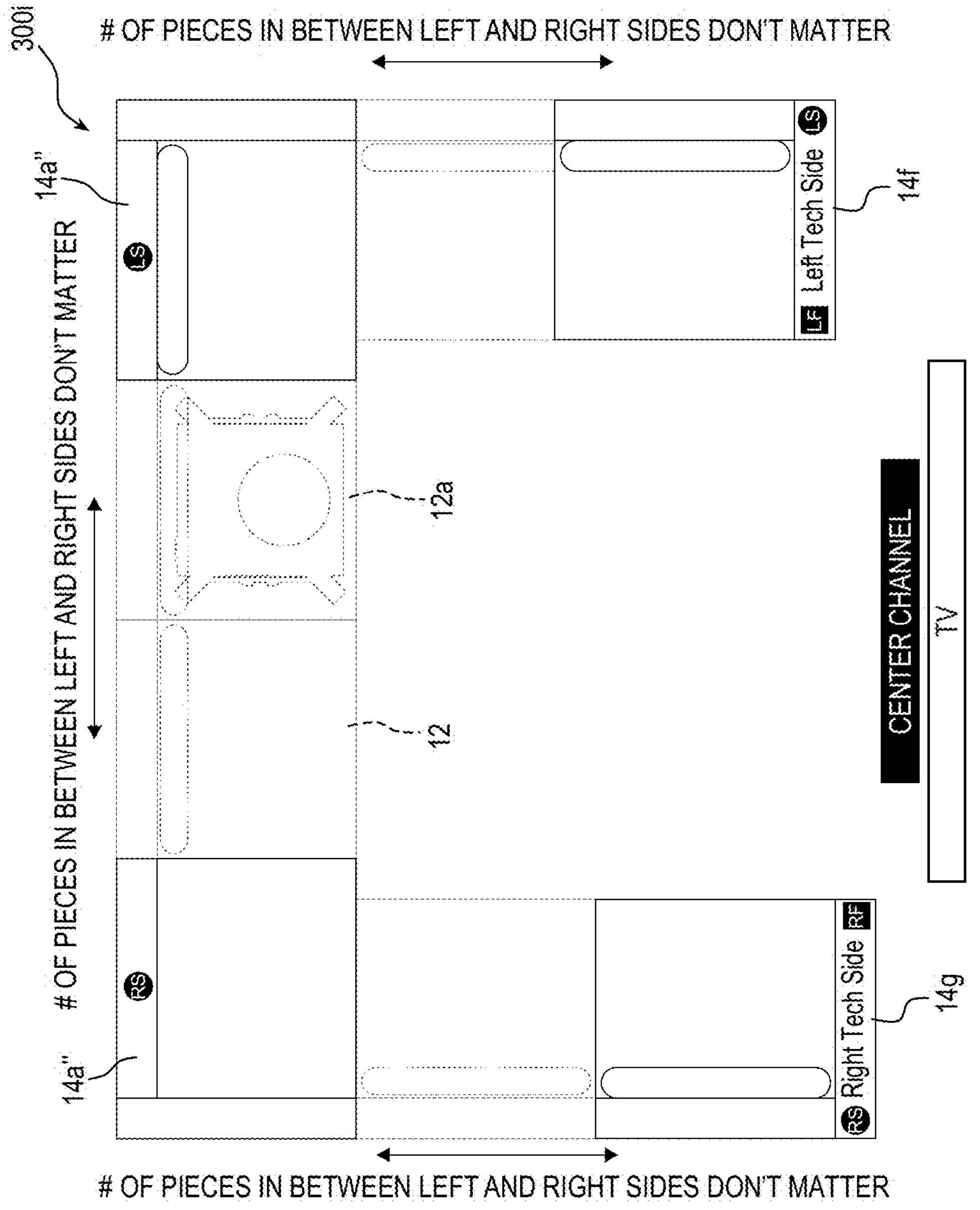
Figure 15J:
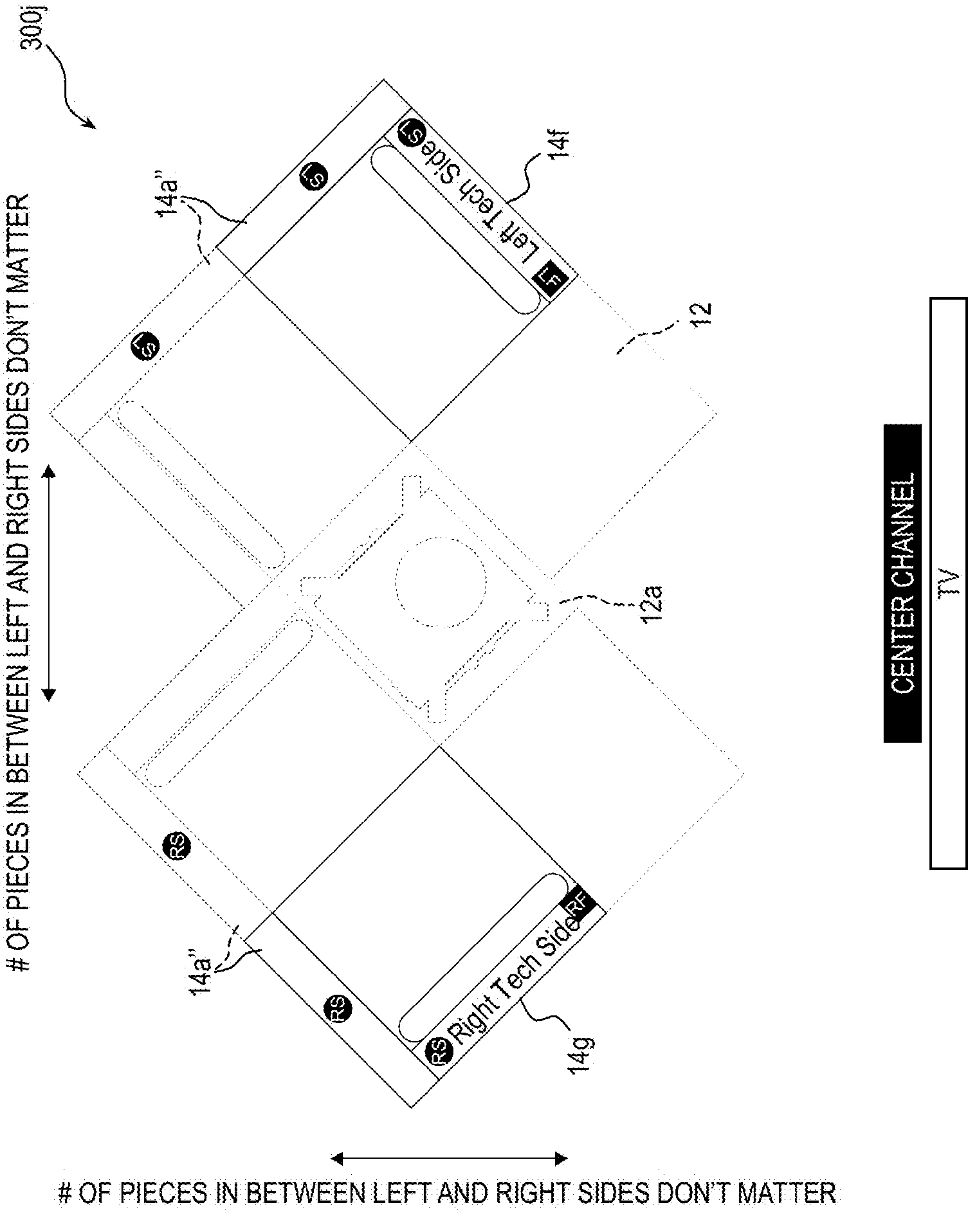
Figure 15K:
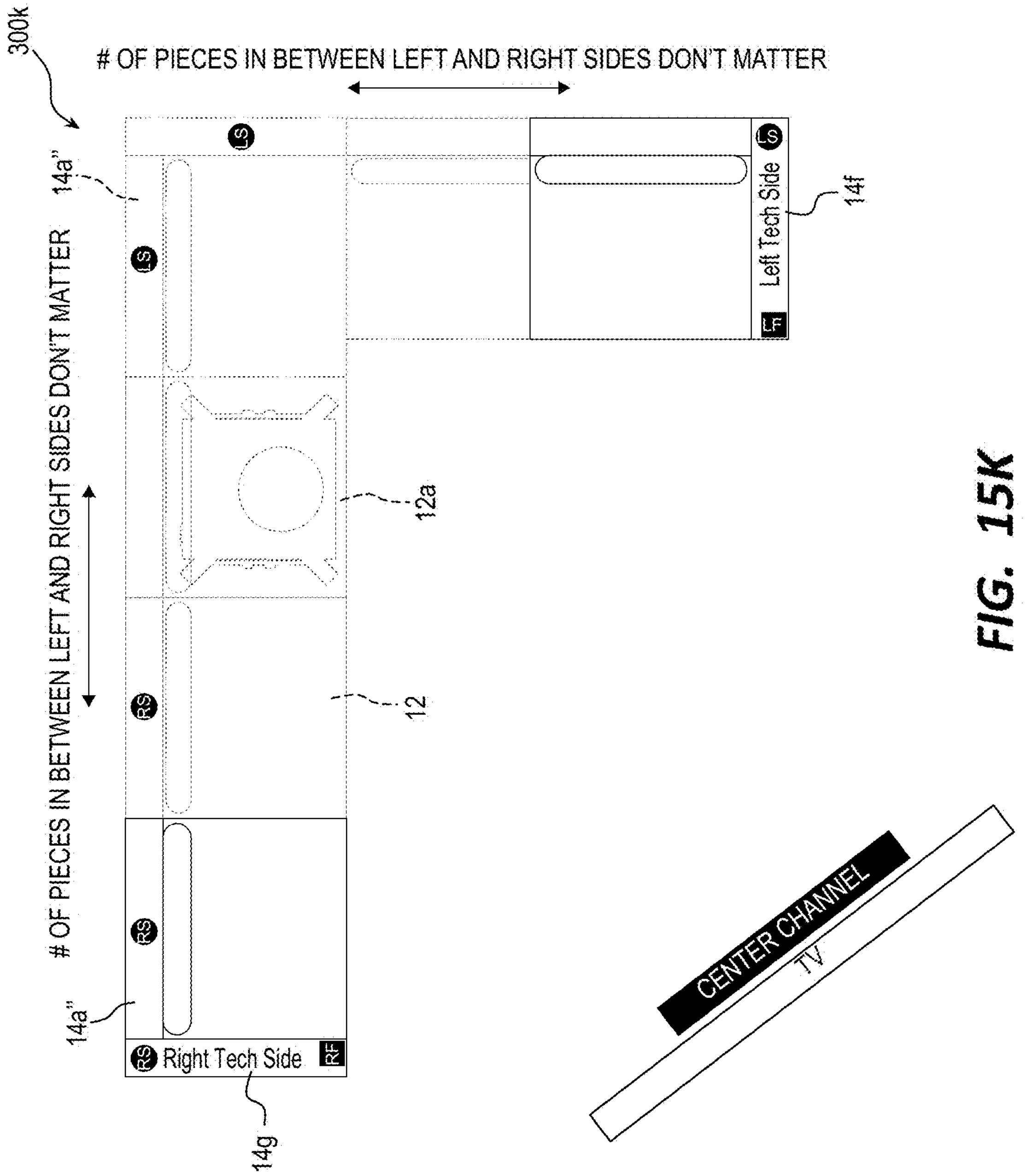

FIG. 13G shows another configuration 300' (similar to assembly 300 of FIG. 13A) that can be formed by a user, using the four basic audio-enhanced transverse members employed in FIGS. 13C-13D. This arrangement can be formed by simply removing the two center bases and transverse members from the assembly shown in FIG. 13C. FIGS. 14A and 15A illustrate a similar configuration 300*a*, but which only uses two audio-enhanced transverse members.

Figure 13H:
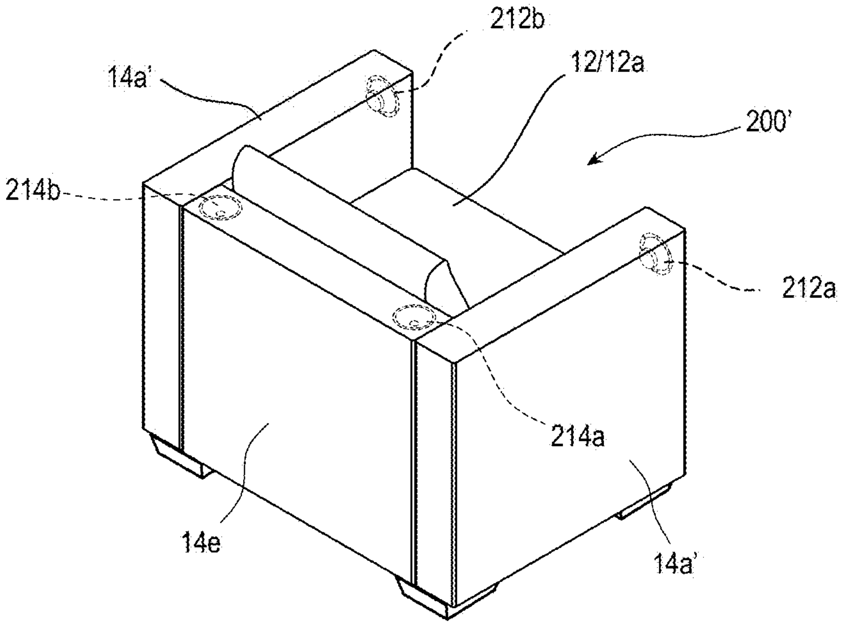
Figure 13G:
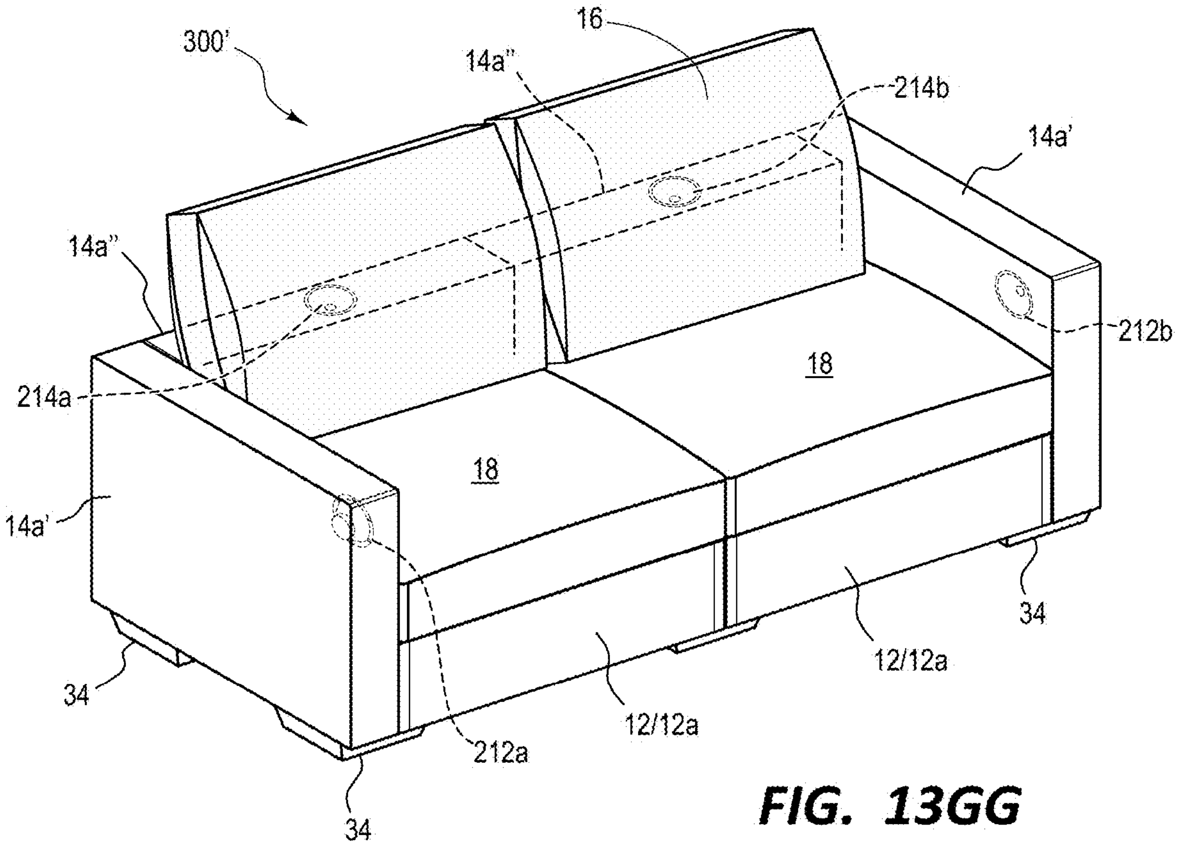
Figure 13H:
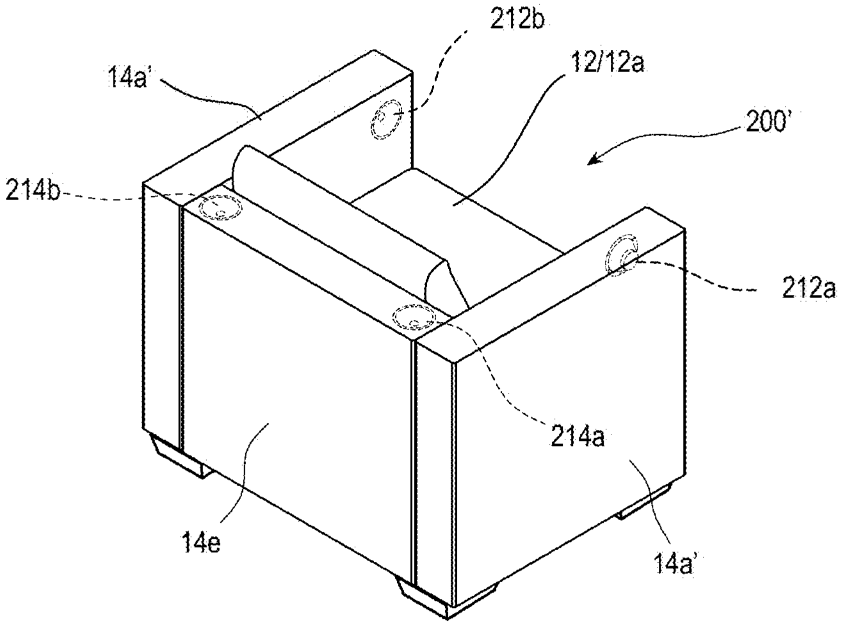
Figure 13I:
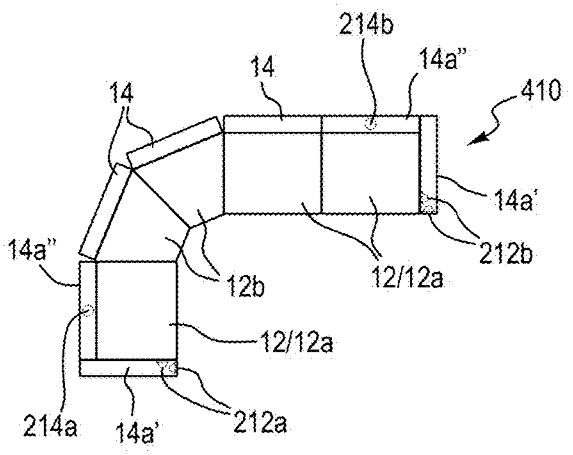
Figure 13J:
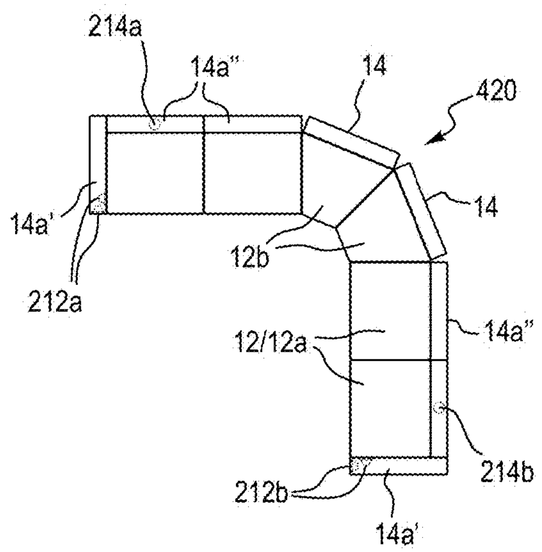
Figure 13K:
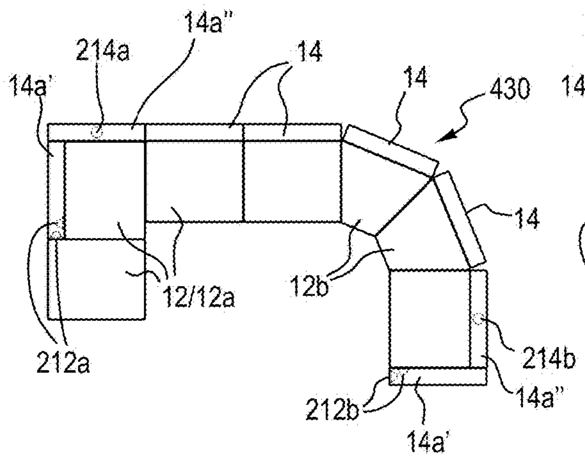
Figure 13L:
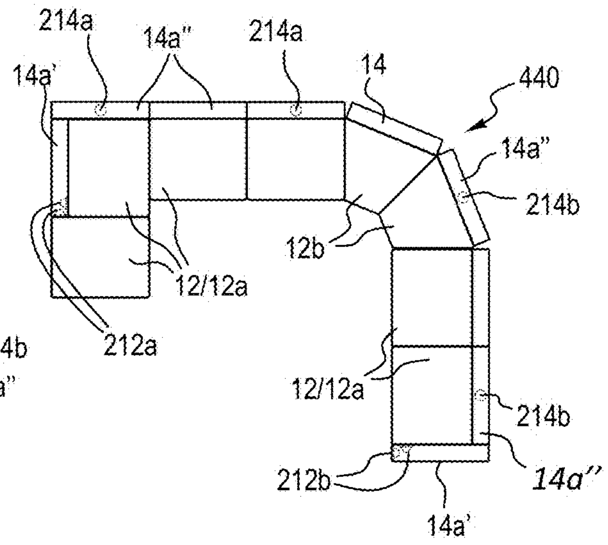

FIG. 13H shows yet another configuration 200', similar to assembly 200 of FIG. 1A, but in which both surround speakers are provided in a single audio-enhanced transverse member 14*e* serving as the backrest.

FIGS. 13CC, 13DD, 13GG, and 13HH are each similar to FIGS. 13C, 13D, 13G, and 13H, respectively, but in which the front speakers have been oriented as shown in FIG. 13F, oriented so as to fire directly towards users seated on the furniture assembly, rather than relying on reflection of sound off a front wall, TV or the like, positioned in front of the assembly. It will be apparent that in such configurations, the front speaker in the transverse member is in the same face of the generally rectangular transverse member as the cavity 26 (e.g., see FIG. 6 or 12), which cavity can be used to couple the given transverse member to the seating base 12 it is coupled to. While each of these configurations is shown with the surround speakers provided in their own separate, dedicated audio-enhanced transverse members, it will be appreciated that other configurations based on the audio-enhanced transverse members shown in FIGS. 14A-15E are also possible, where the left front and left surround speakers are both provided in a first audio-enhanced transverse member, and the right front and right surround speakers are provided in a second audio-enhanced transverse member. If desired, additional stand-alone (e.g., surround) audio-enhanced transverse members (e.g., An "A" type and a "B" type), off-centered as shown in FIGS. 14D-14E and 15D-15E) could also be provided. Also, while 4 audio-enhanced transverse members are shown in many of the configurations, it will be appreciated that a user does not have to employ all 4 such audio-enhanced transverse members. For example, only 3, or only 2 of such audio-enhanced transverse members could be used. Such applies to any of the configurations described herein.

Figure 14B:
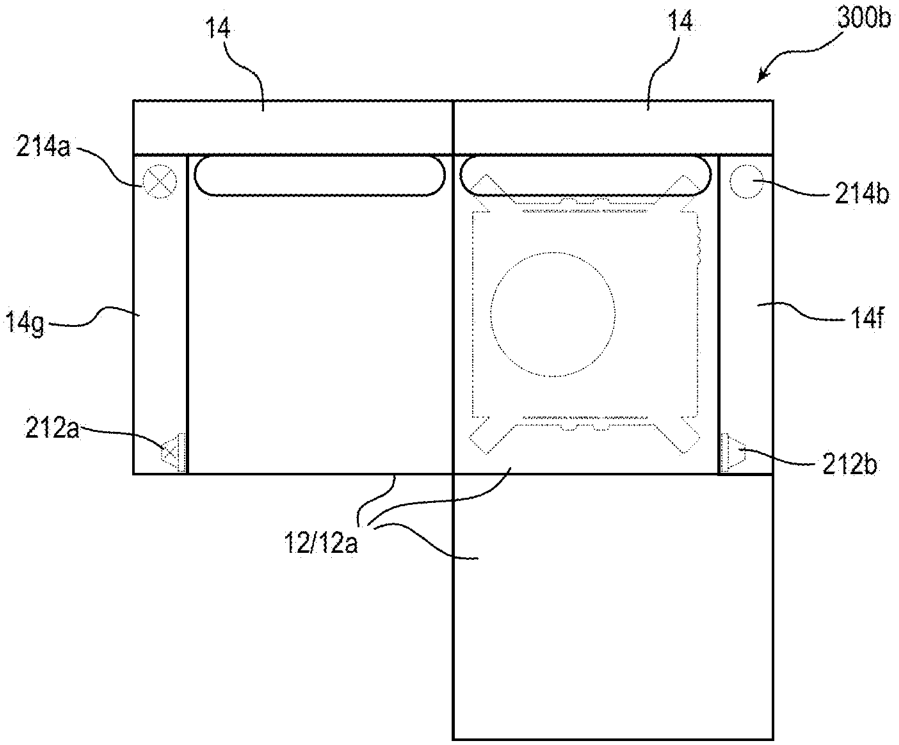
Figure 14C:
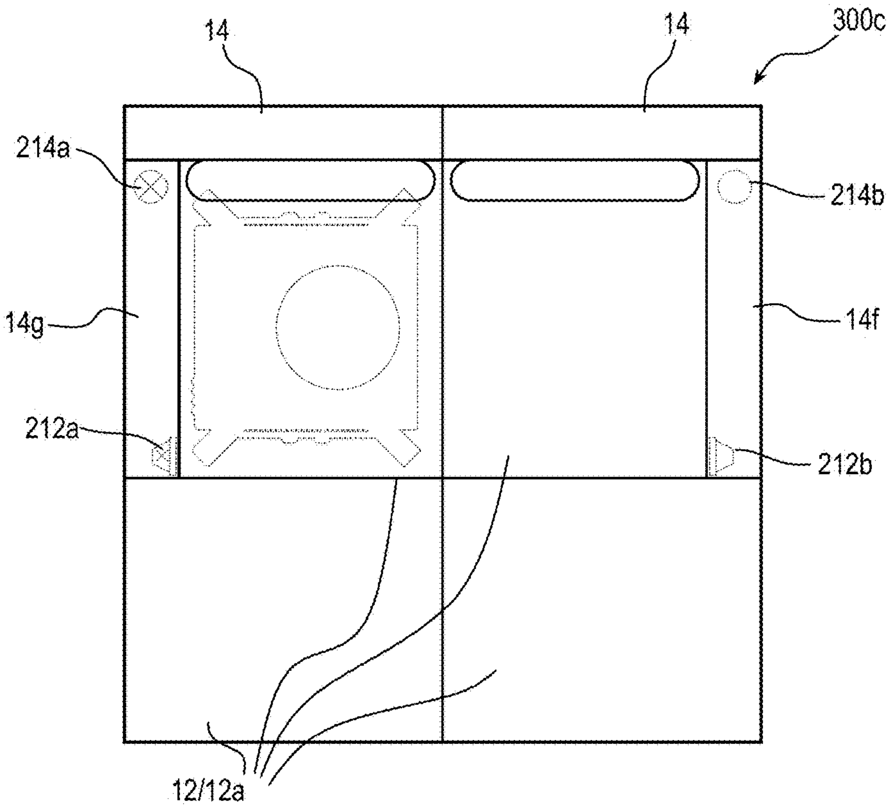

FIGS. 14A-14C illustrate additional furniture assembly configurations 300*a*-300*c*, each of which use the same two audio-enhanced transverse members 14*f* and 14*g*. First audio-enhanced transverse member 14*f* includes the left front speaker 212*b* and the left surround speaker 214*b*. Left surround speaker 214*b* is upwardly oriented, mounted in the top side of the transverse member, firing towards the ceiling. Left front speaker 212*b* is illustrated inwardly oriented, firing towards the seating position(s), mounted in the same face of generally rectangular transverse member 14*f* as the coupling cavity 26, which allows coupling of the transverse member 14*f* to any of the bases. For example, speaker 212*b* can be in the upper right corner of the interior face of the generally rectangular transverse member (as viewed from the base to which it is coupled), e.g., as shown in FIG. 13GG.

The second audio-enhanced transverse member 14*g* includes the right front speaker 212*a* and the right surround speaker 214*a*. Right surround speaker 214*a* is upwardly oriented, mounted in the top side of the transverse member, firing towards the ceiling. Right front speaker 212*a* is illustrated inwardly oriented, firing towards the seating position(s), mounted in the same face of generally rectangular transverse member 14*g* as the coupling cavity 26, which allows coupling of the transverse member 14*g* to any of the bases. For example, speaker 212*a* can be in the upper left corner of the interior face of the generally rectangular transverse member (as viewed from the base to which it is coupled). Transverse members 14, with the same shape and footprint as the audio-enhanced transverse members (just without such embedded audio components) can provide the backrest portions of the assembly 300*a*, as shown. As further shown in FIG. 15A, a TV or other display 222 can be positioned in front of the seating positions provided by the assembly 300*a*, with a center channel speaker 223 (e.g., a sound bar) provided either below or above such display (or behind in the case of a perforated screen), and optionally mounted to a vertical surface, such as a wall or other surface.

FIG. 14B illustrates another furniture assembly 300*b*, using the same components as in assembly 300*a* of FIG. 14A, but arranged to provide a deeper seat, with overall reduced length of the furniture assembly, with an additional base 12/12*a* placed in front of one of the two bases of assembly 300*a*, to provide a loveseat with chaise arrangement. FIG. 14C illustrates a similar assembly 300*c*, with the addition of another base 12/12*a* in front, forming a movie lounger configuration. Any of the more complex and larger configurations seen in FIGS. 13C-13L could similarly be formed by starting from the components seen in FIGS. 14A-14C, e.g., by adding additional bases and/or transverse members. Where additional surround audio-enhanced transverse members are desired in such very large assemblies, the audio-enhanced transverse members 14*h* and 14*i* shown in FIGS. 14D-14E or 15D-15E could be used.

Figure 14D:
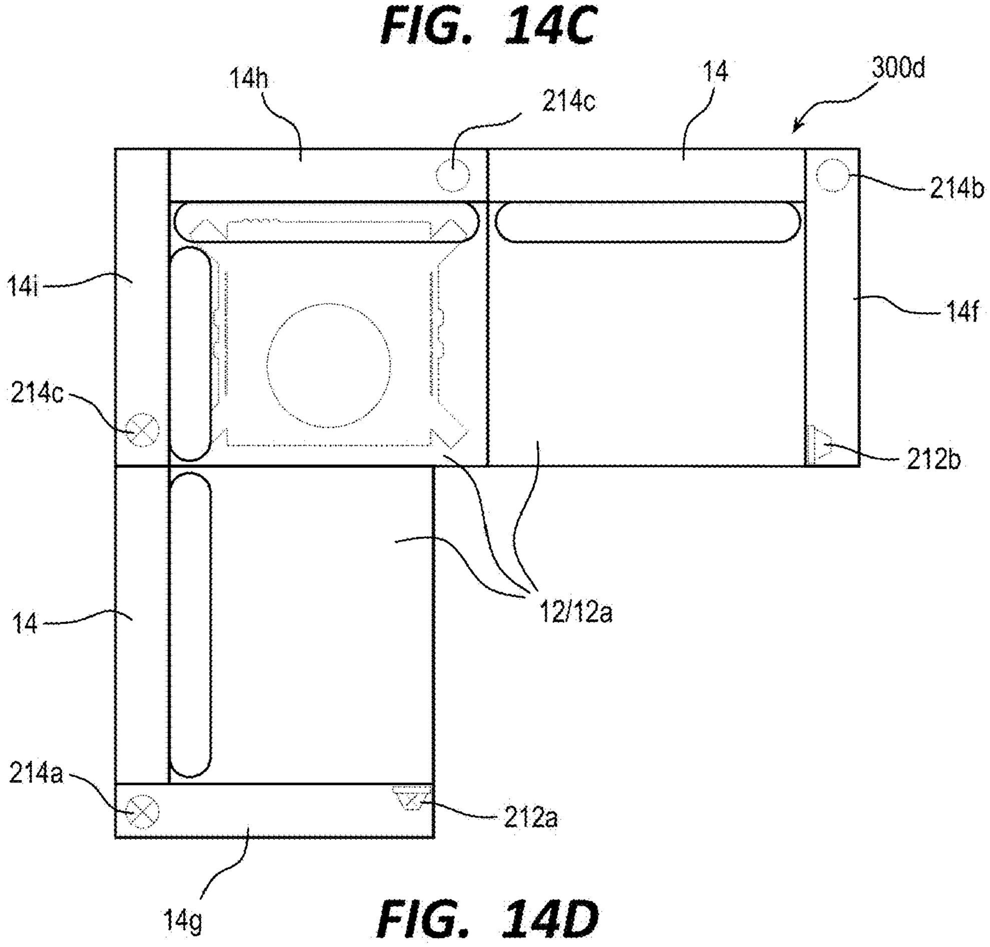
FIGS. 14D-14E illustrate additional modular furniture assembly configurations, using the same two audio-enhanced transverse members as used in the configurations of FIGS. 14A-14C, but also including two additional audio-enhanced transverse members that include only a single (e.g., surround) speaker each, further expanding the variety of configurations that can be achieved with the 4 such audio-enhanced transverse members.

FIG. 14D illustrates an assembly 300*d* including the same bases and transverse member components as used in the assemblies of FIGS. 14A-14C, with the addition of two additional audio-enhanced transverse members 14*h* and 14*i*. These transverse members are not identically configured to one another, but are of two different off-centered types, rather than having the speaker (e.g., similar to the surround speaker 214*a* or 214*b*, respectively) centered within the top face of the transverse member, which was the case with transverse members 14*a*" seen in FIGS. 13C-13L. In particular, transverse member 14*h* could be designated an "A" type surround transverse member, while transverse member 14*i* could be designated a "B" type surround transverse member, where they may be otherwise identical to one another, but for the placement of the speaker 214*c* therein. The speaker 214*c* can be identical to surround speakers 214*a* and 214*b*, e.g., providing benefits such as timbre matching, etc. In transverse member 14*h* (the "A" type), the speaker 214*c* can be positioned off-centered, to the left or right, while in transverse member 14*i* (the "B" type), the speaker 214*c* can be positioned off-centered, to the right or left (opposite the "A" type). Left and right may be as referenced from the seating position of the base coupled thereto.

The user can have the ability to change the "channel" signal that is sent to any given speaker, e.g., particularly signals sent to such "A" or "B" type transverse members, although channel swapping can also occur with any of the other speakers 214*a*, 214*b*, 212*a*, or 212*b*, as well. In the configuration shown in FIGS. 14D and 15D, e.g., the user can have used the app or other control system provided with the furniture system to send speaker 214*c* of transverse member 14*h* the same left surround channel signal as is sent to left surround speaker 214*b* of transverse member 14*f*, with the signal sent to speaker 214*c* of transverse member 14*i* being a right surround channel signal. In addition, rather than speaker 214*a* of transverse member 14*g* producing the right surround channel sound (which it may default to normally doing), it can now be producing the same right front channel sound that is being produced by right front speaker 212*a*. The ability to uncouple the transverse members, and recouple them to the one or more bases in any of a wide variety of arrangements, where at least some of the transverse members are audio-enhanced as described herein, in combination with an app or other control interface provided to the user having abilities as described herein, allows the user to achieve a wide variety of furniture configurations with the ability to customize the sound configuration provided within such furniture assembly.

Figure 14E:
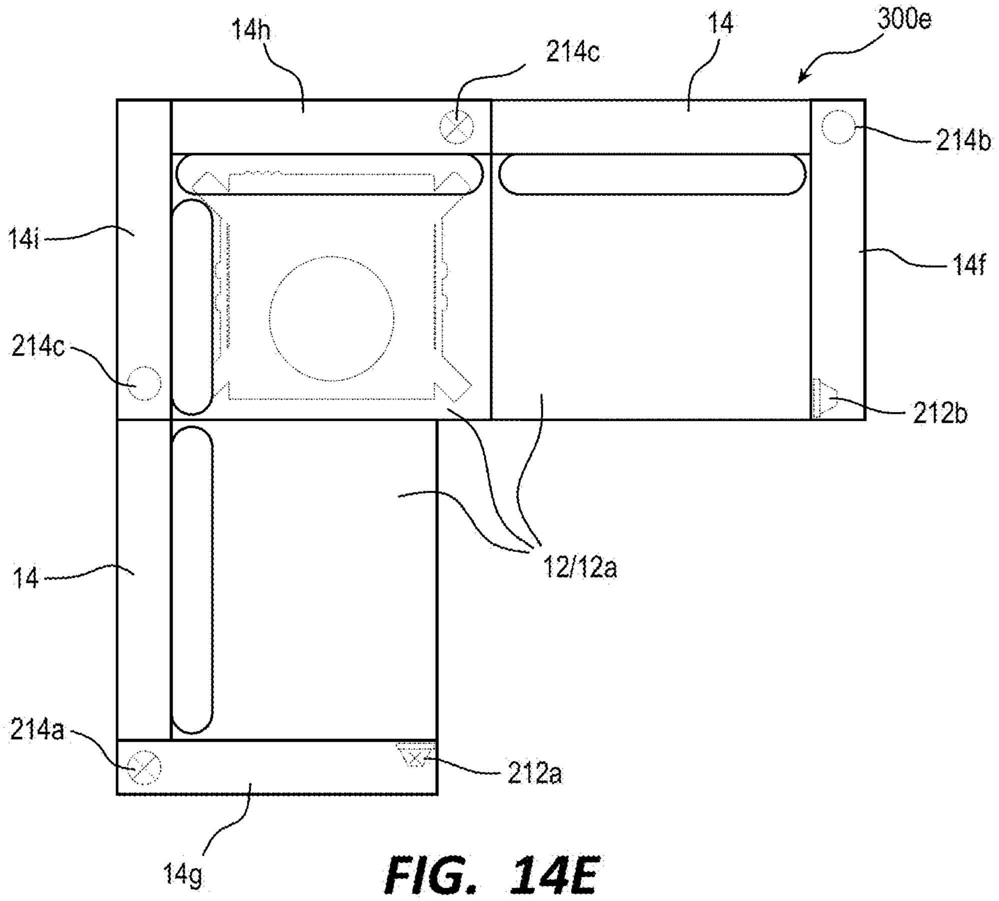

FIG. 14E includes the same physical set-up of the same components as in FIG. 14D, but in which the app or other control interface has been used to alter the channel signal being sent to some of the speakers included in the assembly 300*e*. For example, in this configuration, speaker 212*b* is being fed and is producing the left front channel, speaker 214*b* is being fed and is producing the left surround channel, speaker 212*a* is being fed and is producing the right front channel, while speaker 214*a* is being fed and producing the right surround channel. Speaker 214*c* of transverse member 14*h* is being fed and producing the right surround channel, and speaker 214*c* of transverse member 14*i* is being fed and producing the left surround channel. In another embodiment, the results could be similar, but speaker 214*c* of transverse member 14*i* could be fed and produce the right surround channel sound, and speaker 214*c* of transverse member 14*h* could be fed and produce the left surround channel sound. It will be appreciated that such control over where specific channel signals are being sent for sound production provides the user of such a modular furniture assembly with an incredible variety of customizable possibilities, e.g., to allow the user to tailor the sound desired relative to a specific seating position, or several seating positions as a whole, e.g., room balanced versus seat balanced. From such a control interface, the user may select whatever channel they desire to be sent to each speaker, independent of channel selection made at any other speaker location.

FIGS. 15F-15K illustrated various other assemblies 300*f*-300*k* each of which use the same two audio-enhanced transverse members 14*f* and 14*g*, while optionally including the audio-enhanced transverse members 14*a*" (FIG. 13C). These assemblies 300*f*-300*k* are similar to those illustrated in FIGS. 15A-15E and as such the discussion related to the configurations of FIGS. 13A-15E are also applicable to the assemblies 300*f*-300*k* of FIGS. 15F-15K. First audio-enhanced transverse member 14*f* includes the left front speaker 212*b* and the left surround speaker 214*b*. Left surround speaker 214*b* is upwardly oriented, mounted in the top side of the transverse member, firing towards the ceiling. Left front speaker 212*b* is illustrated inwardly oriented, firing towards the seating position(s), mounted in the same face of generally rectangular transverse member 14*f* as the coupling cavity 26, which allows coupling of the transverse member 14*f* to any of the bases. For example, speaker 212*b* can be in the upper right corner of the interior face of the generally rectangular transverse member (as viewed from the base to which it is coupled), e.g., as shown in FIG. 13GG. The assemblies 300*f*-300*k* schematically illustrate by the three dots that any number of bases 12, with transverse members 14, can be disposed between those bases 12 to which the audio-enhanced transverse members 14*f* and 14*g* are coupled. Further, the placement of bases 12/12*a* that are audio-enhanced (e.g., including a subwoofer or other speaker as described herein) while schematically illustrated as one possible location in relation to the audio-enhanced transverse members 14*f* and 14*g* is depicted, it will be understood by those skilled in the art that various other locations are possible.

In addition to the ability to make such adjustments within the app or other control interface, such app or control interface can also allow the user to designate what their particular furniture assembly looks like geometrically, including where the audio-enhanced transverse members (and/or audio-enhanced bases) are located in such assembly, and what covers the particular user has installed (e.g., chenille, tweed, linen, velvet, leather, polyester linen, cotton, cotton blend, polyester, denim, twill, faux fur, leather, or other, for example) through which the sound is being emitted, to automatically provide tuning of the sound output to compensate for attenuation that occurs as a result of the speakers being hidden behind such covers. For example, particular frequencies may be boosted, to compensate for such attenuation, upon selection of the cover material in the app.

The app or other control interface can allow or automatically make adjustments to time delay (e.g., based on distance from seat to speaker), based on a desired seating position, e.g., based on the geometric arrangement of the modular furniture component bases and transverse members. In an embodiment, the app allows a user to designate the seating location that the sound is to be optimized to, such as the X in FIGS. 15A-15E. Of course, the app or other control interface can also allow the user to adjust and "swap" what channel signals are sent to the specific speakers embedded within the furniture assembly, allowing the user to fully customize the listening experience.

In any case, in each such configuration, the speakers are advantageously hidden behind the upholstery fabric or other cover material of the transverse members.

It will be apparent that the present speaker systems can be implemented in a wide variety of furniture assemblies, including e.g., modular furniture assemblies (e.g., including one or more bases, and one or more transverse members, coupleable to one another to form such modular furniture assemblies, for example where the components can be reconfigured to provide differently configured furniture assemblies). The systems can also be implemented in furniture systems (e.g., couches, other leisure seating, etc.) where the furniture may not necessarily be modular, but where the speaker system still provides benefits of invisibility to the eye and touch, where the sound output is tuned (adjusted) as described herein. The integrated speaker systems can be implemented in various furniture systems that can include removable covers (e.g., removable upholstery covers) that can be selected by the user, e.g., swapped out etc., where the speaker system is hidden (e.g., to eye, feel and/or touch) under the removable cover(s). In another embodiment, the systems can be implanted in any of various upholstered furniture systems, e.g., where the speaker system is hidden (to eye, feel and/or touch) underneath the upholstery, whether such upholstery cover is removable or not. Such furniture systems can extend not only to leisure seating (e.g., couches, chairs, etc.) but also to beds, etc., that can similarly include cushioning, upholstery, etc.).

Tuning as used herein refers to how the sound output is tuned specifically for being delivered from inside the furniture component, through the upholstery or other cover material, as described herein (e.g., boosting select frequencies to compensate for attenuation of such frequencies by the fabric cover). Such "tuning" also refers to the ability to tune the speaker output (e.g., by adjusting sound delay, phase, or other sound parameters) differently, to accommodate differences in placement of the audio-enhanced furniture components (e.g., transverse members), within various different furniture configurations, e.g., such as those shown in FIGS.

13C-13L, FIGS. 14A-14E, or otherwise. Such tuning can even include the described ability to change the "channel" signal being sent to a particular speaker location (changing channel identity), e.g., upon pressing of a button or other control selection on a control interface (e.g., an app on a smartphone, tablet, remote or the like), to provide a different desired sound experience to the listener.

It will be apparent that such reconfiguration of the components to assemble a different furniture assembly can position various speakers farther or closer to a given seating position, such that it would be advantageous for a user to be able to adjust such settings (delay, phase, channel identity, etc.) after such rearrangement. Control of such adjustments can be made in an app or other control interface, accessible by the user, e.g., as described in application Ser. No. 15/786,922, herein incorporated by reference in its entirety.

Figure 16:
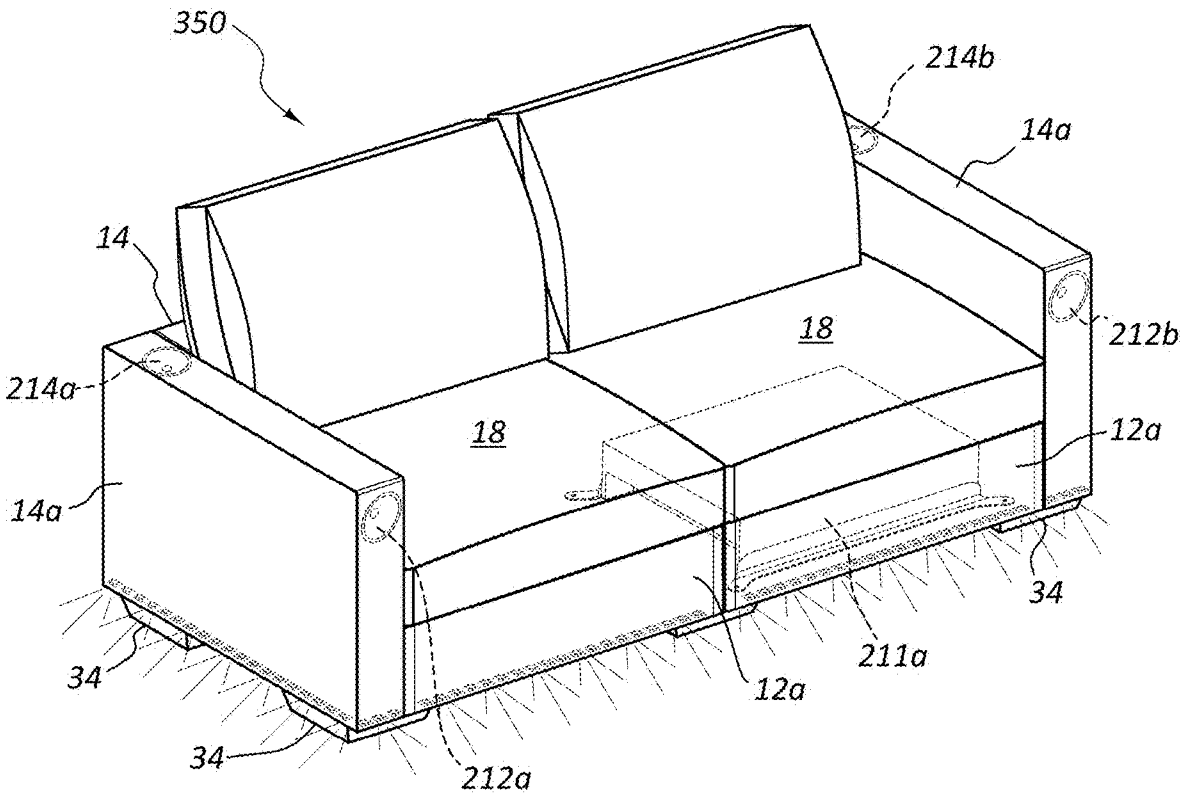
FIG. 16 shows a sofa similar to that of FIGS. 13A-13B. The sofa has night light motion sensors.

FIG. 16 shows a furniture system 350 that is similar to sofa 300 of FIGS. 13A-13B. The sofa 350 has night light motion sensors (i.e., lighting which is motion activated) mounted on the underside of the base 12*a* and/or transverse members 14*a* thereof.

FIG. 16 thus illustrates another embodiment of a modular audio enhanced furniture system in the form of sofa 350 which includes motion activated night lights. For example, LEDs or other lights may be embedded or otherwise provided on or within the bottoms surfaces of the frames of base members 12*a* and/or transverse members 14*a* so as to illuminate all or a portion of a perimeter of sofa 350 when desired by a user. For example, such lighting may be motion activated so as to illuminate when a user approaches the sofa within any given distance.

Power for such lights may be provided through any of the hubs 100 associated with transverse members 14*a* as described herein. Such a configuration may provide a night light system which may illuminate an area around sofa 350 in an otherwise dark room, aiding a user in navigating through the room at night or otherwise.

Such lighting may also be desired in other environments where a user is using sofa 350, for example, while watching a movie or other program on a television or other display in a dimly lit room.

Modular furniture assembly 350 is highly useful in a variety of different settings and includes electronic devices embedded in leisure seating such as in upholstery couches, modular seating, sectionals and the furniture known as SACTIONALS. While illustrated with audio components in the furniture assembly in addition to the motion activated night light system, it will be appreciated that a furniture system without audio components could include the motion activated night light system.

FIG. 16 illustrates an embodiment that might be considered as a 4.1 or 4.2 speaker system, including a front left, a front right, a left surround, and a right surround speaker with a subwoofer speaker 210*a* embedded in at least one of the bases 12*a*. Where one subwoofer speaker 210*a* is included (thus one base 12*a*, and one regular base 12), a 4.1 system results. If both bases are bases 12*a* including subwoofer speakers 210*a*, a 4.2 system can result (e.g., particularly where the subwoofers produce independent sounds). The two subwoofer speakers may produce the same, or different sounds (e.g., 1 or 2 channels).

While no dedicated center channel speaker is illustrated in FIG. 16, it will be appreciated that a virtual center speaker can be provided through sound signals sent to front speakers 212*a* and 212*b* (i.e., a virtual center channel speaker can be mimicked by the stereo of speakers 212*a* and 212*b*). In another embodiment, a dedicated center channel speaker can be positioned under or above the television, behind a perforated screen, or incorporated into a television, or other display device (e.g., a "sound bar" under or above the display, as shown in FIGS. 15A-15E). A center rear channel can be similarly imitated using right and left surround speakers 214*a* and 214*b*, or mounted on a rear wall, as desired, to create 5.1 or 6.1 systems. 7.1 systems or other configurations (e.g., Dolby Atmos) could similarly be provided for.

As shown, sofa 350 includes speakers or other audio components embedded in leisure seating which includes upholstery couches, modular seating, etc. Sofa 350 provides excellent stereo or surround quality sound and provides a high fidelity surround sound experience.

The speakers are hidden from the view of the user and customers within the wooden framing portions of the base 12*a* and/or transverse member 14*a* and can be hidden under covers surrounding the wooden framing.

Wiring Diagram

Figure 17:
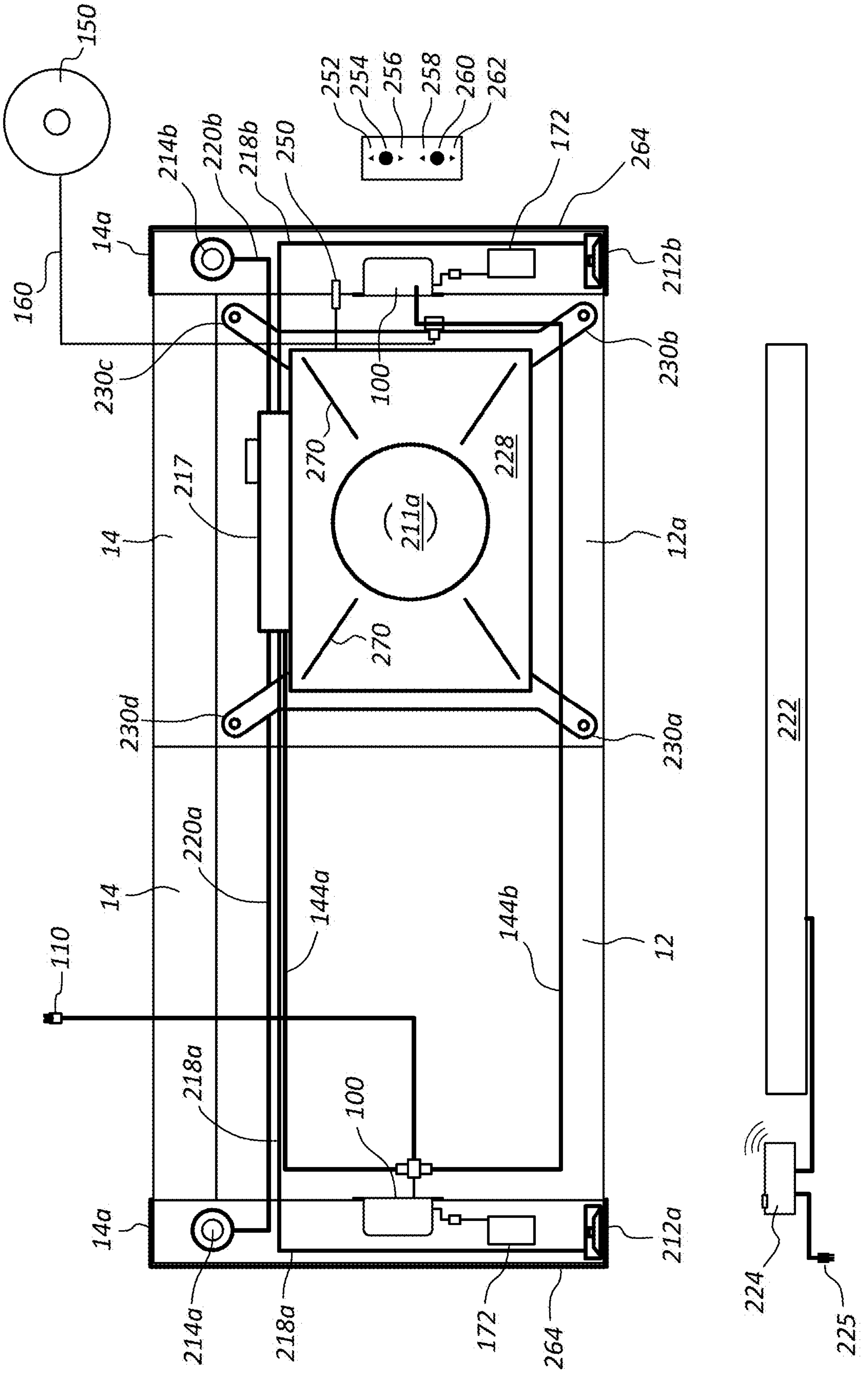
FIG. 17 shows an example of a wiring diagram for the sofa of FIG. 16.

FIG. 17 shows an example of a wiring diagram to be used in conjunction with the furniture system 300 or 350 in the form of the sofa of FIGS. 13A-13B or FIG. 16. A Reference Table identifying certain elements of the wiring diagram of FIG. 17 is shown below.

FIG. 17 Reference Numbers and Components

| Component | Reference Number |
|---|---|
| Base with subwoofer | 12a |
| Regular base or recliner seat | 12 |
| Transverse member with front and surround speaker | 14a |
| Regular transverse member | 14 |
| Electrical Hub | 100 |
| Hub power cord (e.g., 120 volt) | 110 |
| Power cord for amplifier/receiver 217 | 144a |
| Power cord tether for electrical Hub | 144b |
| Floor lamp | 150 |
| Power cord for floor lamp, connected to hub | 160 |
| Qi induction charger | 172 |
| Subwoofer driver | 211a |
| Front right speaker | 212a |
| Front left speaker | 212b |
| Right surround speaker | 214a |
| Left surround speaker | 214b |
| Multi-channel amplifier and/or audio receiver | 217 |
| Front right speaker wire/cable | 218a |
| Front Left speaker wire/cable | 218b |
| Right surround speaker wire/cable | 220a |
| Left surround speaker wire/cable | 220b |
| TV or other display | 222 |
| Wireless transmitter (e.g., 5.1) | 224 |
| Power cord into wall | 225 |
| Subwoofer enclosure | 228 |
| Mounting brackets | 230a-b |
| Tethered Remote | 250 |
| Volume up function on remote | 252 |
| Mute function on remote | 254 |
| Volume down function on remote | 256 |
| Bass volume up function on remote | 258 |
| Bass mute function on remote | 260 |
| Bass volume down function on remote | 262 |
| Low power LED nightlight from Hub | 264 |

FIG. 17 illustrates an exemplary wiring diagram for a modular furniture assembly, including a surround sound system positioned therein, such as that shown in FIGS. 1A-1B, 13A-13B, and 16. Similar systems may be suitable for any of the other assemblies described herein. As shown in FIG. 17, wiring may be provided within the modular furniture assembly to provide signals and/or power to each of speakers 212*a*, 212*b*, 214*a* and 214*b*.

In the illustrated configuration, amplifier 217 is disposed within base member 12*a*. Amplifier 217 may be a multi-channel amplifier and/or an audio receiver including such an amplifier and is illustrated as being disposed within base member 12*a*, for example, adjacent to subwoofer 210*a*, e.g., mounted on or within housing 228.

As further shown in FIG. 17, wiring 218*a* and 218*b* may provide audio signals from amplifier 217 to front right speaker 212*a* and front left speaker 212*b*. In the illustrated configuration, the signal sent through wiring 218*a* and 218*b* is already amplified as shown.

In an alternative configuration, a signal may be sent from an audio receiver 217 to front right and front left speakers 212*a* and 212*b* in an unamplified configuration where amplification occurs at the speaker 212*a* or 212*b*. Unamplified signals can be sent through a wired or wireless connection, as desired.

FIG. 17 further shows wiring 220*a* and 220*b* extending from amplifier 217 to right surround speaker 214*a* and wiring 220*b* extending from amplifier 217 to left surround speaker 214*b*. Power for amplifier 217 is provided through electrical connections shown in FIG. 17, for example. For example, power from plug 110 (FIG. 5) may connect to hub 100 and amplifier 217 is in turn plugged into an outlet associated with hub 100, providing power thereto.

In one embodiment, amplifier 217 amplifies at least the subwoofer speaker. In another embodiment, amplifier 217 amplifies the subwoofer speaker and the other speakers, e.g., the transverse member speakers. In another embodiment, the subwoofer may include its own internal amplifier, and amplifier 217 may amplify the other speakers (e.g., speakers 212*a*, 212*b*, 214*a*, 214*b*) in the furniture assembly. In yet another embodiment, amplifier 217 amplifies the subwoofer speaker and each of transverse member speakers has its own amplifier associated with that speaker.

FIG. 17 shows how additional components may also be powered by hub 100 and/or additional hubs that are present within any of transverse members 14/14*a*. For example, FIG. 17 shows power being provided from a hub in the right transverse member 14*a* to the qi (induction) charger 172.

Figure 17A:
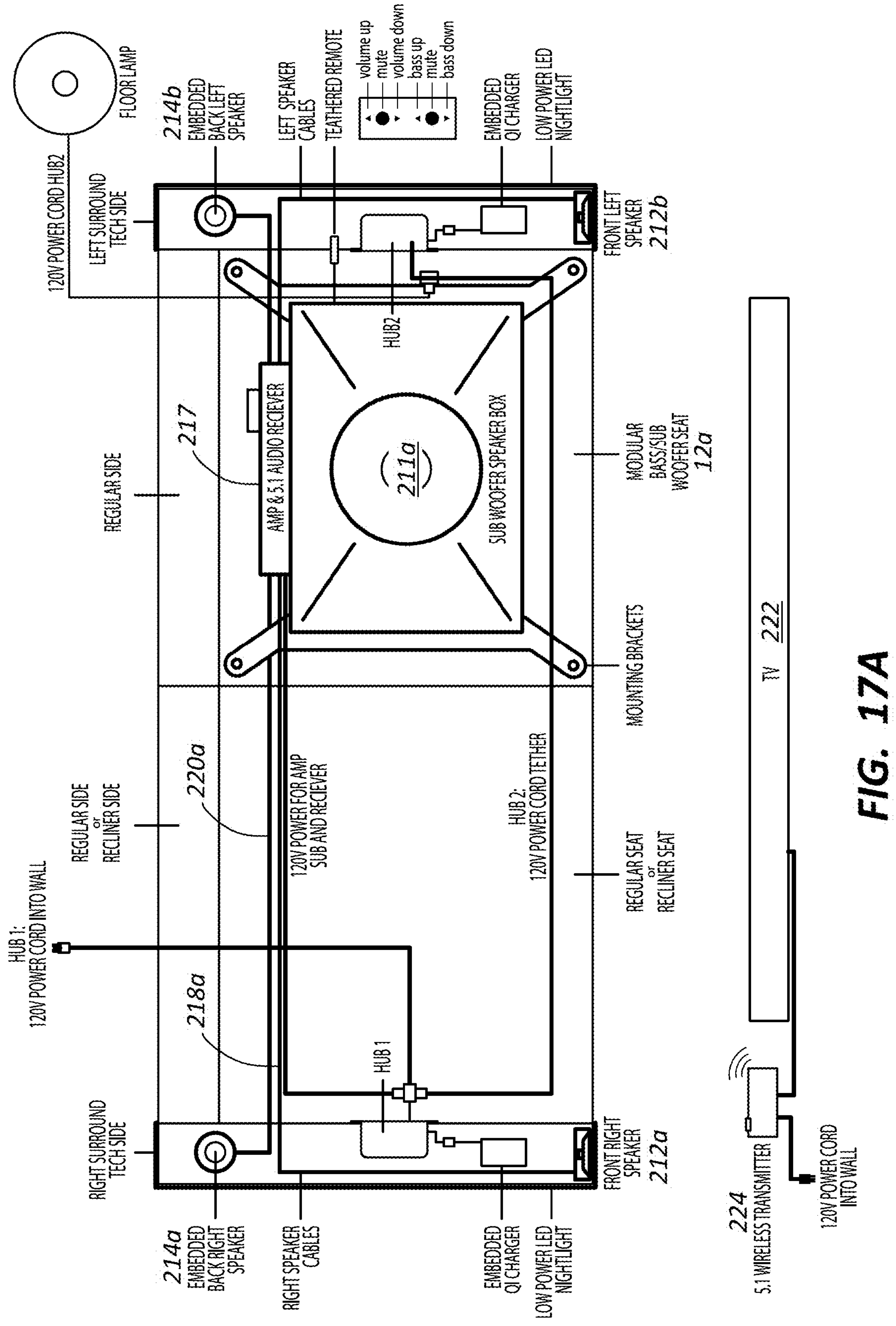
FIG. 17A is another version of the wiring diagram of FIG. 17 with text descriptions for certain elements identified in the wiring diagram.

FIG. 17 further shows power from a second hub in left transverse member 14*a* to another qi charger, as well as to a floor lamp 150. Additional components can be plugged into or otherwise powered by either of such hubs. For example, FIGS. 17-17A show a tethered remote 250 that may be used to provide control over volume (252, 256), the ability to mute (254), the ability to adjust specific frequencies, for example, base up (258) or base down (262), or bass mute (260).

As shown in FIG. 17, one or more of base members 12 may further include a recliner seat whereby power for such recliner could be provided by any of the shown hubs.

FIG. 17 further shows a television 222 or other display. Such a display is positioned or mounted on a front wall in front of sofa 300, 350, allowing a user seated on the sofa to watch television while listening to surround sound provided through the speakers associated with sofa 300 or 350.

In one embodiment, a transmitter 224 is provided at the TV 222, such as a wireless controller transmitting signals for audio through a wireless transmitter to the speaker system of sofa 300 or 350.

For example, as further shown in FIG. 17, it is possible to provide the signals to amplifier or receiver 217 (or wireless speakers 212*a*, 212*b*, 214*a*, 214*b* themselves) of sofa 300 or 350 through a wireless transmitter 224, for example, shown associated with television 222. Such a wireless transmitter 224 is plugged into the wall at 225 so as to be powered therefrom. Signals from wireless transmitter 224 are wirelessly transmitted to amplifier and/or audio receiver 217 in sofa 300 or 350. Wireless transmission of such audio signals and/or control signals can be through Blue-tooth, WiFi, IR, Wireless Speaker and Audio Technology (WISA) or other mechanisms. Receiver 217 can be used to receive communication from wireless controller/transmitter 224, or a smart phone or tablet app, or the like.

In one embodiment, a wired connection can be provided between a transmitter component 224, and amplifier or audio receiver 217, although wireless transmission as illustrated may be advantageous as no wire or cord is thus required between the location of transmitter 224 and amplifier or audio receiver 217 disposed within sofa 300 or 350.

The hubs 100 provide power to the electronic furniture assembly system of sofa 300 or 350, as well as all of the speakers, components and electronic devices associated with sofa 300 or 350.

As a result of the configuration of sofa 300 or 350, the various transverse members, bases and their associated speakers and electronic components can be removed and upgraded as other speaker systems or electronic components are available.

In one embodiment, the furniture system of the present invention also includes an audio receiver/sound bar and a bridge electrically coupled to the television in order to communicate sound to the speakers of the sofa 300 or 350.

The speakers mounted within the base and transverse member, in addition to providing invisibility from a user/customer, also provides an opportunity for high quality sound. The base and transverse member each provide a large enclosure volume within which the speaker sound can resonate to provide high quality sound while using no additional footprint other than that of the sofa itself.

As shown in FIG. 17, base 12*a* may further comprise support beams within subwoofer enclosure housing 228, the support beams being reflected at reference numbers 270 in FIG. 17. Support beams are mounted between the upper and lower portions of the enclosure housing 228 so as to provide support within a cavity 226 to prevent any damage to speaker 210*a*. In one embodiment, a receiver or amplifier 217 is mounted on or within the subwoofer housing 228 of base 12*a*, which has power in and amplified signal outputs.

FIG. 17A is another example of the wiring diagram of FIG. 17 with text descriptions for certain elements identified in the wiring diagram.

Figure 18:
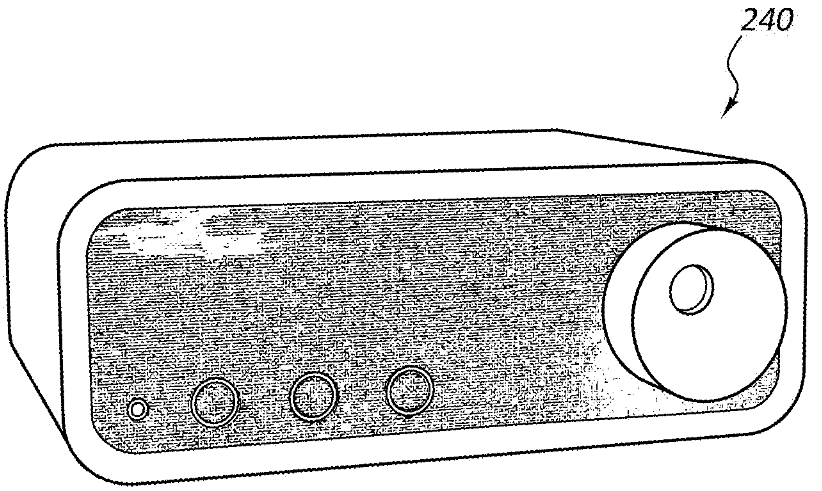
FIG. 18 is a perspective view of a controller or transmitter of the present invention.

FIG. 18: Controllers for Controlling Speakers and Other Components

FIG. 18 is a perspective view of a controller 240 of the present invention. Any of various control mechanisms and components can be provided with the surround sound systems described herein. FIG. 18 shows an exemplary control component 240. Such a component may include one or more knobs, dials, or other controls that a user may use to control various aspects of the sound or other environment.

For example, a user may control overall sound volume, sound volume of one or more of the speakers, frequency boosting (or attenuation) of one of more frequency bands associated with any of the speakers, or other controls that a user may desire to manipulate. Such a control component 240 may transmit signals or instructions through an electrical wired connection or wirelessly from a location that is remote from sofa 300 or 350, for example, adjacent television 222 or elsewhere.

A user may be able to pick up and move such a control component 240 anywhere desired. For example, they may pick it up and take it over to the couch where it may be left, if desired, so as to allow control at that point.

In other embodiments, control of any of the desired parameters may be provided through a cellular phone app (smart phone app) or other software application that can be provided in any desired interface. For example, in the smartphone portable device, tablet, or other device accessible to the user which may wirelessly transmit control signals to the receiver 217 or other component, then implement any desired changes to parameters as instructed by a user. Receiver 217 may be capable of receiving and/or transmitting through WiFi, Blue-tooth, or other wireless system, so as to communicate with such an app, to communicate with transmitter 222, etc.

In some embodiments, the audio receiver and/or amplifier 217, which may be positioned within the base member 212*a*, may include some knobs and/or buttons for controlling any desired parameters thereon. For example, volume controls for each of the speakers could be provided thereon.

Such controls may allow a user to manipulate levels of the different speakers within the surround sound speaker system. For example, where a user wants to calibrate speaker levels of a given surround sound speaker or a given front speaker, or a given subwoofer, controls for increasing or decreasing the sound volume associated with any given individual speaker may thus be provided, allowing a user to make such calibrations or changes.

For example, depending upon the furniture configuration built by the user, a user may wish to boost or attenuate a right front speaker, a left front speaker, a right surround speaker, or a left surround speaker, as numerous furniture assembly possibilities are possible with the modular furniture assemblies.

For example, where a surround speaker or a front speaker may be further away from a given seating position as compared to another surround speaker or another front speaker, a user may wish to boost or decrease volume output from one or more such speakers to even out or calibrate sound volumes from the pair of front speakers, the pair of surround speakers, or across all speakers at a given seating location. Controls as described herein may allow the user to do such.

The speakers and other electronic components of the present invention can be controlled through a variety of different control mechanisms, such as control mechanisms embedded within the sofa, e.g., within the base and/or transverse members or through a controller connected by an electrical cord to the base and/or transverse members or through a remote or wireless setting, such as through the use of a personal cellular phone (e.g., smart phone or tablet). The speakers and other electronics can thus be controlled wirelessly, e.g., through Blue-tooth, WiFi, through internet connections or other wireless connection means. In one embodiment of the present invention, there is no delay through the WISA. For example, sound and video may be correlated to ensure no lip synch problems between produced sound and images (e.g., sound and/or video may be intentionally delayed ensuring proper synchronization).

In one embodiment, a central transmitter such as controller 240 is employed, having a volume knob, wireless communication, ability to select and employ stereo, 4.1, 5.1 etc. with various input capabilities, including an auxiliary port in the jack.

Remote control for the speakers or other audio components or electronic components may be embedded within the furniture system 300 or 350, e.g., within the transverse member 14*a* or base 12*a*. Examples of control include wireless control and tethered control. Parameters that can be controlled include volume for the 2.0 system, 2.1 system, the 4.1 system, volume for the 5.1 system, etc., mute, volume level and intensity control.

As mentioned, in one embodiment, a software application is employed to control the electronic devices such as the speakers and other electronic components within sofa 300 or 350 or other devices in the present invention. The software application may be designed to control within the speakers and other electronic components (e.g., television, lamps, etc.) the volume, power, mute, balance, bass/treble, or other features of the system. The software application can also be used for the lights within the sofa, e.g., the tract lighting or LEDs or other lighting features, e.g., lighting power off and on, and can provide sound performance tracking, recliner settings, temperature settings, dimming/controlling lighting fixtures, television channels, and other user preferences.

In another embodiment, a software application may be used to control the speakers and other electrical components. Such software application may have a variety of different features and settings. In on embodiment, the software application controls speaker volume, TV volume, powers the speakers, power for the TV, mute, balance, bass/treble, lights on/off, sound performance tracking, recliner settings, temperature, diming/controlling of lamps and other lighting, TV channels, etc.

Figure 19:
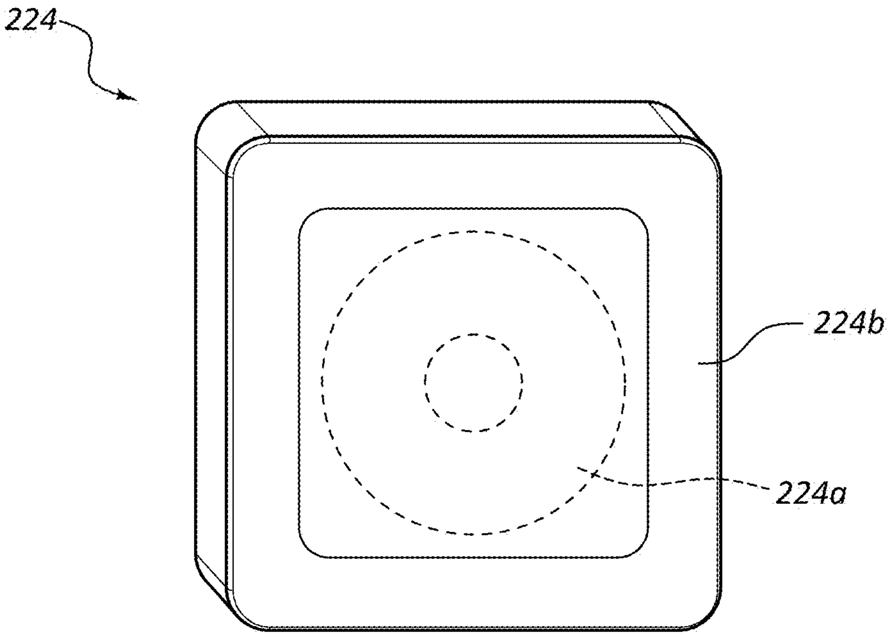
FIG. 19 is an example of a wall-mountable controller or transmitter of the present invention having a speaker (e.g., a center channel speaker).

FIG. 19: Transmitter with Speaker

FIG. 19 shows another example of a transmitter 224 of the present invention, which includes a speaker, for example a center channel speaker, incorporated therein. Transmitter 224 may serve similar functions as controller 240 of FIG. 18 and could be mounted below, or above or behind television or other display 222. In one embodiment, incorporating the center channel speaker 224*a* into the same housing 224*b* which houses the transmitter assembly of transmitter 224 simplifies the overall speaker system. Thus, in one embodiment of transmitter 224, the center channel speaker is in the same housing 224*b* as the controller mechanism.

In another embodiment, transmitter 224, including a built-in channel speaker, can be configured to be wall mounted. For example, it may include mounting structure for such wall mounting.

In one embodiment of the present invention, the furniture assembly can be used as a bed having speakers and other electrical components embedded therein. For example, in one embodiment, base 12*a* can be used as a bed having speakers integrally mounted therein. Base 12*a* can be sized large enough to serve as a bed. For example, base 12*a* can be a stand-alone bed and/or can serve a box spring on which a cushion, such as cushion 18 can be mounted, the combination of base 12*a* and cushion 18 serving as a bed, wherein the base 12*a* and cushion 18 are configured to be large enough to serve as bed. A bed of the present invention having one or more speakers therein can thus be comprised of base 12*a* and/or base 12*a* and cushion 18. In another embodiment, multiple speakers can be placed within the bed. The present invention thus relates to a variety of different types of furniture having electronic components such as speakers, rechargers, power systems and other electrical components embedded therein.

Correcting Sound Loss Through Fabric

One or more embodiments of the present disclosure may generally relate to apparatuses, methods, and systems for acoustically correcting sound loss through various types and compositions of fabric. The apparatuses, methods, and systems provide superior sound quality to speaker systems that include at least one speaker covered with fabric. The apparatuses, methods, and systems are used to improve the balance of audible frequencies emitted by a speaker through a fabric covering. The apparatuses, methods, and systems can use various mechanical, electromechanical, electrical, hardware and/or software components, systems, and modules to improve audio or speaker systems integrated within furniture, whether it be a modular furniture assembly or a single integral furniture unit having integrated speakers.

While the present disclosure will describe particular implementations of apparatuses, methods, and systems, it should be understood that the apparatuses, methods, and systems described herein may be applicable to other uses. Additionally, elements described in relation to any embodiments depicted and/or described herein may be combinable with elements described in relation to any other embodiment depicted and/or described herein.

For instance, "tuning" of a speaker or system of speakers, as discussed throughout the present disclosure, is to be understood to encompass all methods currently known for adjusting the frequency response of the subject speaker or system of speakers. Such methods include but are not limited to adjustment of the equalization of frequencies of a sound signal prior to transmission to the speaker or speaker system, adjustment of a transmitted audio signal prior to its receipt by the speaker or speaker system, or direct modification of the speaker(s).

The disclosed embodiments bring about substantial benefits, improvements, and practical implementations to the technical field. By way of example and not limitation, the improved tuning of audio or speaker systems having speakers covered with fabric provides superior sound quality in applications where it is desired to have a speaker concealed from view. This leads to substantial opportunities for improved aesthetic and functional designs of speaker systems integrated with furniture, thereby leading to substantial improvements in the technical field. These and numerous other benefits will now be discussed in more detail with regard to the Figures presented by this disclosure.

The following section outlines some example improvements and practical applications provided by the disclosed embodiments. It will be appreciated, however, that these are just examples only and that the embodiments are not limited to only these improvements. Generally, now referring to the drawings in detail wherein like reference numerals are used to designate like elements, there is shown one or more embodiments of the present disclosure that provides apparatuses, methods, and systems.

Embodiments of the present disclosure are applicable to a variety of applications wherein audio speakers are covered with fabric not only to improve the aesthetic design of an audio system, but to provide desired aesthetics and durability in a furniture system (e.g., a chair, sofa or other furniture providing seating, or a bed). One such application can be found in audio-enhanced furniture systems including a furniture assembly, an upholstery fabric at least partially covering the furniture assembly, and an audio or speaker system positioned within the furniture assembly, wherein at least one of the speakers is covered and hidden from view by the upholstery fabric that at least partially covers the furniture assembly. According to embodiments of the present disclosure, each speaker that is covered by an upholstery fabric can be tuned to compensate for sound being emitted from the speaker through the upholstery fabric by an adjustment to an equalization or frequency response of the speaker at one or more target frequencies or frequency bands. In particular, adjustment of the equalization or frequency response of the speaker may depend on at least one of a fabric type, a density, a thickness, and a weight of the upholstery fabric covering the furniture assembly. In some embodiments, the tuning of each speaker, or tuning of the audio system or speaker system to change the frequency response of each speaker, is selectable from a plurality of tuning profiles corresponding to a variety of upholstery fabrics, such that a user, retailer, or manufacturer is able to select a tuning profile configured to specifically compensate for sound loss through a particular upholstery fabric.

The density and thickness of the upholstery fabric relate to the weight of the upholstery fabric. For instance, a higher density and thicker upholstery fabric can have a higher weight than a lower density and less thick upholstery fabric. Examples of weights of upholstery fabrics that can be used as covers for the furniture assemblies (and modular components/members thereof) of the present invention include, for example: fabrics having weights in a range of approximately 50 grams per square meter (GSM) to approximately 1500 grams per square meter (GSM), for example, such as approximately 100 GSM to approximately 1000 GSM, or such as approximately 190 GSM to approximately 800 GSM, although a variety of different interior and exterior fabrics may be employed. The speakers of the present invention are adjusted and tuned in order to emit sound through such fabrics in a manner that attenuation due to such fabric is compensated for.

Embodiments of a tuning profile include the information used to adjust the equalization of frequency response of a speaker to compensate for sound loss through a particular upholstery fabric. For example, a range of audible frequencies emitted by a speaker can be divided into a plurality of frequency bands, with each of those frequency bands having a frequency response adjustment to compensate for sound loss through a particular upholstery fabric. The particular grouping of those frequency response adjustments, with a particular identification for the particular upholstery fabric can be an example of a tuning profile.

The total quantity of frequency bands depends on the desired level of accuracy in adjustment of the frequency response, as well as the capability of the intended equipment for implementing the tuning profile. For example, some audio tuning devices, such as speaker controllers, amplifiers, or audio equalizers, are only capable of adjusting frequencies in the three frequency bands corresponding to low frequency ranges (i.e., bass), middle frequency ranges, and high frequency ranges (i.e., treble), whereas other tuning devices available are operable to adjust up to 31 separate frequency ranges.

Some of the embodiments discussed herein, for example, divide the audible frequencies ranging from about 20 Hz to about 21 kHz into the 10 frequency bands for individual adjustment as illustrated in Table 1 below: about 20 Hz to about 49 Hz, about 50 Hz to about 99 Hz, about 100 Hz to about 199 Hz, about 200 Hz to about 399 Hz, about 400 Hz to about 999 Hz, about 1 kHz to about 1.9 kHz, about 2 kHz to about 3.9 kHz, about 4 kHz to about 7.9 kHz, about 8 kHz to about 15.9 kHz, and about 16 kHz to about 21 kHz.

TABLE 1

| Frequency Bands | | | | | | | | | |
|---|---|---|---|---|---|---|---|---|---|
| 20-49 Hz | 50-99 Hz | 100-199 Hz | 200-399 Hz | 400-999 Hz | 1000-1999 Hz | 2-3.99 kHz | 4.00-7.99 kHz | 8.00-15.99 kHz | 16.00-21 kHz |

Alternatively, a plurality of target frequencies within the audible frequency range can be selected for adjustment by parametric equalization or similar known methods. Parametric equalization includes adjustment of one or more target frequencies by a selected amplitude, such the frequency response curve of the tuned speaker is altered by a parametric or "bell" shape centered at the target frequency. The particular data associated with the parametric equalization for one particular upholstery fabric, with a particular identification for the particular upholstery fabric can be another example of a tuning profile. One skilled in the art should appreciate that additional methods of adjusting equalization or frequency response not discussed herein can be used to implement the disclosed embodiments within the scope and spirit of the disclosed invention.

The terms "equalization" and "frequency response" are used interchangeably herein to describe adjustments to the output volumes of one or more frequencies within the audible spectrum of sound emitted by a speaker or speaker system.

Figure 20:
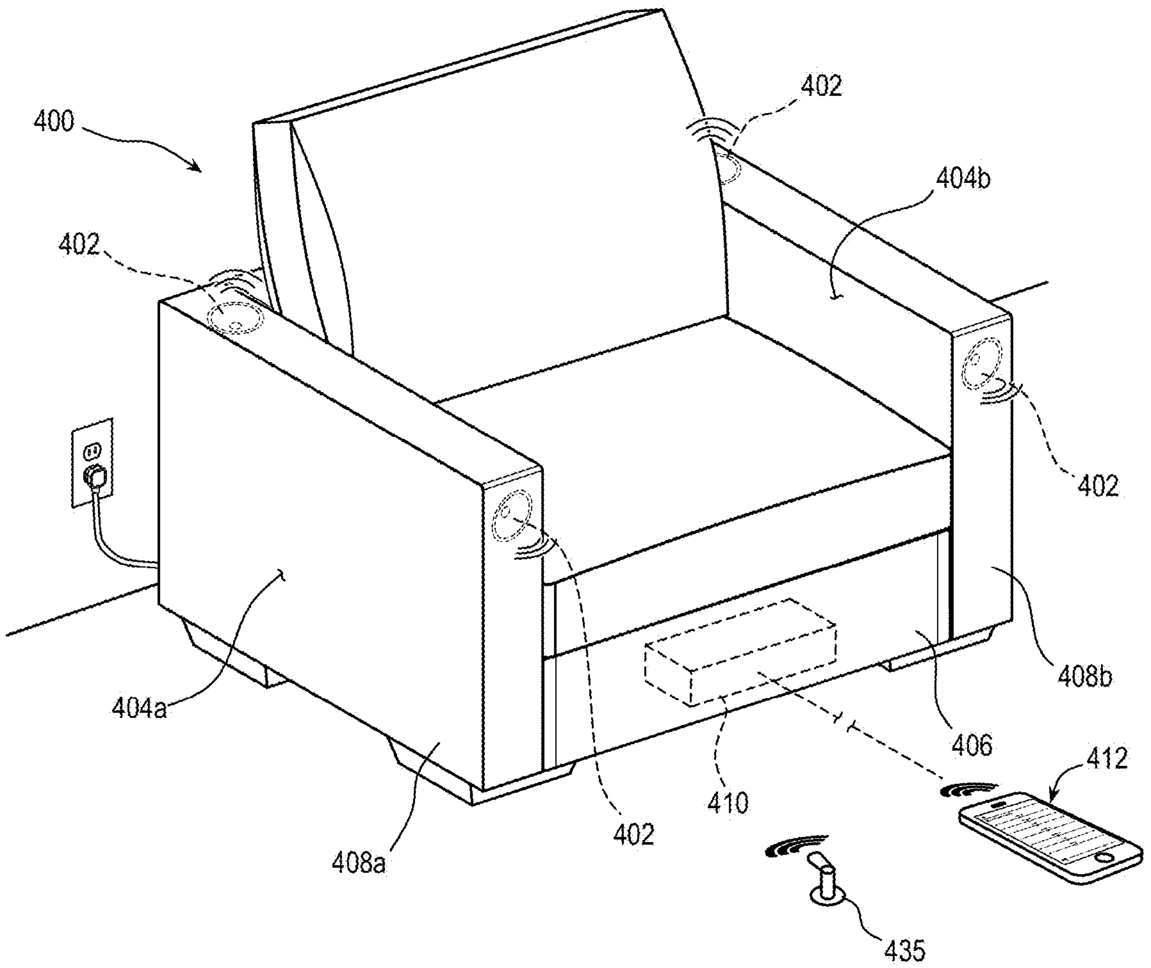
FIG. 20 illustrates a perspective view of a modular furniture assembly having audio speakers mounted thereto, each audio speaker being covered by an upholstery fabric.

Referring now to the drawings, FIG. 20 illustrates a modular furniture assembly 400 having an embedded speaker system including multiple audio speakers 402 integrated with modular furniture assembly 400, each audio speaker 402 being covered by an upholstery fabric 404*a*, 404*b*. As illustrated, modular furniture assembly 400 includes a base 406, and first and second audio-enhanced upright members 408*a*, 408*b*, each audio-enhanced upright member 408*a*, 408*b* having, in the illustrated configuration, two audio speakers 402 mounted thereto. First and second upholstery fabrics 404*a*, 404*b* cover first and second audio-enhanced upright members 408*a*, 408*b*, thus also covering each of speakers 402 embedded within upright members 408*a*, 408*b*. Modular furniture assembly 400 can also include a variety of additional components, such as cushions, feet, additional bases and upright members (audio-enhanced or not), and additional embedded speakers.

According to embodiments of the present disclosure, the system of speakers 402 covered by upholstery fabric 404*a*, 404*b*, are tuned to compensate for sound being emitted from each speaker 402 through upholstery fabric 404*a*, 404*b* by an adjustment to an equalization (i.e., adjustment of the frequency response) of the at least one speaker at one or more target frequencies or frequency bands. Adjustment of the equalization of one or more target frequencies or frequency bands depends on at least one of a fabric type, a density, a thickness, and a weight of upholstery fabric 404*a*, 404*b*.

Further, the tuning of speakers 402 can be implemented by one or more speaker controllers in communication with and configured to control the tuning of each speaker 402. For example, modular furniture assembly 400 includes a receiver/amplifier 410, such being an example of a speaker controller, configured to receive signals from an audio source, such as mobile device 412 (via wired connection or wireless signal) and operable to transmit the received signals and provide power to speakers 402. In other configurations, the center channel speaker 223 (FIG. 15) can be the speaker controller for the modular furniture assembly described herein. Tuning of speakers 402 can thus be implemented by receiver/amplifier 410 via firmware or other known methods for adjusting the equalization of the output of an amplifier. Alternatively, tuning can be implemented by adjusting the equalization of the audio signals transmitted by the audio source (e.g., by execution of tuning software on mobile device 412). Additionally, the tuning of speakers 402 can be made selectable by mobile device 412, or by any means for communicating with the receiver/amplifier 410, such as a remote controller, a control console, mobile device, such as a cellular phone, or combinations, modifications, or alternatives thereof. Alternatively, the tuning can be permanently implemented via firmware associated with receiver/amplifier 410. In some embodiments, a microphone 435 is also provided to enable custom tuning of speakers 402 according to the methods disclosed herein. Alternatively, the disclosed methods can be performed by the consumer using a microphone of mobile device 412.

While modular furniture assembly 400 is depicted with receiver/amplifier 410 mounted within base 406, embodiments also include receivers, amplifiers, and/or speaker controllers provided at virtually any location that allows for communication with speakers 402. For example, receiver/amplifier 410 can be integral with a center console or similar device, and can be connected to speakers 402 via wired or wireless connections. Alternatively, each speaker 402 can have a speaker controller individually associated therewith and secured directly or proximate thereto. One skilled in the art should appreciate that the illustrated embodiments are provided as exemplary configurations and do not limit the scope or spirit of the present disclosure to the physical configuration specifically illustrated.

While mobile device 412 is illustrated as an exemplary audio source, it will be appreciated that any of a wide variety of sources may be used with the present systems (e.g., including, but not limited to TV, disc player such as a CD player, DVD player, Blu-ray player, over-the air radio, TV or other transmissions, etc.). Additionally, the mobile device 412 can be used not only as an audio source, but can optionally control other audio sources, such as those described herein, and so allow a user to tune the speakers 402 based upon the signals received by other audio sources. For instance, and not by way of limitation, the mobile device 412 can tune the speakers 402 based upon a TV, disc player such as a CD player, DVD player, Blu-ray player, over-the air radio, TV or other transmissions, etc. providing a signal to the receiver/amplifier 410. The mobile device 412 can, therefore, be another speaker controller.

Figure 21A:
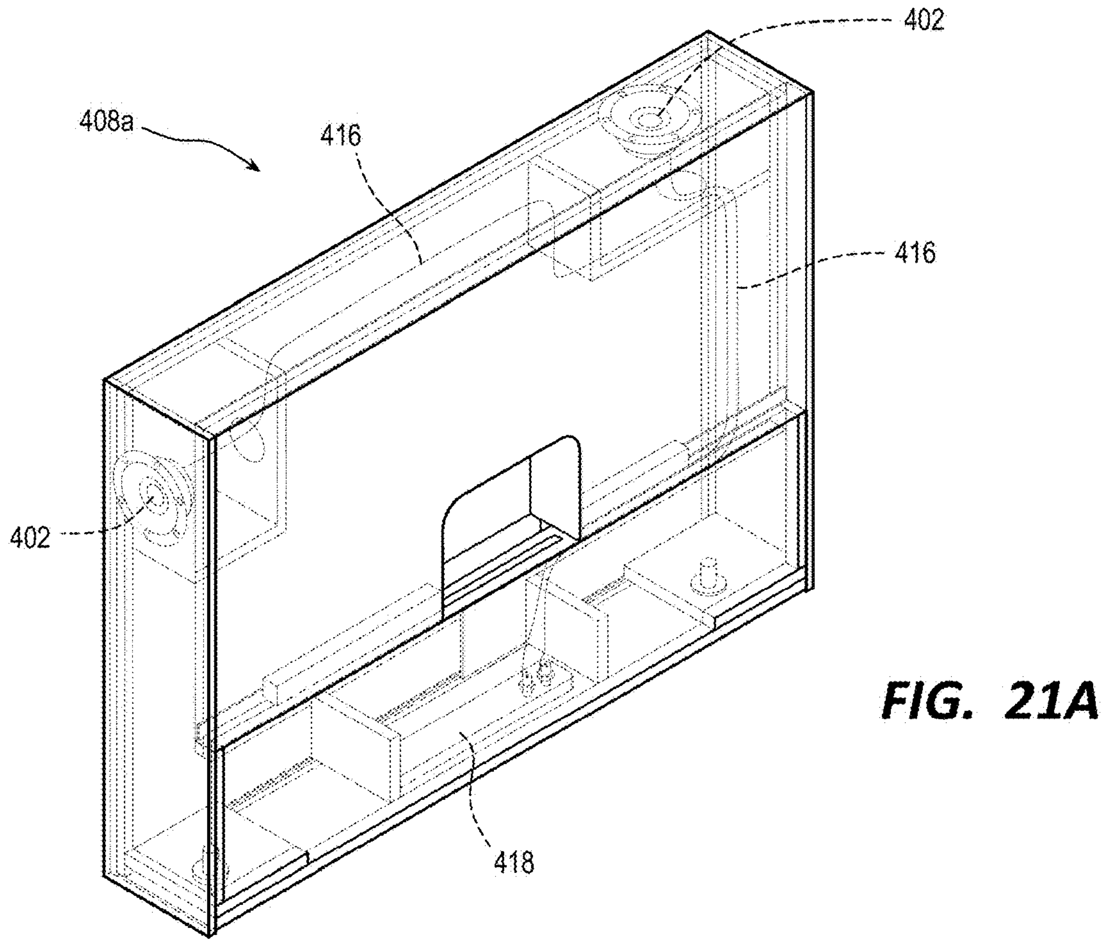
FIG. 21A illustrates a perspective view of an upright member of a modular furniture assembly having audio speakers mounted thereto.
Figure 21B:
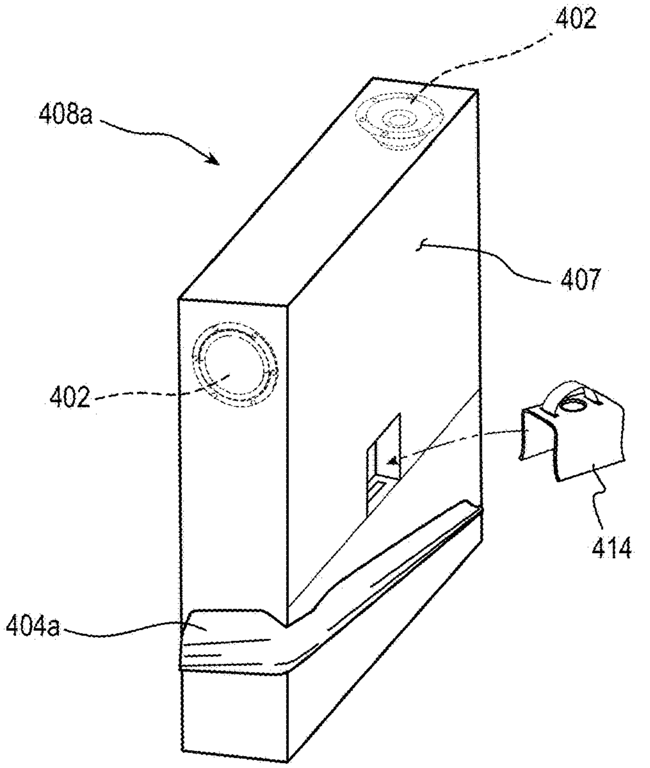
FIG. 21B illustrates a perspective view of the upright member of FIG. 21A with a removable upholstery fabric cover being applied thereto.

FIGS. 21A-21B demonstrate an example upright member 408*a* of an assemble-able modular furniture assembly, such as furniture assembly 400 of FIG. 20, having audio speakers 402 mounted to an internal framework thereof. A fabric cover 404*a* including an upholstery fabric 407 is operable to cover upright member 408*a*, thus covering and concealing speakers 402 from view. Fabric cover 404*a* can thus be removed from upright member 408*a* to be cleaned, to enable access to and maintenance of speakers 402 and any other components mounted within upright member 408*a*, or to exchange the fabric cover 404*a* with another cover designed to fit upright member 408*a*. In some embodiments, consumers may select one or more interchangeable fabric covers 404*a* from a catalog of upholstery fabrics 407. Available upholstery fabrics include but are not limited to polyester, chenille, tweed, linen, polyester linen, velvet, leather, cotton, cotton blend, denim, twill, or faux fur. As shown, a coupler 414 is provided to enable upright member 408*a* to be selectively and securely mounted to a base, such as base 406 of FIG. 20. Although upright member 408*a* is shown in detail in FIGS. 21A-21B, it will be appreciated that upright member 408*b* may be similarly configured, but in a mirror configuration to upright member 408*a*, as apparent from FIG. 20.

As shown in FIG. 21A, each speaker 402 of upright member 408*a* is connected by a wire 416 to a speaker controller 418. Alternatively, speaker 402 can be in wireless communication with speaker controller 418, or individual speaker controllers can be directly integrated with each speaker 402. Speakers 402 can be tuned, according to the methods described herein, to account for sound loss through a variety of upholstery fabrics 407. For example, speaker controller 418 can include firmware operable to adjust one or more target frequencies or frequency bands emitted by speakers 402, depending on the particular fabric within which the speaker is covered. Alternatively, the frequency response of speakers 402 can be adjusted by altering the signal received and transmitted by speaker controller 418 to speakers 402. In any case, the signal sent to any given speaker may be altered to "boost" one or more target frequencies or frequency ranges of the audio signal before transduction of such signal by the speaker. The amount of such "boost" will depend on the particular fabric with which the speaker 402 is covered, as exemplified by FIGS. 26-27H.

Figure 21C:
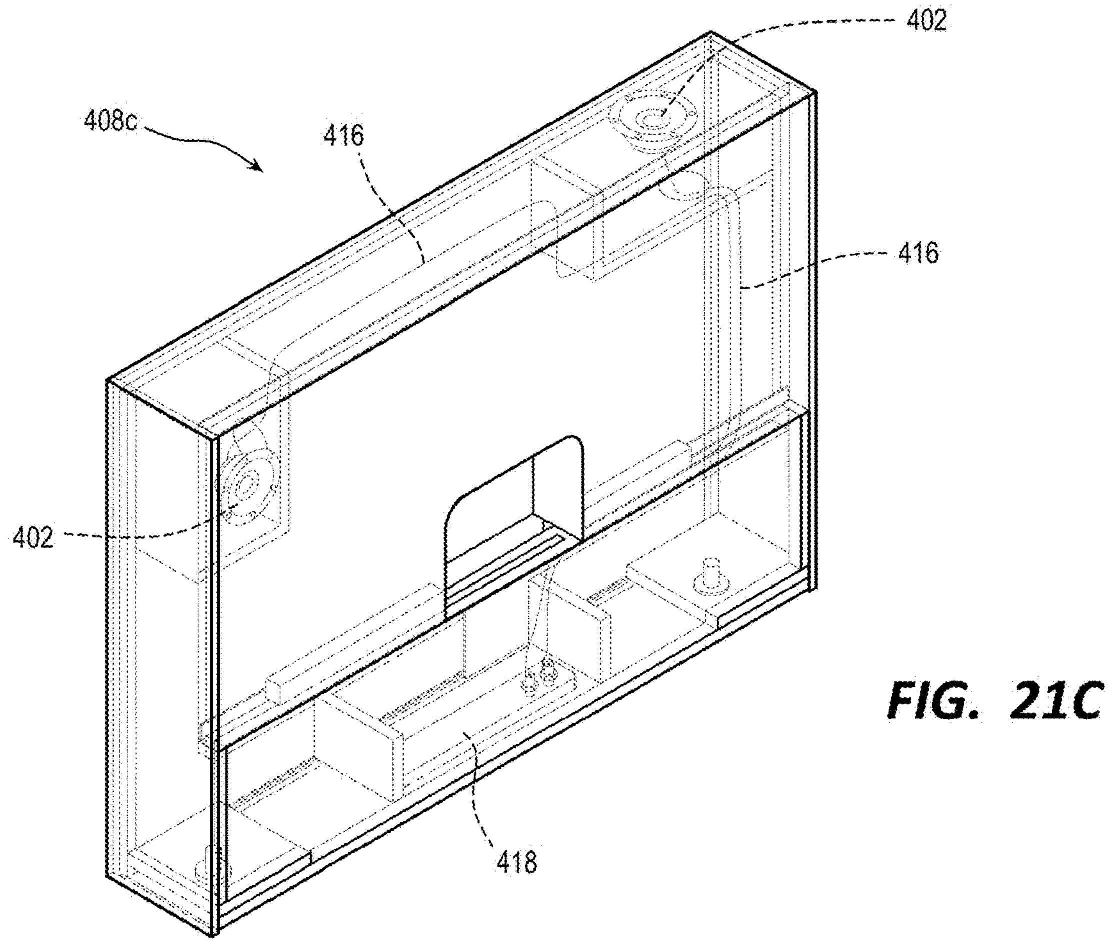
FIG. 21C illustrates a perspective view of another upright member of a modular furniture assembly having audio speakers mounted thereto.
Figure 21D:
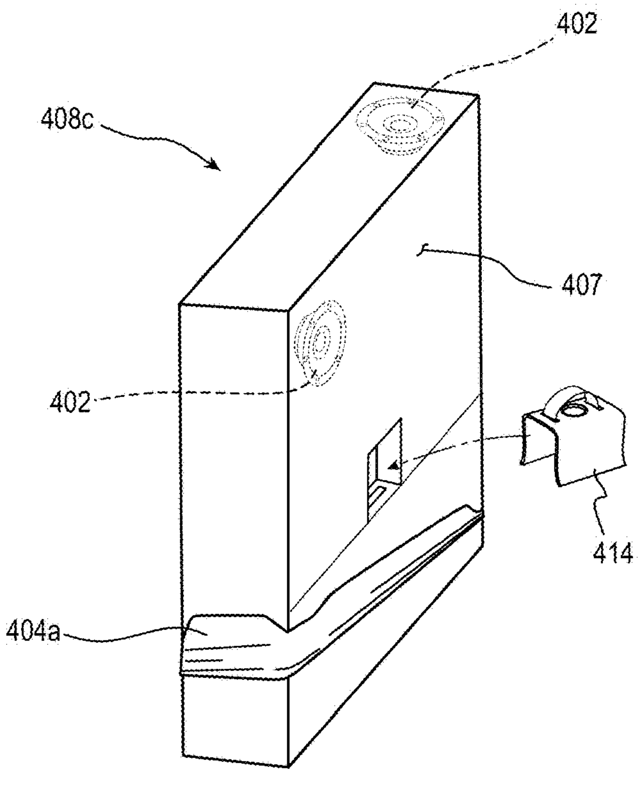
FIG. 21D illustrates a perspective view of the upright member of FIG. 21C with a removable upholstery fabric cover being applied thereto.
Figure 21E:
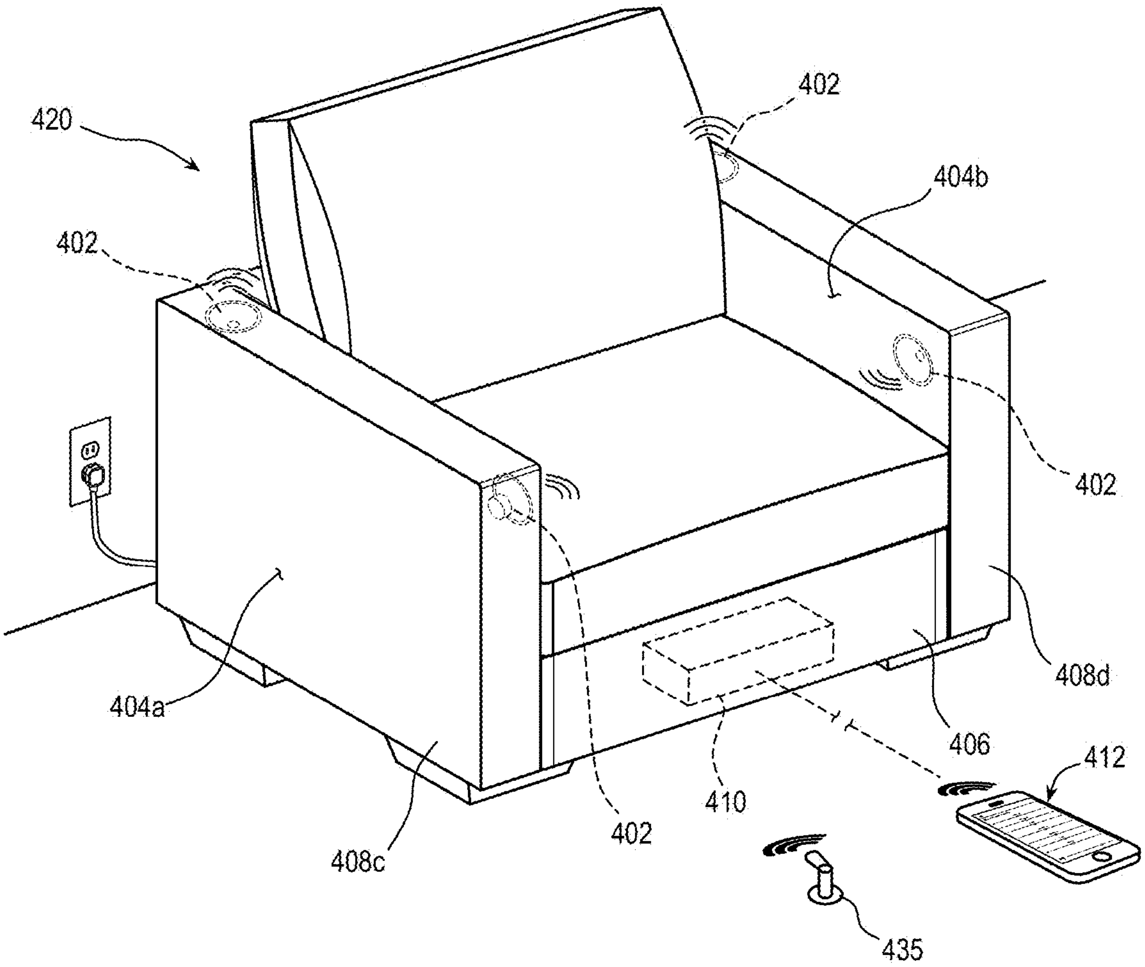
FIG. 21E illustrates a perspective view of a modular furniture assembly formed using upright members with speakers positioned therein as shown in FIGS. 21C-21D.

FIGS. 21A-21B illustrate an upright member configuration where the illustrated audio-enhanced upright member includes two speakers mounted therein, for example, with a front channel speaker positioned in a front edge of the upright member (near a top of the front edge), and a surround speaker positioned in a top edge of the upright member (near a rear of the top edge). FIGS. 21C-21D are similar to FIGS. 21A-21B, but show an alternative speaker placement, where the front channel speaker 402 is positioned in an inside face of the upright member 408*c* (e.g., near the top, front corner), and the surround speaker 402 is positioned similar to that shown in FIGS. 21A-21B, in a top edge of the upright member 408*c*, near a rear of the top edge of the upright member. The configuration seen in FIGS. 21C-21D may thus include front channel speaker placement such that the sound is emitted directly towards the seating position on a chair or sofa. FIG. 21E illustrates such a chair 420, including upright members 408*c*, 408*d*, configured as shown in FIGS. 21C-21D. The configuration of FIGS. 21A-21B includes a front channel speaker placement that may rely on reflection of sound emitted from the front channel speakers off a front wall, TV or the like, for reflection back to the user seated on the chair or sofa. It will be apparent that many alternatives are possible, for placement and positioning of the speakers within the upright members. Any of such may benefit from the embodiments described herein, whereby equalization is applied to the audio signal to compensate for the sound from the speakers being emitted through upholstery fabric that covers the speakers.

FIGS. 22A-22D illustrate perspective views of modular furniture assemblies 422*a*-*d* of various configurations, each having multiple audio speakers 402 mounted thereto, each audio speaker 402 being covered by an upholstery fabric 404. As illustrated, a variety of furniture configurations can be achieved by rearrangement of the various bases 406 and upright members 408, and by introducing additional members. Also, interchangeable fabric covers can be provided, such that the consumer may select the upholstery fabric 407 for the entire assembly or for each individual member of the assembly. Embodiments of the present disclosure enable tuning of any speaker covered by fabric to account for sound loss through virtually any fabric.

Figure 22A:
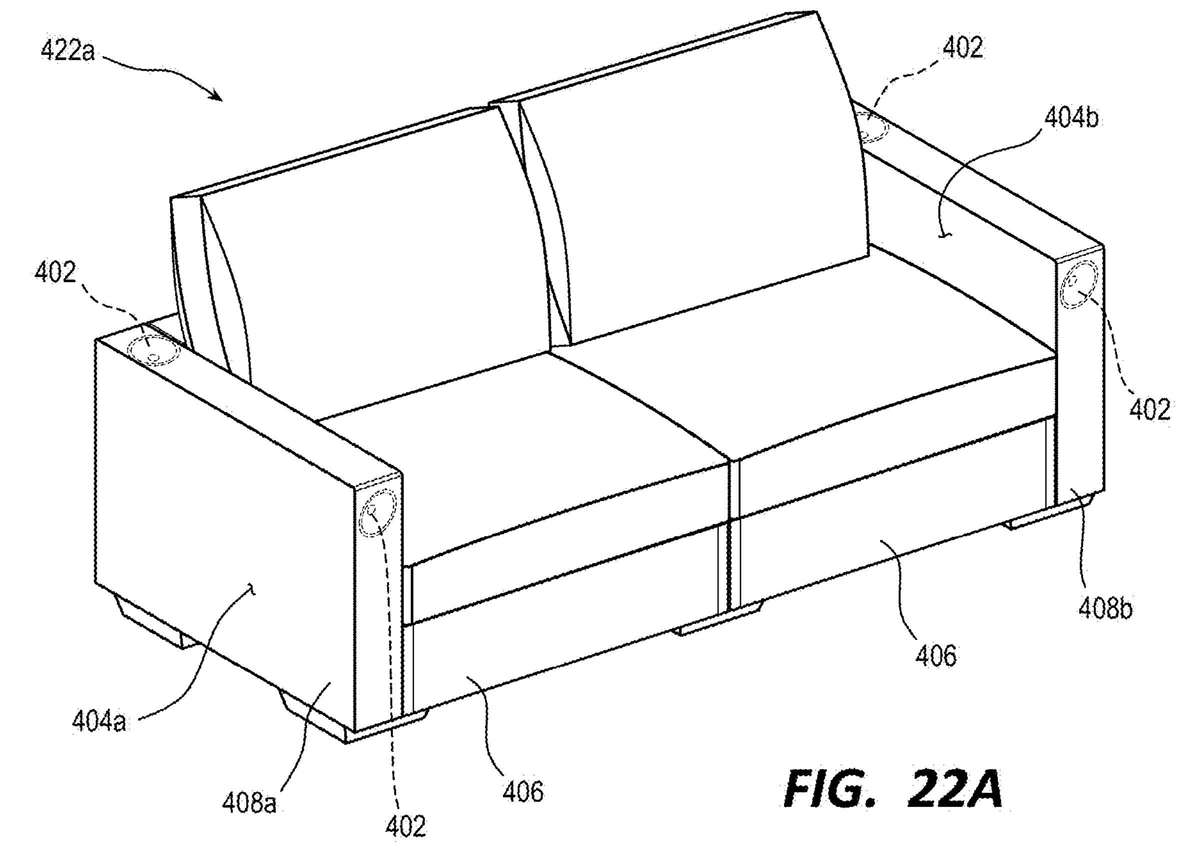
FIGS. 22A-22D illustrate perspective views of modular furniture assemblies of various configurations, each having audio speakers mounted thereto, each audio speaker being covered by an upholstery fabric.

As shown in FIG. 22A, modular furniture assembly 422*a* includes two audio-enhanced upright members 408*a*-*b*, each arranged relative to bases 406 to act as armrests. Audio-enhanced upright members 408*a*-*b* each have two speakers 402 mounted thereto, one speaker facing forward and one speaker facing upward. Each of speakers 402 are positioned underneath upholstery fabric covers 404*a* or 404*b* covering respective audio-enhanced upright members 408*a* or 408*b*. Each speaker 402 may be tuned so that sound emitted from the speaker compensates for sound loss though respective upholstery fabric covers 404*a* or 404*b*.

Figure 22B:
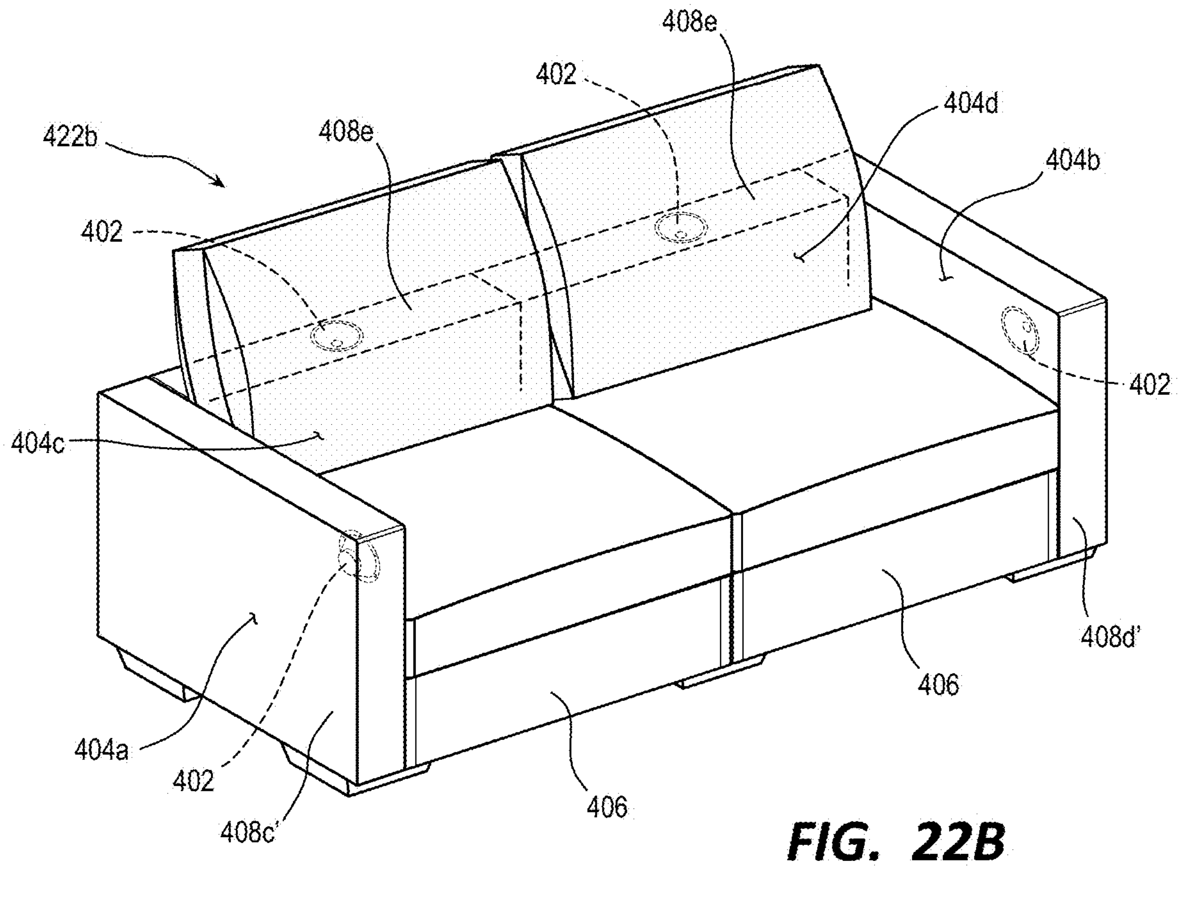
Figure 22C:
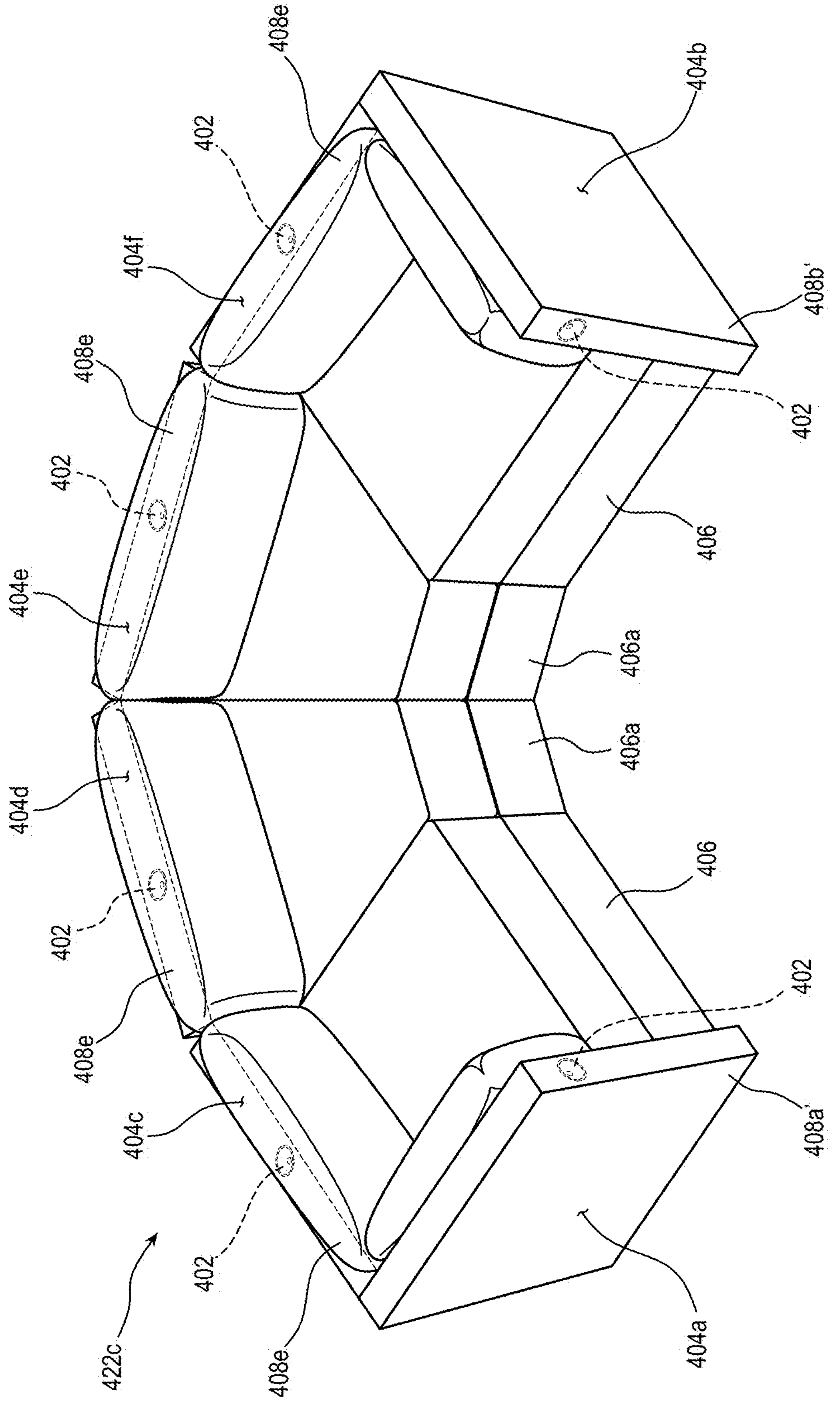

FIG. 22B illustrates a modular furniture assembly 422*b* having four audio-enhanced upright members 408*c*', 408*d*', 408*e*, each having a single speaker 402 mounted thereto. Audio-enhanced upright member 408*c*' and 408*d*' each act as an armrest and include a speaker 402 oriented inward, towards bases 406, whereas audio-enhanced upright members 408*e* each provide a backrest and include a speaker 402 oriented upward and positioned behind respective bases 406. Also, each audio-enhanced upright member 408*c*', 408*d*', 408*e* is covered in an upholstery fabric cover 404*a*-*d*, such that each speaker 402 of modular furniture assembly 422*b* is positioned underneath one of upholstery fabric covers 404*a*-*d*. Accordingly, each speaker 402 of modular furniture assembly 422*b* may be tuned so that sound emitted from the speaker compensates for sound loss though respective upholstery fabric covers 404*a*, 404*b*, 404*c*, or 404*d*. In an embodiment, the various covers of a given furniture assembly may be of the same given material, or of different fabric materials (e.g., one given material on the bases, another on the upright members, or a mix and match configuration between various bases and/or upright members).

By way of an additional example, FIG. 3C illustrates modular furniture assembly 122*c*, wherein six audio-enhanced upright members 408*a*', 408*b*', 408*e* are arranged about bases 406, 406*a*, where the two bases 406*a* are wedge-shaped to create a curved style of sofa or couch. As shown, audio-enhanced upright members 408*a*' and 408*b*' act as armrests and include mounted speakers 402 oriented forwards, the other audio-enhanced upright members 408*e* acting as backrests and each having a speaker 402 oriented upwards. Upright members 408*c*' and 408*d*' may be similar to upright members 408*c* and 408*d*, except that upright members 408*c*' and 408*d*' are shown as including only a single speaker each (e.g., in the inside face), without any surround speaker. Each of upright members 408*e* may be identically configured to one another, as shown (e.g., with a single surround speaker positioned centrally, within the top edge of the upright member). Upright members 408*a*' and 408*b*' may be similar to upright members 408*a* and 408*b*, except that upright members 408*a*' and 408*b*' are shown as including only a single speaker each (e.g., in the front edge), without any surround speaker. As with the prior examples, each speaker 402 is positioned beneath one of upholstery fabrics covers 404*a*-*f* and can be tuned to compensate for sound loss through respective upholstery fabric cover 404*a*, 404*b*, 404*c*, 404*d*, 404*e*, or 404*f*.

Figure 22D:
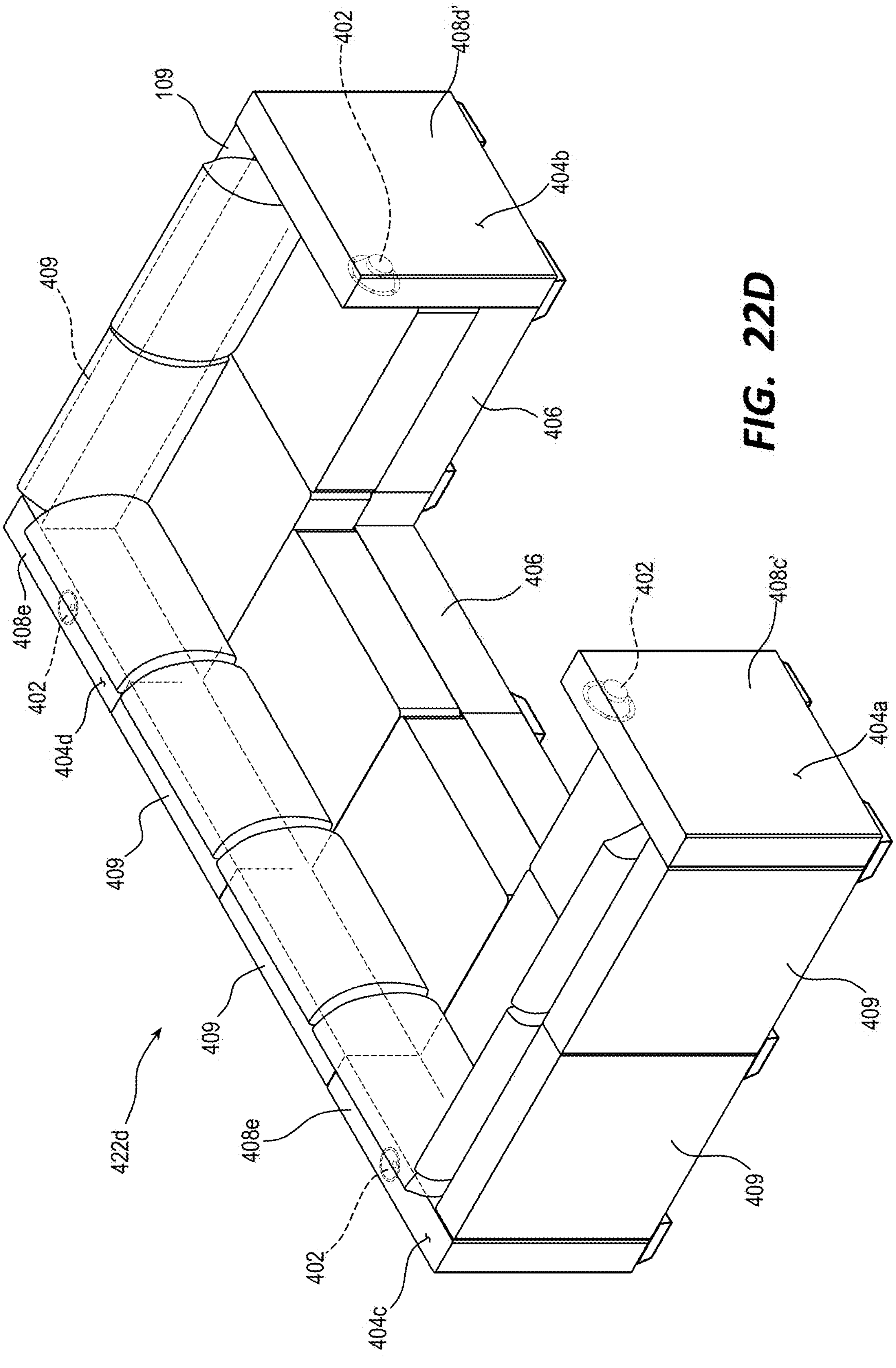

As yet another example, FIG. 22D illustrates modular furniture assembly 422*d* having four audio-enhanced upright members 408*c*', 408*d*', 408*e* and with six bases 406 and several non-audio-enhanced upright members 409 to form a U-shaped sofa or couch. As shown, audio-enhanced upright members 408*c*' and 408*d*' provide armrests and each include a speaker 402 oriented inward, whereas audio-enhanced upright members 108*e* provide backrests and each include a speaker 402 oriented upward. As with the other examples provided, speaker 402 of each audio enhanced upright member 408*c*', 408*d*', 408*e* is positioned beneath respective upholstery fabric covers 404*a-d* and can be tuned to compensate for sound loss through respective upholstery fabric covers 404*a*, 404*b*, 404*c*, and 404*d*.

Although FIGS. 20-22D illustrate particular combinations of specifically configured upright members with various bases, it will be appreciated that any of the described upright members and bases may be used in any combination, with any desired speaker placement, size, or orientation in the upright members, and with any desired placement of the upright members relative to the bases, to provide any of a wide variety of furniture configurations.

Because the speakers are positioned within the modular furniture assembly components, this provides great flexibility to a user in where the speakers can be positioned within the assembled furniture assembly, whether the assembly is modifiable by the user, custom built according to the user's request, or otherwise provided. Further, the use of interchangeable covers for each of the modular furniture assembly components enables the user to change upholstery fabrics at will. Accordingly, embodiments of the present disclosure also enable a user to selectively tune the speakers of an audio-enhanced furniture assembly to compensate for sound loss through the fabric selected by the user, as discussed further herein.

Figure 23A:
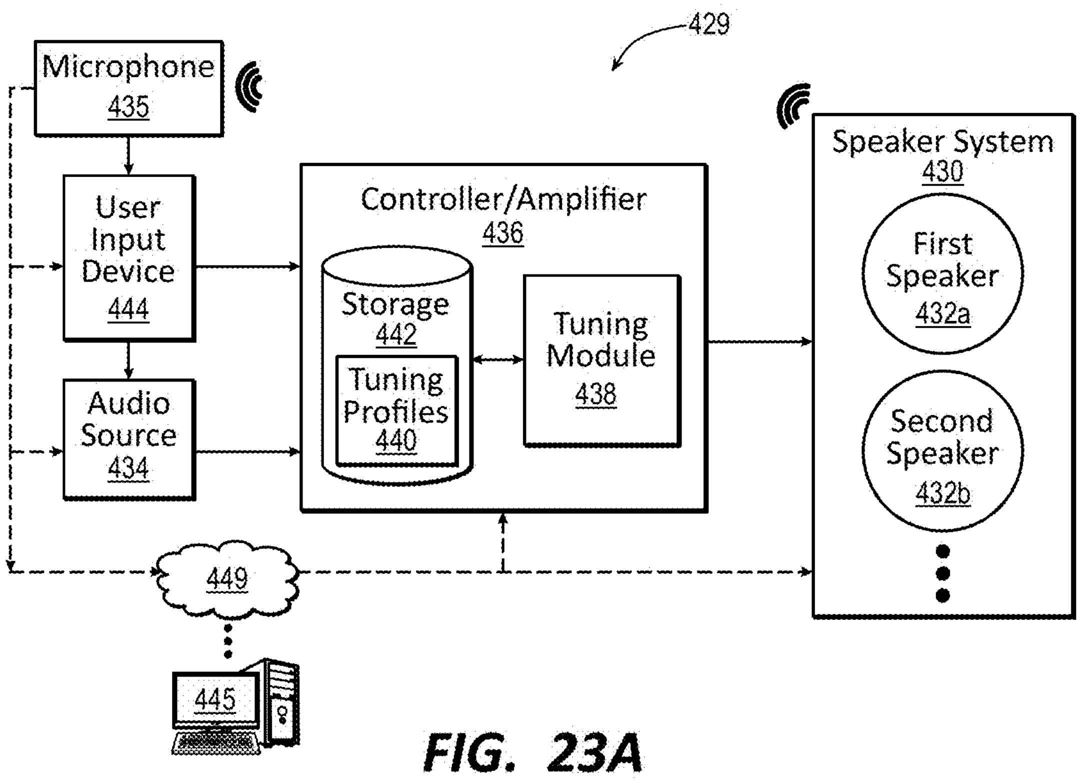
FIGS. 23A-23C illustrate schematics of exemplary audio systems operable to tune speakers to compensate for sound loss through fabric.
Figure 23B:
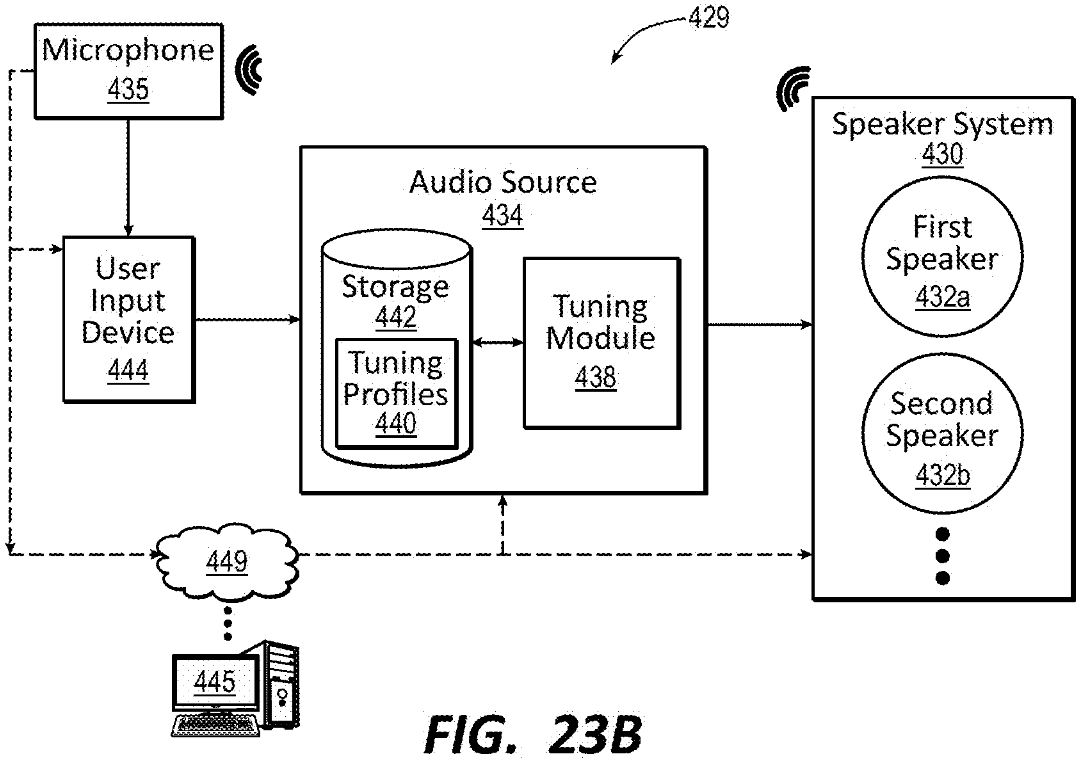
Figure 23C:
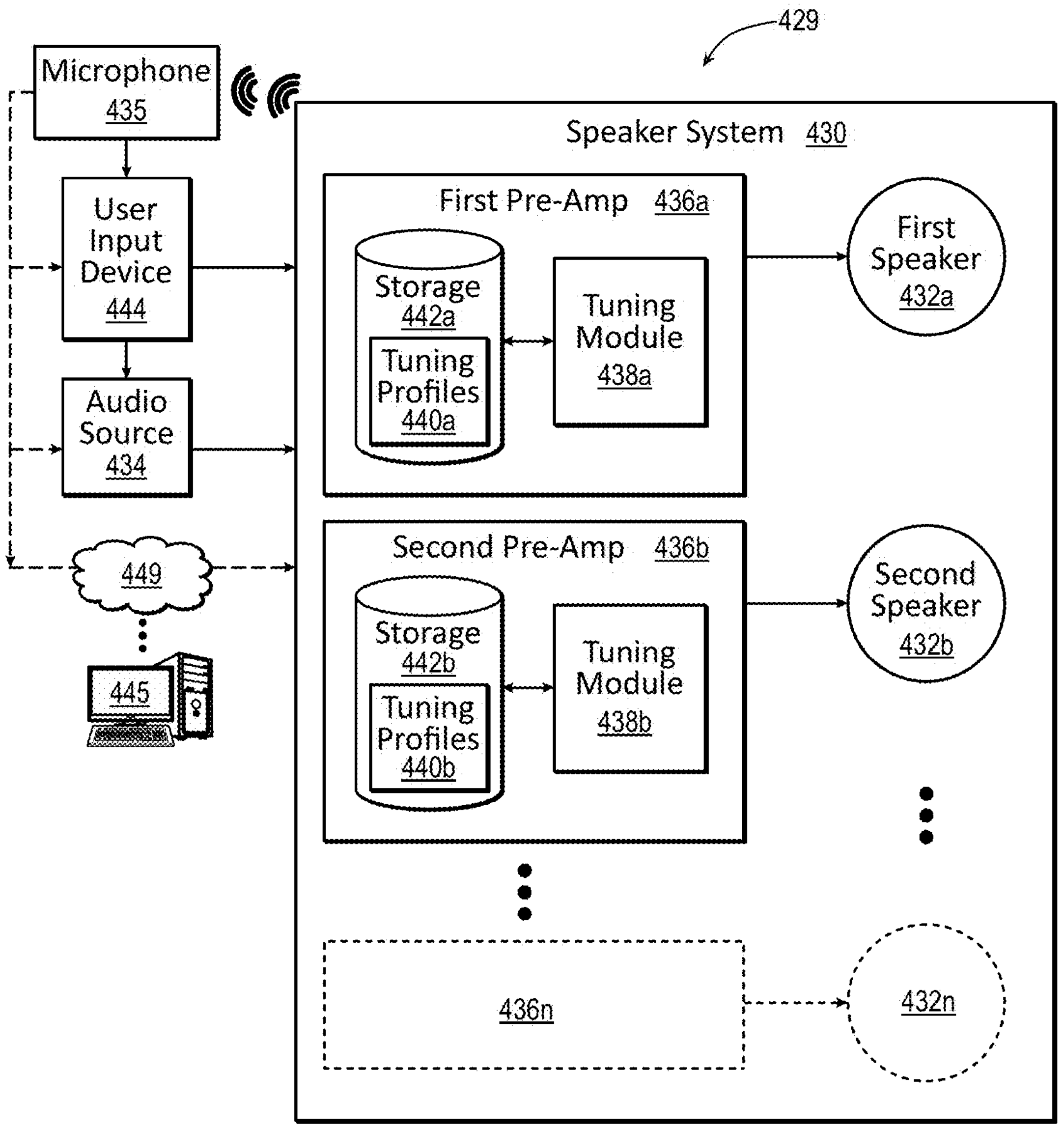

Referring now to FIGS. 23A-23C, schematics of exemplary audio systems operable to tune speakers to compensate for sound loss through fabric are illustrated. As shown, each audio system 429 includes a speaker system 430 having a first speaker 432*a*, a second speaker 432*b*, and any number of additional speakers. Each audio system 429 also includes an audio source 434 configured to transmit audio signals to be emitted by speaker system 430, as well as a user input device 444 operable to control various aspects of the audio system 429, such as adjustment of the output of audio source 434 or modification of one or more settings of controller or amplifier 436. In some embodiments, the controller or amplifier 436 can be incorporated into a center channel speaker 223 (FIG. 15A). User input device 444 can be a separate component of the audio system 429, such as a console, remote controller, or a mobile device, or can be an integral component of audio source 434, such as a user interface on an audio receiver. One should appreciate that the provided exemplary audio systems 429 are for illustrative purposes and do not limit the scope of the present disclosure.

In the example illustrated by FIG. 23A, a controller or amplifier 436 includes a tuning module 438 operable to adjust one or more frequencies or frequency bands of a received audio signal as it is transmitted to speaker system 430 by amplifier 436. Tuning module 438 can be implemented, for example, by firmware directly integrated with amplifier 436. In some embodiments, a tuning profile 440 is selectable from a plurality of tuning profiles 440 stored within a storage 442 associated with the controller or amplifier 436. For instance, tuning module 438 may incorporate a tuning profile associated with a particular upholstery fabric in response to a user's selection of a tuning profile from tuning profiles 440 via user input device 444. In other configurations, the user can select tuning profiles from tuning profiles 440 via input device 444 based upon one or more of (i) a particular shape or orientation of the furniture, such as a single seater, two seats on a row, three seats on a row, four seats on a row, five seats on a row, L-shaped furniture, U-shaped furniture, M-shaped furniture (such as a lounger), or other configuration footprint shapes or sizes of such shapes of the module furniture assembly, (ii) location of one or more speakers of the speaker system (430), such as but not limited to, the location of a sound bar or other speaker on a wall, tabletop, or other location remote from the modular furniture assembly, (iii) location of one or more speakers of the speaker system (430) within the modular furniture assembly, such as inclusion of additional satellite speakers and/or subwoofers, and (iv) combinations and/or modifications thereof. Controller or amplifier 436 can be operable to tune speaker system 430 as a whole, or to tune each individual speaker 432 separately, or both. By incorporating the tuning module within amplifier 436, speaker system 430 can be tuned irrespective of audio source 434.

Alternatively, the exemplary audio system 429 of FIG. 23B illustrates an audio source 434 having a tuning module 438 operable to tune speaker system 430 to compensate for sound loss through fabric by selection of a tuning profile from a plurality of tuning profiles 440 from a storage device 442 of audio source 434. Accordingly, a user input device 444 can be used to select a tuning profile 440 corresponding to a particular fabric, and tuning module 438 can apply the selected tuning profile 440 to adjust the equalization or frequency response of speaker system 430 at one or more target frequencies or frequency bands. By incorporating tuning module 438 within audio source 434, an existing speaker system 430 can be tuned without the need for a specialized amplifier or controller.

As illustrated in FIG. 23C, another alternative exemplary audio system 429 includes a speaker system 430 wherein first and second pre-amps 436*a*, 436*b* are associated with respective first and second speakers 432*a*, 432*b* to independently tune each speaker 432*a*, 432*b* for sound loss through fabric, thus enabling each speaker to be covered by a different upholstery fabric and still be tuned with a fabric-specific tuning profile. Accordingly, each pre-amp 436*a*, 436*b* includes a respective storage device 442*a*, 442*b* from which a tuning profile is selectable from a plurality of tuning profiles 440*a*, 440*b*. A user can thus select a tuning profile for each individual speaker 432 by use of user input device 444, such that the equalization of an audio signal received from audio source 434 by respective pre-amps 436*a*, 436*b* is adjusted prior to transmission to respective speakers 432*a*, 432*b*. In an embodiment, all speakers (e.g., 432*a*, 432*b*, etc.) within the system may have the same tuning profile 440 applied thereto (e.g., all speakers adjusted to compensate for sound emission through a given upholstery fabric). Alternatively, each speaker may have a different individual tuning profile 440 applied thereto when different fabrics are applied to cover each speaker.

Embodiments also include methods and systems for enabling speaker system 430 to be configured by a user to account for sound loss through any fabric covering speakers 432*a*, 432*b*, etc. of speaker system 430 without a predetermined tuning profile (i.e., methods allowing a user to create a new tuning profile corresponding to the actual fabric covering speakers 432*a*, 432*b*, etc.). For instance, FIGS.

23A-23C each depict a microphone 435 configured to receive and measure sounds emitted by speaker system 430. As illustrated, microphone 435 is in communication with at least one (or both) of user input device 444 or network 449. The microphone 435 is located outside of the fabric covering each speaker, such that microphone 435 is configured to receive and measure sound as heard as it passes though the fabric.

Such auto-tuning embodiments further includes using the user input device 444 as a computer system that is operable to apply the methods disclosed herein. The user input device 444 is in communication with network 449 and includes a necessary hardware and software for implementing the disclosed methods. Alternatively, a separate personal computer, a mobile device, and so forth could communicate with the microphone 435, either directly or via the network 449. As such, the user input device 444, for instance, is in communication with microphone 435 to receive audio measurements therefrom as speaker system 430 emits a preset sequence of audio tones stored within storage 442, or within a remote computer system communicating with the speaker system 430, or otherwise transmitted to speaker system 430 via audio source 434. Microphone 435 is operable to measure the tones emitted by speaker system 430 through the fabric. Having received the measurements from microphone 435, the user input device 444 is able to calculate adjustments to the equalization of speaker system 430 according to the methods disclosed herein to create a new tuning profile 440 and communicate with tuning module 438 to store the new tuning profile 140 within storage 442 and to implement the tuning profile to adjust the equalization of each speaker 432*a*, 432*b*, etc. of speaker system 430. It will be understood that a separate computer system 445 could apply the methods disclosed herein, including the auto-tuning using the microphone 435.

The schematic illustration of portions of the audio systems described here can be considered as representations of functional modules or components to perform particular operations. Generally, the operation modules, controllers, systems, etc. described herein may refer to software objects or routines that execute on a special purpose processing device to perform a certain function or group of functions. In at least some instances, a hardware processor is provided that is operable to carry out executable instructions for performing a method or process, such as the methods and processes disclosed herein. It is contemplated that implementations in hardware or a combination of software and hardware are possible. For instance, the controllers, modules, systems, etc. described herein may include the use of computer hardware or software modules. Such hardware and software modules or structures may include a processor and computer storage media carrying instructions that, when executed by the processor and/or caused to be executed by the processor, perform any one or more of the methods disclosed herein, or any part(s) of any method disclosed. By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

The functionality and operation of the controller/amplifier, user input device, audio source, speaker system, audio system, and other structures and components described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Optionally, while the user input device 444 and audio source 434 are illustrated as communicating directly with the controller/amplifier 136 and/or the speaker system 430 as illustrated in FIGS. 23A-23C, any of the structures described herein can communication and deliver signals between or to other structures via a network 449. A "network," like network 449, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The controller/amplifier 136, the user device 444, the audio source 434, the microphone 435, the speaker system 430, and the computer system 445 can include one or more communication channels that are used to communicate with the network 449. Transmission media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Figure 24:
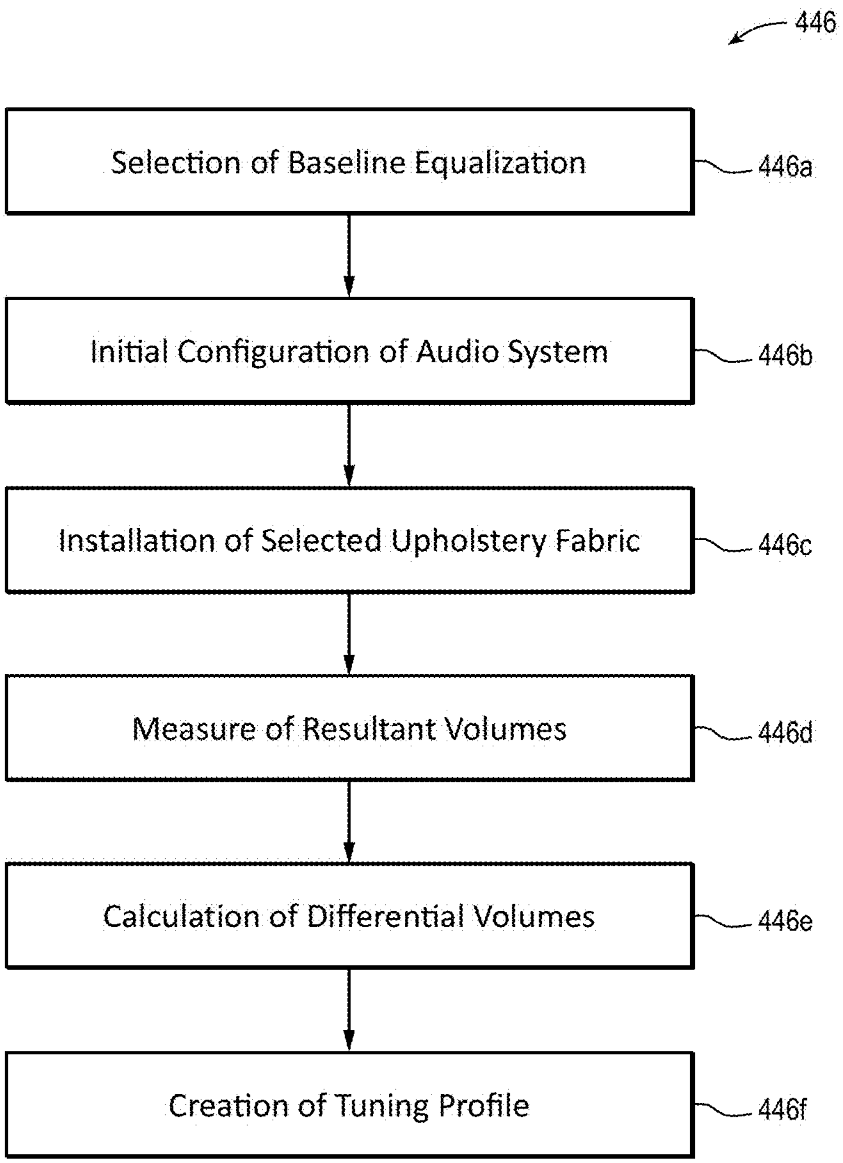
FIG. 24 illustrates a flowchart of a method of the present invention for acoustically correcting sound loss through fabric.

FIG. 24 illustrates a flowchart of a method 446 of the present invention for acoustically correcting sound loss through fabric. More specifically, method 446 includes various acts for creating a tuning profile operable to tune a speaker to compensate for sound loss through a selected upholstery fabric. By way of example (but not limitation), such a method may be performed by a manufacturer or other provider of systems such as those described herein. The method can be performed, for example, by any of the audio systems illustrated in FIGS. 23A-23C.

Method 446 begins with act 446*a* of selecting a baseline equalization of one or more audio frequencies for a speaker of an audio system, such as the audio systems illustrated in FIGS. 23A-23C. Such a baseline equalization may correspond to a desired frequency response curve or, alternatively, may correspond to the unaltered frequency response of a given speaker system at a selected volume level. Embodiments may include virtually any baseline equalization that enables measurement of the volume of each target frequency or frequency band as the speaker emits sound through the fabric for which the speaker is to be tuned. In other words, the volume of each target frequency within the selected baseline equalization needs to be sufficiently high to enable the proceeding method steps to be performed accurately.

As a non-limiting example, baseline decibel levels for each target frequency or frequency band of a baseline equalization can be between about 40 decibels or less, 60 decibels or less, 70 decibels or less, 90 decibels or less, 100 decibels or less, 120 decibels or less, or 130 decibels or less. Stated another way, the baseline equalization can be based upon baseline decibel levels from about 40 decibels to about 130 decibels, from about 60 decibels to about 120 decibels, or from about 70 decibels to about 100 decibels. Further, the baseline decibel levels of each target frequency or frequency band can be adjusted if it is found that the previously selected decibel level is too low to be heard or detected by a microphone, such as microphone 435, as the sound passes through the selected fabric. Further still, methods as disclosed herein may be performed at a variety of baseline decibel levels to determine accurate adjustments to the baseline equalization at each selected decibel level.

In act 446*b*, the audio system is configured to emit each of the one or more target frequencies or frequency bands from the speaker at an actual volume according to the selected baseline equalization. For example, for a frequency range of about 20 Hz to about 21 kHz, the frequency range can include up to 3, up to 5, up to 10, up to 31 target frequencies, or up to one target frequency for each frequency of the range so that for a range from 0 Hz to about 21 kHz there can be 21,000 target frequencies. Stated another way, the full frequency range could be adjusted at each frequency as would be characterized by a continuous equation, or through a step function as would result in bands. A particular frequency range can be divided into a number of frequency bands, such as about 1 to about 21000 target frequency bands, about 1 to about 31 target frequency bands, about 2 to about 20 target frequency bands, about 3 to about 15 target frequency bands, or from about 5 to about 10 target frequency bands. More specifically, as an example only, the following 10 target frequencies can be selected for adjustment: about 32 Hz, about 63 Hz, about 125 Hz, about 250 Hz, about 500 Hz, about 1 kHz, about 2 kHz, about 4 kHz, about 8 kHz, and about 16 kHz. The target frequencies can also be implemented as frequency bands, such as, for example, the following 10 frequency bands, as provided in Table 1: about 20 Hz to about 49 Hz, about 50 Hz to about 99 Hz, about 100 Hz to about 199 Hz, about 200 Hz to about 399 Hz, about 400 Hz to about 999 Hz, about 1 kHz to about 1.9 kHz, about 2 kHz to about 3.9 kHz, about 4 kHz to about 7.9 kHz, about 8 kHz to about 15.9 kHz, and about 16 kHz to about 21 kHz. One skilled in the art should appreciated that adjustment of target frequencies or frequency bands can be implemented by a variety of devices currently available, such as a parametric equalizer, a graphical equalizer, a semi-graphical equalizer, a custom designed equalizer, and so forth.

After the audio system has been configured according to the selected baseline configuration, act 146*c* includes covering the speaker with a selected upholstery fabric. Preferably, the selected upholstery fabric is either the same upholstery fabric as or substantially similar in fabric type, density, thickness, and a weight to an upholstery fabric intended to be used to cover a speaker system product, such as an audio-enhanced furniture assembly, during use.

With the speaker covered by the selected upholstery fabric, act 146*d* includes activating the audio system and measuring a resultant volume of each of the one or more target frequencies as the speaker emits sound through the selected upholstery fabric. The resultant volume of the one or more target frequencies will differ based on the fabrics used to cover the speaker, with the resulting frequency response affected differently, depending at least one of, for example, fabric type, density, thickness, or weight. For example, one fabric may significantly affect certain frequencies while having only a nominal or substantially no effect on others, and an alternative fabric may affect different frequencies by varying amounts, as discussed further herein.

At act 446*e*, a differential volume is calculated between the actual volume of each of the one or more target frequencies from act 446*b* and the resultant volume of each of the one or more target frequencies measured in act 446*d*. These differential volumes can be calculated for any number of audio frequencies, preferably at least for each audio frequency or frequency band that is adjustable by the audio system. When the audio system emits target frequencies, in one example configuration, ranging from about 20 Hz to about 21 kHz, with a baseline ranging from about 70 dB to about 100 dB over the range of about 20 Hz to about 21 kHz, the compensation values can be up to about 25 dB for each of the one or more adjusted frequency bands, with the adjusted frequency bands having a band width of about 1 Hz to about 4000 Hz, from about 2 Hz to about 2000 Hz, from about 3 Hz to about 1000 Hz, from about 4 Hz to about 500 Hz, from about 5 Hz to about 200 Hz, from about 5 Hz to about 100 Hz, from about 5 Hz to about 50 Hz, combinations and/or modification thereof, or some other band width for the selected target frequency or target frequency band. Stated another way, the compensation values can range from about 1 dB to about 25 dB when compensation of a particular frequency band occurs for a particular fabric during tuning. Alternatively, the compensation values can range from about 1 dB to about 30 dB, from about 2 dB to about 21 dB, from about 3 dB to about 16 dB, from about 1 dB to about 21 dB, or from about 1 dB to about 16 dB.

In other examples, the differential volumes can be, as provided in Table 2, up to about 2 dB, about 4 dB, or about 5 dB for a target frequency of about 32 Hz or a frequency band of about 20 Hz to about 49 Hz; up to about 1 dB, about 4 dB, or about 5 dB for a target frequency of about 63 Hz or a frequency band of about 50 Hz to about 99 Hz; up to about 3 dB, about 4 dB, or about 5 dB for a target frequency of about 125 Hz or a frequency band of about 100 Hz to about 199 Hz; up to about 1 dB, about 4 dB, or about 5 dB for a target frequency of about 250 Hz or a frequency band of about 199 Hz to about 399 Hz; up to about 1 dB, about 4 dB, or about 5 dB for a target frequency of about 500 Hz or a frequency band of about 400 Hz to about 999 Hz; up to about 3 dB, about 5 dB, or about 7 dB for a target frequency of about 1 kHz or a frequency band of about 1 kHz to about 1.9 kHz; up to about 8 dB, about 10 dB, or about 12 dB for a target frequency of about 2 kHz or a frequency band of about 2 kHz to about 3.9 kHz; up to about 11 dB, about 14 dB, or about 16 dB for a target frequency of about 4 kHz or a frequency band of about 4 kHz to about 7.9 kHz; up to about 15 dB, about 18 dB, or about 20 dB for a target frequency of about 8 kHz or a frequency band of about 8 kHz to about 15.9 kHz; and up to about 16 dB, about 21 dB, or about 25 dB for a target frequency of about 16 kHz or a frequency band of about 16 kHz to about 21 kHz. It is to be understood that the foregoing volume adjustments include lower magnitude adjustments below the presented upper limit, such as, for example, increasing the volume of each target frequency or frequency band expressed above by a magnitude from about 1 decibel to the presented maximum number of decibels.

The foregoing adjustments are provided as examples and are not intended to limit the scope of the present disclosure. For instance, while certain differential volumes are provided in each of Examples 1-3, it will be understood that any differential volumes from any examples can be combined together. For instance, any differential volumes of Example 1 can be combined with any differential volumes of either or both of Example 2 and 3. Additionally, any differential volumes of Example 2 can be combined with any differential volumes of either or both of Example 1 and 3. Additionally, any differential volumes of Example 3 can be combined with any differential volumes of either or both of Example 1 and 2.

TABLE 2

Frequency Ranges vs Differential Volumes (dB)

| | 20-49 Hz | 50-99 Hz | 100-199 Hz | 200-399 Hz | 400-999 Hz | 1000-1999 Hz | 2-3.99 kHz | 4.00-7.99 kHz | 8.00-15.99 kHz | 16.00-21 kHz |
|---|---|---|---|---|---|---|---|---|---|---|
| Example 1 | about 2 | about 1 | about 3 | about 1 | about 1 | about 3 | about 8 | about 11 | about 15 | about 16 |
| Example 2 | about 4 | about 4 | about 4 | about 4 | about 4 | about 5 | about 10 | about 14 | about 18 | about 21 |
| Example 3 | about 5 | about 5 | about 5 | about 5 | about 5 | about 7 | about 12 | about 16 | about 20 | about 25 |

Finally, in act 446*f*, the audio system is reconfigured to compensate for sound loss through the selected upholstery fabric by adjusting the actual volume of each of the one or more target frequencies or frequency bands emitted by the speaker and adjustable by the audio system by the corresponding calculated differential volume. As illustrated in Table 2, some embodiments include adjustments to higher frequencies (e.g., frequencies around 1 kHz or higher) that are greater in magnitude than adjustments made to lower frequencies. The exact magnitude of adjustment to each target frequency or frequency range depends on the magnitude of volume that is attenuated (i.e., reduced) by the particular fabric covering the speaker.

Method 446 may also include creation of a tuning profile corresponding to the selected upholstery fabric, such that the tuning profile may be implemented to tune any speaker covered by a fabric identical or similar to the selected upholstery fabric to compensate for sound loss through the upholstery fabric. The tuning profile created may include a fabric identifier and the calculated differential volume of each of the one or more target frequencies or frequency bands as obtained by methods of the present disclosure. Alternatively, the tuning profile may include a fabric identifier and ratios of the differential volume and the baseline volume to allow for linear adjustment of equalization as the overall volume level of the speaker is altered by a user. Also, differential volumes and/or ratios may be calculated at varying levels of overall volume by repeating method 146 for each of the various levels of overall volume, thus creating a stepwise volume adjustment profile. The calculated differential volumes or volume ratios of a tuning profile can thus be used to tune a speaker or speaker system by adjusting the actual volume of the one or more frequencies for which a calculated differential volume is provided.

Additional tuning profiles can also be created using methods of the present disclosure, each tuning profile corresponding to an additional upholstery fabric. For instance, during act 446*c* of method 446, the selected upholstery fabric may be replaced with each additional upholstery fabric in turn, then the remaining acts carried out for each additional upholstery fabric to create a corresponding tuning profile.

Accordingly, a speaker mounted within a furniture assembly can be tuned according to any of the tuning profiles, such as tuning profiles 440, 440*a*, 440*b* (FIGS. 4A-4C) created by selecting the tuning profile corresponding to the particular upholstery fabric covering the mounted speaker, those tuning profiles 440, 440*a*, 440*b*, being stored in a storage 442, 442*a*, 442*b* as illustrated in FIGS. 23A-23C. Application of the tuning profile can be achieved, for example, via a speaker controller 436 configured to control one or more speakers of the furniture assembly or by adjusting the output of an audio source 434. The speaker controller can include any known means for tuning the audio output of a speaker or system of speakers, such as but not limited to a center console associated with the speaker system, individual pre-amps associated with each speaker, a programmable audio output source, and so forth.

Figure 25:
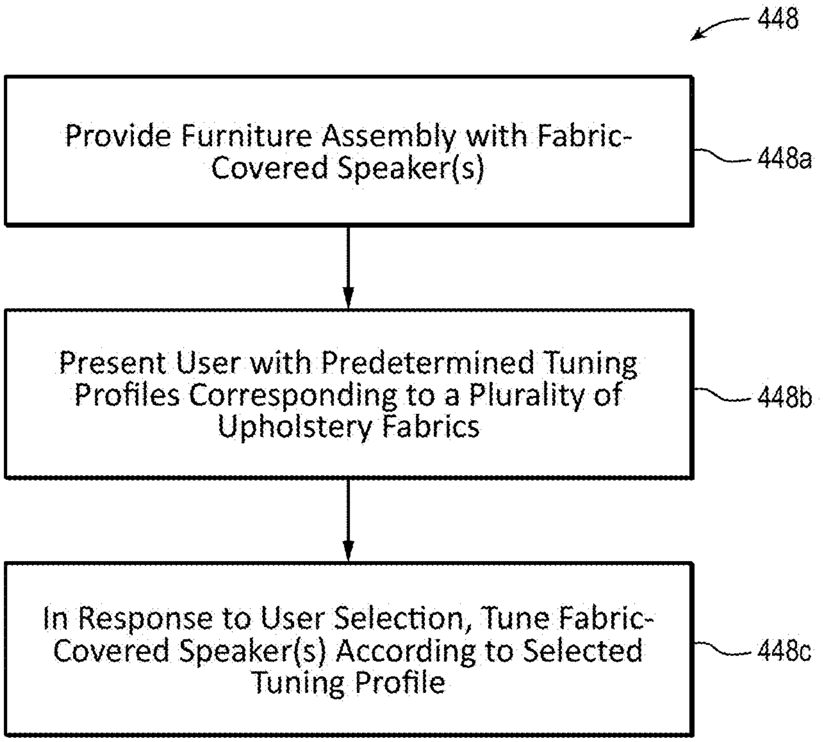
FIG. 25 illustrates a flowchart of a method of the present invention for tuning an audio-enhanced modular furniture system to compensate for sound loss through fabric.

FIG. 25 illustrates a flowchart of a method 448 for incorporating tuning profiles, such as those obtained by method 446, to tune an audio-enhanced modular furniture system, such as but not limited to those illustrated in FIGS. 20-22D, to compensate for sound loss through fabric. Such a method may be performed, e.g., by an end user, by the manufacturer, or other furniture provider. Act 148*a* of method 148 includes providing an assemble-able modular furniture assembly with at least one fabric-covered speaker controlled by a speaker controller, such as but not limited to a dedicated console or amplifier, a pre-amp or other controller individually dedicated to the at least one fabric-covered speaker, or an audio source configured to control the frequency response of the at least one fabric-covered speaker.

The assemble-able modular furniture assembly, for example, can include one or more bases, a plurality of upright members configured to attach to the one or more bases, and a speaker system, wherein at least one of upright members is an audio-enhanced upright member, such as the modular furniture assemblies illustrated in FIGS. 20-22D. The speaker system can include at least one speaker mounted within the first audio-enhanced upright member, the at least one speaker being hidden from view by a first upholstery fabric that covers the first audio-enhanced upright member.

According to act 448*b*, a plurality of predetermined tuning profiles is presented, each corresponding to an upholstery fabric and each operable by the speaker controller to adjust a volume of one or more target frequencies or frequency bands emitted by the at least one fabric-covered speaker to compensate for sound being emitted from the at least one speaker through the upholstery fabric.

In response to selection of a tuning profile, act 448*c* includes tuning the at least one fabric-covered speaker via the speaker controller to adjust an actual volume of one or more target frequencies or frequency bands by a magnitude approximately equal to a calculated differential volume included in the selected tuning profile. The calculated differential volume of each of the one or more audio frequencies is equal to the difference between: (i) a baseline volume corresponding to sound emitted from the at least one speaker or a similar speaker, and (ii) a resultant volume corresponding to sound emitted from the at least one speaker or similar speaker when covered with the first upholstery fabric or a similar fabric. Tuning of the at least one speaker can be accomplished by any known means of adjusting the equalization of audio frequencies of a speaker or speaker system, such as but not limited to the means discussed in connection with FIGS. 23A-23C herein.

One skilled in the art should appreciate that the disclosed methods can be performed under various circumstances. For instance, tuning profiles can be predetermined for one or more selected fabrics during design or development of an audio system, such as an audio-enhanced furniture assembly. Also, the plurality of tuning profiles can be presented and selectable via a user interface on a mobile device, a remote-control device, or a dedicated console associated with the speaker system. Alternatively, the furniture assembly can be provided to the consumer with a tuning profile already selected based on the upholstery fabric selected by the user when ordering the furniture. In at least one embodiment, the disclosed methods can be applied to an existing speaker, audio system, or speaker system having speakers at least partially covered in fabric to improve the sound quality of the existing system. As discussed herein, a user may be provided with means, such as a microphone or software capable of operating a microphone of a mobile device, for measuring the actual volume emitted through the fabric covering one or more speakers to determine a resultant volume of one or more target frequencies, calculate a differential volume for each target frequency, and reconfigure the existing system to adjust the actual volume of each target frequency, or corresponding frequency band, as emitted by each speaker to compensate for sound loss through the fabric.

Additionally, some embodiments include an assemble-able modular furniture assembly with a plurality of speakers, each speaker being separately tunable by separate selection of one of the pluralities of tuning profiles. In some embodiments, a user can select a tuning profile from the plurality of tuning profiles via a dedicated console, a remote controller, or a user interface of a mobile device or computer system, for the speaker system as a whole or for each individual speaker, depending on the placement of fabrics relative to the speakers included with the assemble-able modular furniture assembly.

Referring now to FIG. 26, an illustrative table of audio frequency adjustments for acoustically correcting sound loss through fabric according to embodiments of the present invention is provided. The illustrated table may be created for any fabric using the methods described herein, such as method 446 discussed in connection with FIG. 24 herein. For example, any number of target audio frequencies F1-Fn can be selected for adjustment, e.g., those frequencies typically adjustable by an equalizer function of equalization systems currently available.

These frequencies F1-Fn can include, for example, 32 Hz, 63 Hz, 125 Hz, 250 Hz, 500 Hz, 1 kHz, 2 kHz, 4 kHz, 6 kHz, and 16 kHz. These frequencies F1-Fn can include, for example, any frequencies ranging from about 20 Hz to about 21 kHz, with one or more adjustable frequencies from 20 Hz to 49 Hz, with one or more adjustable frequencies from 50 Hz to 99 Hz, with one or more adjustable frequencies from 100 Hz to 199 Hz, with one or more frequencies from 200 Hz to 399 Hz, with one or more frequencies from 400 Hz to 399 Hz, with one or more frequencies from 1 kHz to 1.999 kHz, with one or more frequencies from 2 kHz to 3.999 kHz, with one or more frequencies from 4 kHz to 7.999 kHz, with one or more frequencies from 8 kHz to 15.999 kHz, and with one or more frequencies from 16 kHz to 21 kHz. Alternatively, one or more of the foregoing frequency ranges can be targeted for adjustment using, for example, a graphical equalizer or similar device. Also, one skilled in the art should appreciate that the total range of frequencies selected for adjustment is not limited to between 20 Hz and 21 kHz but can be expanded to include any lower or higher frequencies if so desired.

A baseline equalization of the selected audio frequencies F1-Fn can then be selected, the baseline equalization including actual desired volumes V1-Vn corresponding to the selected audio frequencies F1-Fn (e.g., a desired frequency response curve for the speaker). Embodiments may include virtually any baseline equalization that enables measurement of the volume of each target frequency or frequency band as the speaker emits sound through the fabric for which the speaker is to be tuned. In other words, the volume of each target frequency within the selected baseline equalization needs to be sufficiently high to enable the proceeding method steps to be performed accurately.

Once the baseline equalization frequencies F1-Fn and the actual desired volumes V1-Vn are determined, resultant volumes V1_fabric1-Vn fabric1 corresponding to sound emitted from a speaker through a first fabric (fabric1) can be determined according to methods of the present disclosure, and corresponding differential volumes ÄV1-ÄVn can be calculated and stored as a tuning profile corresponding to the first fabric, such that the calculated differential volumes ÄV1-ÄVn may be used to adjust the equalization of a speaker (the speaker's frequency response) covered by the first fabric, or a fabric similar thereto, to compensate for sound loss through the fabric. The disclosed methods can be performed for any number of fabrics to create corresponding tuning profiles in this manner. The differential volumes ÄV1-ÄVn vary based upon the particular audio frequencies F1-Fn being tested. As an alternative to adjusting discrete target frequencies F1-Fn (e.g., by parametric equalization at each target frequency F1-Fn), the differential volumes ÄV1-ÄVn can be applied to frequency bands that respectively include target frequencies F1-Fn (e.g., by graphical equalization at each respective frequency band).

Adjustments to the equalization or frequency response of a speaker can alternatively be implemented as a ratio of the calculated differential volume and the respective baseline volume, such that the equalization adjustment depends on the volume level of the speaker as selected by a user.

For example, and as illustrated in Table 3, each audio frequency can be adjusted by a multiplication factor or ratio up to about 1.03, about 1.06, or about 1.07 for a target frequency of about 32 Hz or a frequency band of about 20 Hz to about 49 Hz; up to about 1.01, about 1.05, or about 1.06 for a target frequency of about 63 Hz or a frequency band of about 50 Hz to about 99 Hz; up to about 1.03, about 1.04, or about 1.05 for a target frequency of about 125 Hz or a frequency band of about 100 Hz to about 199 Hz; up to about 1.01, about 1.04, or about 1.05 for a target frequency of about 250 Hz or a frequency band of about 199 Hz to about 399 Hz; up to about 1.01, about 1.04, or about 1.06 for a target frequency of about 500 Hz or a frequency band of about 400 Hz to about 999 Hz; up to about 1.03, about 1.06, or about 1.08 for a target frequency of about 1 kHz or a frequency band of about 1 kHz to about 1.9 kHz; up to about 1.09, about 1.11, or about 1.13 for a target frequency of about 2 kHz or a frequency band of about 2 kHz to about 3.9 kHz; up to about 1.12, about 1.16, or about 1.18 for a target frequency of about 4 kHz or a frequency band of about 4 kHz to about 7.9 kHz; up to about 1.17, about 1.21, or about 1.23 for a target frequency of about 8 kHz or a frequency band of about 8 kHz to about 15.9 kHz; and up to about 1.19, about 1.25, or about 1.30 for a target frequency of about 16 kHz or a frequency band of about 16 kHz to about 21 kHz. It is to be understood that the foregoing volume adjustments include lower magnitude adjustments below the presented upper limit, such as, for example, multiplying the volume of each target frequency or frequency band expressed above by a factor from about 1 to the presented maximum multiplication factor. Also, the foregoing adjustments ratios are provided as examples and are not intended to limit the scope of the present disclosure.

For instance, while certain multiplication factors or ratios are provided in each of Examples 1-3, it will be understood that any multiplication factors or ratios from any examples can be combined together. For instance, any multiplication factor or ratio of Example 1 can be combined with any multiplication factor or ratio of either or both of Example 2 and 3. Additionally, any multiplication factor or ratio of Example 2 can be combined with any multiplication factor or ratio of either or both of Example 1 and 3. Additionally, any multiplication factor or ratio of Example 3 can be combined with any multiplication factor or ratio of either or both of Example 1 and 2.

about 1 dB to about 8 dB, from about 1 dB to about 7 dB, from about 1 dB to about 6 dB, from about 1 dB to about 5 dB, from about 2 dB to about 7 dB, from about 2 dB to about 6 dB, from about 2 dB to about 5 dB, from about 2 dB to about 4 dB, or from about 2 dB to about 3 dB.

Alternatively, speaker tuning can be accomplished by multiplication of one or more audio frequencies by a predetermined ratio or multiplication factor. For instance, each audio frequency can be adjusted by a multiplication factor ranging between about 1 and about 1.235 for speakers covered by leather, between about 1 and about 1.115 for speakers covered by polyester, between about 1 and about 1.063 for speakers covered by chenille or velvet, and between about 1 and about 1.037 for speakers covered by tweed or linen. One skilled in the art should appreciate that the foregoing values are provided as an example and are specific to example materials having a particular composition, density, thickness, and weight. As disclosed herein, specific adjustment values are preferably calculated on an individual basis for each upholstery fabric intended to cover a speaker or speaker system to ensure optimal sound quality as the sound is emitted though the selected upholstery fabric.

Figure 28:
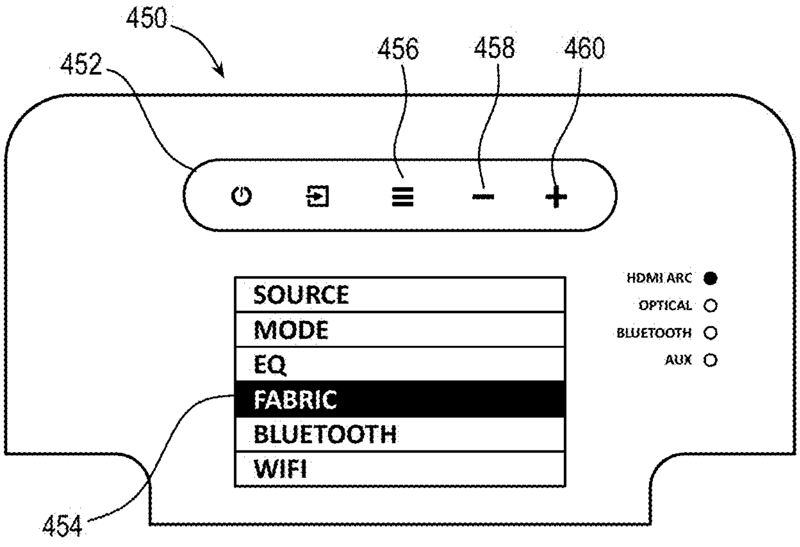
FIG. 28 illustrates a planar view of a control console of the present invention.

Referring now to FIG. 28, embodiments can include a control console dedicated to a speaker system and configured to enable a user to select a tuning profile from a plurality of tuning profiles, according to the present disclosure. The control console can be one configuration of the user input device 444, the audio source 434 and/or the computer system 435 of FIGS. 23A-23C. As illustrated,

TABLE 3

Frequency Ranges vs Multiplication Factor or Ratio

| | 20-49 Hz | 50-99 Hz | 100-199 Hz | 200-399 Hz | 400-999 Hz | 1000-1999 Hz | 2-3.99 kHz | 4.00-7.99 kHz | 8.00-15.99 kHz | 16.00-21 kHz |
|---|---|---|---|---|---|---|---|---|---|---|
| Example 1 | 1.03 | 1.01 | 1.03 | 1.01 | 1.01 | 1.03 | 1.09 | 1.12 | 1.17 | 1.19 |
| Example 2 | 1.06 | 1.05 | 1.04 | 1.04 | 1.04 | 1.06 | 1.11 | 1.16 | 1.21 | 1.25 |
| Example 3 | 1.07 | 1.06 | 1.05 | 1.05 | 1.06 | 1.08 | 1.13 | 1.18 | 1.23 | 1.30 |

Audio frequency adjustments for acoustically correcting sound loss through a variety of exemplary upholstery fabrics are discussed herein. Specifically, FIGS. 8A-8H include target audio frequency adjustments corresponding to upholstery fabrics including polyester (FIG. 8A), chenille (FIG. 8B), tweed (FIG. 8C), linen (FIG. 8D), velvet (FIG. 8E), leather (FIG. 8F), polyester linen (FIG. 8G), and faux fur (FIG. H), respectively. More specifically, the "EQ compensation" values provided in each table can be implemented FIGS. 8A-8H show tables of target by adjusting the actual volume of each target frequency (or a frequency band that includes the target frequency) as it is emitted from a speaker covered in the upholstery fabric corresponding to the respective table or tuning profile. One skilled in the art should appreciate that the boosting of audio frequencies provided herein specifically correspond to exemplary fabric materials of a particular composition, density, thickness, or weight, and to the specific baseline equalization presented, and that audio frequencies corresponding to virtually any material and/or baseline equalization can be calculated by the methods and systems described herein.

As illustrated in FIG. 8A-8E, the "EQ compensation" values below about 1000 Hz can range from about 1 dB to about 5 dB, from about 1 dB to about 4 dB, from about 1 dB to about 3 dB, or from about 1 dB to about 2 dB for a baseline equalization from about 70 dB to about 100 dB. More generally, the EQ compensation" values can be from control console 450 includes a series of buttons 452 and a display 454, thus providing a user with means for selecting a tuning profile stored within a storage unit of the audio system and implemented by a tuning module, as illustrated in any of FIGS. 23A-23C. For example, a user can select menu button 456 and use navigation buttons 458 and 460 to select a tuning profile corresponding to any fabric for which a tuning profile is provided.

While display 454 can be configured as a liquid crystal display (LCD), alternative displays can be implemented, such as but not limited to a series of light-emitting diodes (LED) corresponding to each available tuning profile. Alternatively, the user can be provided with instructions for selecting, deselecting, and/or changing the tuning profile via a series of button selections, thus foregoing the need for an LCD or other display on control console 450.

Figure 29:
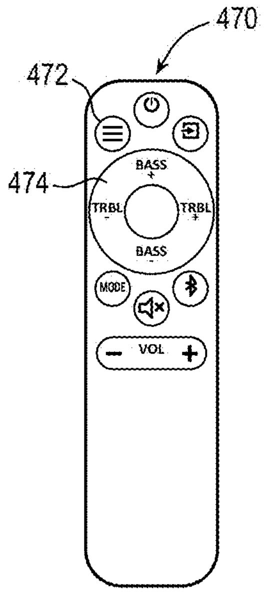
FIG. 29 illustrates a planar view of a remote control device of the present invention.

FIG. 29 illustrates an embodiment of a remote control device 470. The remote control device 470 can be one configuration of the user input device 444 or audio source 434 of FIGS. 23A-23C. Remote control device 470 can be operable to interact with a controller of an audio system using menu button 472 and navigation buttons 474. For example, remote control device 470 can be operable to interact with control console 450 via a wire or wireless connection, to assist a user in selection of a tuning profile for the audio system, as well as adjustment of other system settings. As an alternative example, remote control device

470 can be operable to interact with an interface programmed to display on a television screen or other display via a computer system included within control console 450.

Figure 30A:
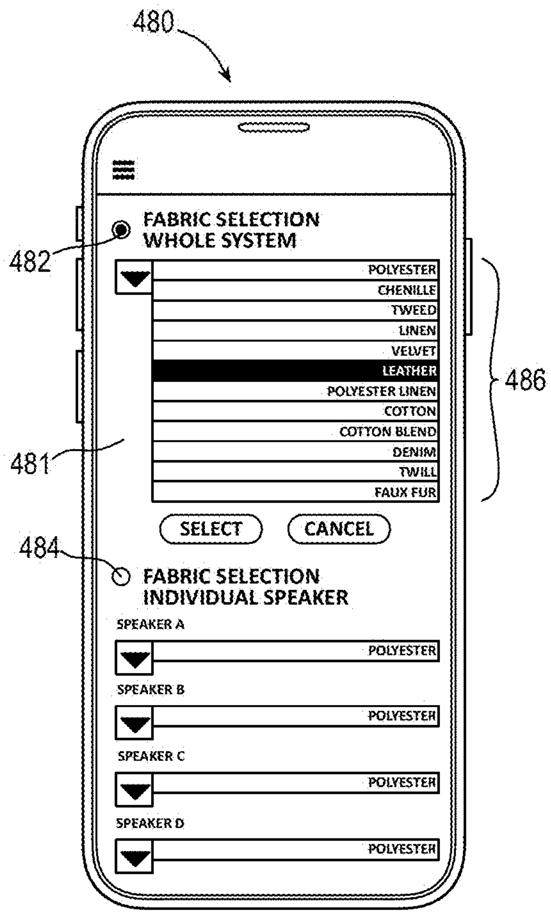
FIG. 30A illustrates a planar view of a mobile device displaying a user control interface of the present invention.
Figure 30B:
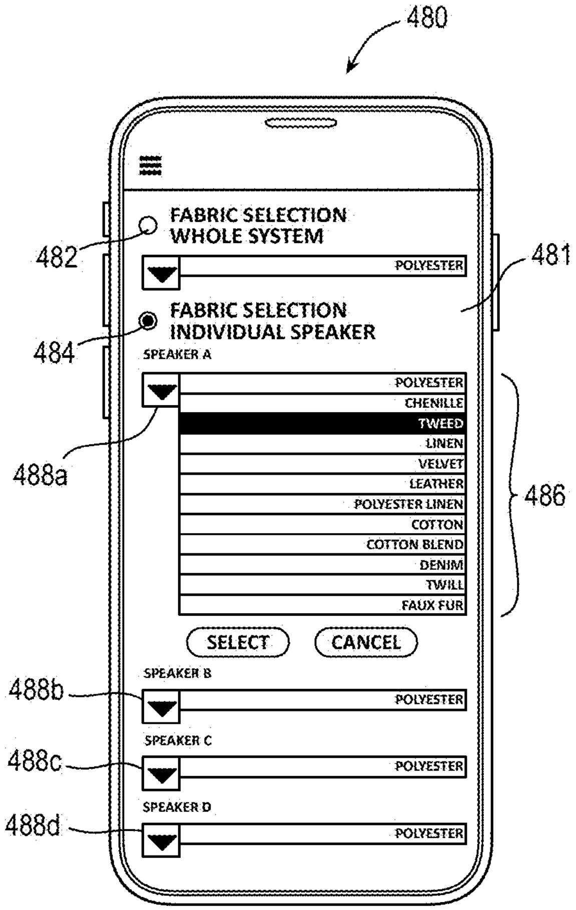
FIG. 30B illustrates a planar view of a mobile device displaying an additional feature of the user control interface of FIG. 30A.

FIGS. 30A-30B illustrate an exemplary mobile device 480 displaying an embodiment of a user control interface or graphical user interface. The mobile device 480 can be one configuration of the user input device 444, the audio source 434, and/or the computer system 445 of FIGS. 23A-23C. Embodiments of a mobile device application can be operable to control various functions of the audio system, such as input/output, volume, user-adjustable equalization, and selection of tuning profiles based on upholstery fabric. Mobile device 480 can be configured to connect to a system controller via wireless communication directly with the controller, via a network connection, or via a wired connection. One skilled in the art should appreciate that the user interface is not limited to mobile devices but can be implemented on any system or device having a user interface, such as a computer console, a television, and so forth.

As illustrated, mobile device 480 has been programmed to display various selectable options to a user through a graphical user interface 481, including selection 482 of a tuning profile based on upholstery fabric for a whole speaker system, and selection 484 of a tuning profile based on upholstery fabric for each individual speaker 488*a-d* of a speaker system. Selection 484 thus allows for use of different upholstery fabrics on different components of the speaker system, such as by covering different audio-enhanced members (e.g., upright members and/or bases) of a modular furniture assembly with different fabric covers. An exemplary list 486 of selectable upholstery fabrics is shown, allowing the user to select a tuning profile corresponding to any upholstery fabric listed.

When a user makes selection 482 for tuning of the whole system, a single drop down list 486 of fabrics are displayed for user selection. If the user selects the fabric leather (as shown in FIG. 30A), for example, the mobile device will transmit a signal to a receiver, amplifier, or other appropriate component of the audio system to implement a tuning profile specifically configured to compensate for sound loss through a leather upholstery fabric. If instead the user makes selection 484 for tuning each individual speaker 488*a-d*, a drop down list 486 is made available for each of speakers 488*a-d*, such that the user may select any of the listed fabrics for each speaker 488*a-d*. For instance, if the user selects the fabric tweed for speaker 488*a* (as shown in FIG. 30B), the mobile device will transmit a signal to a receiver, amplifier, or other appropriate component of the audio system to implement a tuning profile specifically configured to compensate for sound loss through a tweed upholstery fabric for speaker 488*a* only.

Embodiments of a tuning profile can include the information used to adjust the equalization or frequency response of the speaker to which the tuning profile is applied to compensate for sound loss through the upholstery fabric to which the tuning profile corresponds. For example, each tuning profile can include a fabric name or identification number and a plurality of target frequency or frequency band adjustments, such as the "EQ Compensation" decibel values disclosed in FIGS. 27A-H. Alternatively, adjustments can be included in various forms, such as but not limited to ratio or multiplication factors. Also, tuning profiles can include adjustment values, ratios, or factors corresponding to a variety of baseline volume levels, such that the magnitude of adjustment is varied as the user adjusts the output volume of the audio system.

Tuning Based on Furniture Configuration

In addition to tuning by adjusting the frequency response of the speaker to adjust for the particular upholstery material through which the sound is emitted (e.g., by boosting particular frequencies, etc.), tuning can also refer to other adjustments configured to improve the sound quality, e.g., by adjusting a sound delay setting, phase, or other parameter of the sound, to accommodate placement of the speaker within the room, e.g., when the components of a modular furniture system are uncoupled from one another, and reassembled, in a different configuration with a different configuration footprint shape (e.g., such as any of the various configurations shown in FIGS. 13C-13L, 14A-15K, or others). For example, when rearranging the bases and/or transverse members to form a different furniture assembly, a given speaker (e.g., left front, right front, left surround, right surround, etc.) may now be positioned at a different distance, location, or orientation as compared to a previous position, such that adjustments to sound delay, phase, volume of a given speaker, etc. could be advisable, to provide a high quality listening experience. The present systems contemplate such "tuning" adjustments, as well. Such adjustments can be made through any suitable control interface, e.g., an app on the user's smartphone, tablet, a remote control, or otherwise. The available controls can also allow changing of what channel signal (i.e., left surround channel, right surround channel, left front channel, or right front channel) is being sent to a given speaker, e.g., as described herein in conjunction with FIGS. 14D-14E and 15D-15E.

Figure 30C:
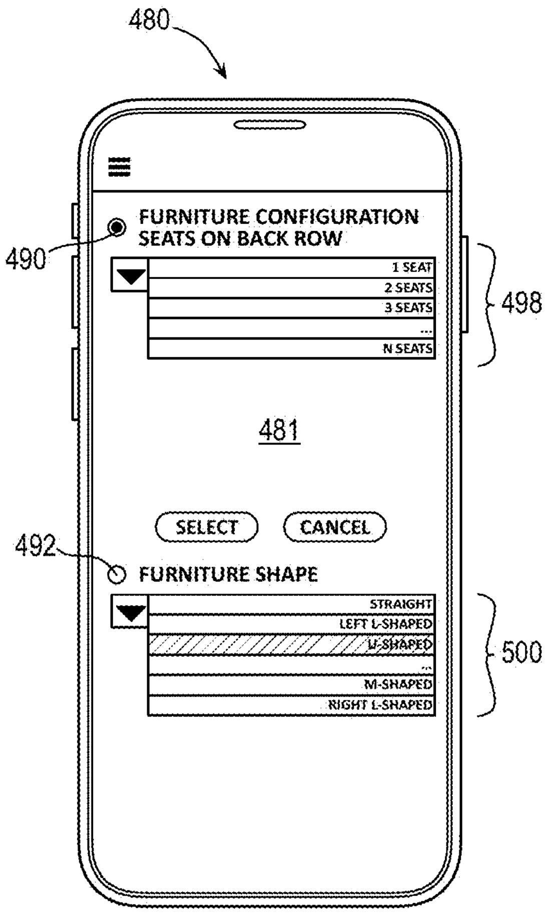
FIG. 30C illustrates a planar view of a mobile device displaying an additional feature of the user control interface of FIG. 30A.
Figure 30D:
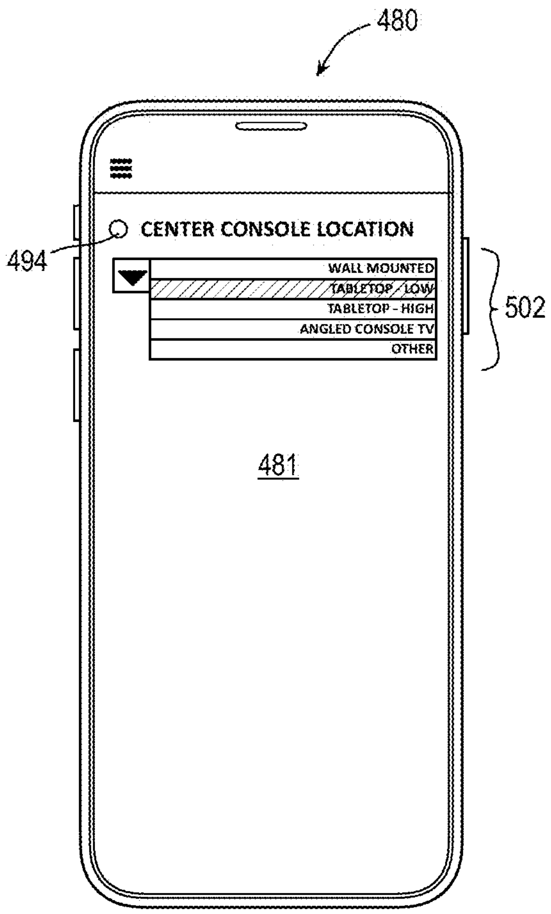
FIG. 30D illustrates a planar view of a mobile device displaying an additional feature of the user control interface of FIG. 30A.

FIGS. 30C-30D illustrate an exemplary mobile device 480 displaying an embodiment of a user control interface or graphical user interface 481. The mobile device 480 can be one configuration of the user input device 444, the audio source 434, and/or the computer system 445 of FIGS. 23A-23C. Embodiments of a mobile device application can be operable to control various functions of the audio system, such as input/output, volume, user-adjustable equalization, and selection of tuning profiles based on upholstery fabric, modular furniture assembly orientation or configuration footprint shape, and/or location of a center channel speaker or other speaker remote or spaced from the modular furniture assembly. Mobile device 480 can be configured to connect to a system controller via wireless communication directly with the controller, via a network connection, or via a wired connection. One skilled in the art should appreciate that the user interface is not limited to mobile devices but can be implemented on any system or device having a user interface, such as a computer console, a television, and so forth.

As illustrated, mobile device 480 has been programmed to display various selectable options to a user, including those discussed in reference to FIGS. 30A-30B and those illustrated in FIGS. 30C-30D. For instance, selection 490 allows selection of a tuning profile based upon a number of seats on a back row of the modular furniture assembly, selection 492 allows selection of a tuning profile based upon an orientation or configuration footprint shape of the modular furniture assembly, and selection 494 allows selection of a tuning profile based upon a location of the central channel 223 (FIG. 15A) or other speaker that is remote from the modular furniture assembly but forming part of the speaker system 430, or more generally the audio system 429 (FIG. 23A-23C). When a user makes selection 490 for tuning based upon the number of seats on a back row of the modular furniture, a single drop down list 498 of the number of seats in the back row of the modular furniture assembly is displayed for user selection. If the user selects the 3 seats (as shown in FIG. 30C), for example, the mobile device will transmit a signal to a receiver, amplifier, or other appropriate component of the audio system, such as the center console 223 (FIG. 15A) to implement a tuning profile specifically configured to compensate for sound for that number of seats.

When a user makes selection 492 for tuning based upon a configuration of the modular furniture assembly, a single drop down list 500 of an orientation or configuration footprint shape of the modular furniture assembly is displayed for user selection. If the user selects the U-shaped (as shown in FIG. 30C), for example, the mobile device will transmit a signal to a receiver, amplifier, or other appropriate component of the audio system, such as the center console 223 (FIG. 15A) to implement a tuning profile specifically configured to compensate for sound based upon the orientation or configuration footprint shape of the modular furniture assembly.

When a user makes selection 494 for tuning based upon a location or position of the center console 223 (FIG. 15A), a single drop down list 502 of the possible location or position orientation of the center console 223 (FIG. 15A) is displayed for user selection. If the user selects the Tabletop-low (as shown in FIG. 30D), for example, the mobile device will transmit a signal to a receiver, amplifier, or other appropriate component of the audio system, such as the center console 223 (FIG. 15A) to implement a tuning profile specifically configured to compensate for sound based upon the location or position of the center console 223 (FIG. 15A) in relation to the modular furniture assembly.

Embodiments of a tuning profile can include the information used to adjust the equalization or frequency response of the speaker to which the tuning profile is applied to compensate for sound loss through the upholstery fabric to which the tuning profile corresponds. For example, each tuning profile can include a fabric name or identification number and a plurality of target frequency or frequency band adjustments, such as the "EQ Compensation" decibel values disclosed in FIGS. 27A-H. Alternatively, adjustments can be included in various forms, such as but not limited to ratio or multiplication factors. Also, tuning profiles can include adjustment values, ratios, or factors corresponding to a variety of baseline volume levels, such that the magnitude of adjustment is varied as the user adjusts the output volume of the audio system.

Figure 31:
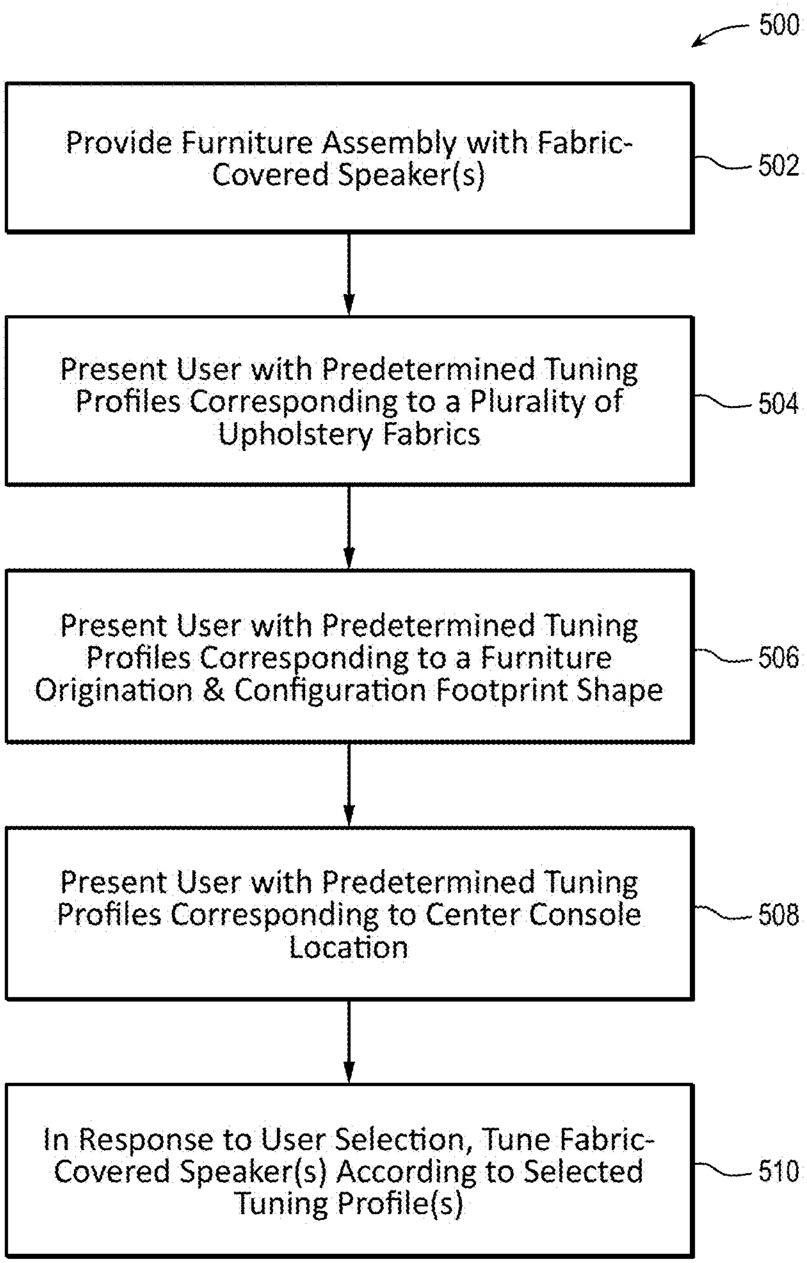
FIG. 31 illustrates a flowchart of a method of the present invention for tuning an audio-enhanced modular furniture system.

Turing to FIG. 31 illustrates a flowchart of a method 510 for incorporating tuning profiles, such as those obtained by methods described herein, to tune an audio-enhanced modular furniture system, such as but not limited to those illustrated in herein, to compensate for sound loss through fabric, accommodate for sound variations based, in part, from the orientation or configuration footprint shape of the modular furniture assembly and/or location of portions of the speaker system, and improve acoustic experience of users. Such a method may be performed, e.g., by an end user, by the manufacturer, or other provider or modular furniture assembly. Initially, the method includes providing an assemble-able modular furniture assembly with at least one fabric-covered speaker controlled by a speaker controller, such as but not limited to a center channel speaker, a console or amplifier, a pre-amp or other controller individually dedicated to the at least one fabric-covered speaker, or an audio source configured to control the frequency response of the at least one fabric-covered speaker (512).

The assemble-able modular furniture assembly, for example, can include one or more bases, a plurality of upright members configured to attach to the one or more bases, and a speaker system, wherein at least one of upright members is an audio-enhanced upright member, such as the modular furniture assemblies illustrated herein. The speaker system can include at least one speaker mounted within an audio-enhanced upright member, the at least one speaker being hidden from view by a first upholstery fabric that covers the first audio-enhanced upright member.

A user is presented with a plurality of predetermined tuning profiles corresponding to an upholstery fabric (514). Each tuning profile is operable to adjust or control a volume of one or more target frequencies or frequency bands emitted by the at least one fabric-covered speaker to compensate for sound being emitted from the at least one speaker through the upholstery fabric, and optionally the center channel speaker or other remote speakers.

A user is presented with a plurality of predetermined tuning profiles corresponding to an orientation or configuration footprint shape of the modular furniture assembly (516). Each tuning profile is operable to adjust or control a volume of one or more target frequencies or frequency bands emitted by the at least one fabric-covered speaker, and optionally the center channel speaker or other remote speakers, to compensate for sound being emitted from the at least one speaker. This can include allowing the user to select tuning profiles based upon a configuration footprint shape of the modular furniture assembly and/or a number of seats associated with a particular row of the modular furniture assembly.

A user is presented with a plurality of predetermined tuning profiles corresponding a location or position of the center console or other speaker (518). Each tuning profile is operable to adjust or control a volume of one or more target frequencies or frequency bands emitted by the at least one fabric-covered speaker to compensate for sound being emitted from the at least one speaker based upon the location of the or position of the center console or other speaker.

In response to selection of a tuning profile, the method includes tuning the at least one fabric-covered speaker, the center console, and other speakers via the speaker controller to adjust an actual volume of one or more target frequencies or frequency bands by a magnitude approximately equal to a calculated differential volume included in the selected tuning profile. With respect to the fabric covered speakers, the calculated differential volume of each of the one or more audio frequencies is equal to the difference between: (i) a baseline volume corresponding to sound emitted from the at least one speaker or a similar speaker, and (ii) a resultant volume corresponding to sound emitted from the at least one speaker or similar speaker when covered with the first upholstery fabric or a similar fabric. The calculated differential volume can also include differences between the baseline volume corresponding to sound emitted from the at least one speaker or a similar speaker and resultant volume corresponding to sound emitted from the at least one speaker or similar speaker based upon the configuration or shape of the modular furniture assembly and/or the location or position of the center channel speaker or other speaker. Tuning of the at least one speaker can be accomplished by any known means of adjusting the equalization of audio frequencies of a speaker or speaker system.

The tuning profiles selected through the mobile device 480, for instance, can be stacked or combined together to create a combined tuning profile for the specific setup for the audio-enhanced modular furniture assembly. For instance, the tuning profile used to control the audio system associated with the audio-enhanced modular furniture assembly can include a summation of the profiles from one or more of selections 482, 484, 490, 492, and 494. This allows the user to selectively choose which profiles to combine to achieve the desired sound quality for their particular audio-enhanced modular furniture assembly and room, home, office or another environment within which it is located.

One skilled in the art should appreciate that the disclosed methods can be performed under various circumstances. For instance, tuning profiles can be predetermined for one or more selected fabrics, audio-enhanced furniture assembly orientation or configuration footprint shape, and/or center channel speaker or speaker location or position during design or development of an audio system, such as an audio-enhanced furniture assembly. Also, the plurality of tuning profiles can be presented and selectable via a user interface on a mobile device, a remote-control device, or a dedicated console associated with the speaker system. Alternatively, the furniture assembly can be provided to the consumer with a tuning profile already selected based on a combination or one or more of the upholstery fabrics selected by the user when ordering the furniture, the pieces selected to form the furniture assembly, and/or purchase of the center channel speaker and other remote speakers. In at least one embodiment, the disclosed methods can be applied to an existing speaker, audio system, or speaker system having speakers at least partially covered in fabric to improve the sound quality of the existing system. As discussed herein, a user may be provided with means, such as a microphone or software capable of operating a microphone of a mobile device, for measuring the actual volume emitted through the fabric covering one or more speakers to determine a resultant volume of one or more target frequencies, calculate a differential volume for each target frequency, and reconfigure the existing system to adjust the actual volume of each target frequency, or corresponding frequency band, as emitted by each speaker to compensate for sound loss through the fabric, the orientation or configuration footprint shape of the modular furniture assembly, and/or the location or position of the center channel speaker.

Additionally, some embodiments include an assemble-able modular furniture assembly with a plurality of speakers, each speaker being separately tunable by separate selection of one of the pluralities of tuning profiles. In some embodiments, a user can select a tuning profile from the plurality of tuning profiles via a dedicated console, a remote controller, or a user interface of a mobile device or computer system, for the speaker system as a whole or for each individual speaker, depending on the placement of fabrics relative to the speakers included with the assemble-able modular furniture assembly, the orientation or configuration footprint shape of the modular furniture assembly, and/or the location or position of the center channel speaker.

Additional Modular Furniture Assemblies and Systems

Turning to FIGS. 32 to 58E, various alternate configurations of the modular furniture assemblies are depicted. The description of other modular furniture assemblies referenced herein, and subcomponents or elements thereof, is also applicable to the modular furniture assemblies in FIGS. 32 to 58E. Additionally, any of the various alternate configurations of the modular furniture assemblies depicted FIGS. 32 to 58E can incorporate or be operated using one or more tuning profiles as described herein to improve or enhance a user's experience with the modular furniture assemblies.

Figure 32:
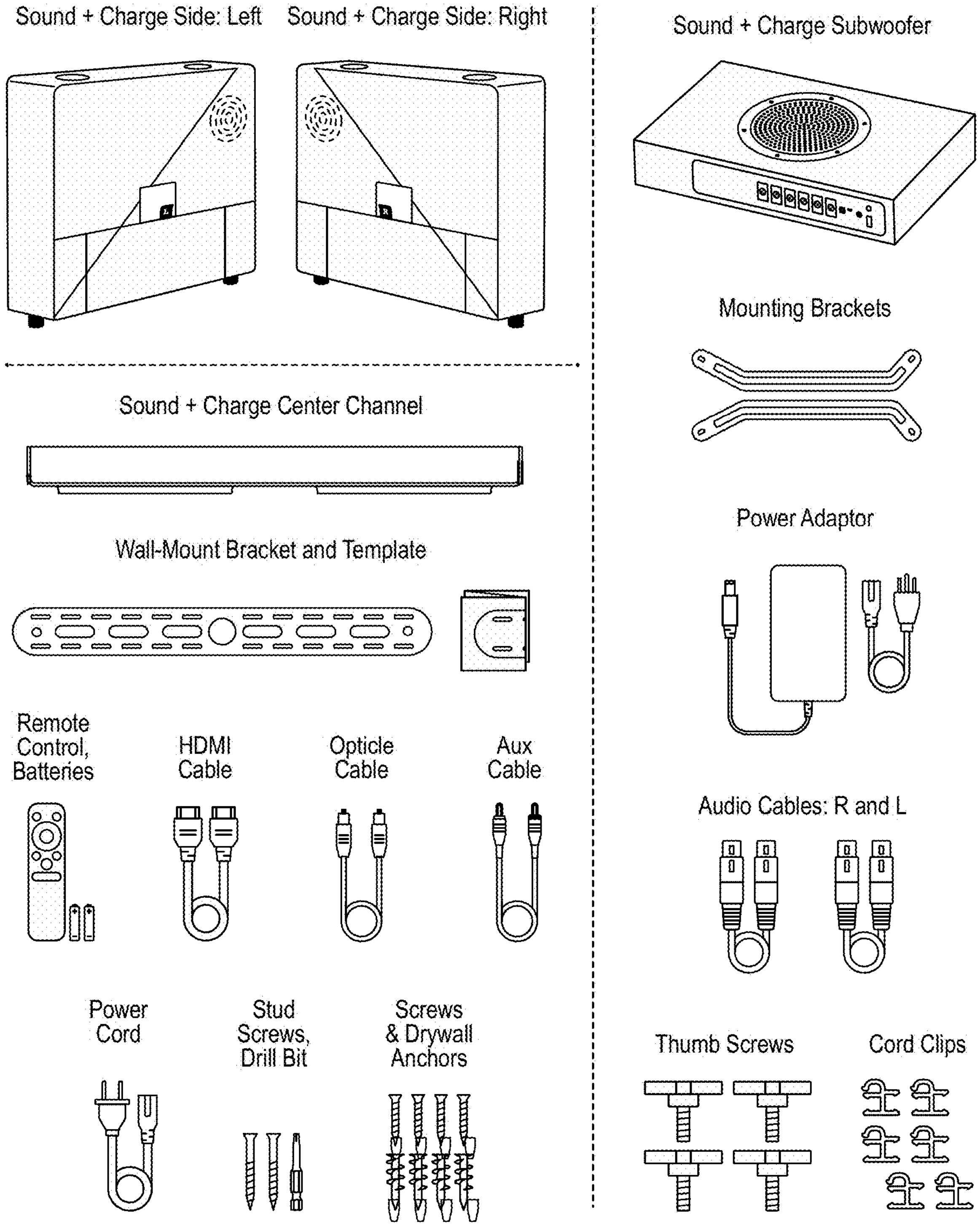
FIG. 32 illustrates a kit of an embodiment of a modular furniture assembly with surround sound tunable using one or more tuning profiles.

Illustrated in FIG. 32 is an assembly or kit that can be used to as the modular furniture assembly. As illustrated, the kit includes various upright members, a left and right being illustrated for simplicity, a center channel speaker with associated mounting bracket, and remote control that can be used to operate one or more of the audio-enhanced furniture speakers described herein. Also included in the assembly or kit is the subwoofer, mounting bracket, power adapter and various cables (HDMI, optical, AUX, XLR, audio cables, etc.), and fasteners (screws, clips, etc.) that can be used with the kit.

Figure 33A:
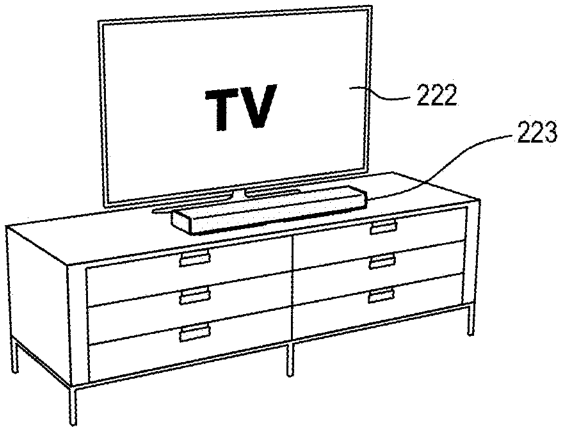
FIG. 33A illustrates a center channel speaker of the modular furniture assembly and a position or location of the center channel speaker in relation to a visual display.
Figure 33B:
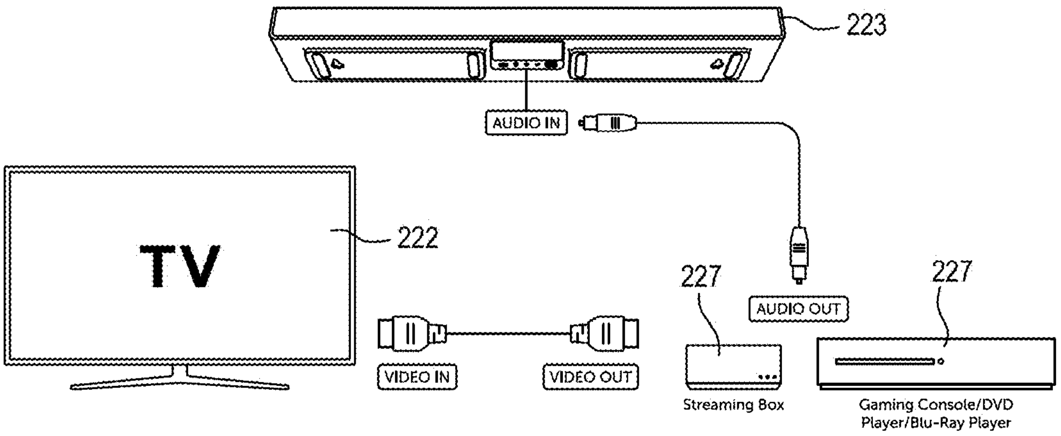
FIG. 33B illustrates connections between a center channel speaker, a visual display, and a streaming device or gaming console.
Figure 33C:
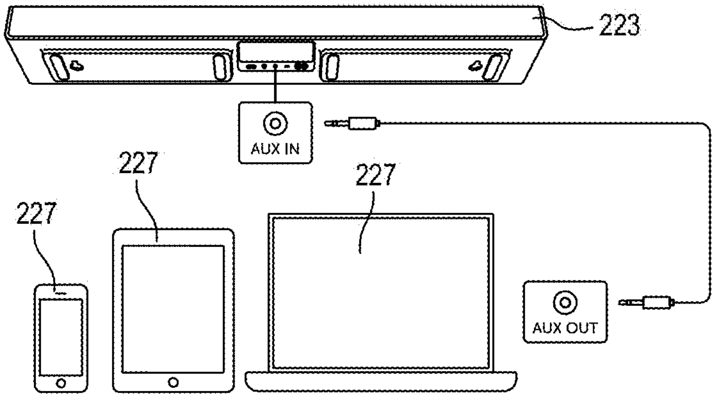
FIG. 33C illustrates connections between a center channel speaker and various electronic devices using an analog auxiliary connection.

Illustrated in FIG. 33 is an explain installation of a center channel speaker or controller, such as a configuration of the center channel speaker 223 (FIG. 15A). The center channel speaker or controller is illustrated in a tabletop orientation in proximity to a television 222 (FIG. 15A). The center channel speaker alternatively be mounted to a wall or other surface and subsequently connected to the television. In addition to, or alternatively to connecting to the television 222, the center channel speaker or controller 223 can be connected to a source 227, such as a gaming device, streaming devices, laptops, tablets, smartphone or smart device, etc., as illustrated in FIGS. 33B and 33C.

Figure 34A:
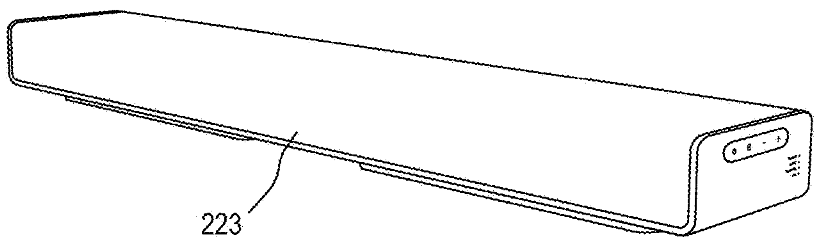
FIG. 34A illustrates the center channel speaker of the modular furniture assembly.
Figure 34B:
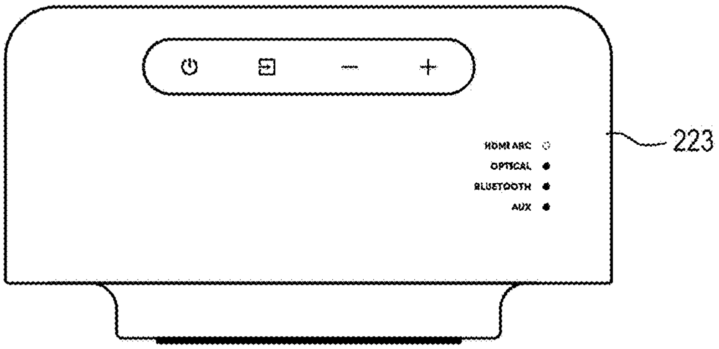
FIG. 34B illustrates an end view of the center channel speaker of the modular furniture assembly.
Figure 34C:
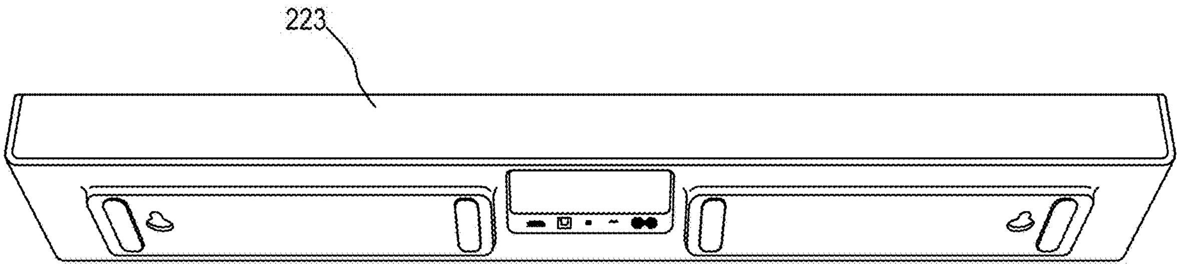
FIG. 34C illustrates a back view of the center channel speaker of the modular furniture assembly.

Illustrated in FIGS. 34A-34C is an embodiment of a center channel speaker or controller, such as a configuration of the center channel speaker 223 (FIG. 15A). The center channel speaker or controller can also function as the controller/amplifier 438 (FIG. 23A) and other devices that can store tuning provides for use with the audio-enhanced modular furniture described herein. The center channel speaker or controller 223 can be used to control the operation of the audio-enhanced modular furniture, while providing feedback or visual indication of the current status or operation of the audio-enhanced modular furniture. For instance, the center channel speaker or controller includes light emitting diodes (LED) or other indicators of status to allow a user to identify an operating status of the audio system/speaker system. The center channel speaker or controller can also include power on control, power off control, volume up and down controls, and ports to connect to other devices, such as ports for connecting to various cables (HDMI, optical, AUX, XLR, audio cables, etc.). Additionally, the center channel speaker or controller can include a USB port or other port to allow for communication with other computer or storage devices.

Once the center channel speaker is appropriately positioned, it can be connected to the television through use or appropriate cables, such as an HDMI, an optical cable, or other cables. Once the center channel speaker or controller is connected to the television, it can be powered on by plugging a power cable into an outlet or other power source and subsequent turned on, as illustrated and described with respect to (FIGS. 35 and 36).

Figure 37:
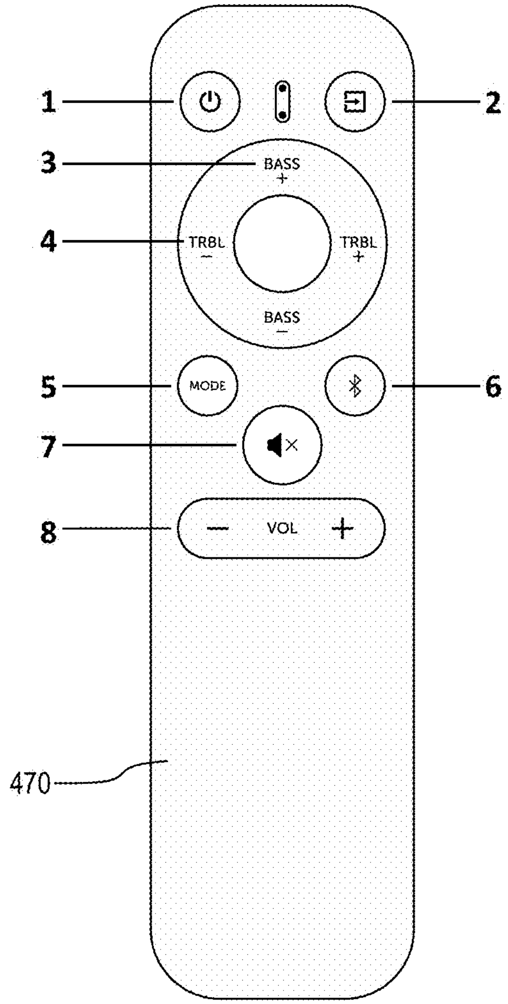
FIG. 37 illustrates a remote control of the modular furniture assembly.

Illustrated in FIG. 37 is a remote control 470 to operate the center channel speaker, and more generally any of the speakers, amplifiers, or other components of the audio-enhanced modular furniture. The remote control 470 can be paired with the center channel speaker, such as through Blue-tooth, WiFi, IR, Wireless Speaker and Audio Technology (WISA) or other mechanisms once the center channel speaker is powered on as illustrated and described with respect to FIG. 38.

Illustrated in FIG. 39 is a configuration of a subwoofer, such as subwoofer 210*a*, that can be disposed in a base of the audio-enhanced modular furniture. The illustrated subwoofer 210*a* includes various ports to receive various cables (HDMI, optical, AUX, XLR, audio cables, etc.), while also include a button which, when operated, aids with pairing the subwoofer with the remote control and/or the audio system or speaker system, including the center channel speaker described herein. Additionally, the subwoofer 210*a* can include a USB port or other port to allow for communication with other computer or storage devices.

In use, in one configuration, the subwoofer 210*a* can be mounted into a base using various brackets or mounts following pairing of the remote control with the center channel speaker or controller. When the subwoofer 210*a* is mounted in the based and cables and power supply are connected to it and other speakers, including additional subwoofers or satellite subwoofer for audio-enhanced modular furniture having two or more subwoofers, the subwoofers can be powered on and paired to the center channel speaker or controller.

Figure 40:
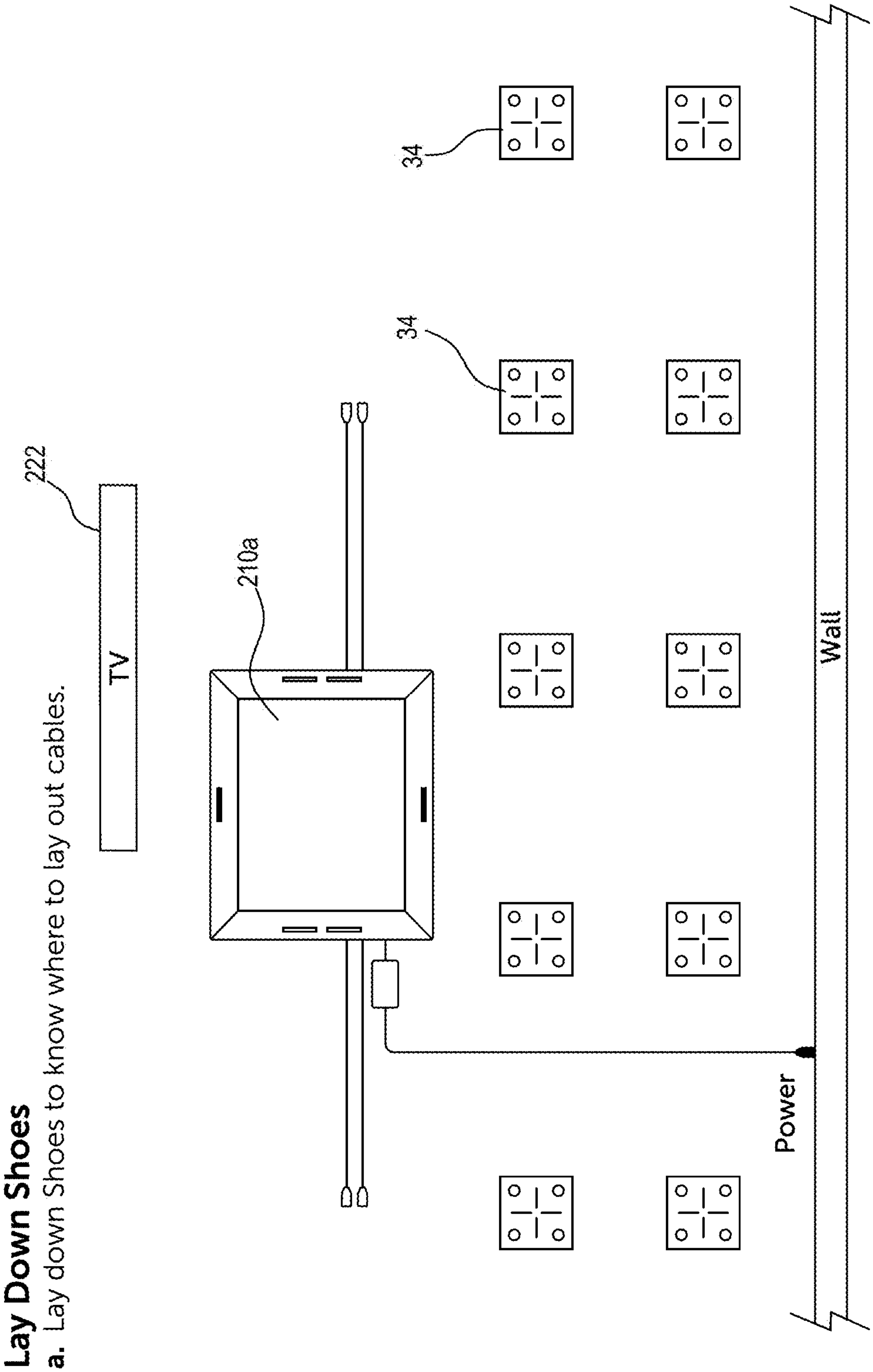
FIG. 40 illustrates a top view of a layout of portions of the modular furniture assembly during assembly of the modular furniture assembly to position cables, feet, and subwoofers of the modular furniture assembly.
Figure 41:
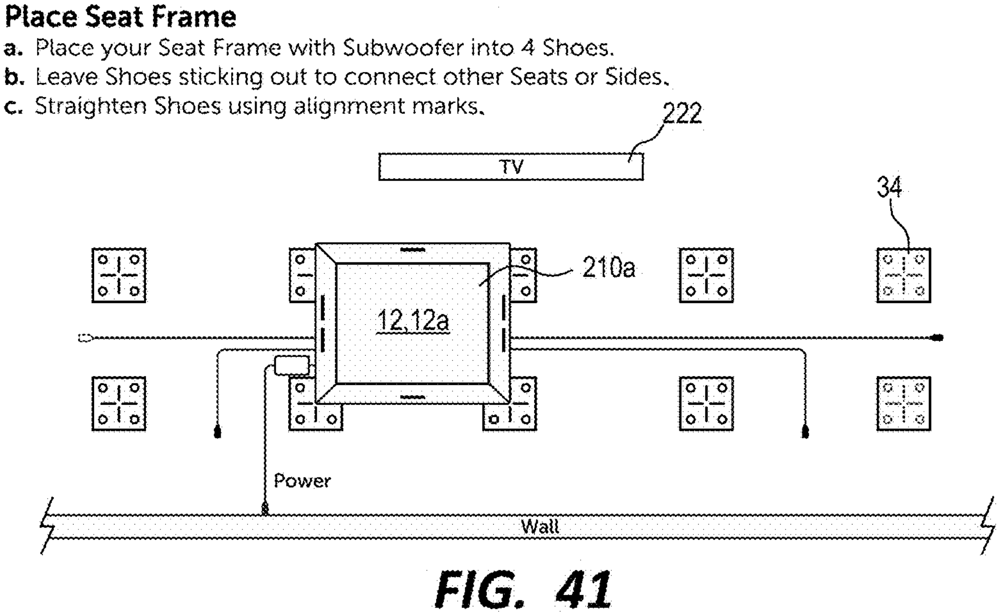
FIG. 41 illustrates a top view of a layout of portions of the modular furniture assembly during assembly of the modular furniture assembly to position cables, feet, and subwoofers of the modular furniture assembly.
Figure 42:
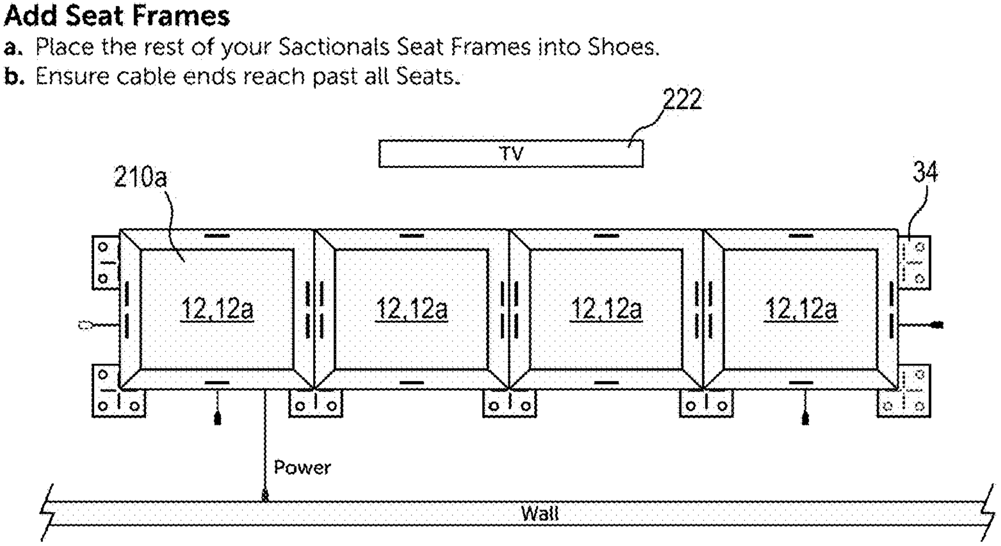
FIG. 42 illustrates a top view of a layout of portions of the modular furniture assembly during assembly of the modular furniture assembly to position cables, feet, and subwoofers of the modular furniture assembly.
Figure 43:
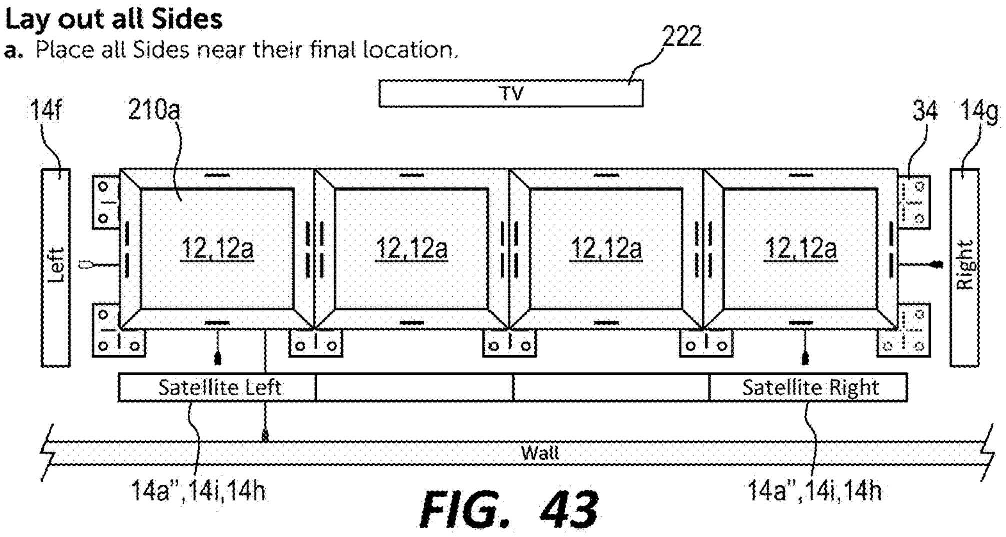
FIG. 43 illustrates a top view of a layout of portions of the modular furniture assembly during assembly of the modular furniture assembly to position bases, upright or transverse members, cables, feet, and subwoofers of the modular furniture assembly.
Figure 44:
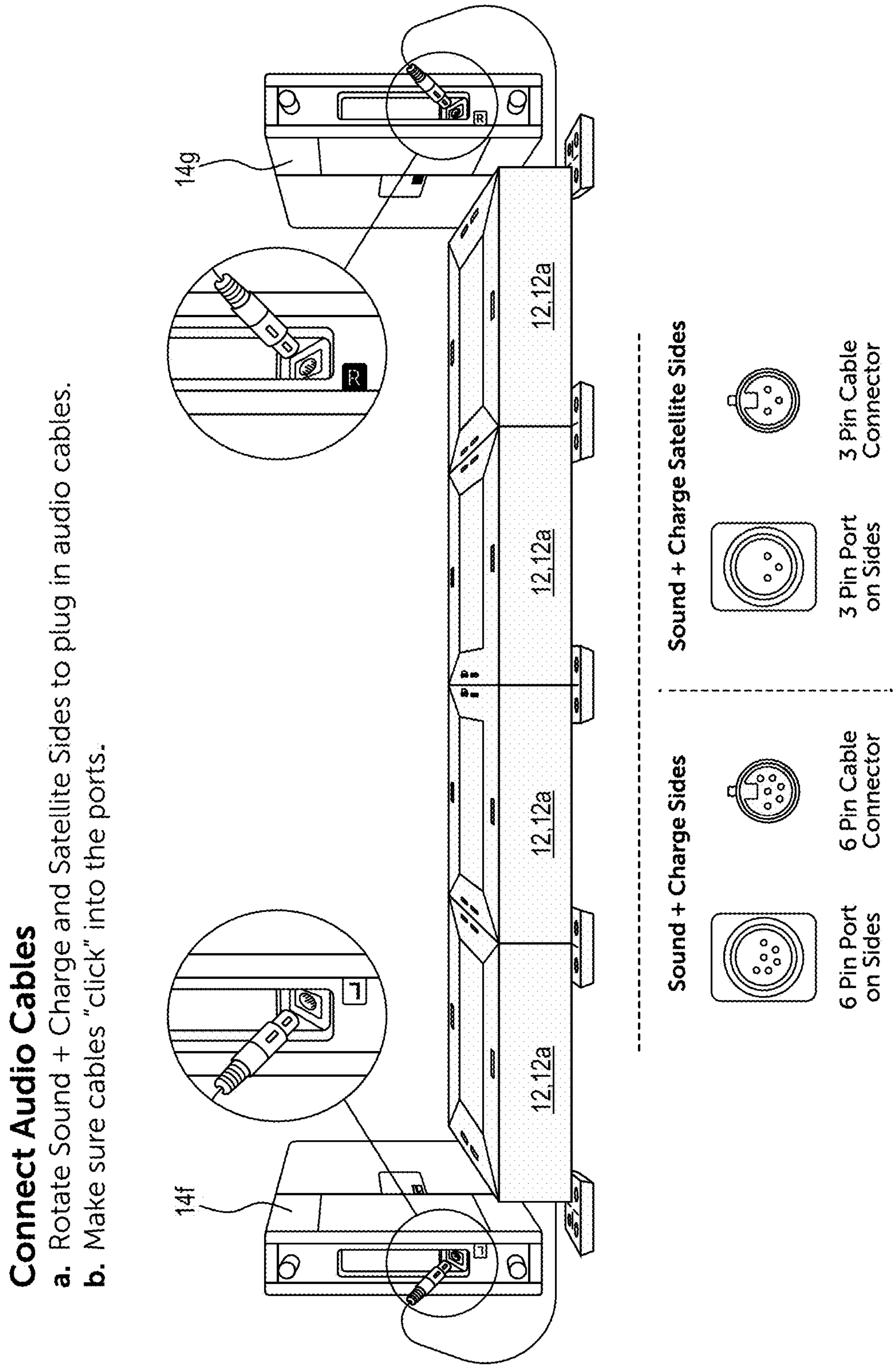
FIG. 44 illustrates a view of a layout of portions of the modular furniture assembly during assembly of the modular furniture assembly to position bases, upright or transverse members, cables, feet, and subwoofers of the modular furniture assembly.
Figure 45:
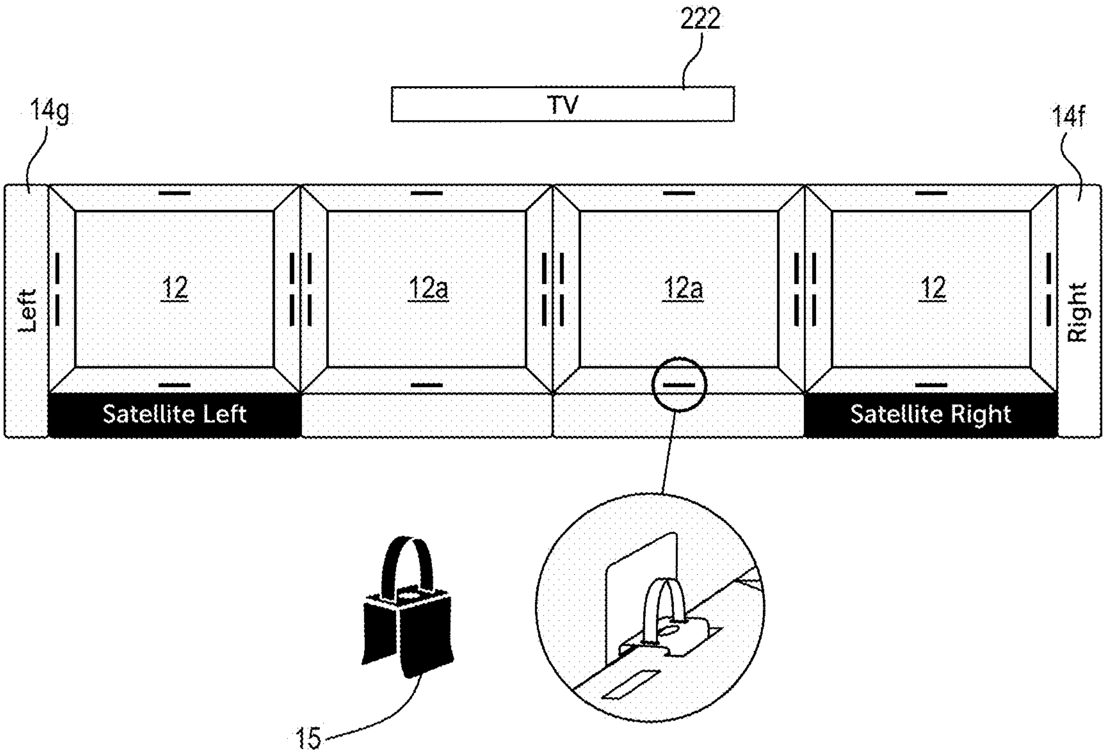
FIG. 45 illustrates a top view of portions of the modular furniture assembly during assembly of the modular furniture assembly with the upright or transverse members mounted to bases of the modular furniture assembly.
Figure 46:
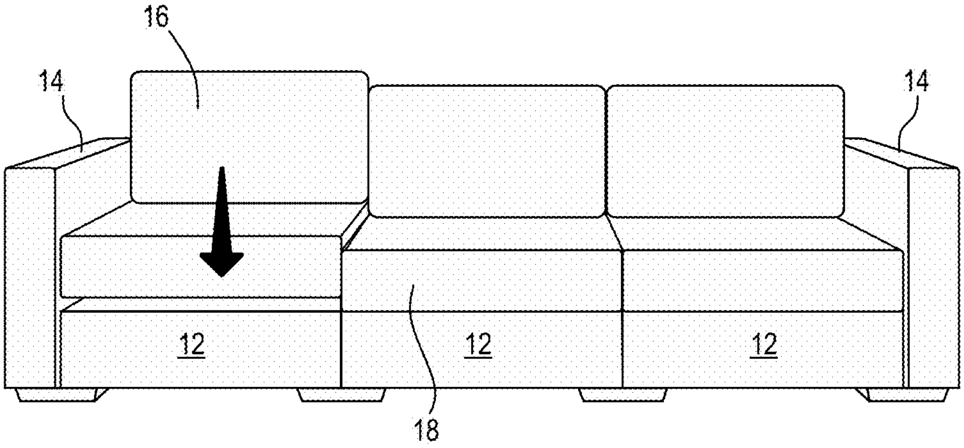
FIG. 46 illustrates a view of portions of the modular furniture assembly during assembly of the modular furniture assembly with the upright or transverse members mounted to bases of the modular furniture assembly and cushions and pillows also positioned.

Turning to FIGS. 40-46, once the subwoofer(s) 210*a* and center channel speaker or controller are paired, it is possible to assemble a remainder of the audio-enhanced modular furniture. For instance, as illustrated in FIG. 40, the particular location of the shoes 34 can be laid out to accommodate for the cable runs. Following mounting an audio-enhanced base to the shoes 34, as illustrated in FIG. 41, the other bases can be mounted to the feet or couplers, as illustrated in FIG. 42. With bases mounted to the feet or couplers, the upright members can be positioned, as illustrated in FIG. 43, and subsequently mounted to the bases when the cables, such as audio cables or other control cables are connected, as illustrated in FIG. 44. Once the remaining audio-enhanced uprights and other uprights are mounted to the bases as described herein, and illustrated in FIG. 45, the cushions and pillows can be placed on the bases, as illustrated in FIG. 46.

As mentioned before, the central console or controller includes LEDs to identify a status of the central console or controller. Illustrated in FIGS. 47 and 48 are the different functions, LED behaviors, and associated details of the particular status behavior. Such behaviors can include, but not limited to, power status (On, Wake from Standby, etc.), input selection (HDMI, optical, Bluetooth, AUX), volume level, muted volume, speaker balance, treble and bass levels, pairing status of a Bluetooth (or other connection).

Figure 49A:
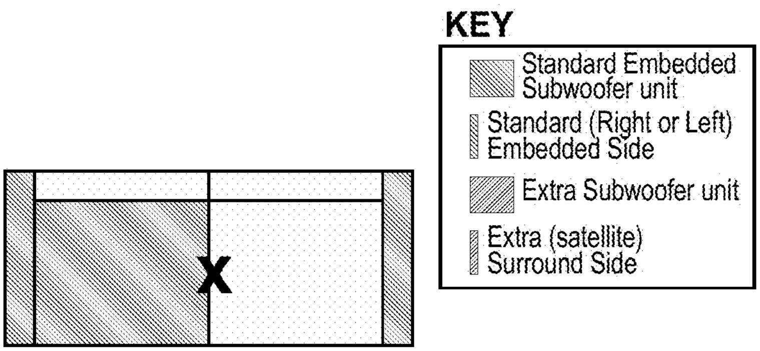
FIG. 49A illustrates a 2 seat on back row configuration of the modular furniture assembly having one combination of audio-enhanced bases and upright or transverse members and non-audio-enhanced bases and upright or transverse members.
Figure 49B:
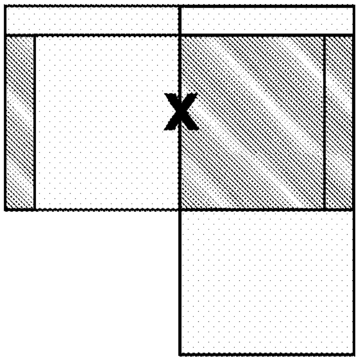
FIG. 49B illustrates a 2 seat on back row configuration of the modular furniture assembly having one combination of audio-enhanced bases and upright or transverse members and non-audio-enhanced bases and upright or transverse members.
Figure 49C:
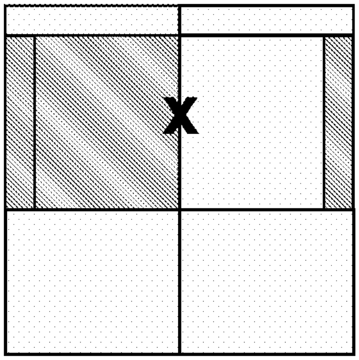
FIG. 49C illustrates a 2 seat on back row configuration of the modular furniture assembly having one combination of audio-enhanced bases and upright or transverse members and non-audio-enhanced bases and upright or transverse members.
Figure 49D:
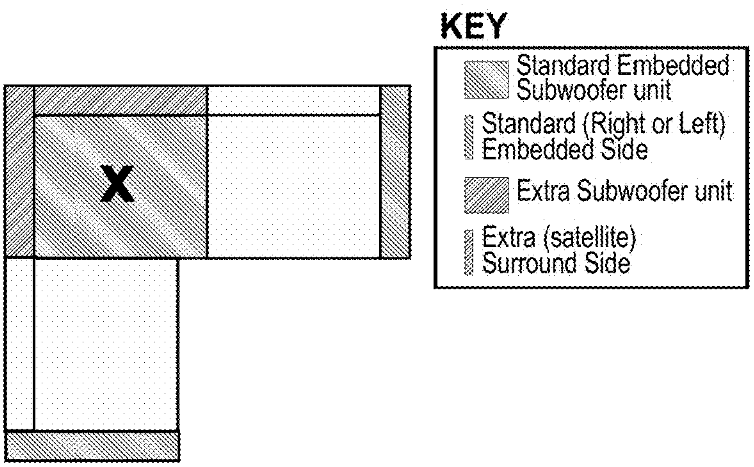
FIG. 49D illustrates a 2 seat on back row configuration of the modular furniture assembly having one combination of audio-enhanced bases and upright or transverse members and non-audio-enhanced bases and upright or transverse members.
Figure 49E:
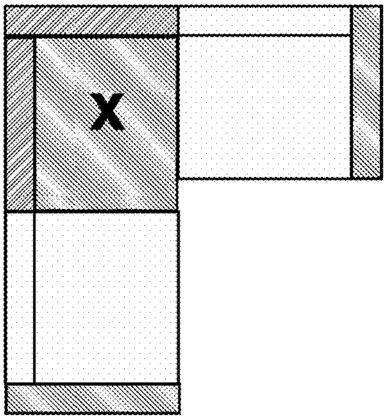
FIG. 49E illustrates a 2 seat on back row configuration of the modular furniture assembly having one combination of audio-enhanced bases and upright or transverse members and non-audio-enhanced bases and upright or transverse members.
Figure 49F:
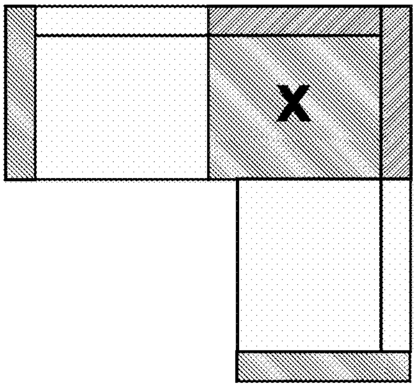
FIG. 49F illustrates a 2 seat on back row configuration of the modular furniture assembly having one combination of audio-enhanced bases and upright or transverse members and non-audio-enhanced bases and upright or transverse members.
Figure 49G:
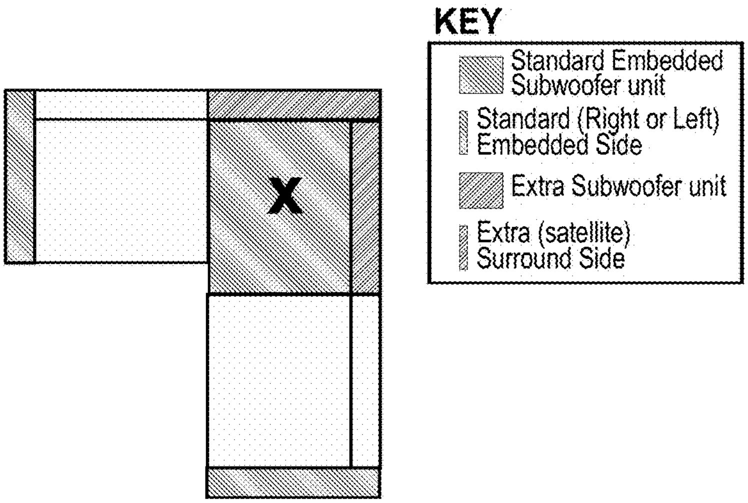
FIG. 49G illustrates a 2 seat on back row configuration of the modular furniture assembly having one combination of audio-enhanced bases and upright or transverse members and non-audio-enhanced bases and upright or transverse members.
Figure 49H:
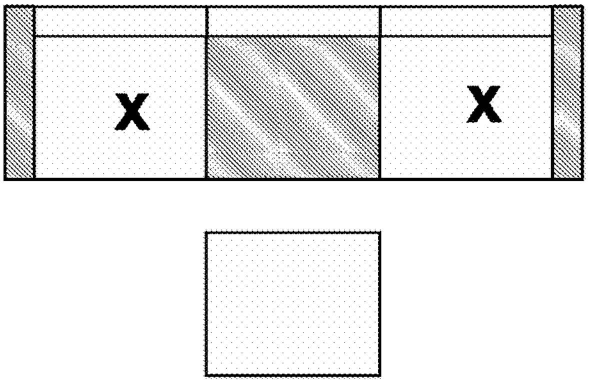
FIG. 49H illustrates a 3 seat on back row configuration of the modular furniture assembly having one combination of audio-enhanced bases and upright or transverse members and non-audio-enhanced bases and upright or transverse members.
Figure 49I:
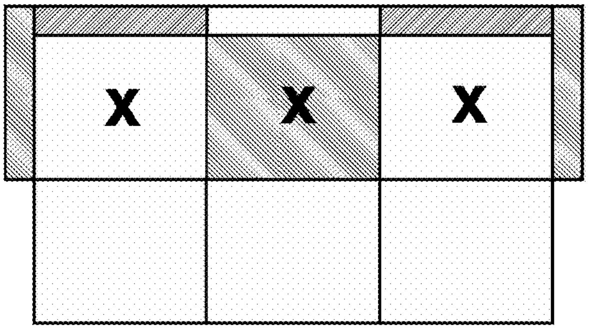
FIG. 49I illustrates a 3 seat on back row configuration of the modular furniture assembly having one combination of audio-enhanced bases and upright or transverse members and non-audio-enhanced bases and upright or transverse members.
Figure 49J:
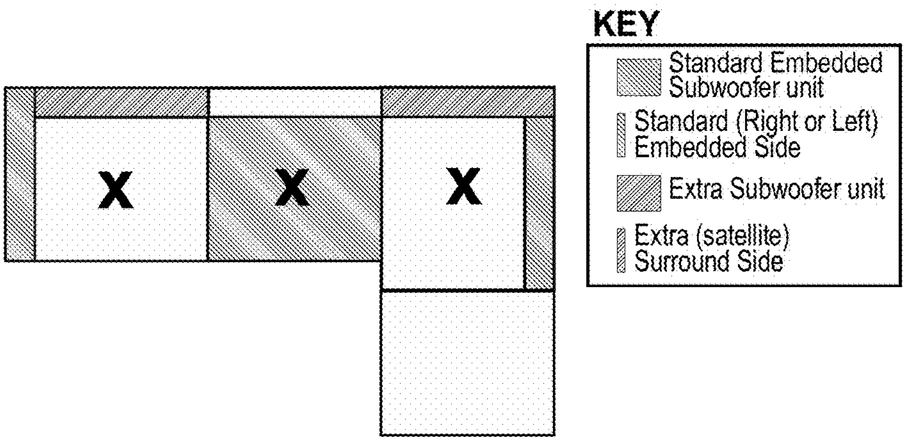
FIG. 49J illustrates a 3 seat on back row configuration of the modular furniture assembly having one combination of audio-enhanced bases and upright or transverse members and non-audio-enhanced bases and upright or transverse members.
Figure 49K:
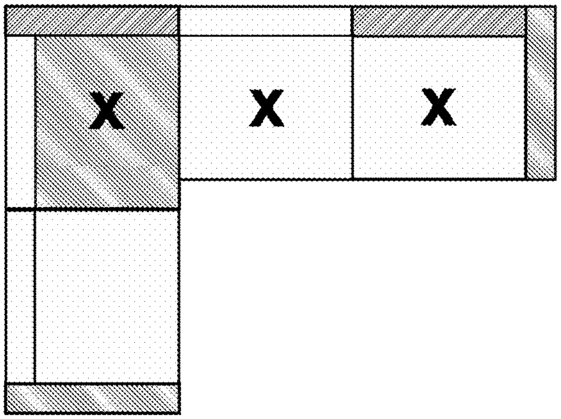
FIG. 49K illustrates a 3 seat on back row configuration of the modular furniture assembly having one combination of audio-enhanced bases and upright or transverse members and non-audio-enhanced bases and upright or transverse members.
Figure 49L:
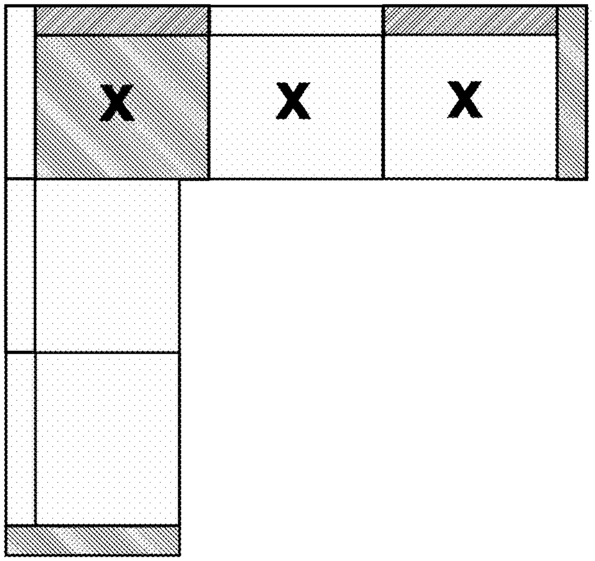
FIG. 49L illustrates a 3 seat on back row configuration of the modular furniture assembly having one combination of audio-enhanced bases and upright or transverse members and non-audio-enhanced bases and upright or transverse members.
Figure 49M:
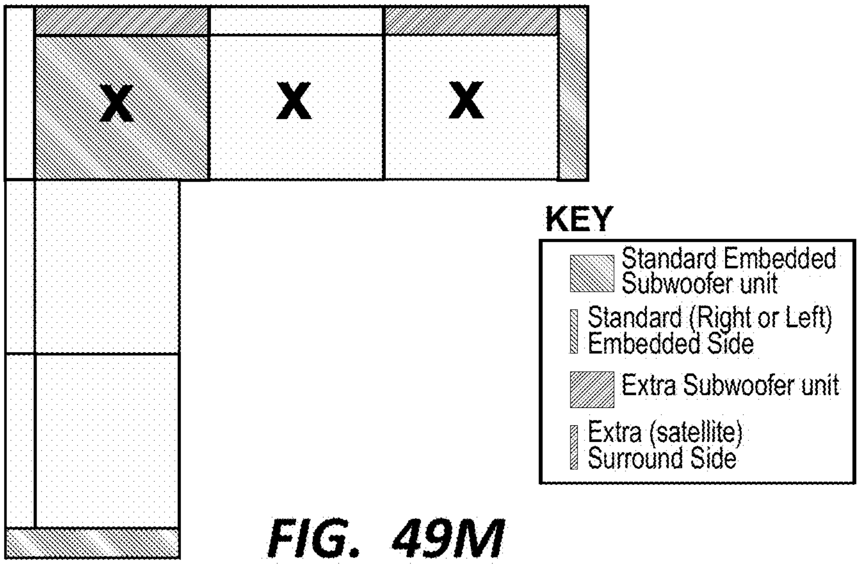
FIG. 49M illustrates a 3 seat on back row configuration of the modular furniture assembly having one combination of audio-enhanced bases and upright or transverse members and non-audio-enhanced bases and upright or transverse members.
Figure 49N:
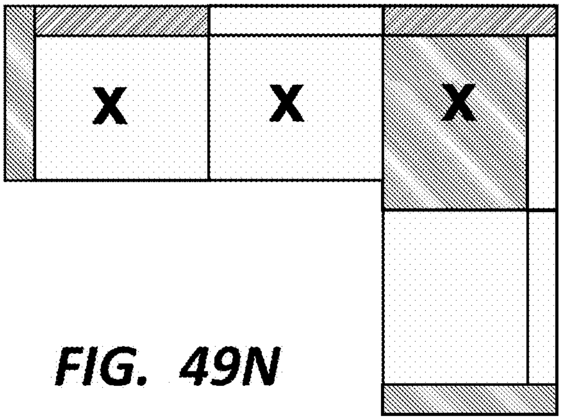
FIG. 49N illustrates a 3 seat on back row configuration of the modular furniture assembly having one combination of audio-enhanced bases and upright or transverse members and non-audio-enhanced bases and upright or transverse members.
Figure 49O:
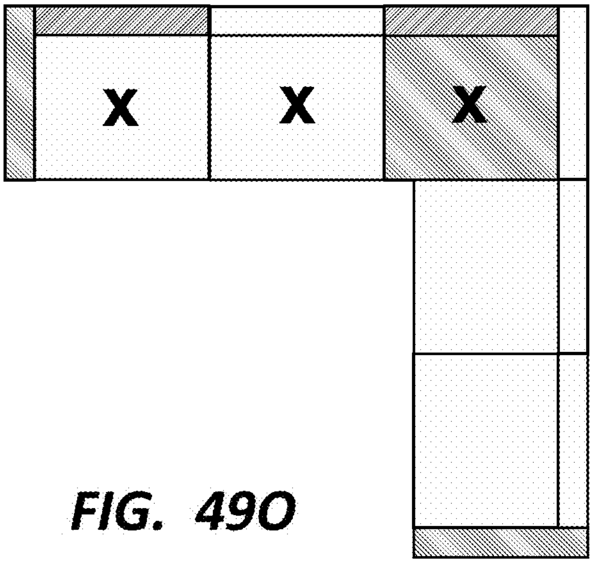
FIG. 49O illustrates a 3 seat on back row configuration of the modular furniture assembly having one combination of audio-enhanced bases and upright or transverse members and non-audio-enhanced bases and upright or transverse members.
Figure 49P:
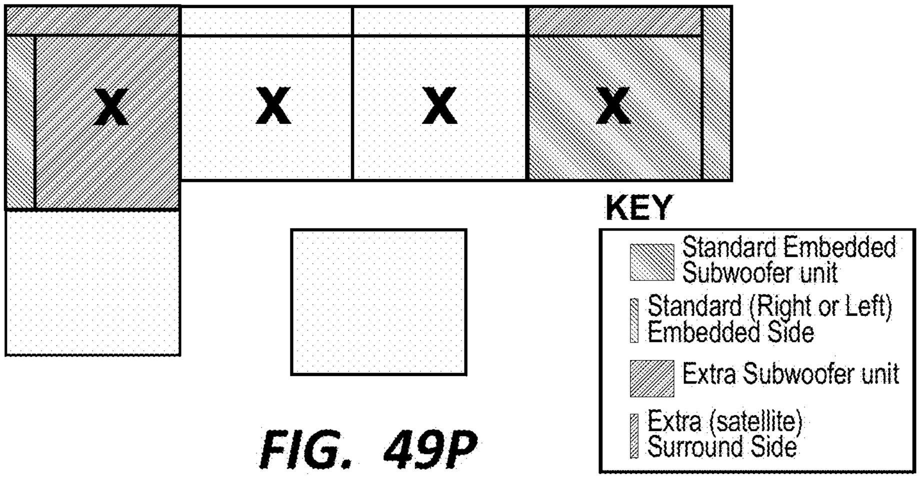
FIG. 49P illustrates a 4 seat on back row configuration of the modular furniture assembly having one combination of audio-enhanced bases and upright or transverse members and non-audio-enhanced bases and upright or transverse members.
Figure 49Q:
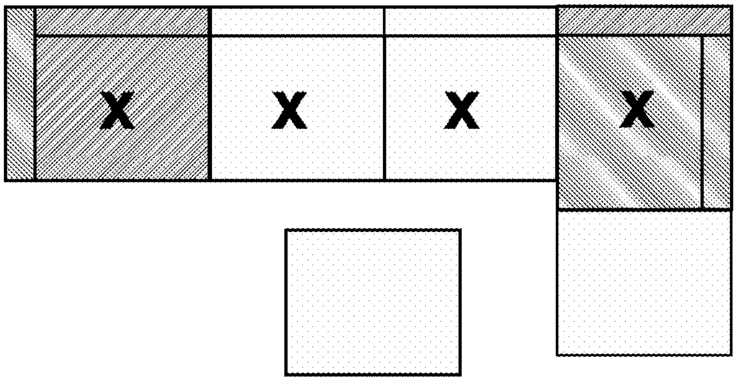
FIG. 49Q illustrates a 4 seat on back row configuration of the modular furniture assembly having one combination of audio-enhanced bases and upright or transverse members and non-audio-enhanced bases and upright or transverse members.
Figure 49R:
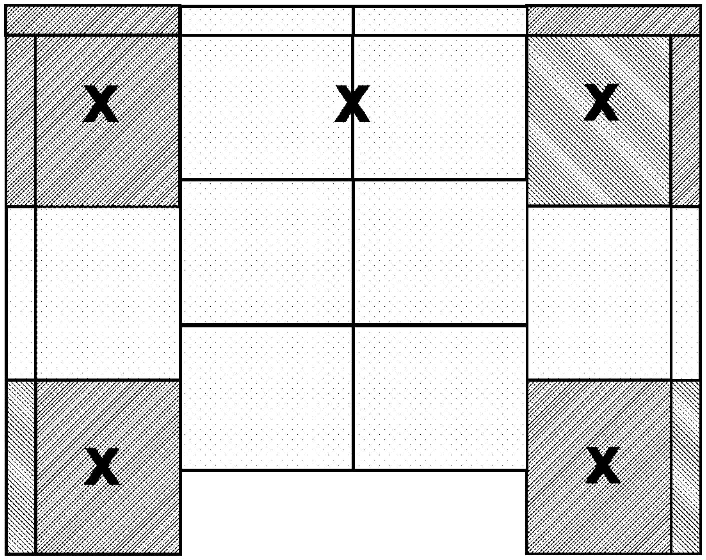
FIG. 49R illustrates a 4 seat on back row configuration of the modular furniture assembly having one combination of audio-enhanced bases and upright or transverse members and non-audio-enhanced bases and upright or transverse members.
Figure 49S:
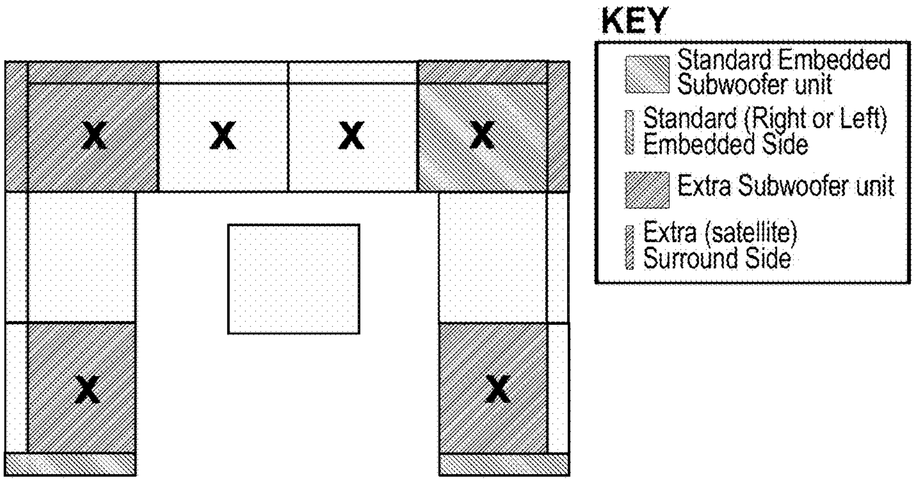
FIG. 49S illustrates a 4 seat on back row configuration of the modular furniture assembly having one combination of audio-enhanced bases and upright or transverse members and non-audio-enhanced bases and upright or transverse members.
Figure 49T:
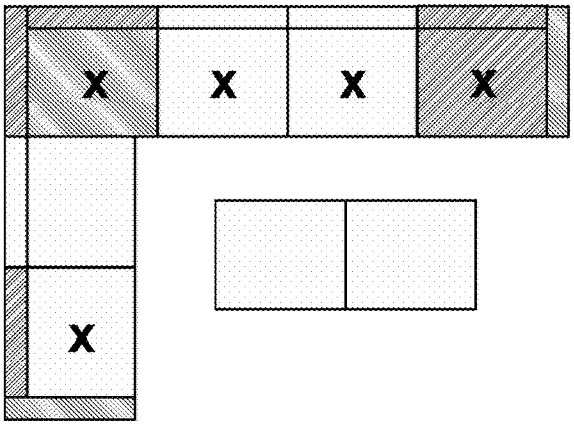
FIG. 49T illustrates a 4 seat on back row configuration of the modular furniture assembly having one combination of audio-enhanced bases and upright or transverse members and non-audio-enhanced bases and upright or transverse members.
Figure 49U:
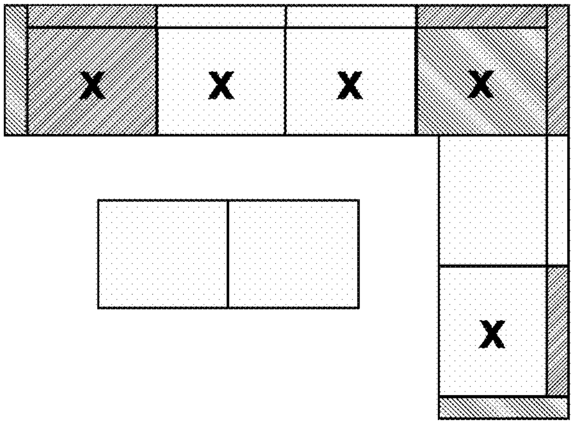
FIG. 49U illustrates a 4 seat on back row configuration of the modular furniture assembly having one combination of audio-enhanced bases and upright or transverse members and non-audio-enhanced bases and upright or transverse members.
Figure 49V:
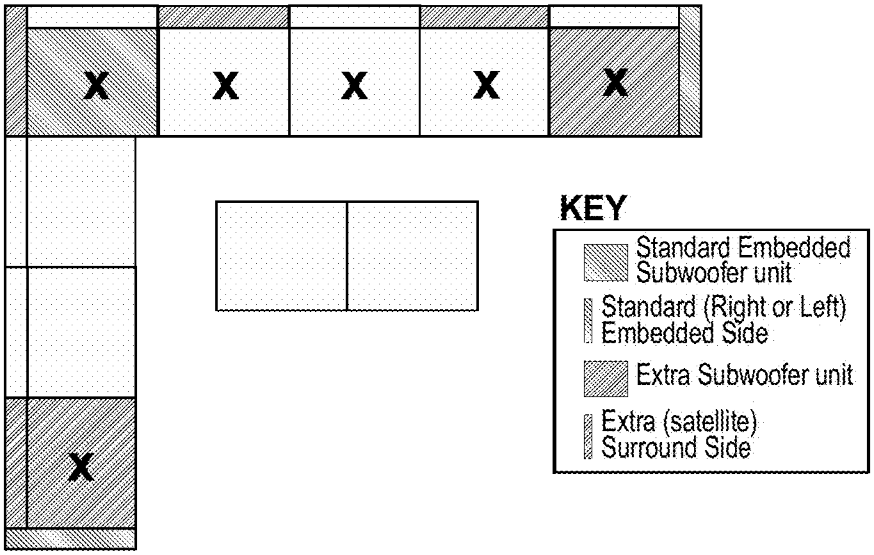
FIG. 49V illustrates a 5 seat on back row configuration of the modular furniture assembly having one combination of audio-enhanced bases and upright or transverse members and non-audio-enhanced bases and upright or transverse members.
Figure 49W:
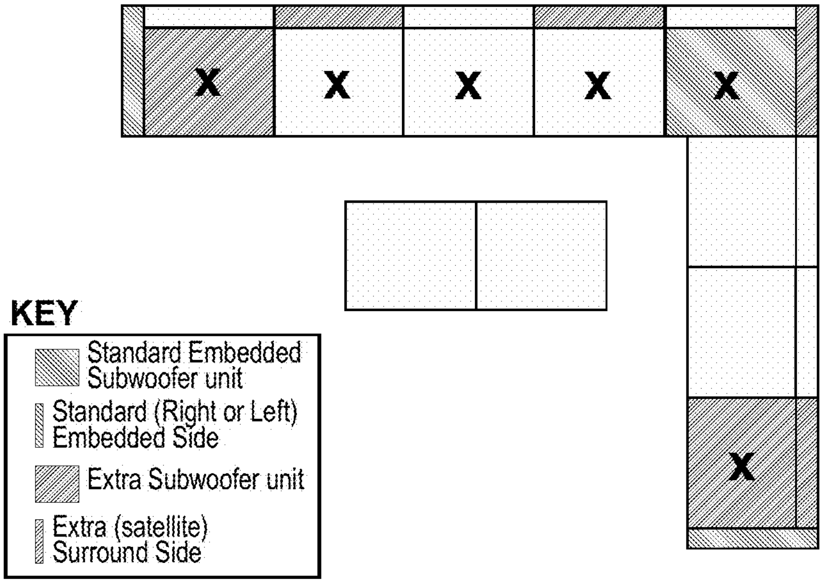
FIG. 49W illustrates a 4 seat on back row configuration of the modular furniture assembly having one combination of audio-enhanced bases and upright or transverse members and non-audio-enhanced bases and upright or transverse members.
Figure 49X:
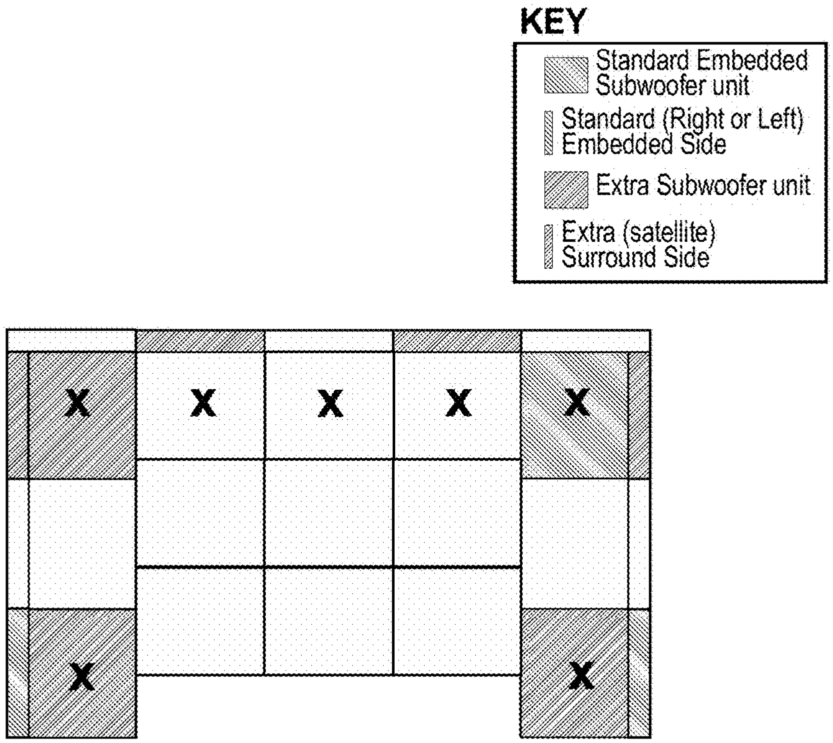
FIG. 49X illustrates a 4 seat on back row configuration of the modular furniture assembly having one combination of audio-enhanced bases and upright or transverse members and non-audio-enhanced bases and upright or transverse members.
Figure 49Y:
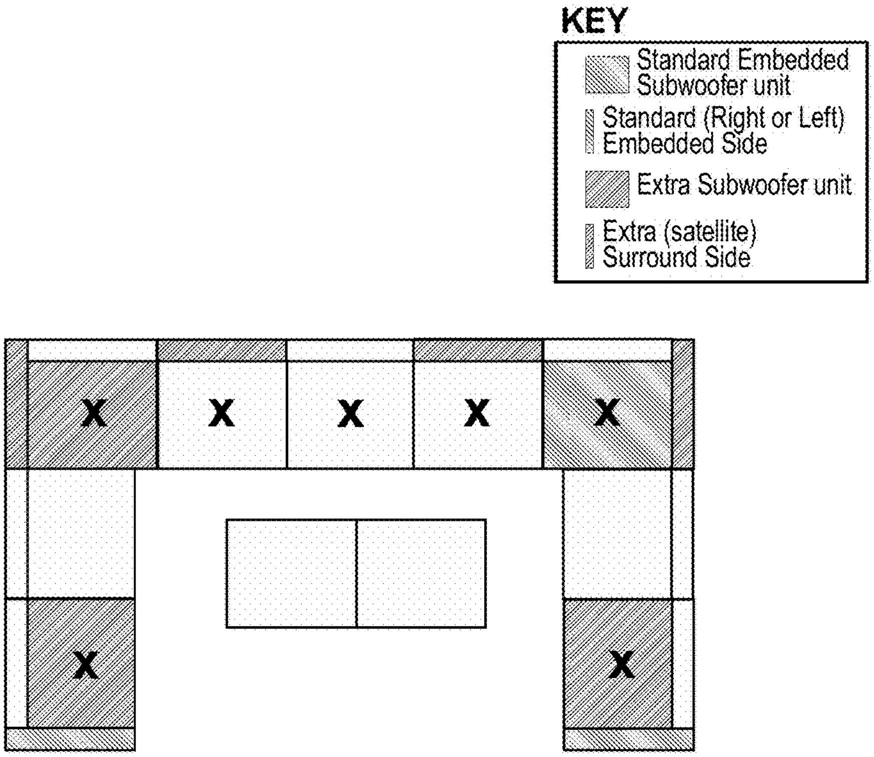
FIG. 49Y illustrates a 4 seat on back row configuration of the modular furniture assembly having one combination of audio-enhanced bases and upright or transverse members and non-audio-enhanced bases and upright or transverse members.

Turning to FIGS. 49A-49Y, illustrated are various different furniture shapes and orientations, with different combinations of audio-enhanced uprights and bases with non-audio-enhanced uprights and bases as described herein. This provides different combinations of the standard, left, right, subwoofer, and satellite speakers. As illustrated in FIGS. 49A-49Y, different orientations or configurations, with associated configuration footprint shapes, sizes of shapes, or orientations of the audio-enhanced modular furniture assemblies can use the same stored tuning profiles stored at the center channel 223. For instance, the audio-enhanced modular furniture assemblies 49A-49C can use a tuning profile 1, the audio-enhanced modular furniture assemblies 49D-49E can use a tuning profile 2, the audio-enhanced modular furniture assemblies 49F-49G can use a tuning profile 2.5 (which is a variation of tuning profile 2, i.e., switching between right and left L-shape of the audio-enhanced modular furniture assembly), the audio-enhanced modular furniture assemblies 49H can use a tuning profile 1, the audio-enhanced modular furniture assemblies 49I-49K can use a tuning profile 3, the audio-enhanced modular furniture assemblies 49L-49M can use a tuning profile 4, the audio-enhanced modular furniture assemblies 49N-49O can use a tuning profile 4.5 (which is a variation of tuning profile 4, i.e., switching between right and left L-shape of the audio-enhanced modular furniture assembly), the audio-enhanced modular furniture assemblies 49P-49Q can use a tuning profile 3, the audio-enhanced modular furniture assemblies 49R can use a tuning profile 5, the audio-enhanced modular furniture assemblies 49S can use a tuning profile 6, the audio-enhanced modular furniture assemblies 49T can use a tuning profile 7, and the audio-enhanced modular furniture assemblies 49U can use a tuning profile 7.5 (which is a variation of tuning profile 7, i.e., switching between right and left L-shape of the audio-enhanced modular furniture assembly), the audio-enhanced modular furniture assemblies 49V can use a tuning profile 7, the audio-enhanced modular furniture assemblies 49W can use a tuning profile 7.5, the audio-enhanced modular furniture assemblies 49X can use a tuning profile 5, and the audio-enhanced modular furniture assemblies 49W can use a tuning profile 6. Therefore, different but related audio-enhanced modular furniture assemblies that have different orientations or configuration footprint shapes can use the same tuning profiles.

Figure 50:
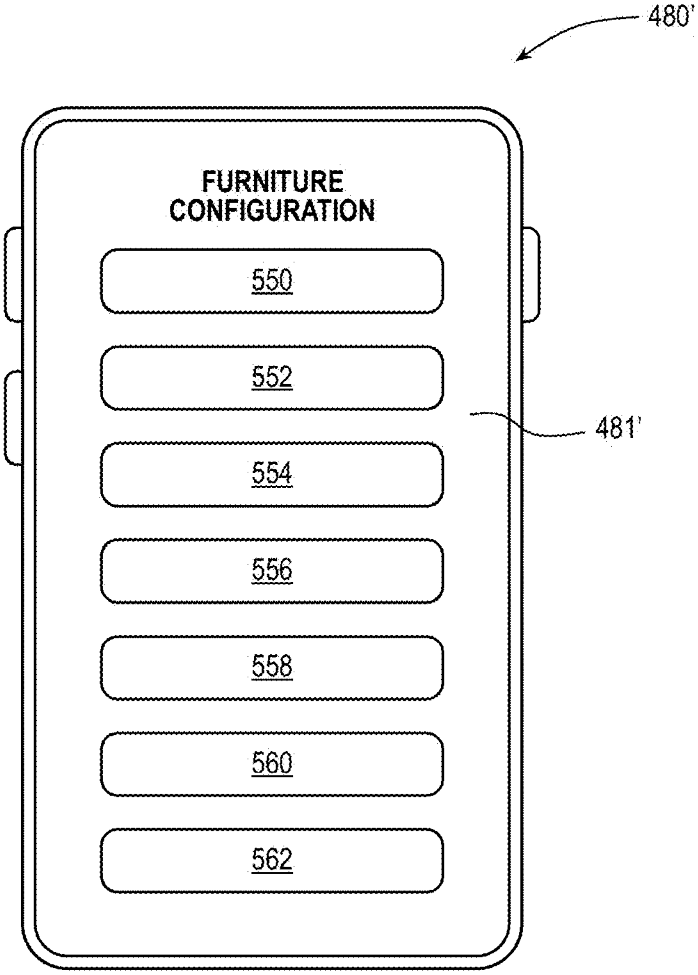
FIG. 50 illustrates another graphical user interface of a mobile device for controlling and tuning an audio-enhanced modular furniture assembly or system

As mentioned above, the mobile device 480 can be used to tune the audio-enhanced furniture. While the applications and drop down lists have been illustrated in FIGS. 30A-30D of the mobile device 480, instead of using those drop down lists, a mobile device 480' can provide visual depictions of possible furniture configurations, shapes, configuration footprint shapes, etc. on the graphical user interface 481 as illustrated in FIG. 50.

Figure 51A:
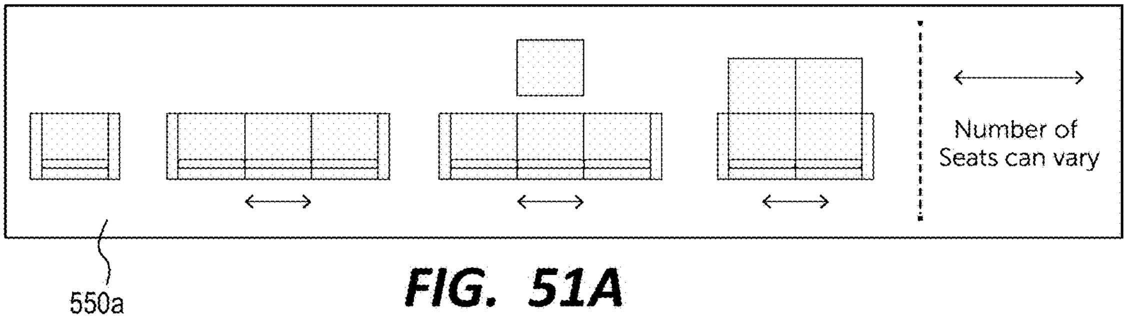
FIG. 51A illustrates a view of a graphical user interface accessible through the mobile device of FIG. 50 to select a configuration footprint shape having a straight configuration for tuning of an audio-enhanced modular furniture assembly or system.
Figure 51B:
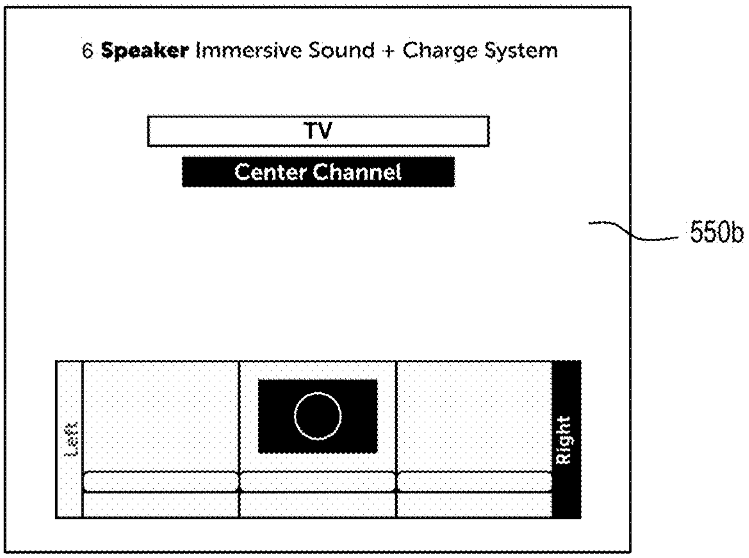
FIG. 51B illustrates a view of a graphical user interface accessible through the mobile device of FIG. 50 to select a configuration footprint shape having a straight configuration for tuning of an audio-enhanced modular furniture assembly or system.
Figure 51C:
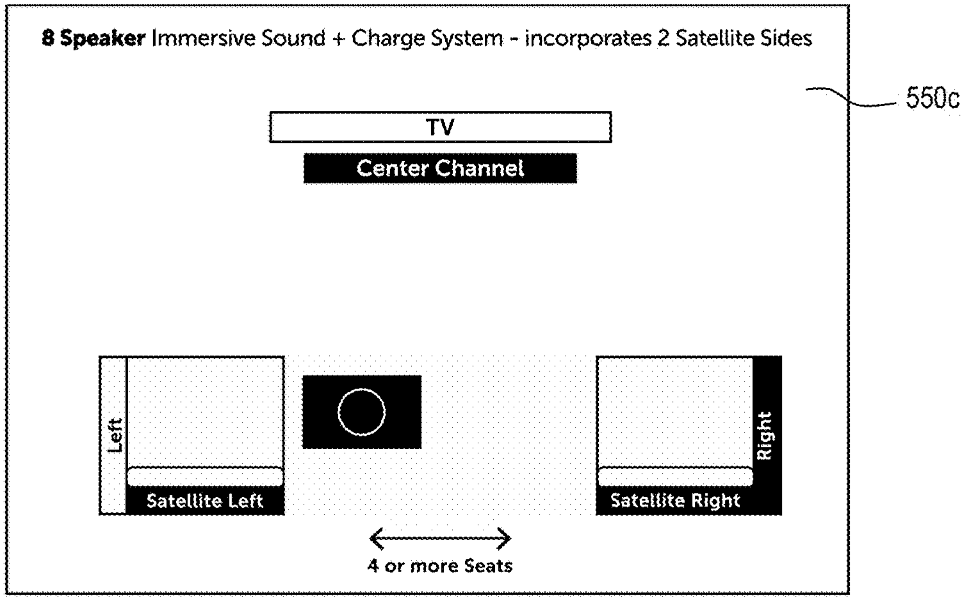
FIG. 51C illustrates a view of a graphical user interface accessible through the mobile device of FIG. 50 to select a configuration footprint shape having a straight configuration for tuning of an audio-enhanced modular furniture assembly or system.
Figure 52A:
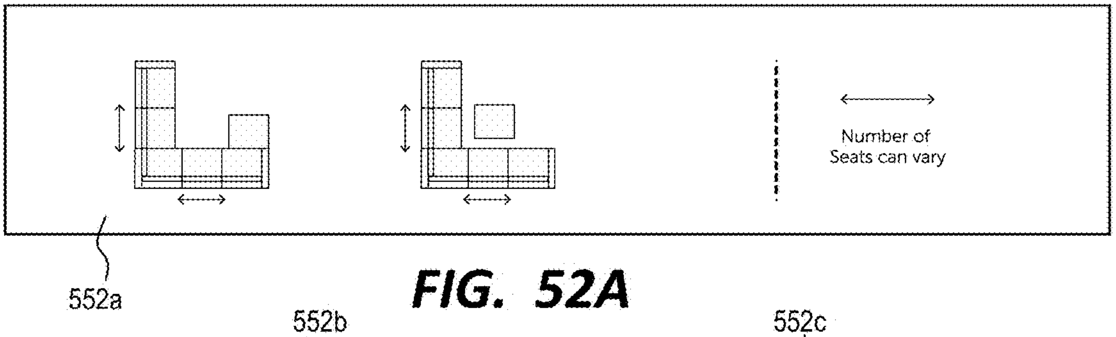
FIG. 52A illustrates a view of a graphical user interface accessible through the mobile device of FIG. 50 to select a configuration footprint shape having a left "L" configuration for tuning of an audio-enhanced modular furniture assembly or system.
Figure 52B:
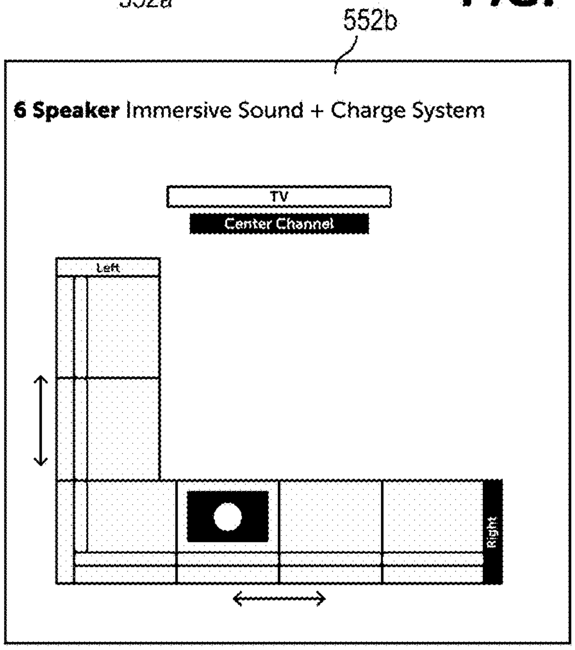
FIG. 52B illustrates a view of a graphical user interface accessible through the mobile device of FIG. 50 to select a configuration footprint shape having a left "L" configuration for tuning of an audio-enhanced modular furniture assembly or system.
Figure 52C:
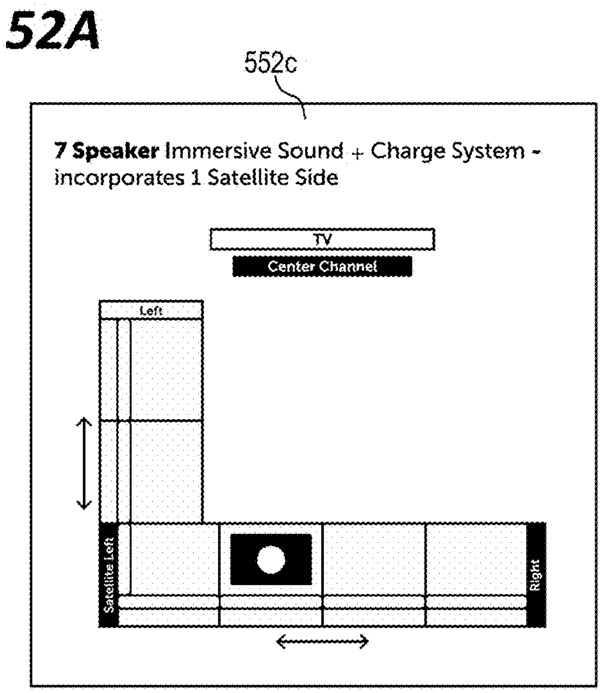
FIG. 52C illustrates a view of a graphical user interface accessible through the mobile device of FIG. 50 to select a configuration footprint shape having a left "L" configuration for tuning of an audio-enhanced modular furniture assembly or system.
Figure 52D:
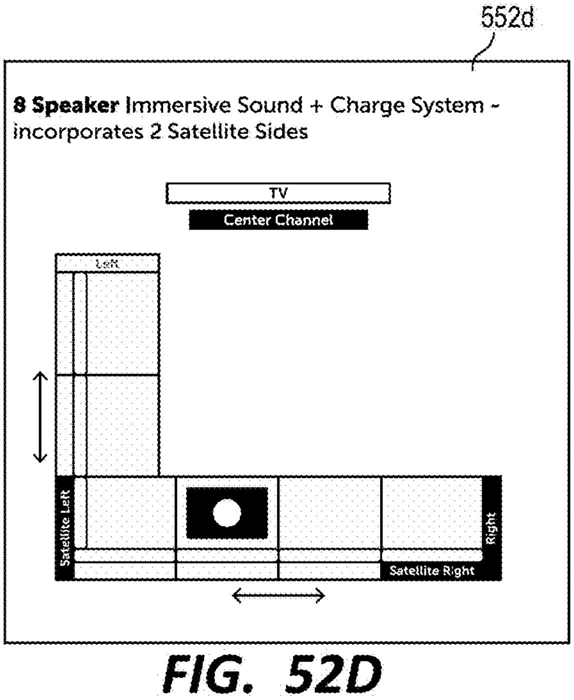
FIG. 52D illustrates a view of a graphical user interface accessible through the mobile device of FIG. 50 to select a configuration footprint shape having a left "L" configuration for tuning of an audio-enhanced modular furniture assembly or system.
Figure 52E:
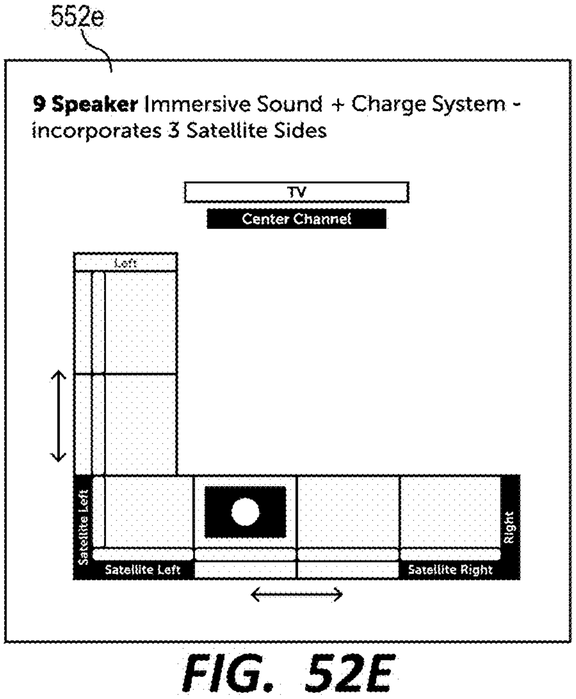
FIG. 52E illustrates a view of a graphical user interface accessible through the mobile device of FIG. 50 to select a configuration footprint shape having a left "L" configuration for tuning of an audio-enhanced modular furniture assembly or system.

The mode device 480' includes selections 550-560 that allow the user to select different orientations, configuration footprint shapes, and/or configuration footprint shape sizes that approximates the user's current or anticipated modular furniture assembly orientation configuration footprint shape. By selecting button 550, for instance the user can access a graphical depiction of the modular furniture assembly having a straight configuration in which the bases are aligned in a straight line or orientation, such as illustrated in FIG. 51A. When the user selects the button 550, the mobile device 480' can illustrate the view 550*a* from FIG. 51A on the graphical user interface 481' and the user can choose different configuration for which a tuning profile can be selected. Optionally, the configuration footprint shapes and/or sizes 550*b* and 550*c* of FIGS. 51B and 51C can be displayed as suggested or recommended configuration footprint shapes, sizes and combination of components and subcomponents, such as a combination of audio-enhanced bases and upright or transverse members and non-audio-enhanced bases and upright or transverse members.

By selecting button 552, for instance the user can access a graphical depiction of the modular furniture assembly having a left "L" configuration in which the bases and uprights or transverse members generally form a left "L" configuration footprint shape when viewed from above. When the user selects the button 552 of the graphical user interface 481', the mobile device 480' can illustrate the view 552*a* from FIG. 52A on the graphical user interface 481' and the user can choose different configuration for which a tuning profile can be selected. Optionally, the configuration footprint shapes and/or sizes 552*b*-552*e* of FIG. 52B-52E can be displayed as suggested or recommended configuration footprint shapes, sizes, and combination of components and subcomponents, such as a combination of audio-enhanced bases and upright or transverse members and non-audio-enhanced bases and upright or transverse members.

By selecting button 554, for instance the user can access a graphical depiction of the modular furniture assembly having a right "L" configuration in which the bases and uprights or transverse members generally form a right "L" configuration footprint shape when viewed from above. When the user selects the button 554 on the graphical user interface 481', the mobile device 480' can illustrate the view

Figure 53A:
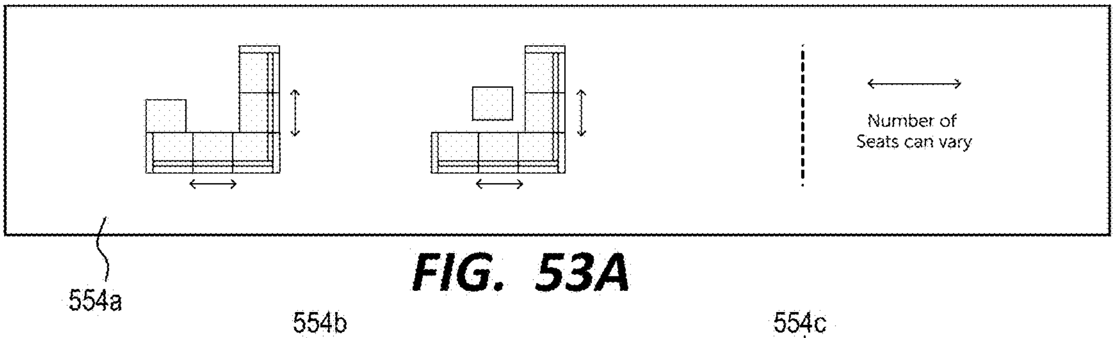
FIG. 53A illustrates a view of a graphical user interface accessible through the mobile device of FIG. 50 to select a configuration footprint shape having a right "L" configuration for tuning of an audio-enhanced modular furniture assembly or system.
Figure 53B:
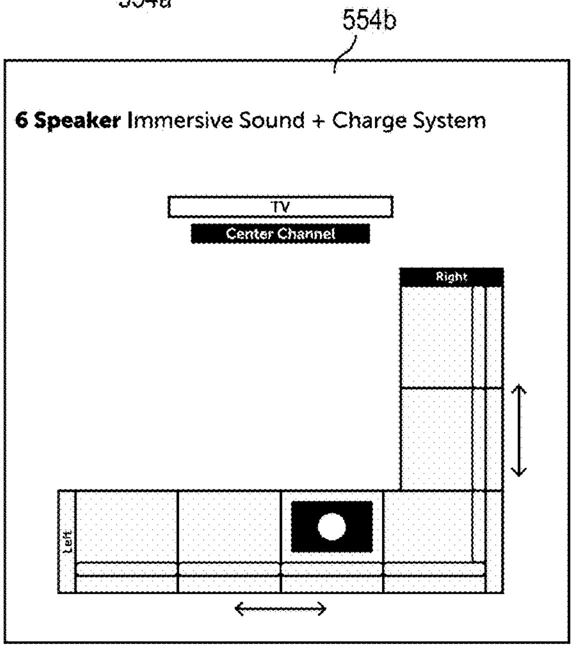
FIG. 53B illustrates a view of a graphical user interface accessible through the mobile device of FIG. 50 to select a configuration footprint shape having a right "L" configuration for tuning of an audio-enhanced modular furniture assembly or system.
Figure 53C:
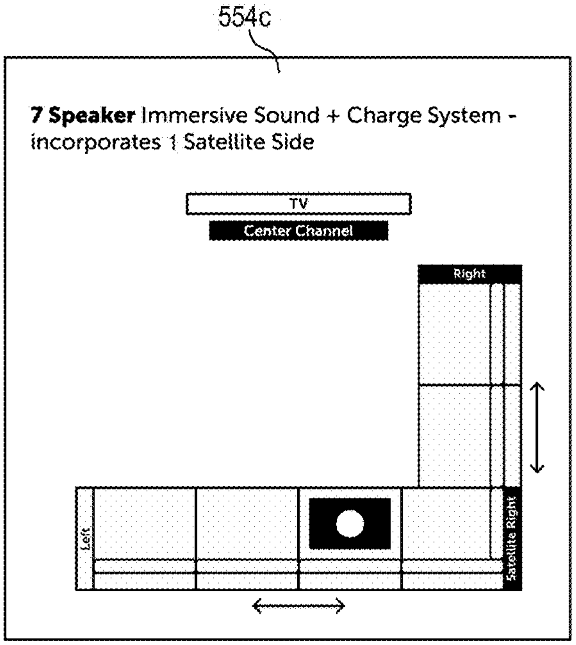
FIG. 53C illustrates a view of a graphical user interface accessible through the mobile device of FIG. 50 to select a configuration footprint shape having a right "L" configuration for tuning of an audio-enhanced modular furniture assembly or system.
Figure 53D:
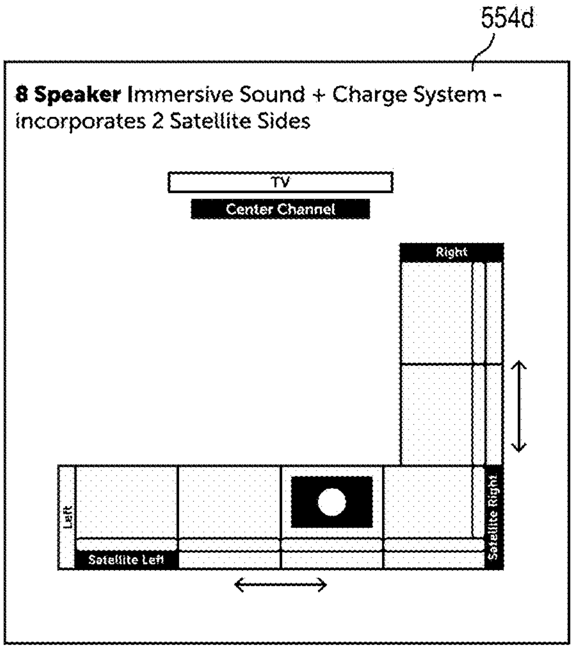
FIG. 53D illustrates a view of a graphical user interface accessible through the mobile device of FIG. 50 to select a configuration footprint shape having a right "L" configuration for tuning of an audio-enhanced modular furniture assembly or system.
Figure 53E:
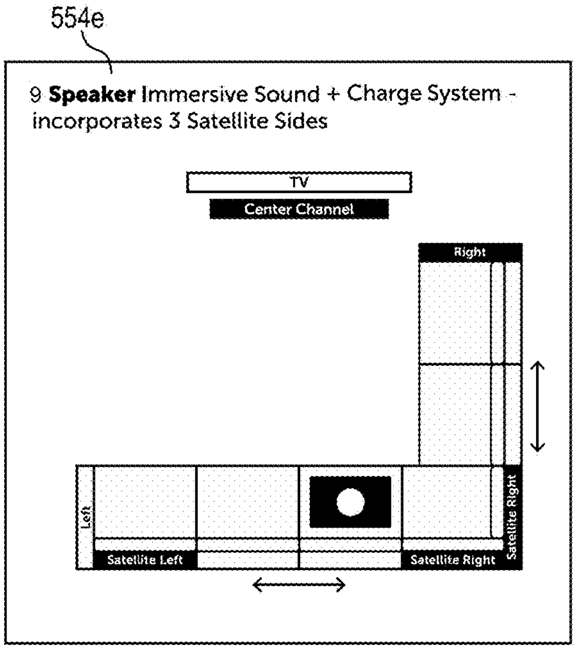
FIG. 53E illustrates a view of a graphical user interface accessible through the mobile device of FIG. 50 to select a configuration footprint shape having a right "L" configuration for tuning of an audio-enhanced modular furniture assembly or system.
Figure 54A:
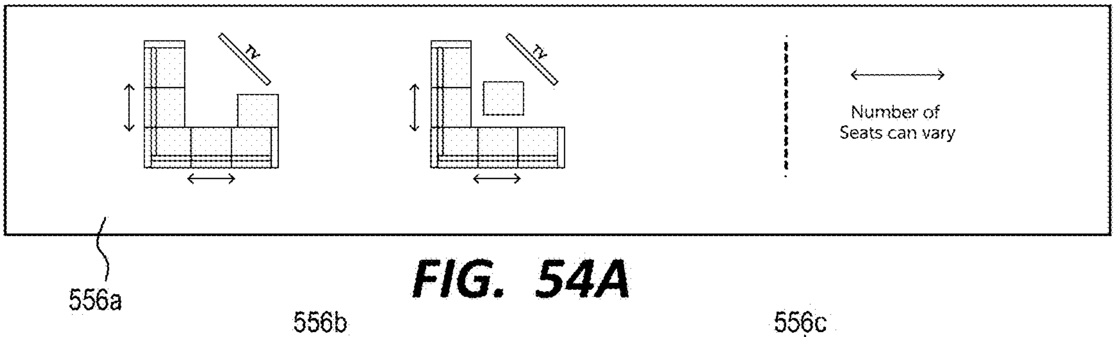
FIG. 54A illustrates a view of a graphical user interface accessible through the mobile device of FIG. 50 to select a configuration footprint shape having a left "L" configuration, with a visual display at an angle, for tuning of an audio-enhanced modular furniture assembly or system.
Figure 54B:
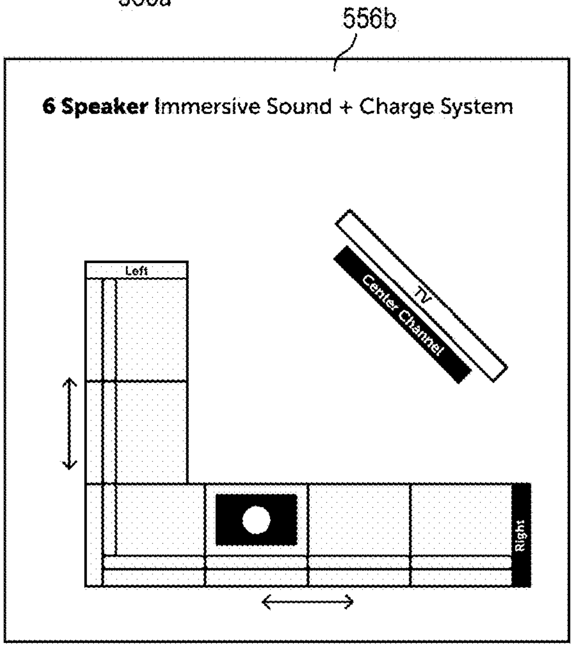
FIG. 54B illustrates a view of a graphical user interface accessible through the mobile device of FIG. 50 to select a configuration footprint shape having a left "L" configuration, with a visual display at an angle, for tuning of an audio-enhanced modular furniture assembly or system.
Figure 54C:
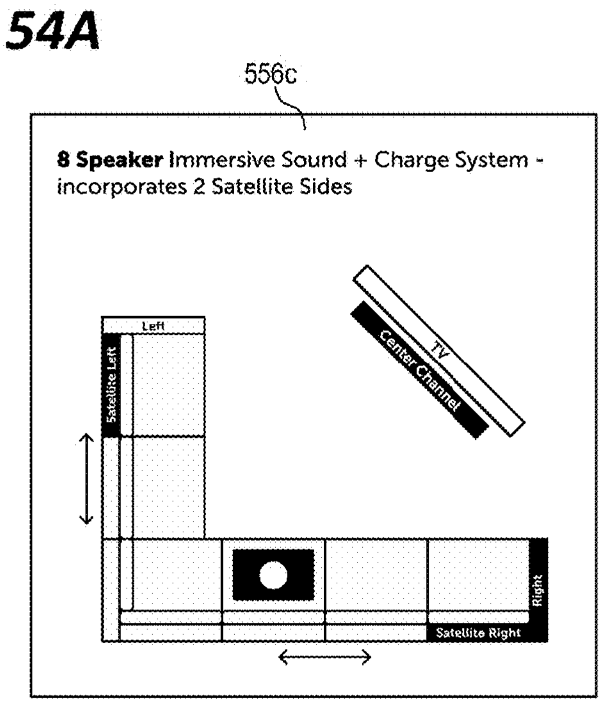
FIG. 54C illustrates a view of a graphical user interface accessible through the mobile device of FIG. 50 to select a configuration footprint shape having a left "L" configuration, with a visual display at an angle, for tuning of an audio-enhanced modular furniture assembly or system.
Figure 54D:
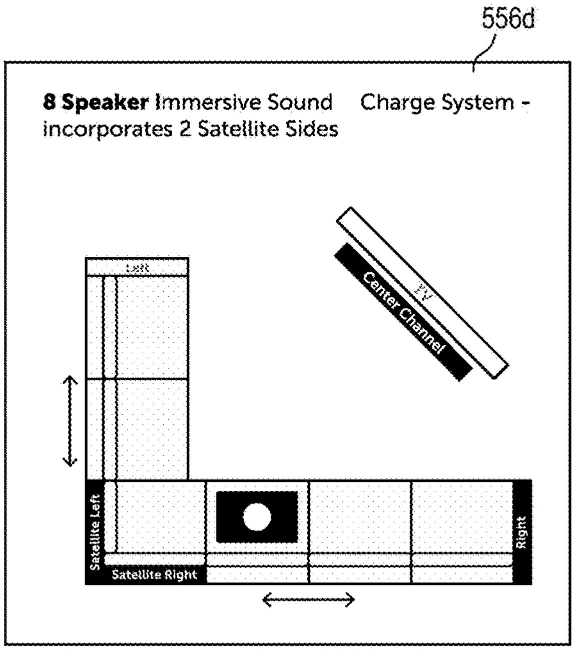
FIG. 54D illustrates a view of a graphical user interface accessible through the mobile device of FIG. 50 to select a configuration footprint shape having a left "L" configuration, with a visual display at an angle, for tuning of an audio-enhanced modular furniture assembly or system.
Figure 54E:
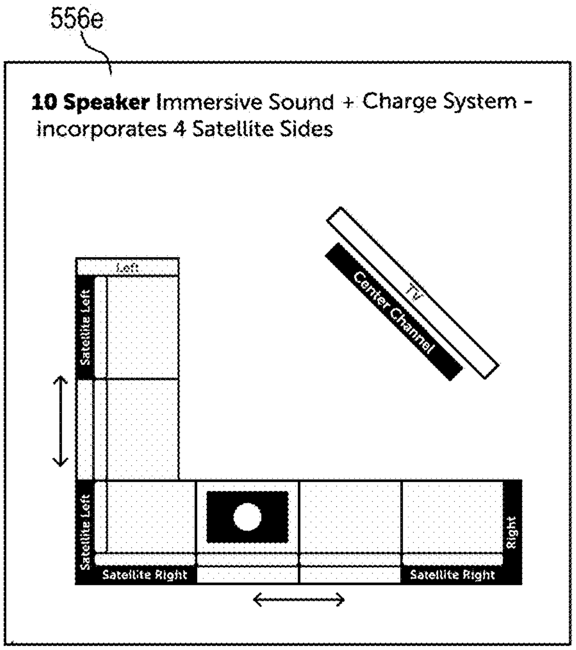
FIG. 54E illustrates a view of a graphical user interface accessible through the mobile device of FIG. 50 to select a configuration footprint shape having a left "L" configuration, with a visual display at an angle, for tuning of an audio-enhanced modular furniture assembly or system.
Figure 55A:
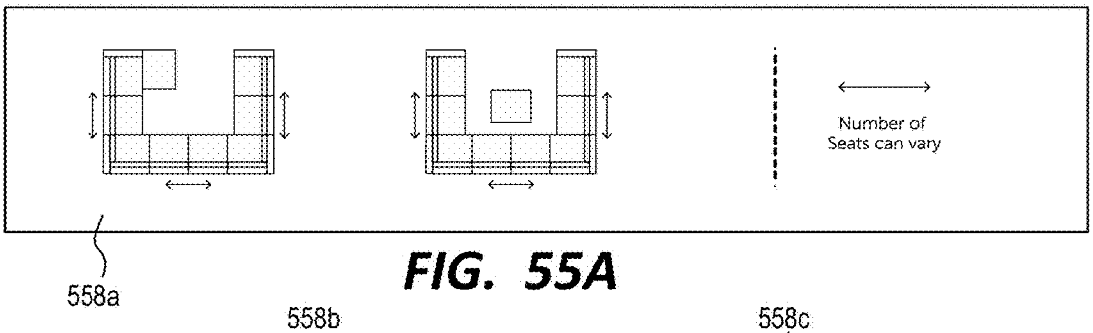
FIG. 55A illustrates a view of a graphical user interface accessible through the mobile device of FIG. 50 to select a configuration footprint shape having a "U" configuration for tuning of an audio-enhanced modular furniture assembly or system.
Figure 55B:
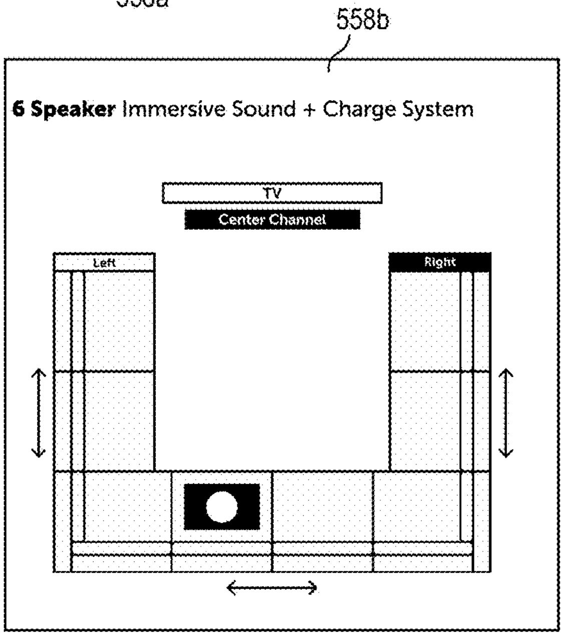
FIG. 55B illustrates a view of a graphical user interface accessible through the mobile device of FIG. 50 to select a configuration footprint shape having a "U" configuration for tuning of an audio-enhanced modular furniture assembly or system.
Figure 55C:
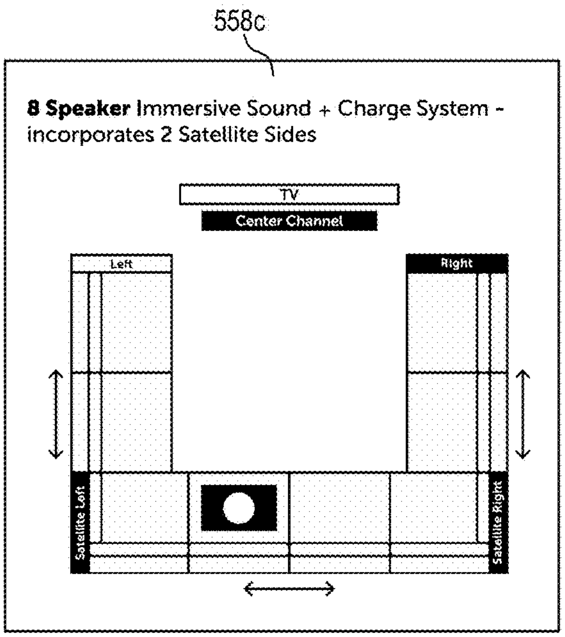
FIG. 55C illustrates a view of a graphical user interface accessible through the mobile device of FIG. 50 to select a configuration footprint shape having a "U" configuration for tuning of an audio-enhanced modular furniture assembly or system.
Figure 55D:
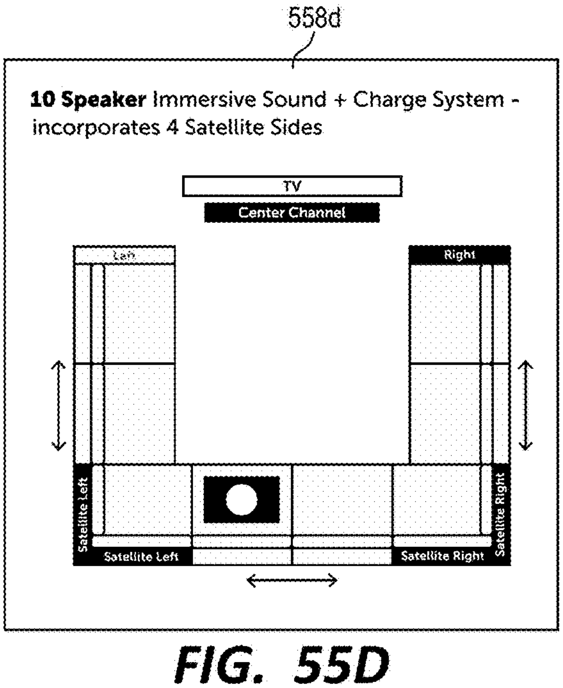
FIG. 55D illustrates a view of a graphical user interface accessible through the mobile device of FIG. 50 to select a configuration footprint shape having a "U" configuration for tuning of an audio-enhanced modular furniture assembly or system.
Figure 56A:
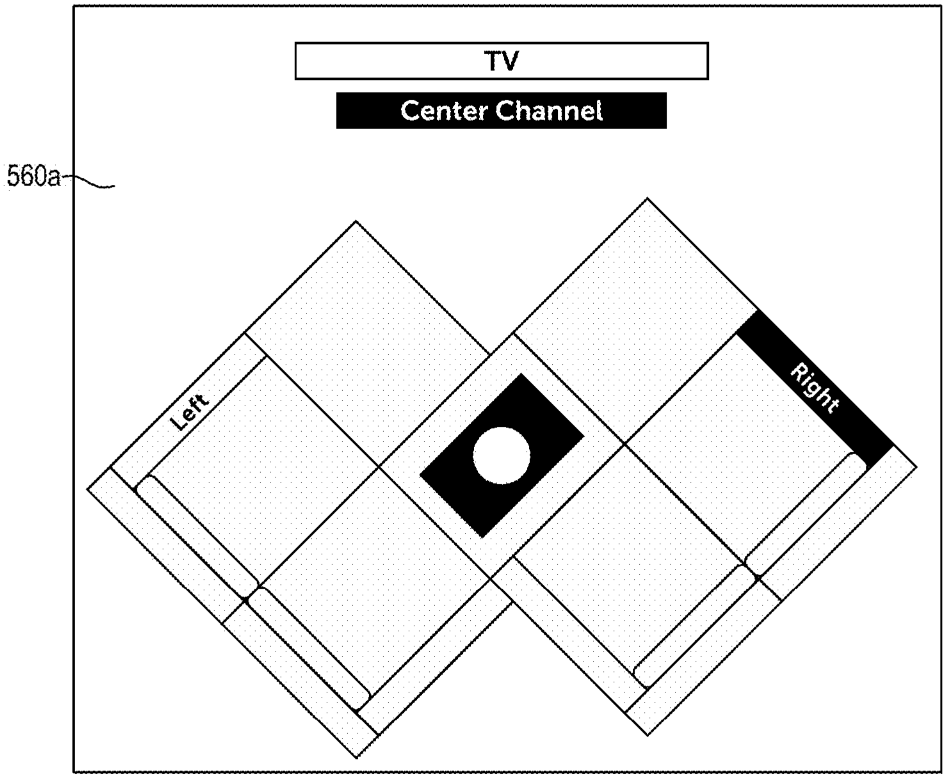
FIG. 56A illustrates a view of a graphical user interface accessible through the mobile device of FIG. 50 to select a configuration footprint shape having an "M" configuration for tuning of an audio-enhanced modular furniture assembly or system.
Figure 56B:
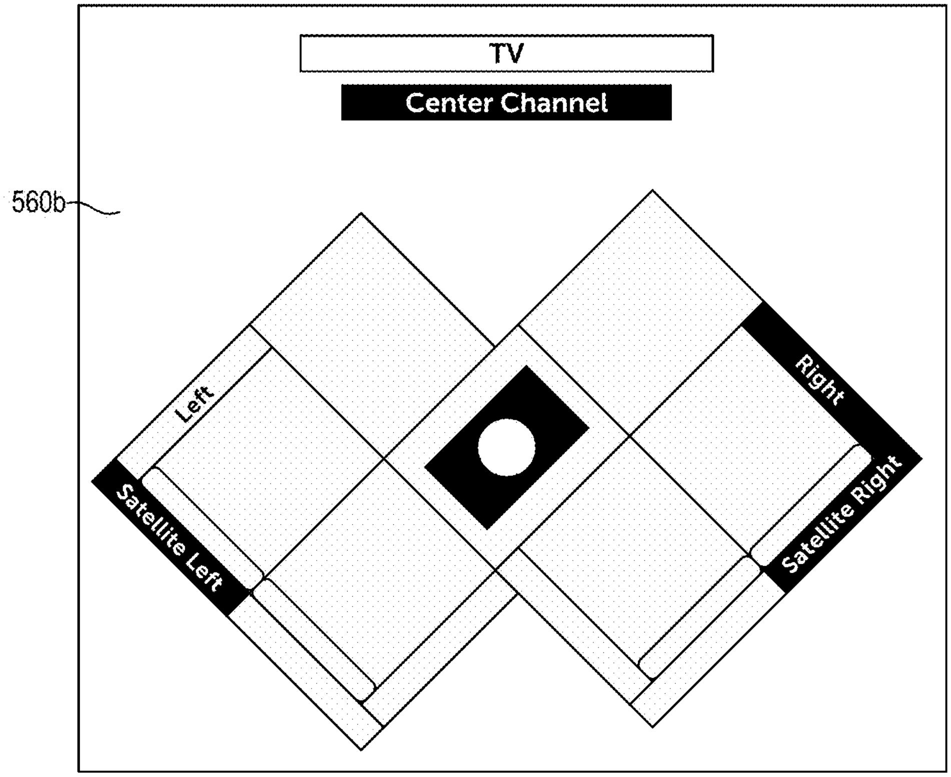
FIG. 56B illustrates a view of a graphical user interface accessible through the mobile device of FIG. 50 to select a configuration footprint shape having an "M" configuration for tuning of an audio-enhanced modular furniture assembly or system.
Figure 57A:
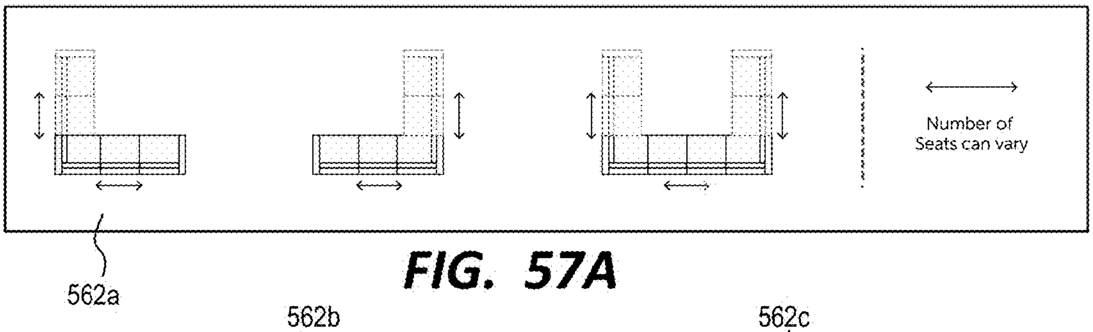
Figure 57B:
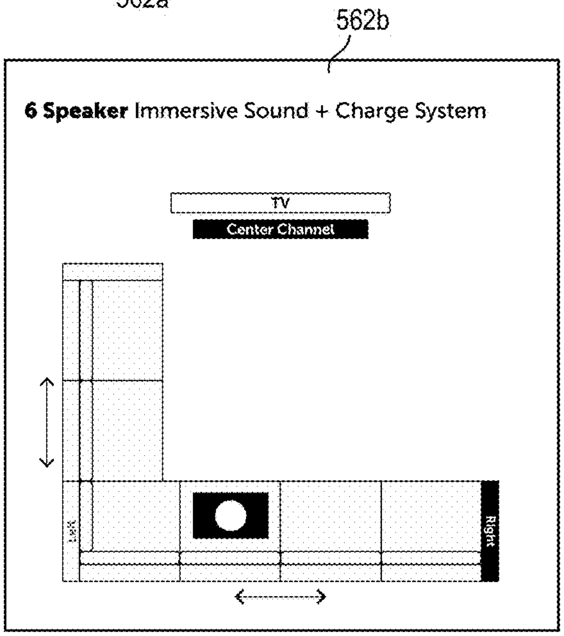
Figure 57C:
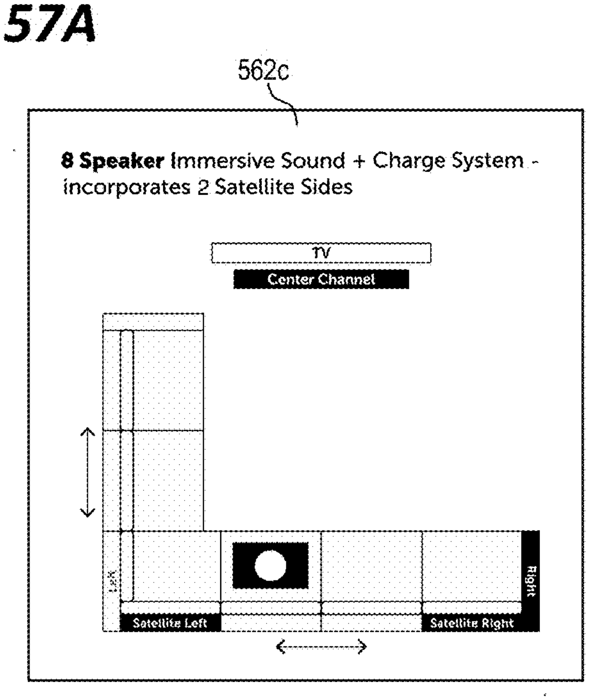
Figure 57D:
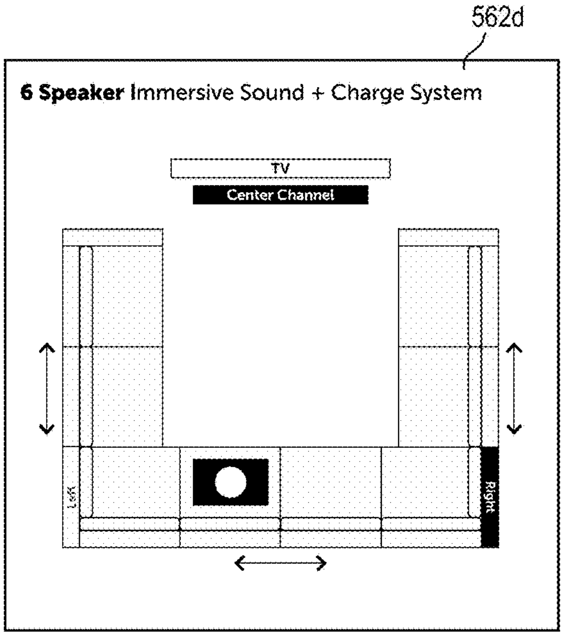
Figure 57E:
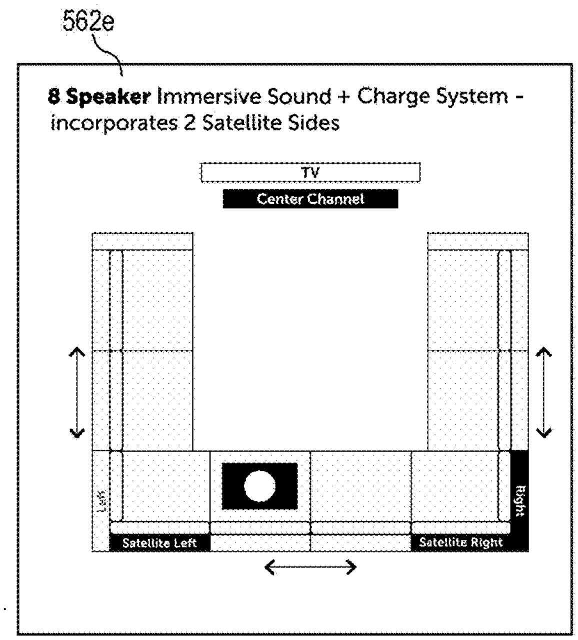

554*a* from FIG. 53A and the user can choose different configuration for which a tuning profile can be selected. Optionally, the configuration footprint shapes and/or sizes 554*b*-554*e* of FIG. 53B-53E can be displayed as suggested or recommended configuration footprint shapes, sizes, and combination of components and subcomponents, such as a combination of audio-enhanced bases and upright or transverse members and non-audio-enhanced bases and upright or transverse members.

By selecting button 556, for instance the user can access a graphical depiction of the modular furniture assembly having a left "L" configuration with the television on an angle in which the bases and uprights or transverse members generally form a left "L" configuration footprint shape when viewed from above. When the user selects the button 556 on the graphical user interface 481', the mobile device 480' can illustrate the view 556*a* from FIG. 54A and the user can choose different configuration for which a tuning profile can be selected. Optionally, the configuration footprint shapes and/or sizes 556*b*-556*e* of FIG. 54B-54E can be displayed as suggested or recommended configuration footprint shapes, sizes, and combination of components and subcomponents, such as a combination of audio-enhanced bases and upright or transverse members and non-audio-enhanced bases and upright or transverse members.

By selecting button 558, for instance the user can access a graphical depiction of the modular furniture assembly having a "U" configuration in which the bases and uprights or transverse members generally form a "U" configuration footprint shape when viewed from above. When the user selects the button 558 on the graphical user interface 481', the mobile device 480' can illustrate the view 558*a* from FIG. 55A and the user can choose different configuration for which a tuning profile can be selected. Optionally, the configuration footprint shapes and/or sizes 558*b*-558*d* of FIG. 55B-55D can be displayed as suggested or recommended configuration footprint shapes, sizes, and combination of components and subcomponents, such as a combination of audio-enhanced bases and upright or transverse members and non-audio-enhanced bases and upright or transverse members.

By selecting button 560, for instance the user can access a graphical depiction of the modular furniture assembly having an "M" configuration in which the bases and uprights or transverse members generally form a left "L" configuration footprint shape when viewed from above. When the user selects the button 560 on the graphical user interface 481', the mobile device 480' can illustrate the view 560*a* from FIG. 56A and/or the view 560*b* from FIG. 56B and the user can choose different configuration for which a tuning profile can be selected. Optionally, suggested or recommended configuration footprint shapes, sizes, and combination of components and subcomponents, such as a combination of audio-enhanced bases and upright or transverse members and non-audio-enhanced bases and upright or transverse members.

By selecting button 562, for instance the user can access a graphical depiction of the modular furniture assembly having optional "L" and "U" configurations in which the bases and uprights or transverse members generally form an "L" and "U" configuration footprint shape when viewed from above. When the user selects the button 556 through the graphical user interface 481', the mobile device 480' can illustrate the view 562*a* from FIG. 57A and the user can choose different configuration for which a tuning profile can be selected. Optionally, the configuration footprint shapes and/or sizes 562*b*-562*e* of FIG. 57B-57E can be displayed as suggested or recommended configuration footprint shapes, sizes, and combination of components and subcomponents, such as a combination of audio-enhanced bases and upright or transverse members and non-audio-enhanced bases and upright or transverse members.

The particular representation of the furniture configurations, shapes, sizes, footprints, etc. is selectable by the user through the mobile device to select an associated tuning profile for that particular furniture configuration, shape, footprint, etc. Other furniture configurations, shapes, footprints, etc., selectable through the mobile device 480' are possible. Additionally, the particular shape, orientation, and placement of buttons 550-562 as viewed on the mobile device 480', which associated graphical user interface, can be varied.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant work of furniture assemblies and audio systems.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Following are some further example embodiments of the present invention. These are presented only by way of example and are not intended to limit the scope of the invention in any way. Further, any example embodiment can be combined with one or more of the example embodiments.

Embodiment 1. An audio-enhanced furniture system, comprising: a furniture assembly; an upholstery fabric at least partially covering the furniture assembly; and a speaker system positioned within the furniture assembly, the speaker system comprising at least one speaker covered by the upholstery fabric, such that the at least one speaker is hidden from view, wherein the at least one speaker is configured to be tuned to compensate for sound being emitted from the speaker through the upholstery fabric by an adjustment to an equalization of one or more target audio frequencies emitted by the at least one speaker.

Embodiment 2. The audio-enhanced furniture system of embodiment 1, wherein the adjustment of the equalization of one or more target audio frequencies depends on at least one of a fabric type or a weight of the upholstery fabric.

Embodiment 3. The audio-enhanced furniture system of any of embodiments 1-2, further comprising a removable cover comprised of the upholstery fabric.

Embodiment 4. The audio-enhanced furniture system of any of embodiments 1-3, wherein the removeable cover is interchangeable with one or more alternative covers, each alternative cover comprising an alternative upholstery fabric.

Embodiment 5. The audio-enhanced furniture system of any of embodiments 1-4, wherein the at least one speaker is configured to be tuned via a mobile device.

Embodiment 6. The audio-enhanced furniture system of any of embodiments 1-5, wherein the at least one speaker is configured to be tuned via a control console associated with the furniture assembly.

Embodiment 7. The audio-enhanced furniture system of any of embodiments 1-6, further comprising at least one speaker controller in communication with the at least one speaker, the speaker controller being configured to control tuning of the at least one speaker.

Embodiment 8. The audio-enhanced furniture system of any of embodiments 1-7, wherein the at least one speaker controller is selectively controlled by at least one of a mobile device, a remote controller, or a console controller.

Embodiment 9. The audio-enhanced furniture system of any of embodiments 1-8, wherein the at least one speaker comprises a plurality of speakers, each speaker being configured to be tuned and controlled by the speaker controller.

Embodiment 10. The audio-enhanced furniture system of any of embodiments 1-9, wherein the one or more target audio frequencies comprises a plurality of target audio frequencies between about 20 Hz and 20 kHz.

Embodiment 11. The audio enhanced furniture system of any of embodiments 1-10, wherein at least one of the plurality of target audio frequencies is adjusted by at least 3 dB.

Embodiment 12. An audio-enhanced modular furniture system, comprising: (i) a modular furniture assembly comprising: (a) one or more bases; (b) a plurality of upright members, wherein at least two of the upright members are audio-enhanced upright members; and (ii) a speaker system positioned within the modular furniture assembly, the speaker system comprising: (a) at least one speaker mounted within a first audio-enhanced upright member, the at least one speaker being hidden from view by a first upholstery fabric that covers the first audio-enhanced upright member; (b) at least one speaker mounted within a second audio-enhanced upright member, the at least one speaker being hidden from view by a second upholstery fabric that covers the second audio-enhanced upright member; and (c) at least one speaker controller configured to control each speaker of the speaker system; wherein each speaker of the speaker system is configured to be tuned through the at least one speaker controller to compensate for sound being emitted from the speaker through the respective first or second upholstery fabric by adjusting one or more target audio frequencies emitted by the at least one speaker.

Embodiment 13. The audio-enhanced modular furniture assembly of embodiment 12, wherein the plurality of upright members can be selectively coupled to the one or more bases to form various furniture assembly configurations.

Embodiment 14. The audio-enhanced modular furniture system of any of embodiments 12-13, wherein at least one of the one or more bases is an audio-enhanced base, and wherein the speaker system further comprises at least one speaker mounted within the audio-enhanced base.

Embodiment 15. The audio-enhanced modular furniture system of any of embodiments 12-14, further comprising first and second removable covers, the first removable cover being comprised of the first upholstery fabric and the second removable cover being comprised of the second upholstery fabric.

Embodiment 16. The audio-enhanced modular furniture system of any of embodiments 12-15, wherein the adjustment of the equalization of one or more target audio frequencies depends on at least one of a fabric type or a weight of the upholstery fabric.

Embodiment 17. The audio-enhanced modular furniture system of any of embodiments 12-16, wherein the first upholstery fabric and the second upholstery fabric each comprise a different fabric type or weight, each speaker being tuned to specifically compensate for sound emitted through the corresponding first or second upholstery fabric.

Embodiment 18. The audio-enhanced furniture system of any of embodiments 12-17, wherein the fabric-specific tuning of each speaker is selectable via a dedicated control console, the control console selectively communicating with at least one speaker controller.

Embodiment 19. The audio-enhanced furniture system of any of embodiments 12-18, wherein the fabric-specific tuning of each speaker is selectable via a dedicated remote controller, the remote controller selectively communicating with at least one speaker controller.

Embodiment 20. The audio-enhanced furniture system of any of embodiments 12-19, wherein the fabric-specific tuning of each speaker is selectable via a mobile device, the mobile device selectively and wirelessly communicating with at least one speaker controller.

Embodiment 21. A method of tuning a speaker to compensate for loss of sound being emitted through upholstery fabric, the method comprising: providing an assemble-able modular furniture assembly comprising: (a) one or more bases; (b) a plurality of upright members, wherein at least one of the upright members is a first audio-enhanced upright member; and (c) a speaker system comprising: (i) at least one speaker mounted within the first audio-enhanced upright member, the at least one speaker being hidden from view by a first upholstery fabric that covers the first audio-enhanced upright member; and tuning the at least one speaker mounted within the first audio-enhanced upright member to compensate for sound being emitted from the at least one speaker through the first upholstery fabric by adjusting the equalization of one or more target audio frequencies emitted by the at least one speaker.

Embodiment 22. The method of embodiment 21, wherein the at least one speaker comprises a plurality of speakers, each speaker being separately tunable to compensate for sound being emitted from through fabric.

Embodiment 23. The method of any of embodiments 21-22, wherein tuning the at least one speaker comprises adjusting a signal transmitted from an audio source to the at least one speaker.

Embodiment 24. The method of any of embodiments 21-23, wherein tuning of the at least one speaker is provided through a software application on a mobile device.

Embodiment 25. The method of any of embodiments 21-24, wherein tuning of the at least one speaker is provided through a dedicated center console associated with the speaker system.

Embodiment 26. The method of any of embodiments 21-25, wherein the one or more target audio frequencies comprises a plurality of target audio frequencies between about 20 Hz and 20 kHz.

Embodiment 27. The method of any of embodiments 21-26, wherein at least one of the plurality of target audio frequencies is adjusted by at least 3 dB.

Embodiment 28. The method of any of embodiments 21-27, wherein each of the adjusted target audio frequencies is above 800 Hz.

Embodiment 29. The method of any of embodiments 21-28, wherein each of the adjusted target audio frequencies is above 2 kHz.

Embodiment 30. The method of any of embodiments 21-29, wherein each of the adjusted target audio frequencies is above 4 kHz.

Embodiment 31. An audio-enhanced furniture system, comprising: a furniture assembly; an upholstery fabric at least partially covering the furniture assembly; and a speaker system positioned within the furniture assembly, the speaker system comprising at least one speaker covered by the upholstery fabric, such that the at least one speaker is hidden from view, wherein the at least one speaker is configured to be tuned to compensate for sound being emitted from the speaker through the upholstery fabric by an adjustment to an equalization of one or more target audio frequencies or frequency bands emitted by the at least one speaker.

Embodiment 32. The audio-enhanced furniture system of embodiment 31, wherein the adjustment of the equalization of one or more target audio frequencies or frequency bands depends on at least one of a fabric type or a weight of the upholstery fabric.

Embodiment 33. The audio-enhanced furniture system of any of embodiments 31-32, further comprising a removable cover comprised of the upholstery fabric.

Embodiment 34. The audio-enhanced furniture system of any of embodiments 31-33, wherein the removeable cover is interchangeable with one or more alternative covers, each alternative cover comprising an alternative upholstery fabric.

Embodiment 35. The audio-enhanced furniture system of any of embodiments 31-34, wherein the at least one speaker is configured to be tuned by selection from a plurality of tuning profiles corresponding to a variety of upholstery fabrics.

Embodiment 36. The audio-enhanced furniture system of embodiment 35, wherein the plurality of tuning profiles includes tuning profiles corresponding to one or more of the following upholstery fabrics: polyester, chenille, tweed, linen, polyester linen, velvet, leather, cotton, cotton blend, denim, twill, or faux fur.

Embodiment 37. The audio-enhanced furniture system of any of embodiments 31-36, further comprising at least one speaker controller in communication with the at least one speaker, the speaker controller being configured to control tuning of the at least one speaker.

Embodiment 38. The audio-enhanced furniture system of any of embodiments 31-37, wherein the at least one speaker controller is selectively controlled by at least one of a mobile device, a remote controller, or a console controller.

Embodiment 39. The audio-enhanced furniture system of any of embodiments 31-38, wherein the at least one speaker comprises a plurality of speakers, each speaker being configured to be tuned and controlled by the speaker controller.

Embodiment 40. The audio-enhanced furniture system of any of embodiments 31-39, wherein the at least one speaker comprises a plurality of speakers, and wherein the at least one speaker controller comprises a plurality of dedicated speaker controllers, each dedicated speaker controller being dedicated to an individual speaker of the plurality of speakers.

Embodiment 41. An audio-enhanced modular furniture system, comprising: (i) a modular furniture assembly comprising: (a) one or more bases; (b) a plurality of upright members, wherein at least two of the upright members are audio-enhanced upright members; and (ii) a speaker system positioned within the modular furniture assembly, the speaker system comprising: (a) at least one speaker mounted within a first audio-enhanced upright member, the at least one speaker being hidden from view by a first upholstery fabric that covers the first audio-enhanced upright member; (b) at least one speaker mounted within a second audio-enhanced upright member, the at least one speaker being hidden from view by a second upholstery fabric that covers the second audio-enhanced upright member; and (c) at least one speaker controller configured to control each speaker of the speaker system; wherein each speaker of the speaker system is configured to be tuned through the at least one speaker controller to compensate for sound being emitted from the speaker through the respective first or second upholstery fabric by adjusting one or more target audio frequencies or frequency bands emitted by the at least one speaker.

Embodiment 42. The audio-enhanced modular furniture assembly of embodiment 41, wherein the plurality of upright members can be selectively coupled to the one or more bases to form various furniture assembly configurations.

Embodiment 43. The audio-enhanced modular furniture system of any of embodiments 41-42, further comprising first and second removable covers, the first removable cover being comprised of the first upholstery fabric and the second removable cover being comprised of the second upholstery fabric.

Embodiment 44. The audio-enhanced modular furniture system of any of embodiments 41-43, wherein at least one of the one or more bases is an audio-enhanced base, and wherein the speaker system further comprises at least one speaker mounted within the audio-enhanced base.

Embodiment 45. The audio-enhanced modular furniture system of any of embodiments 41-44, wherein each speaker of the speaker system is configured to be tuned according to a tuning profile comprised of at least one adjustment to at least one target audio frequency or frequency band emitted by the speaker, wherein the at least one adjustment depends on one or more characteristics of the respective first or second upholstery fabric through which the speaker emits sound.

Embodiment 46. The audio-enhanced modular furniture system of any of embodiments 41-45, wherein the tuning profile of each speaker of the speaker system is selectable from a plurality of tuning profiles corresponding to a variety of upholstery fabrics.

Embodiment 47. The audio-enhanced modular furniture system of any of embodiments 41-46, wherein the tuning profile of each speaker is selectable via a user interface on a mobile device, the mobile device selectively communicating with the at least one speaker controller.

Embodiment 48. The audio-enhanced modular furniture system of any of embodiments 41-47, wherein the tuning profile of each speaker is selectable via a dedicated control console, the control console selectively communicating with at least one speaker controller.

Embodiment 49. The audio-enhanced modular furniture system of any of embodiments 41-48, wherein the tuning profile of each speaker is selectable via a dedicated remote controller, the remote controller selectively communicating with at least one speaker controller.

Embodiment 50. The audio-enhanced modular furniture system of any of embodiments 41-49, wherein the at least one speaker controller comprises a plurality of dedicated speaker controllers, each dedicated speaker controller dedicated to an individual speaker of the speaker system.

Embodiment 51. The audio-enhanced modular furniture system of any of embodiments 41-50, wherein the tuning profile of each speaker is separately selectable via a user interface on a mobile device, the mobile device selectively communicating with the dedicated speaker controller of each speaker.

Embodiment 52. The audio-enhanced modular furniture system of any of embodiments 41-51, wherein the tuning profile of each speaker is selectable via a dedicated control console, the control console selectively communicating with the dedicated speaker controller of each speaker.

Embodiment 53. The audio-enhanced modular furniture system of any of embodiments 41-52, wherein the tuning profile of each speaker is selectable via a dedicated remote controller, the remote controller selectively communicating with the dedicated speaker controller of each speaker.

Embodiment 54. A method of tuning a speaker to compensate for sound being emitted through upholstery fabric, the method comprising: selecting a baseline equalization for a speaker within an audio system, the baseline equalization comprising one or more target audio frequencies, each audio frequency having a selected baseline volume; configuring the audio system such that the speaker emits sound at an actual volume approximately equal to the selected baseline volume of each of the one or more target audio frequencies; covering the speaker with a selected upholstery fabric; measuring a resultant volume of each of the one or more target audio frequencies as the speaker emits sound through the selected upholstery fabric; calculating a differential volume defined by the difference between the resultant volume and the selected baseline volume of each of the one or more target audio frequencies; and reconfiguring the audio system such that the speaker emits sound through the selected upholstery fabric according to the selected baseline equalization by adjusting the actual volume of each of the one or more target audio frequencies by a magnitude approximately equal to the differential volume of each respective target audio frequency.

Embodiment 55. The method of embodiment 54, further comprising: creating a tuning profile corresponding to the selected upholstery fabric, the tuning profile including each differential volume calculated for each of the one or more target audio frequencies.

Embodiment 56. The method of any of embodiments 54-55, further comprising: creating at least one additional tuning profile corresponding to at least one additional upholstery fabric by repeating each step of the recited method with the selected upholstery fabric being replaced by the at least one additional upholstery fabric.

Embodiment 57. The method of any of embodiments 54-56, further comprising: tuning a furniture-integrated speaker according to the tuning profile, wherein the furniture-integrated speaker is mounted within a furniture assembly and covered by an upholstery fabric that is identical or substantially similar to the selected upholstery fabric.

Embodiment 58. The method of any of embodiments 54-57, further comprising at least one speaker controller configured to control the at least one speaker, wherein reconfiguring the audio system further comprises tuning the speaker through at least one speaker controller associated with a modular furniture assembly.

Embodiment 59. The method of any of embodiments 54-58, wherein the at least one speaker controller comprises a dedicated center console configured to control the audio system.

Embodiment 60. The method of any of embodiments 54-59, further comprising: uploading the tuning profile to an audio source, such that the audio output signal of the audio source to a speaker system connected thereto is adjusted according to the tuning profile.

Embodiment 61. A method of tuning a speaker to compensate for loss of sound being emitted through upholstery fabric, the method comprising: providing an assemble-able modular furniture assembly comprising: (a) one or more bases; (b) a plurality of upright members, wherein at least one of the upright members is a first audio-enhanced upright member; and (c) a speaker system comprising: (i) at least one speaker mounted within the first audio-enhanced upright member, the at least one speaker being hidden from view by a first upholstery fabric that covers the first audio-enhanced upright member; and tuning the at least one speaker mounted within the first audio-enhanced upright member to compensate for sound being emitted from the at least one speaker through the first upholstery fabric by adjusting the equalization of one or more target audio frequencies or frequency bands emitted by the at least one speaker.

Embodiment 62. The method of embodiment 61, wherein tuning the at least one speaker comprises reconfiguring an audio system associated with the at least one speaker to adjust an actual volume of each of the one or more target audio frequencies or frequency bands by a magnitude approximately equal to a calculated differential volume of each of the one or more audio target frequencies or frequency bands.

Embodiment 63. The method of embodiment 62, wherein the calculated differential volume of each of the one or more target audio frequencies or frequency bands is equal to the difference between: (i) a baseline volume corresponding to sound emitted from the at least one speaker or a similar speaker, and (ii) a resultant volume corresponding to sound emitted from the at least one speaker or similar speaker when covered with the first upholstery fabric or a similar fabric.

Embodiment 64. The method of any of embodiments 54-63, further comprising: presenting a user with a plurality of tuning profiles corresponding to a plurality of upholstery fabrics; and in response to selection of one of the plurality of tuning profiles by the user, tuning the at least one speaker to compensate for sound being emitted from the speaker through the upholstery fabric to which the selected tuning profile corresponds.

Embodiment 65. The method of any of embodiments 54-64, wherein the at least one speaker comprises a plurality of speakers, each speaker being separately tunable by separate selection of one of the plurality of tuning profiles.

Embodiment 66. The method of any of embodiments 54-65, wherein the plurality of tuning profiles is presented and selectable via a user interface on a mobile device.

Embodiment 67. The method of any of embodiments 54-66, wherein the plurality of tuning profiles is presented and selectable via a dedicated console associated with the speaker system.

Embodiment 68. The method of any of embodiments 54-67, wherein tuning the at least one speaker comprises adjusting a signal transmitted from an audio source to the at least one speaker.

Embodiment 69. The method of any of embodiments 54-68, further comprising at least one speaker controller directly associated with the at least one speaker, the at least one speaker controller configured to tune the at least one speaker independent of signals transmitted to the speaker by an audio source.

Embodiment 70. The method of any of embodiments 54-69, wherein the one or more target audio frequencies or frequency bands are adjusted by increasing an actual volume of each of the one or more target audio frequencies or frequency bands by a magnitude up to about 25 decibels.

Embodiment 71. The method of any of embodiments 54-70, wherein each of the one or more target audio frequencies or frequency bands are adjusted by a magnitude between about 1 decibel and about 25 decibels.

Embodiment 72. The method of any of embodiments 54-71, wherein the one or more target audio frequencies or frequency bands are adjusted by increasing an actual volume of each of the one or more target audio frequencies or frequency bands by a magnitude up to about 21 decibels.

Embodiment 73. The method of any of embodiments 54-72, wherein each of the one or more target audio frequencies or frequency bands are adjusted by a magnitude between about 1 decibel and about 21 decibels.

Embodiment 74. The method of any of embodiments 54-73, wherein the one or more target audio frequencies or frequency bands are adjusted by increasing an actual volume of each of the one or more target audio frequencies or frequency bands by a magnitude up to about 16 decibels.

Embodiment 75. The method of any of embodiments 54-74, wherein each of the one or more target audio frequencies or frequency bands are adjusted by a magnitude between about 1 decibel and about 16 decibels.

Embodiment 76. The method of any of embodiments 54-75, wherein at least one of the one or more target audio frequencies or frequency bands is below 1000 Hz and is adjusted by a magnitude between about 1 decibel and about 8 decibels.

Embodiment 77. The method of any of embodiments 54-76, wherein the at least one target audio frequency or frequency band below 1000 Hz is adjusted by a magnitude between about 1 decibel and about 7 decibels.

Embodiment 78. The method of any of embodiments 54-77, wherein the at least one target audio frequency of frequency band below 1000 Hz is adjusted by a magnitude between about 1 decibel and about 6 decibels.

Embodiment 79. The method of any of embodiments 54-78, wherein the at least one target audio frequency of frequency band below 1000 Hz is adjusted by a magnitude between about 1 decibel and about 5 decibels.

Embodiment 80. The method of any of embodiments 54-79, wherein the at least one target audio frequency of frequency band below 1000 Hz is adjusted by a magnitude between about 1 decibel and about 4 decibels.

Embodiment 81. The method of any of embodiments 54-80, wherein the at least one target audio frequency of frequency band below 1000 Hz is adjusted by a magnitude between about 1 decibel and about 3 decibels.

Embodiment 82. The method of any of embodiments 54-81, wherein the at least one target audio frequency of frequency band below 1000 Hz is adjusted by a magnitude between about 1 decibel and about 2 decibels.

Embodiment 83. The method of any of embodiments 54-82, wherein the one or more target audio frequencies or frequency bands are adjusted by multiplying an actual volume of each of the one or more target audio frequencies or frequency bands by a factor from about 1 to about 1.3.

Embodiment 84. The method of any of embodiments 54-83, wherein the one or more target audio frequencies or frequency bands are adjusted by multiplying an actual volume of each of the one or more target audio frequencies or frequency bands by a factor from about 1 to about 1.25.

Embodiment 85. The method of any of embodiments 54-84, wherein the one or more target audio frequencies or frequency bands are adjusted by multiplying an actual volume of each of the one or more target audio frequencies or frequency bands by a factor from about 1 to about 1.2.

Embodiment 86. The method of any of embodiments 54-85, wherein the one or more target frequencies or frequency bands comprises at least four target frequencies or frequency bands.

Embodiment 87. The method of any of embodiments 54-86, wherein two or more of the at least four target frequencies or frequency bands are below 1000 Hz and are each adjusted by increasing an actual volume thereof by a magnitude from about 1 decibel to about 8 decibels.

Embodiment 88. The method of any of embodiments 54-87, wherein two or more of the at least four target frequencies or frequency bands are above 1000 Hz and are each adjusted by increasing an actual volume thereof by a magnitude from about 1 decibel to about 25 decibels.

Embodiment 89. The method of any of embodiments 54-88, wherein a magnitude of the adjustment of the equalization of one or more target audio frequencies or frequency bands depends on a selected volume of the speaker system.

Embodiment 90. An audio-enhanced furniture system comprising a reconfigurable furniture assembly comprising; one or more base(s) providing a seating surface; one or more upright member(s) having a height that is greater than that of the base; a speaker system comprising one or more speakers in the base, the upright member or both; and a controller for tuning the speaker system, the controller tuning the speaker system based on a configuration footprint shape of the furniture assembly.

Embodiment 91. The audio-enhanced furniture system of Embodiment 90, wherein the controller is configured to tune the speaker system by selection from a plurality of tuning profiles corresponding to a variety of configuration footprint shapes that the base(s) and the upright member(s) of the furniture assembly can be positioned in.

Embodiment 92. The audio-enhanced furniture system of any of the Embodiments 90-91, wherein the plurality of tuning profiles includes tuning profiles corresponding to one or more of the following configuration footprint shapes: a chair, a loveseat, a sofa, a right L corner sectional, a left L corner sectional, a U-shaped sectional, or an M-shaped sectional.

Embodiment 93. The audio-enhanced furniture system of any of the Embodiments 90-92, wherein the controller allows selection between two or more configuration footprint shapes selected from: a chair, a loveseat, a sofa, a right L corner sectional, a left L corner sectional, a U-shaped sectional, or an M-shaped sectional.

Embodiment 94. The audio-enhanced furniture system of any of the Embodiments 90-93, wherein the controller allows selection between two or more upholstery fabrics that cover the furniture assembly, any speakers in the base or upright member being covered by the upholstery fabric, the controller allowing selection between two or more upholstery fabrics selected from: polyester, chenille, tweed, linen, polyester linen, velvet, leather, cotton, cotton blend, denim, twill, or faux fur.

Embodiment 95. The audio-enhanced furniture system of any of the Embodiments 90-94, wherein the configuration footprint shapes include 1 seat, 2 seats, 3 seats, 4 seats or 5 seats on a backrow of the configuration footprint shape.

Embodiment 96. The audio-enhanced furniture system of any of the Embodiments 90-95, wherein the controller comprises a user interface on at least one of a mobile device, a remote controller, or a console controller that allows a user to make selections to tune the speaker system based on the configuration footprint shape of the furniture assembly.

Embodiment 97. The audio-enhanced furniture system of any of the Embodiments 90-96, wherein the user interface queries the user as to (i) the configuration footprint shape of the furniture assembly; (ii) what fabric covers the furniture assembly is covered with, and (iii) a location of a center channel speaker of the speaker system.

Embodiment 98. The audio-enhanced furniture system of any of the Embodiments 90-97, wherein the user interface queries the user as to whether the center channel speaker of the speaker system is table mounted or wall mounted.

Embodiment 99. The audio-enhanced furniture system of any of the Embodiments 90-98, wherein the user interface further queries the user as to how many seats are in the configuration.

Embodiment 100. The audio-enhanced furniture system of any of the Embodiments 90-99, wherein the controller tunes the speaker system by an adjustment to an equalization of one or more target audio frequencies or frequency bands emitted by the speaker being tuned, the adjustment of the equalization of one or more target audio frequencies or frequency bands being dependent on the configuration footprint shape of the furniture assembly.

Embodiment 101. The audio-enhanced furniture system of any of the Embodiments 90-100, wherein the speaker system includes at least 2 speakers embedded in the furniture assembly and a center channel speaker not embedded in the furniture assembly.

Embodiment 102. The audio-enhanced furniture system of any of the Embodiments 90-101, wherein the speaker system includes at least 5 speakers embedded in the furniture assembly and a center channel speaker not embedded in the furniture assembly.

Embodiment 103. The audio-enhanced furniture system of any of the Embodiments 90-102, wherein the 5 speakers include a front right and right surround speaker embedded in one of the upright members, a front left and left surround speaker embedded in another of the upright members, and a subwoofer embedded in the base.

Embodiment 104. The audio-enhanced furniture system of any of the Embodiments 90-103, further comprising a satellite surround speaker embedded in another upright member, the upright member including the satellite surround speaker being configured so that the satellite surround speaker is the only speaker embedded therein.

Embodiment 105. The audio-enhanced furniture system of any of the Embodiments 90-104, further comprising a satellite subwoofer embedded in another base, so that the furniture assembly includes at least two subwoofers in separate bases.

Embodiment 106. The audio-enhanced furniture system of any of the Embodiments 90-105, wherein configuration footprint shape includes accounting for size of the furniture assembly, as to how many seats are included therein.

Embodiment 107. The audio-enhanced furniture system of any of the Embodiments 90-106, wherein the upright member provides a backrest or an armrest, the upright member being directly connected to the base.

Embodiment 108. The audio-enhanced furniture system of any of the Embodiments 90-107, wherein the furniture assembly further comprises a coupler, wherein the upright member provides a backrest or an armrest, the upright member being indirectly coupled to the base by the coupler.

Embodiment 109. A method for tuning speakers of an audio-enhanced furniture system comprising: providing a reconfigurable furniture assembly comprising; one or more base(s) providing a seating surface; one or more upright member(s) having a height that is greater than that of the base; a speaker system comprising one or more speakers in the base, the upright member or both; and a controller for tuning the speaker system, the controller tuning the speaker system based on a configuration footprint shape of the furniture assembly; presenting a user with predetermined tuning profiles corresponding to a plurality of configuration footprint shapes in which the furniture assembly can be assembled; and in response to a user selection of a given configuration footprint shape, tuning the speaker system according to the tuning profile selected by the user.

Embodiment 110. The method of Embodiment 109, wherein the furniture assembly further comprises a coupler for selectively coupling the base to the transverse member.

Embodiment 111. The method of any of the Embodiments 109-110, wherein the predetermined tuning profiles include tuning profiles corresponding to one or more of the following configuration footprint shapes: a chair, a loveseat, a sofa, a right L corner sectional, a left L corner sectional, a U-shaped sectional, or an M-shaped sectional.

Embodiment 112. The method of any of the Embodiments 109-111, wherein the user selects between two or more configuration footprint shapes selected from: a chair, a loveseat, a sofa, a right L corner sectional, a left L corner sectional, a U-shaped sectional, or an M-shaped sectional.

Embodiment 113. The method of any of the Embodiments 109-112, wherein the controller further prompts the user to select between two or more upholstery fabrics that cover the furniture assembly, any speakers in the base or upright member being covered by the upholstery fabric, the controller allowing selection between two or more upholstery fabrics selected from: polyester, chenille, tweed, linen, polyester linen, velvet, leather, cotton, cotton blend, denim, twill, or faux fur.

Embodiment 114. The method of any of the Embodiments 109-113, wherein the configuration footprint shapes include 1 seat, 2 seats, 3 seats, 4 seats or 5 seats on a backrow of the configuration footprint shape.

Embodiment 115. The method of any of the Embodiments 109-114, wherein the controller comprises a user interface on at least one of a mobile device, a remote controller, or a console controller that allows a user to make selections to tune the speaker system based on the configuration footprint shape of the furniture assembly.

Embodiment 116. The method of any of the Embodiments 109-115, wherein the user interface queries the user as to (i) the configuration footprint shape of the furniture assembly; (ii) what fabric covers the furniture assembly is covered with, and (iii) a location of a center channel speaker of the speaker system.

Embodiment 117. The method of any of the Embodiments 109-116, wherein the user interface queries the user as to whether the center channel speaker of the speaker system is table mounted or wall mounted.

Embodiment 118. The method of any of the Embodiments 109-117, wherein the user interface further queries the user as to how many seats are in the configuration.

Embodiment 119. The method of any of the Embodiments 109-118, wherein the controller tunes the speaker system by an adjustment to an equalization of one or more target audio frequencies or frequency bands emitted by the speaker being tuned, the adjustment of the equalization of one or more target audio frequencies or frequency bands being dependent on the configuration footprint shape of the furniture assembly selected by the user.

Embodiment 120. The method of any of the Embodiments 109-119, wherein the speaker system includes at least 2 speakers embedded in the furniture assembly and a center channel speaker not embedded in the furniture assembly.

Embodiment 121. The method of any of the Embodiments 109-120, wherein the speaker system includes at least 5 speakers embedded in the furniture assembly and a center channel speaker not embedded in the furniture assembly.

Embodiment 122. The method of any of the Embodiments 109-121, wherein the 5 speakers include a front right and right surround speaker embedded in one of the upright members, a front left and left surround speaker embedded in another of the upright members, and a subwoofer embedded in the base.

Embodiment 123. The method of any of the Embodiments 109-122, further comprising a satellite surround speaker embedded in another upright member, the upright member including the satellite surround speaker being configured so that the satellite surround speaker is the only speaker embedded therein.

Embodiment 124. The method of any of the Embodiments 109-123, further comprising a satellite subwoofer embedded in another base, so that the furniture assembly includes at least two subwoofers in separate bases.

Embodiment 125. The method of any of the Embodiments 109-124, wherein the upright member provides a backrest or an armrest, the upright member being directly connected to the base.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An audio-enhanced furniture system comprising:

a reconfigurable furniture assembly assembled into a furniture configuration by a user comprising;
 one or more bases providing a seating surface;
 one or more upright members having a height that is greater than that of the one or more bases, wherein at least one of the one or more upright members further includes a cavity, wherein an electrical hub is mounted within the cavity;
 a speaker system comprising one or more speakers in the one or more bases, the one or more upright members or both, wherein the electrical hub provides power to the speaker system; and
 a controller for at least one of boosting or attenuating at least one of the one or more speakers of the speaker system based on a configuration footprint shape of the reconfigurable furniture assembly, wherein the electrical hub provides power to the controller.

2. The audio-enhanced furniture system of claim 1, wherein the controller is configured to tune the speaker system by selection from a plurality of tuning profiles corresponding to a variety of configuration footprint shapes that the one or more bases and the one or more upright members of the reconfigurable furniture assembly can be positioned in.

3. The audio-enhanced furniture system of claim 2, wherein the plurality of tuning profiles includes tuning profiles corresponding to one or more configuration footprint shapes including a chair, a loveseat, a sofa, a right L corner sectional, a left L corner sectional, a U-shaped sectional, or an M-shaped sectional.

4. The audio-enhanced furniture system of claim 3, wherein the controller allows selection between at least two of the configuration footprint shapes.

5. The audio-enhanced furniture system of claim 1, wherein the controller allows selection of one or more upholstery fabrics that cover the reconfigurable furniture assembly, any speakers in the one or more bases or the one or more upright members being covered by the one or more upholstery fabrics, the controller allowing selection of the one or more upholstery fabrics selected from: polyester, chenille, tweed, linen, polyester linen, velvet, leather, cotton, cotton blend, denim, twill, or faux fur.

6. The audio-enhanced furniture system of claim 1, wherein the configuration footprint shape include 1 seat, 2 seats, 3 seats, 4 seats or 5 seats on a backrow of the configuration footprint shape.

7. The audio-enhanced furniture system of claim 1, wherein the controller comprises a user interface on at least one of a mobile device, a remote controller, or a console controller that allows a user to make selections to tune the speaker system based on the configuration footprint shape of the reconfigurable furniture assembly.

8. The audio-enhanced furniture system of claim 7, wherein the user interface queries the user as to (i) the configuration footprint shape of the reconfigurable furniture assembly; (ii) what fabric covers the reconfigurable furniture assembly is covered with, and (iii) a location of a center channel speaker of the speaker system.

9. The audio-enhanced furniture system of claim 8, wherein the user interface queries the user as to whether the center channel speaker of the speaker system is table mounted or wall mounted.

10. The audio-enhanced furniture system of claim 8, wherein the user interface further queries the user as to how many seats are in the configuration footprint shape.

11. The audio-enhanced furniture system of claim 7, wherein the controller tunes the speaker system by an adjustment to an equalization of one or more target audio frequencies or frequency bands emitted by the speaker system being tuned, the adjustment of the equalization of the one or more target audio frequencies or frequency bands being dependent on the configuration footprint shape of the reconfigurable furniture assembly.

12. The audio-enhanced furniture system of claim 1, wherein the speaker system includes at least 2 speakers embedded in the reconfigurable furniture assembly and a center channel speaker not embedded in the reconfigurable furniture assembly.

13. The audio-enhanced furniture system of claim 1, wherein the speaker system includes at least 5 speakers embedded in the reconfigurable furniture assembly and a center channel speaker not embedded in the reconfigurable furniture assembly.

14. The audio-enhanced furniture system of claim 13, wherein each of the one or more speakers include a front right and right surround speaker embedded in one of the one or more upright members, a front left and left surround speaker embedded in another of the one or more upright members, and a subwoofer embedded in the one or more bases.

15. The audio-enhanced furniture system of claim 1, further comprising a satellite surround speaker embedded in the one or more upright members, wherein the one or more upright members including the satellite surround speaker is configured so that the satellite surround speaker is the only speaker embedded therein.

16. The audio-enhanced furniture system of claim 14, further comprising a satellite subwoofer embedded in the one or more bases, so that the reconfigurable furniture assembly includes at least two subwoofers in separate bases of the one or more bases.

17. The audio-enhanced furniture system of claim 1, wherein the configuration footprint shape includes accounting for size of the reconfigurable furniture assembly, as to how many seats are included therein.

18. The audio-enhanced furniture system of claim 1, wherein the one or more upright members provide a backrest or an armrest, the one or more upright members being directly connected to the one or more bases.

19. The audio-enhanced furniture system of claim 1, wherein the reconfigurable furniture assembly further comprises a coupler, wherein the one or more upright members provides a backrest or an armrest, the one or more upright members being indirectly coupled to the one or more bases by the coupler.

20. A method comprising:

identifying a user selection of a configuration footprint shape of a reconfigurable furniture assembly, the reconfigurable furniture assembly comprising one or more bases providing a seating surface and one or more upright members positioned relative to the one or more bases, wherein at least one of the one or more upright members further includes a cavity, at least one of the one or more bases or the one or more upright members housing one or more speakers of a speaker system, wherein an electrical hub is mounted within the cavity, the electrical hub providing power to the one more speakers; and at least one of boosting or attenuating at least one speaker of the one or more speakers of the speaker system based on the configuration footprint shape of the reconfigurable furniture assembly.

* * * * *